United States Patent
Simpson

(10) Patent No.: US 12,354,033 B2
(45) Date of Patent: Jul. 8, 2025

(54) TIME INTERVAL GEOLOCATION COMMUNITY OBJECTS WITH PRICE-TIME PRIORITY QUEUES FOR TRANSFORMED TIME INTERVAL GEOLOCATION UNITS

(71) Applicant: CirclesX LLC, Houston, TX (US)

(72) Inventor: Erik Mowery Simpson, Houston, TX (US)

(73) Assignee: CIRCLESX LLC, Houston, TX (US)

( * ) Notice: Subject to any disclaimer, the term of this patent is extended or adjusted under 35 U.S.C. 154(b) by 898 days.

(21) Appl. No.: 17/324,051

(22) Filed: May 18, 2021

(65) Prior Publication Data

US 2021/0342869 A1  Nov. 4, 2021

Related U.S. Application Data

(63) Continuation-in-part of application No. 17/082,254, filed on Oct. 28, 2020, and a continuation-in-part of (Continued)

(51) Int. Cl.
*G06Q 10/02* (2012.01)
*G01C 21/34* (2006.01)
(Continued)

(52) U.S. Cl.
CPC ......... *G06Q 10/02* (2013.01); *G01C 21/3438* (2013.01); *G06Q 30/08* (2013.01); *G06Q 50/47* (2024.01); *G06Q 30/0206* (2013.01)

(58) Field of Classification Search
None
See application file for complete search history.

(56) References Cited

U.S. PATENT DOCUMENTS

D209,710 S   12/1967 Bruce
4,476,954 A  10/1984 Johnson et al.
(Continued)

FOREIGN PATENT DOCUMENTS

CN  107341968 A  11/2017
GB  2539556 A   12/2016
(Continued)

OTHER PUBLICATIONS

Freebeat, Smart Exercise Bike; retrieved from internet: https://www.amazon.com/Resistance-Cushioned-Detection-Altorithm-Instructors/dp/B0BZKKZ6B3/?th=1; Mar. 3, 2023; p. 1.
(Continued)

*Primary Examiner* — Sunit Pandya
(74) *Attorney, Agent, or Firm* — Pramudji Law Group PLLC; Ari Pramudji

(57) ABSTRACT

Various implementations directed to price time priority queue routing for time interval object capacity units are provided. The method may also include generating data packet routes based on the origin location data and the destination location data. The method may further include determining virtual hubs along the data packet routes, where the virtual hubs include a first virtual hub based on the origin location data and a second virtual hub based on the destination location data. The method may additionally include receiving travel cost data for the routes for geolocation time interval object exchange units. In addition, the method may include receiving market depth data for a geolocation exchange for the geolocation exchange units based on the data packet routes. The method may also include selecting an optimized route of the routes for the geolocation exchange units based on an objective function.

17 Claims, 106 Drawing Sheets

Related U.S. Application Data application No. 17/069,597, filed on Oct. 13, 2020, and a continuation-in-part of application No. 16/589,229, filed on Oct. 1, 2019, now abandoned, and a continuation-in-part of application No. 16/556,838, filed on Aug. 30, 2019, now Pat. No. 11,555,709, and a continuation-in-part of application No. 16/397,685, filed on Apr. 29, 2019, and a continuation-in-part of application No. 16/359,841, filed on Mar. 20, 2019, now Pat. No. 12,141,885, and a continuation-in-part of application No. 16/357,241, filed on Mar. 18, 2019, and a continuation-in-part of application No. 16/274,490, filed on Feb. 13, 2019, now Pat. No. 11,215,466, and a continuation-in-part of application No. 16/258,658, filed on Jan. 27, 2019, now Pat. No. 11,035,682, and a continuation-in-part of application No. 16/257,032, filed on Jan. 24, 2019, now abandoned, and a continuation-in-part of application No. 16/242,981, filed on Jan. 8, 2019, now abandoned, and a continuation-in-part of application No. 16/242,967, filed on Jan. 8, 2019, now Pat. No. 12,001,999, and a continuation-in-part of application No. 16/239,485, filed on Jan. 3, 2019, and a continuation-in-part of application No. 16/183,647, filed on Nov. 7, 2018, now Pat. No. 11,861,527, and a continuation-in-part of application No. 16/167,525, filed on Oct. 22, 2018, now Pat. No. 11,810,023, and a continuation-in-part of application No. 15/877,393, filed on Jan. 23, 2018, now Pat. No. 12,124,976, and a continuation-in-part of application No. 15/266,326, filed on Sep. 15, 2016, now Pat. No. 11,138,827.

(60) Provisional application No. 63/052,159, filed on Jul. 15, 2020, provisional application No. 63/051,373, filed on Jul. 13, 2020, provisional application No. 63/044,997, filed on Jun. 26, 2020, provisional application No. 63/039,918, filed on Jun. 16, 2020, provisional application No. 63/027,344, filed on May 19, 2020, provisional application No. 62/927,081, filed on Oct. 28, 2019, provisional application No. 62/914,427, filed on Oct. 12, 2019.

(51) Int. Cl.
*G06Q 30/08* (2012.01)
*G06Q 50/47* (2024.01)
*G06Q 30/0201* (2023.01)

(56) References Cited

U.S. PATENT DOCUMENTS

| | | |
|---|---|---|
| D318,073 S | 7/1991 | Jang |
| 5,249,259 A | 9/1993 | Harvey |
| 5,412,560 A | 5/1995 | Dennison |
| 5,604,676 A | 2/1997 | Penzias |
| 5,726,885 A | 3/1998 | Klein et al. |
| 5,751,245 A | 5/1998 | Janky et al. |
| 5,948,040 A | 9/1999 | DeLorme |
| 5,973,619 A | 10/1999 | Paredes |
| 6,175,831 B1 | 1/2001 | Weinreich et al. |
| 6,240,396 B1 | 5/2001 | Walker et al. |
| 6,285,999 B1 | 9/2001 | Page |
| D453,945 S | 2/2002 | Shan |
| 6,356,838 B1 | 3/2002 | Paul |
| 6,400,996 B1 | 6/2002 | Hoffberg |
| D460,952 S | 7/2002 | Kataoka |
| 6,421,606 B1 | 7/2002 | Asai et al. |
| 6,434,530 B1 | 8/2002 | Sloane et al. |
| D468,738 S | 1/2003 | Lin |
| D469,089 S | 1/2003 | Lin |
| 6,609,103 B1 | 8/2003 | Kolls |
| 6,618,062 B1 | 9/2003 | Brown et al. |
| 6,646,659 B1 | 11/2003 | Brown et al. |
| 6,663,564 B2 | 12/2003 | Miller-Kovach et al. |
| 6,708,879 B2 | 3/2004 | Hunt |
| 6,850,907 B2 | 2/2005 | Lutnick et al. |
| 7,010,472 B1 | 3/2006 | Vasey-Glandon et al. |
| 7,090,638 B2 | 8/2006 | Vidgen |
| 7,373,320 B1 | 5/2008 | Mcdonough |
| D590,396 S | 4/2009 | Lo |
| 7,584,123 B1 | 9/2009 | Karonis et al. |
| 7,634,442 B2 | 12/2009 | Alvarado et al. |
| 7,680,690 B1 | 3/2010 | Catalano |
| 7,680,770 B1 | 3/2010 | Buyukkokten et al. |
| 7,711,629 B2 * | 5/2010 | Laurent ............ G06Q 10/0834 705/37 |
| 7,747,739 B2 | 6/2010 | Bridges et al. |
| 7,756,633 B2 | 7/2010 | Huang et al. |
| 7,788,207 B2 | 8/2010 | Alcorn et al. |
| D628,171 S | 11/2010 | Hakopian |
| 7,886,166 B2 | 2/2011 | Shnekendorf et al. |
| D638,879 S | 5/2011 | Suto |
| 7,987,110 B2 | 7/2011 | Cases et al. |
| 8,024,234 B1 | 9/2011 | Thomas et al. |
| 8,065,191 B2 | 11/2011 | Senior |
| D650,385 S | 12/2011 | Chiu |
| 8,121,780 B2 | 2/2012 | Gerdes et al. |
| 8,249,946 B2 | 8/2012 | Froseth et al. |
| 8,296,335 B2 | 10/2012 | Bouve et al. |
| 8,388,451 B2 | 3/2013 | Auterio et al. |
| 8,570,244 B2 | 10/2013 | Mukawa |
| 8,762,035 B2 | 6/2014 | Levine et al. |
| 8,798,593 B2 | 8/2014 | Haney |
| 8,918,411 B1 | 12/2014 | Latif et al. |
| 8,920,175 B2 | 12/2014 | Black et al. |
| 8,930,490 B2 | 1/2015 | Brown et al. |
| 8,968,099 B1 | 3/2015 | Hanke et al. |
| 9,011,153 B2 | 4/2015 | Bennett et al. |
| 9,020,763 B2 | 4/2015 | Faaborg et al. |
| 9,077,204 B2 | 7/2015 | More et al. |
| 9,092,826 B2 | 7/2015 | Deng et al. |
| 9,159,088 B2 | 10/2015 | Dillahunt et al. |
| 9,213,957 B2 | 12/2015 | Stefik et al. |
| 9,274,540 B2 | 3/2016 | Anglin et al. |
| 9,292,764 B2 | 3/2016 | Yun et al. |
| 9,387,928 B1 | 7/2016 | Gentry et al. |
| 9,389,090 B1 | 7/2016 | Levine et al. |
| 9,389,094 B2 | 7/2016 | Brenner et al. |
| 9,410,963 B2 | 8/2016 | Martin et al. |
| 9,436,923 B1 | 9/2016 | Sriram et al. |
| D772,828 S | 11/2016 | Kusumoto |
| 9,528,972 B2 | 12/2016 | Minvielle |
| 9,558,515 B2 | 1/2017 | Babu et al. |
| 9,665,983 B2 | 5/2017 | Spivack |
| 9,880,577 B2 | 1/2018 | Dyess et al. |
| 9,952,042 B2 | 4/2018 | Abovitz et al. |
| 9,960,637 B2 | 5/2018 | Sanders et al. |
| 9,978,282 B2 | 5/2018 | Lambert et al. |
| 10,082,793 B1 | 9/2018 | Glaser |
| D832,355 S | 10/2018 | Castro |
| 10,216,367 B1 | 2/2019 | Patel |
| 10,262,289 B2 | 4/2019 | Vaananen |
| 10,395,332 B1 | 8/2019 | Konrardy et al. |
| 10,403,050 B1 | 9/2019 | Beall et al. |
| 10,460,520 B2 | 10/2019 | Simpson et al. |
| 10,533,850 B2 | 1/2020 | Abovitz et al. |
| 10,586,084 B2 | 3/2020 | Burch et al. |
| 10,685,503 B2 | 6/2020 | Ricci |
| 10,737,585 B2 | 8/2020 | Chaudhary et al. |
| D896,315 S | 9/2020 | Castro |
| 10,832,337 B1 | 11/2020 | Floyd et al. |
| D903,657 S | 12/2020 | Catania |
| D903,658 S | 12/2020 | Catania |
| D903,659 S | 12/2020 | Catania |
| 10,872,381 B1 | 12/2020 | Leise et al. |
| D910,758 S | 2/2021 | Leong |
| 11,138,827 B2 | 10/2021 | Simpson |
| D938,375 S | 12/2021 | Zhang |

(56) References Cited

U.S. PATENT DOCUMENTS

| | | | |
|---|---|---|---|
| 11,288,563 | B2 | 3/2022 | Lee et al. |
| 11,296,897 | B2 | 4/2022 | Endress et al. |
| 11,298,017 | B2 | 4/2022 | Tran |
| 11,298,591 | B2 | 4/2022 | Evancha |
| 11,537,953 | B2 | 12/2022 | Beaurepaire |
| 11,555,709 | B2 | 1/2023 | Simpson |
| 11,586,993 | B2 | 2/2023 | Handler et al. |
| D980,210 | S | 3/2023 | Wu |
| 11,651,464 | B2 | 5/2023 | Park |
| D993,316 | S | 7/2023 | Lin |
| 11,704,219 | B1 | 7/2023 | Lerner et al. |
| 11,722,500 | B2 | 8/2023 | Singh |
| 11,734,618 | B2 | 8/2023 | Ogden |
| 1,000,137 | A1 | 10/2023 | Shuster |
| 1,007,451 | A1 | 12/2023 | Im |
| 1,024,065 | A1 | 4/2024 | Kim |
| 2002/0004788 | A1 | 1/2002 | Gros et al. |
| 2002/0013718 | A1* | 1/2002 | Cornwell ............... G06Q 10/02 705/5 |
| 2002/0013761 | A1 | 1/2002 | Bundy |
| 2002/0017997 | A1 | 2/2002 | Wall |
| 2002/0065738 | A1 | 5/2002 | Riggs et al. |
| 2002/0065766 | A1 | 5/2002 | Brown et al. |
| 2002/0128952 | A1* | 9/2002 | Melkomian ............ G06Q 40/04 705/37 |
| 2002/0133456 | A1 | 9/2002 | Lancaster et al. |
| 2002/0161689 | A1 | 10/2002 | Segal |
| 2003/0055776 | A1 | 3/2003 | Samuelson |
| 2003/0191725 | A1 | 10/2003 | Ratliff et al. |
| 2003/0233311 | A1* | 12/2003 | Bramnick .......... G06Q 30/0601 705/26.1 |
| 2004/0019552 | A1 | 1/2004 | Tobin |
| 2004/0115596 | A1 | 6/2004 | Snyder et al. |
| 2004/0249742 | A1 | 12/2004 | Laurent et al. |
| 2004/0254819 | A1 | 12/2004 | Halim |
| 2004/0260581 | A1 | 12/2004 | Baranowski et al. |
| 2005/0021346 | A1 | 1/2005 | Nadan et al. |
| 2005/0027637 | A1 | 2/2005 | Kohler |
| 2005/0132070 | A1 | 6/2005 | Redlich et al. |
| 2005/0288974 | A1* | 12/2005 | Baranowski ......... G06Q 10/025 705/5 |
| 2005/0288986 | A1 | 12/2005 | Barts et al. |
| 2006/0104224 | A1 | 5/2006 | Singh et al. |
| 2006/0184321 | A1 | 8/2006 | Kawakami |
| 2007/0005224 | A1 | 1/2007 | Sutardja |
| 2007/0260723 | A1 | 11/2007 | Cohen |
| 2008/0033833 | A1 | 2/2008 | Senior |
| 2008/0040232 | A1 | 2/2008 | Perchthaler |
| 2008/0077309 | A1 | 3/2008 | Cobbold |
| 2008/0129490 | A1 | 6/2008 | Linville et al. |
| 2008/0140557 | A1 | 6/2008 | Bowlby et al. |
| 2008/0157990 | A1 | 7/2008 | Belzer et al. |
| 2008/0195432 | A1 | 8/2008 | Fell et al. |
| 2008/0262892 | A1 | 10/2008 | Prager et al. |
| 2009/0221338 | A1 | 9/2009 | Stewart |
| 2009/0231687 | A1 | 9/2009 | Yamamoto |
| 2009/0271236 | A1 | 10/2009 | Ye et al. |
| 2009/0275002 | A1 | 11/2009 | Hoggle |
| 2009/0276154 | A1 | 11/2009 | Subramanian et al. |
| 2009/0287401 | A1 | 11/2009 | Levine et al. |
| 2009/0309729 | A1 | 12/2009 | Nichols |
| 2010/0042421 | A1 | 2/2010 | Bai et al. |
| 2010/0081548 | A1 | 4/2010 | Labedz |
| 2010/0114790 | A1 | 5/2010 | Strimling et al. |
| 2010/0191834 | A1 | 7/2010 | Zampiello |
| 2010/0208029 | A1 | 8/2010 | Marti |
| 2010/0211441 | A1 | 8/2010 | Sprigg et al. |
| 2010/0217680 | A1 | 8/2010 | Fusz et al. |
| 2010/0228574 | A1 | 9/2010 | Mundinger et al. |
| 2010/0280748 | A1 | 11/2010 | Mundinger et al. |
| 2010/0280884 | A1 | 11/2010 | Levine et al. |
| 2010/0306078 | A1 | 12/2010 | Hwang |
| 2010/0318373 | A1 | 12/2010 | Harris |
| 2011/0025267 | A1 | 2/2011 | Kamen et al. |
| 2011/0059693 | A1 | 3/2011 | O'Sullivan |
| 2011/0098056 | A1 | 4/2011 | Rhoads et al. |
| 2011/0106660 | A1 | 5/2011 | Ajjarapu et al. |
| 2011/0184784 | A1 | 7/2011 | Rudow |
| 2011/0191248 | A1 | 8/2011 | Bishop |
| 2011/0202418 | A1 | 8/2011 | Kempton et al. |
| 2012/0023032 | A1 | 1/2012 | Visdomini |
| 2012/0072925 | A1 | 3/2012 | Jenkins et al. |
| 2012/0075067 | A1 | 3/2012 | Attaluri |
| 2012/0078743 | A1 | 3/2012 | Betancourt |
| 2012/0101629 | A1 | 4/2012 | Olsen et al. |
| 2012/0136527 | A1 | 5/2012 | McQuade |
| 2012/0158762 | A1 | 6/2012 | IwuchukWu |
| 2012/0303259 | A1 | 11/2012 | Prosser |
| 2012/0323645 | A1 | 12/2012 | Spiegel et al. |
| 2013/0024041 | A1 | 1/2013 | Golden et al. |
| 2013/0035973 | A1 | 2/2013 | Desai et al. |
| 2013/0132261 | A1* | 5/2013 | Ebersole ................ G06Q 40/00 705/37 |
| 2013/0147820 | A1 | 6/2013 | Kalai et al. |
| 2013/0173326 | A1 | 7/2013 | Anglin et al. |
| 2013/0179205 | A1 | 7/2013 | Slinin |
| 2013/0191237 | A1 | 7/2013 | Tenorio |
| 2013/0211863 | A1 | 8/2013 | White |
| 2013/0265174 | A1 | 10/2013 | Scofield et al. |
| 2013/0268325 | A1 | 10/2013 | Dembo |
| 2013/0275156 | A1 | 10/2013 | Kinkaid et al. |
| 2013/0304522 | A1 | 11/2013 | Cundle |
| 2013/0311264 | A1 | 11/2013 | Solomon et al. |
| 2014/0032034 | A1 | 1/2014 | Raptopoulos |
| 2014/0038781 | A1 | 2/2014 | Foley |
| 2014/0052500 | A1 | 2/2014 | Vallapuzha et al. |
| 2014/0075528 | A1 | 3/2014 | Matsuoka |
| 2014/0098009 | A1 | 4/2014 | Prest et al. |
| 2014/0122190 | A1 | 5/2014 | Wolfson et al. |
| 2014/0129302 | A1 | 5/2014 | Amin et al. |
| 2014/0149157 | A1 | 5/2014 | Shaam et al. |
| 2014/0162598 | A1 | 6/2014 | Villa-Real |
| 2014/0180732 | A1 | 6/2014 | Rotchin |
| 2014/0220516 | A1 | 8/2014 | Marshall et al. |
| 2014/0229258 | A1 | 8/2014 | Seriani |
| 2014/0236641 | A1 | 8/2014 | Dawkins |
| 2014/0244413 | A1 | 8/2014 | Senior |
| 2014/0282586 | A1 | 9/2014 | Shear et al. |
| 2014/0310019 | A1 | 10/2014 | Blander et al. |
| 2014/0310149 | A1* | 10/2014 | Singh ..................... G06Q 40/04 705/37 |
| 2014/0324633 | A1 | 10/2014 | Pollak et al. |
| 2014/0349672 | A1 | 11/2014 | Kern et al. |
| 2015/0006428 | A1 | 1/2015 | Miller |
| 2015/0016777 | A1 | 1/2015 | Abovitz et al. |
| 2015/0058051 | A1 | 2/2015 | Movshovich |
| 2015/0097864 | A1 | 4/2015 | Alaniz |
| 2015/0154516 | A1 | 6/2015 | Joachim |
| 2015/0161564 | A1 | 6/2015 | Sweeney et al. |
| 2015/0178642 | A1* | 6/2015 | Abboud ................ G06Q 10/02 705/5 |
| 2015/0198459 | A1 | 7/2015 | MacNeille et al. |
| 2015/0206443 | A1 | 7/2015 | Aylesworth et al. |
| 2015/0220916 | A1 | 8/2015 | Prakash et al. |
| 2015/0241236 | A1 | 8/2015 | Slusar et al. |
| 2015/0248689 | A1 | 9/2015 | Paul et al. |
| 2015/0260474 | A1 | 9/2015 | Rublowsky et al. |
| 2015/0269865 | A1 | 9/2015 | Volach et al. |
| 2015/0324831 | A1 | 11/2015 | Barua et al. |
| 2015/0348282 | A1 | 12/2015 | Gibbon et al. |
| 2015/0371186 | A1 | 12/2015 | Podgurny et al. |
| 2016/0018969 | A1 | 1/2016 | Sundarraman |
| 2016/0026253 | A1 | 1/2016 | Bradski et al. |
| 2016/0034305 | A1 | 2/2016 | Shear et al. |
| 2016/0041628 | A1 | 2/2016 | Verma |
| 2016/0063436 | A1 | 3/2016 | Coles |
| 2016/0117657 | A1 | 4/2016 | Forbes, Jr. et al. |
| 2016/0117756 | A1 | 4/2016 | Carr et al. |
| 2016/0148289 | A1 | 5/2016 | Altschuler |
| 2016/0162989 | A1 | 6/2016 | Cole et al. |
| 2016/0171891 | A1 | 6/2016 | Banatwala et al. |
| 2016/0203422 | A1* | 7/2016 | Demarchi ............... G06F 16/29 705/6 |
| 2016/0221935 | A1 | 8/2016 | Jaworska-Maslanka |

(56) References Cited

U.S. PATENT DOCUMENTS

| | | |
|---|---|---|
| 2016/0224935 A1 | 8/2016 | Burnett |
| 2016/0225115 A1 | 8/2016 | Levy et al. |
| 2016/0253662 A1 | 9/2016 | Sriram |
| 2016/0307276 A1 | 9/2016 | Young |
| 2016/0297316 A1 | 10/2016 | Penilla et al. |
| 2016/0298977 A1 | 10/2016 | Newlin |
| 2016/0300296 A1 | 10/2016 | Alonso Cembrano |
| 2016/0307288 A1 | 10/2016 | Yehuda et al. |
| 2016/0307373 A1 | 10/2016 | Dean et al. |
| 2016/0321609 A1 | 11/2016 | Dube et al. |
| 2016/0349835 A1 | 12/2016 | Shapira |
| 2016/0364679 A1 | 12/2016 | Cao |
| 2017/0019496 A1 | 1/2017 | Orbach |
| 2017/0039770 A1 | 2/2017 | Lanier et al. |
| 2017/0046658 A1 | 2/2017 | Jones et al. |
| 2017/0046664 A1 | 2/2017 | Haldenby et al. |
| 2017/0046799 A1 | 2/2017 | Chan et al. |
| 2017/0046806 A1 | 2/2017 | Haldenby et al. |
| 2017/0048216 A1 | 2/2017 | Chow et al. |
| 2017/0053461 A1 | 2/2017 | Pal et al. |
| 2017/0061509 A1 | 3/2017 | Rosenberg et al. |
| 2017/0089710 A1 | 3/2017 | Slusar |
| 2017/0122746 A1 | 5/2017 | Howard et al. |
| 2017/0146360 A1 | 5/2017 | Averbuch |
| 2017/0232300 A1 | 8/2017 | Tran et al. |
| 2017/0243286 A1 | 8/2017 | Castinado et al. |
| 2017/0243310 A1* | 8/2017 | Dawkins ............... G06Q 10/02 |
| 2017/0249626 A1 | 8/2017 | Marlatt |
| 2017/0276500 A1 | 9/2017 | Margalit et al. |
| 2017/0293881 A1 | 10/2017 | Narkulla |
| 2017/0293950 A1 | 10/2017 | Rathod |
| 2017/0318325 A1 | 11/2017 | Ortiz |
| 2017/0330274 A1 | 11/2017 | Conant, II et al. |
| 2017/0356749 A1 | 12/2017 | Shelby |
| 2017/0357914 A1 | 12/2017 | Tulabandhula |
| 2018/0012149 A1 | 1/2018 | Yust |
| 2018/0013211 A1 | 1/2018 | Ricci |
| 2018/0025417 A1 | 1/2018 | Brathwaite et al. |
| 2018/0046431 A1 | 2/2018 | Thagadur Shivappa et al. |
| 2018/0053226 A1 | 2/2018 | Hutton et al. |
| 2018/0053237 A1 | 2/2018 | Hayes et al. |
| 2018/0068355 A1 | 3/2018 | Garry |
| 2018/0075695 A1 | 3/2018 | Simpson |
| 2018/0088455 A1 | 3/2018 | Cippant |
| 2018/0095471 A1 | 4/2018 | Allan et al. |
| 2018/0102053 A1 | 4/2018 | Hillman et al. |
| 2018/0111494 A1 | 4/2018 | Penilla et al. |
| 2018/0117447 A1 | 5/2018 | Bao et al. |
| 2018/0121958 A1 | 5/2018 | Aist et al. |
| 2018/0129276 A1 | 5/2018 | Nguyen et al. |
| 2018/0140903 A1 | 5/2018 | Poure |
| 2018/0143029 A1 | 5/2018 | Nikulin et al. |
| 2018/0157999 A1 | 6/2018 | Arora |
| 2018/0165354 A1 | 6/2018 | Mehta et al. |
| 2018/0173742 A1 | 6/2018 | Liu et al. |
| 2018/0173800 A1 | 6/2018 | Chang et al. |
| 2018/0188715 A1 | 7/2018 | Cella et al. |
| 2018/0190026 A1 | 7/2018 | Barnett et al. |
| 2018/0209801 A1 | 7/2018 | Stentz |
| 2018/0209803 A1 | 7/2018 | Rakah |
| 2018/0238705 A1 | 8/2018 | O'Herlihy |
| 2018/0240542 A1 | 8/2018 | Grimmer |
| 2018/0278984 A1 | 9/2018 | Aimone et al. |
| 2018/0293638 A1 | 10/2018 | Simpson |
| 2018/0313798 A1 | 11/2018 | Chokshi et al. |
| 2018/0342106 A1 | 11/2018 | Rosado |
| 2018/0348863 A1 | 12/2018 | Aimone et al. |
| 2018/0357899 A1 | 12/2018 | Krivacic et al. |
| 2018/0365598 A1 | 12/2018 | Jamail |
| 2018/0365904 A1 | 12/2018 | Holmes |
| 2018/0374268 A1 | 12/2018 | Niles |
| 2019/0019144 A1 | 1/2019 | Gillen |
| 2019/0020973 A1 | 1/2019 | Harish |
| 2019/0047427 A1 | 2/2019 | Pogorelik |
| 2019/0050634 A1 | 2/2019 | Nerayoff et al. |
| 2019/0066528 A1 | 2/2019 | Hwang et al. |
| 2019/0102946 A1 | 4/2019 | Spivack et al. |
| 2019/0108686 A1 | 4/2019 | Spivack et al. |
| 2019/0139448 A1 | 5/2019 | Marshall et al. |
| 2019/0143828 A1 | 5/2019 | Sawada et al. |
| 2019/0146974 A1 | 5/2019 | Chung et al. |
| 2019/0158603 A1 | 5/2019 | Nelson et al. |
| 2019/0160958 A1 | 5/2019 | Chaudhary et al. |
| 2019/0178654 A1 | 6/2019 | Hare |
| 2019/0180862 A1 | 6/2019 | Wisser et al. |
| 2019/0186942 A1 | 6/2019 | Rubin |
| 2019/0188450 A1 | 6/2019 | Spivack et al. |
| 2019/0202448 A1 | 7/2019 | Pal et al. |
| 2019/0204110 A1 | 7/2019 | Dubielzyk |
| 2019/0205798 A1 | 7/2019 | Rosas-Maxemin et al. |
| 2019/0228269 A1 | 7/2019 | Brent et al. |
| 2019/0236741 A1 | 8/2019 | Bowman et al. |
| 2019/0236742 A1 | 8/2019 | Tomskii et al. |
| 2019/0251503 A1 | 8/2019 | Simpson |
| 2019/0251509 A1 | 8/2019 | Simpson |
| 2019/0259008 A1 | 8/2019 | Lindsey |
| 2019/0271553 A1 | 9/2019 | Simpson |
| 2019/0272589 A1 | 9/2019 | Simpson |
| 2019/0293438 A1 | 9/2019 | Simpson |
| 2019/0304000 A1 | 10/2019 | Simpson |
| 2019/0311431 A1 | 10/2019 | Simpson |
| 2019/0318286 A1 | 10/2019 | Simpson |
| 2019/0324989 A1 | 10/2019 | Borochoff et al. |
| 2019/0325541 A1 | 10/2019 | Simpson |
| 2019/0333166 A1 | 10/2019 | Simpson |
| 2019/0333181 A1 | 10/2019 | Simpson |
| 2019/0353499 A1 | 11/2019 | Stenneth |
| 2020/0013498 A1 | 1/2020 | Gelber |
| 2020/0027096 A1 | 1/2020 | Cooner |
| 2020/0047055 A1 | 2/2020 | Ward |
| 2020/0098071 A1 | 3/2020 | Jackson |
| 2020/0125999 A1 | 4/2020 | Simpson |
| 2020/0151816 A1 | 5/2020 | Simpson |
| 2020/0156495 A1 | 5/2020 | Lindup |
| 2020/0160461 A1 | 5/2020 | Kaniki |
| 2020/0173808 A1 | 6/2020 | Beaurepaire et al. |
| 2020/0219017 A1 | 7/2020 | Simpson |
| 2020/0226853 A1 | 7/2020 | Ahmed et al. |
| 2020/0317074 A1 | 10/2020 | Miller et al. |
| 2020/0317075 A1 | 10/2020 | Yokoyama et al. |
| 2020/0389301 A1 | 12/2020 | Detres et al. |
| 2021/0004909 A1 | 1/2021 | Farmer et al. |
| 2021/0012278 A1 | 1/2021 | Alon et al. |
| 2021/0041258 A1 | 2/2021 | Simpson |
| 2021/0042835 A1 | 2/2021 | Simpson |
| 2021/0065100 A1 | 3/2021 | Hwang |
| 2021/0158447 A1 | 5/2021 | Simpson |
| 2021/0166317 A1 | 6/2021 | Simpson |
| 2021/0248633 A1 | 8/2021 | Simpson |
| 2021/0318132 A1 | 10/2021 | Simpson |
| 2021/0326872 A1 | 10/2021 | Robotham |
| 2021/0379447 A1 | 12/2021 | Lee |
| 2021/0382924 A1 | 12/2021 | Aaltonen et al. |
| 2022/0020073 A1 | 1/2022 | Farmer |
| 2022/0068081 A1 | 3/2022 | Pariseau |
| 2022/0100731 A1 | 3/2022 | Tirapu Azpiroz et al. |
| 2022/0122026 A1 | 4/2022 | Okabe et al. |
| 2023/0157579 A1 | 5/2023 | Sato |
| 2023/0377409 A1 | 11/2023 | Rye |

FOREIGN PATENT DOCUMENTS

| | | |
|---|---|---|
| JP | 2003177034 A | 12/2001 |
| KR | 20170078094 A1 | 12/2015 |
| WO | 9508240 A2 | 3/1995 |
| WO | 2001041084 A2 | 6/2001 |
| WO | 2015059691 A1 | 4/2015 |
| WO | 2015161307 A1 | 4/2015 |
| WO | 2018024844 A1 | 2/2018 |
| WO | 2019/134005 A1 | 7/2019 |

(56) References Cited

FOREIGN PATENT DOCUMENTS

| WO | 2019183468 A1 | 9/2019 |
|---|---|---|
| WO | 2021/163675 A1 | 8/2021 |

OTHER PUBLICATIONS

Li, Jundong, et al., "Multi-network Embedding", pp. 1-9, 2018.
Speediance, All-in-One Smart Home Gym; retrieved from internet: https://www.amazon.com/Speediance-Equipment-Resistance-Training-Machine-Works/dp/B0C4KF7844/?th=1; May 8, 2023; p. 1.
The Wayback Machine, Interest Rate Swaps, https://web.archive.org/web/20171006212154/https://global.pimco.com/en/gbl/resources/education/understanding-interest-rate-swaps, 2016, pp. 1-7.
Freight Derivatives—a Vital Tool for Your Business, https://www.reedsmith.com/-/media/files/perspectives/2007/02/freight-derivatives—a-vital-tool-for-your-business/files/freight-derivatives—a vital-tool-for-your-business/fileattachment/etcfreightderivativesavitaltoolforyourbusiness.pdf (Year: 2007), Energy, Trade & Commodities, pp. 1-3.
Jiang, Landu, et al., Sun Chase: Energy-Efficient Route Planning for solar-powered Evs, IEEE 37th international conference on distrubuted computing systems, 2017, pp. 1-11.
Directed Graph, https://en.wikipedia.org/wiki/Directed_graph, pp. 1-6, 2022.
About IBM Food Trust, https://www.ibm.com/downloads/cas/E9DBNDJG, pp. 1-17, 2019.
IBM Blockchain Transparent Supply, https://www.ibm.com/downloads/cas/BKQDK0M2, pp. 1-14, Aug. 2020.
Radocchia, Samantha, 3 Innovative Ways Blockchain Will Build Trust in the Food Industry, https://www.forbes.com/sites/samantharadocchia/2018/04/26/3-innovative-ways-blockchain-will-build-trust-in-the-food-industry/?sh=65bc79f42afc, Forbes, pp. 1-5, Apr. 26, 2018.
Change the World, https://fortune.com/change-the-world/2019/ibm/, Fortune Media IP Limited, pp. 1-5, 2022.
IBM Food Trust, https://www.constellationr.com/node/17601/vote/application/view/588, Constellation Research Inc., pp. 1-4, 2010-2022.
Dey, Somdip, et al., FoodSQRBlock: Digitizing Food Production and the Supply Chain with Blockchain and QR Code in the Cloud, https://www.mdpi.com/2071-1050/13/6/3486/htm, MDPI, pp. 1-27, Mar. 22, 2021.
Wyzant, https://web.archive.org/web/20190327185429/https://www.wyzant.com/hotitworks/students,Wyzant tutoring, pp. 1-13 , Mar. 27, 2019.
PCT International Search Report and Written Opinion; PCT/US2021/065855; Mar. 29, 2022.
PCT International Search Report and Written Opinion; PCT/US2022/012717; Mar. 30, 2022.
Zhao, et al., Incentives in Ridesharing with Deficit Control, Proceedings of the 13th International Conference on Autonomous Agents and Multiagent Systems (AAMAS 2014), May 5-9, 2014, pp. 1021-1028.
Peters, et al.; Student Support Services for Online Learning Re-Imagined and Re-Invigorated: Then, Now and What's to Come; Contact North | Contact Nord; Sep. 2017.
Soccer ball-shaped drone might be the safest flying robot yet https://mashable.com/2015/12/21/soccer-ball-drone/ ; Dec. 21, 2015.
Fleishman; Use Parking Apps to Find Lots, Garages, Valet, and Meters; Macworld; Jul. 19, 2015.
Borras, et al. Intelligent Tourism Reminder Systems: A Survey; Expert Systems with Applications 41; Elsevier; Jun. 9, 2014.
Sun, et al.; Real-Time MUAV Video Augmentation with Geo-Information for Remote Monitoring; 2013 Fifth International Conference on Geo-Information Technologies for Natural Disaster Management; pp. 114-118; IEEE; 2013.
Barry, Kieth, App lets drivers auction public parking spaces, Wired, Aug. 11, 2011, pp. 1-4.
Netlingo, https://web.archive.org/web/20170122184857/https://www.netlingo.com/word/electronic-exchange.php,dated Oct. 22, 2017.
Laseter, Tim, "B2B benchmark: The State of Electronic Exchanges", Tech & Innovation, dated Oct. 1, 2001.
Ramasubramanian, Vasant, "Quadrasense: Immersive UAV-based cross-reality environmental sensor networks," phD diss., Massachusetts Institute of Technology, pp. 1-75, 2015.
PCT International Search Report and Written Opinion; PCT/US2020/027543; Jul. 1, 2020.
PCT International Search Report and Written Opinion; PCT/US2020/023223; Jun. 19, 2020.
PCT International Search Report and Written Opinion; PCT/US2020/023729; Jun. 18, 2020.
PCT International Search Report and Written Opinion; PCT/US2020/021546; Jun. 8, 2020.
PCT International Search Report and Written Opinion; PCT/US2020/018012; Apr. 21, 2020.
PCT International Search Report and Written Opinion; PCT/US2020/012208; Mar. 24, 2020.
Westerman; Longitudinal Analysis of Biomarker Data from a Personalized Nutrition Platform in Healthy Subjects; Nature, Scientific Reports; vol. 8; Oct. 2, 2018 (retrieved Jun. 10, 2020). https://www.nature.com/articles/s41598-018-33008-7.
Ahmed, et al.; Energy Trading with Electric Vehicles in Smart Campus Parking Lots; Applied Sciences; Sep. 7, 2018.
Fitzsimmons; Uber Hit with Cap as New York City Takes Lead in Crackdown; New York Times; Aug. 8, 2018 (retrieved Feb. 29, 2020). https://www.wral.com/uber-hit-with-cap-as-new-york-city-takes-lead-in-crackdow/17755819/?version=amp?
Soccer ball-shaped drone might be the safest flying robot yet https://mashable.com/2015/12/21/soccer-ball-drone/ ; 2015.
Pentland; After Decades of Doubt, Deregulation Delivers Lower Electricity Rates; Forbes; Oct. 13, 2013 (retrieved Feb. 29, 2020). https://www.forbes.com/sites/williampentland/2013/10/13/after-decades-of-doubt-deregulation-delivers-lower-electricity-prices/#201d4a9c1d13.
U.S. Appl. No. 60/035,205, filed Jan. 10, 1997.
PCT International Search Report and Written Opinion; PCT/US2022/027077; Nov. 1, 2022.
Wei, et al. "impact of aircraft size and seat availability on airlines demand and market share in duopoly markets" Published by Elsevier, 2005, pp. 315-327.
PCT International Search Report and Written Opinion; PCT/US2022/052969; Mar. 21, 2023.
Little, T.D., et al., On the Joys of Missing Data, Journal of pediatric psychology, 2014, pp. 151-162.
Honaker, J., et al., What to do About Missing Values in Time-Series Cross-Section Data, American Journal of Political Science, Sep. 6, 2008, pp. 561-581.
Westerhoff, Market Depth and Price Dynamics: A Note, University of Osnabrueck, Department of Economics Rolandstrasse 8, D-49069 Osnabrueck, German, Mar. 30, 2004, pp. 1-8.
PCT International Search Report and Written Opinion; PCTUS2022/051998; Mar. 8, 2023.
EP23153137.7 European Search Report, May 24, 2023, pp. 1-10.
EP20787830.7 European Search Report, May 12, 2023, pp. 1-10.
Zheyong, Bian, et al., "Planning the Ridesharing Route for the First-Mile Service Linking to Railway Passenger Transportation," Joint Rail Conference, Apr. 2017, pp. 1-11.
EP23168879.7 European Search Report, Jul. 5, 2023, pp. 1-13.
Papa, U., & Del Core, G., "Design of Sonar Sensor Model for Safe Landing of an UAV," IEEE Metrology for Aerospace, 2015, pp. 346-350.
European Search Report, Nov. 1, 20242, pp. 1-29.
"Node Influence Metric", Wikipedia, Nov. 6, 2020, pp. 1-5.
EP21916571 European Search Report, May 29, 2024, pp. 1-9.
Bortolini, et al.; "Fresh food sustainable distribution: cost, delivery time and carbon footprint three-objective optimization," 2016, pp. 1-12.
Aratani, Lori, "This app wants to reward you for smart commuting choices," The Washington Post, Aug. 18, 2018, pp. 1-3.

(56) References Cited

OTHER PUBLICATIONS

Yu, Haicong et al.; "A Multi-Modal Route Planning Approach with an Improved Genetic Algorithm", The International Archives of the Photogrammetry, Remote Sensing and Spaital Information Sciences, vol. 38, Part 1, 2010.

Fulldomepro, VR Aquatic Simulator with a Dome, Pub. Sep. 3, 2018, htttps://www.youtube.com/watch?v=k_53G5DksjQ, pp. 1-2.

Randomoneh, Dome Screens & Displays, Pub. Oct. 12, 2012, https:// hardforum.com/threads/dome-screens-displays, p. 1.

Borgobello, Bridget, TOOB Personal Dome Screen Revamped, Pub. Jan. 12, 2012, https:// newatlas.com/toob-earth-personal-dome-screen/21082, p. 1.

Asghari, et al; "Price-aware Real-time Ride-sharing at Scale—An Auction-based Approach", Oct. 31, 2016, SIGSPACIAL'16: Proceedings of the 24th ACM SIGSPATIAL International Conference on Advances in Geographic Information Systems, Article No. 3, pp. 1-10.

EP23153137.7 Exam Report (Communication pursuant to Article 94(3) EPC), Mar. 5, 2025, pp. 1-11.

Chang, et al., "Estimating Real-Time Traffic Carbon Dioxide Emissions Based on Intelligent Transportation System Technologies," IEEE Mar. 1, 2013, vol. 14, pp. 1-11.

Karbassi, et al.; "Vehicle Route Prediction and Time of Arrival Estimation Techniques for Improved Transportation System Management" Published by IEEE; 2003, pp. 511-516.

Valdes, J. J.,et al.; (Sep. 2007). Virtual reality high dimensional objective spaces for multi-objective optimization: An improved representation. In 2007 IEEE Congress on Evolutionary Computation (pp. 4191-4198). IEEE., pp. 1-11.

Valdes, J. J.,et al.; (2007). Multi-objective evolutionary optimization for constructing neural networks for virtual reality visual data mining: Application to geophysical prospecting. Neural networks, 20(4), pp. 498-508.

Zhao, et al., Deshpande, P M., Naughton, J. F., & Shukla, A (Jun. 1998). Simultaneous optimization and evaluation of multiple dimensional queries. In Proceedings of the 1998 ACM SIGMOD international conference on Management of data (pp. 271-282).

\* cited by examiner

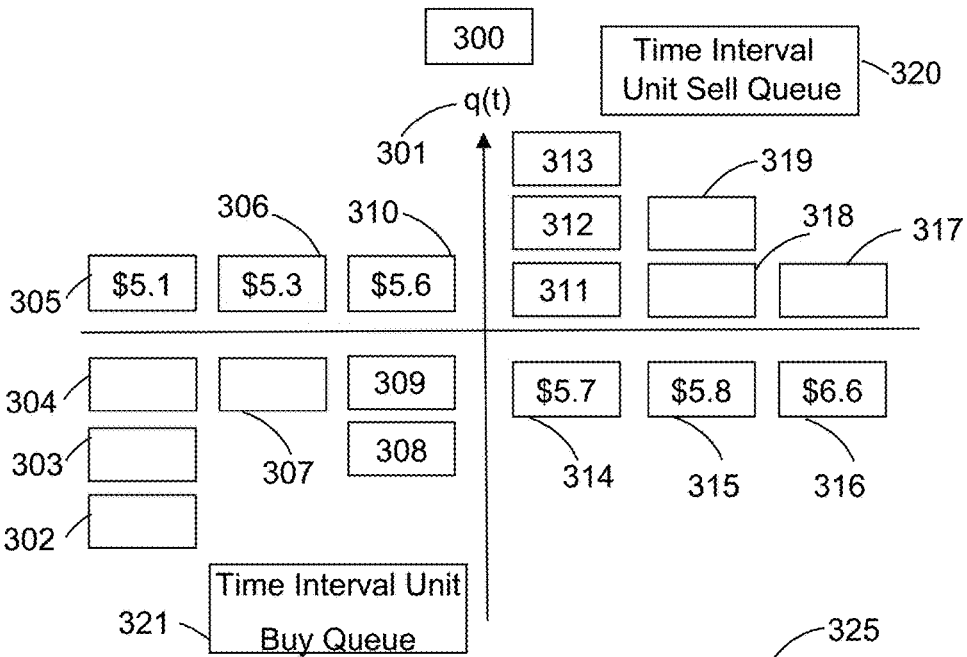
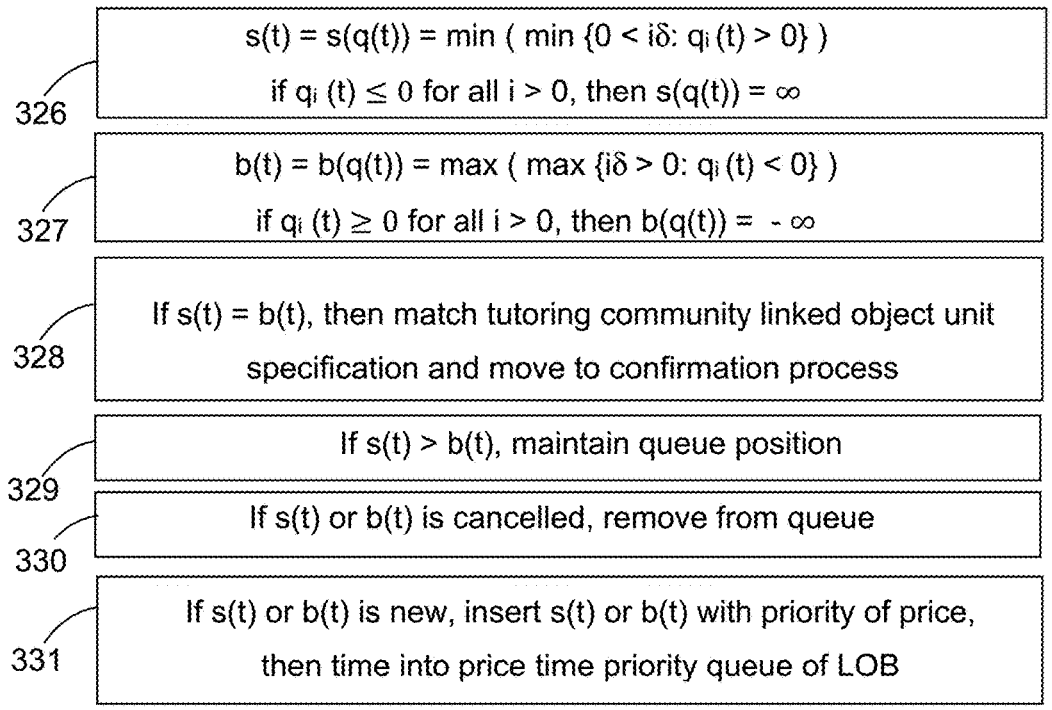
FIG. 3

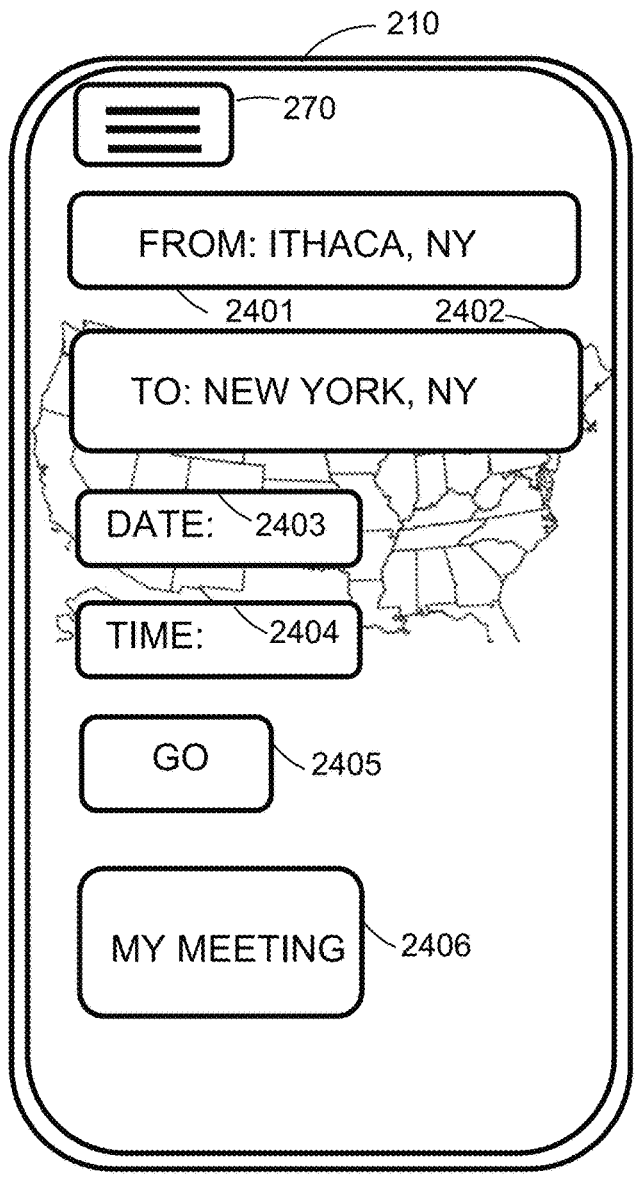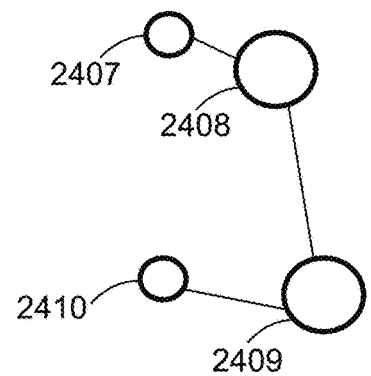
FIG. 24

4000

4010

4051

MODEL MAKE — 4015

ACURA ✓ — 4020
BMW
DAIMLER
FORD
GM, HONDA, ETC

MODEL TYPE — 4025

MDX ✓ — 4030
RDX
NSX
TLX
ILX

MODEL YEAR — 4035

2019 ✓ — 4040
2020

MODEL FUEL TYPE — 4045

ELECTRIC
GASOLINE ✓ — 4050
DIESEL
SOLAR

General Terms & Conditions Relating to Geolocation Exchange Unit Transfers

SIMPSX TECHNOLOGIES, LLC

GENERAL TERMS AND CONDITIONS

PREAMBLE

These General Terms & Conditions including this preamble (the "General Terms" or "GTCs") shall be applicable to all without Transactions related to the sale and purchase and/or resale and purchase, transfer and assignment of those certain contracts for Geolocation Exchange Unit(s) or "GXU"(s) as arranged and accommodated by SimpsX, LLC ("SimpsX"), including (i) for an original Transaction, from Seller to Buyer, as arranged and accommodated by SimpsX and (ii) for a resale Transaction, from Seller (who acquired such rights through a prior original Transaction, as accommodated by SimpsX), to Buyer, as arranged and accommodated by SimpsX. In any Transaction hereto, Seller shall be Party A and Buyer shall be Party B. SimpsX is not a Party to the Transaction but provides a platform and marketplace to bring together and match willing Buyers and Sellers. For Resale Transactions, prior to use or consumption of the underlying Geolocation Exchange Units by Party A, Party A desires to resell its Geolocation Exchange Units and, through the use of SimpsX's electronic trading platform and proprietary software and system for matching Buyers and Sellers in a forward marketplace ("SimpsX Trade Hub",) a Buyer ("Party B") desires to and agrees to purchase and take possession of said Geolocation Exchange Units from Party A pursuant to the terms of these GTCs and the Transaction Confirmation, and Party A is willing to sell and dispose of such Geolocation Exchange Units pursuant to the terms of these GTCs and the Transaction Confirmation.

To the extent that differing terms are specifically otherwise agreed between Party A and Party B, and approved by SimpsX, in its discretion, and included in the Confirmation, the Confirmation shall control; provided, however, that in a resale Transaction, such Confirmation must be consistent with the Confirmation of the original Transaction being resold. The Confirmation, together with these General Terms and the SimpsX Terms of Service, shall constitute the binding agreement of the Parties with respect to any Transaction. These General Terms may be amended from time to time by SimpsX.

By establishing an account with SimpsX and by executing trades on the SimpsX Trade Hub, you acknowledge and agree to these GTCs. SimpsX's GTCs and/or amended General Terms shall be available electronically on the SimpsX Trade Hub. It is the Parties' responsibility to know and understand each's respective duties and obligations hereunder. SimpsX shall have no further obligation to Parties with respect to such amendments other than to provide access to such amendments on the SimpsX Trade Hub.

Certain larger users that either offer for purchase or that purchase large volumes of GXUs on the SimpsX Trade Hub (each "Margin Party") may, in SimpsX discretion, be asked to post additional credit support in the format of margin or in such other form as such Party and SimpsX may mutually agree.

Party A and Party B have entered and/or anticipate entering into one or more Transactions that are or will be governed by these GTCs, as well as the SimpsX Terms of Service.

ARTICLE I

DEFINITIONS

As used in these GTCs, the following terms have the respective meanings set forth below:

"Affiliate" means, with respect to any Person, any other Person that directly or indirectly, through one or more intermediaries, controls or is controlled by, or is under common control with, such Person. For these purposes, "control" of any Person shall mean the ownership of, or the power to direct the voting of, more than ten percent (10%) of the common stock or issued share capital or other equity interests having ordinary voting power for the election of directors (or Persons performing comparable functions) of such Person.

"Agreement" has the meaning set forth in Section 2.2.

"Applicable Interest Rate" means, with respect to any cash held as collateral or margin by SimpsX posted by the applicable Margin Party the Federal Funds (effective) rate as set forth in the most recent H.15 (5/9) released and publicly available by the Federal Reserve Board of Governors.

"Assigning Party" has the meaning set forth in Section 10.4.

"Bankrupt" means any entity, if such entity a. files a petition or otherwise commences, authorizes or acquiesces in the commencement of a proceeding or cause of action under any bankruptcy, insolvency, reorganization, debt restructuring, liquidation or similar law, or has any such petition filed or commenced against it, b. makes an assignment or any general arrangement for the benefit of creditors, c. otherwise becomes bankrupt or insolvent (however evidenced),

FIG. 54

5500 c. otherwise becomes bankrupt or insolvent (however evidenced), d. has a liquidator, administrator, receiver, trustee, conservator or similar official appointed with respect to it or any substantial portion of its property or assets, or e. is generally unable to pay its debts as they fall due.

"Business Day" means (i) with respect to payments, a day, other than a Saturday or Sunday, on which the banks in Texas are open for business.

"Buyer" means the Party to an original Transaction or resale Transaction that is obligated to purchase a Product.

"Claiming Party" has the meaning set forth in Article 3.

"Claims" means all third-party claims, demands or actions in connection with this Agreement, threatened or filed, that directly or indirectly relate to the subject matter of an indemnity or remedy hereunder, and the resulting losses, liabilities, obligations, damages, expenses, attorneys' fees and court costs, whether incurred by or in connection with a settlement or otherwise, and whether such claims, demands or actions are threatened or filed prior to or after the termination of this Agreement.

"Confirmation" has the meaning set forth in Section 2.3.

"Contract Price" means the price per Period agreed to be paid by Buyer to Seller executed through the SimpsX Trade Hub in connection with a Transaction.

"Contract Value" means, with respect to a Terminated Transaction, as applicable, the net present value (discounted at the Present Value Discount Rate to the first day of the term applicable to such Terminated Transaction) of the Contract Price applicable to such Terminated Transaction.

"Contractual Currency" means United States Dollars.

"Costs" means, with respect to the Non-Defaulting Party, agency fees, brokerage fees, attorneys' fees and expenses, commissions and other similar third party transaction costs and expenses reasonably incurred by such Party (i) in terminating any arrangement or entering into new arrangements which replace a Terminated Transaction, or (ii) in connection with the enforcement and protection of such Party's rights and remedies under this Agreement.

"Defaulting Party" means a Party that is responsible for an Event of Default.

"Default Rate" means, for any day, the annual prime commercial lending rate (or comparable rate), from time to time published in the Wall Street Journal, as such rate may change, plus two (2) percent per annum; provided that the Default Rate shall never exceed the maximum interest rate permitted by applicable law.

"Delivery" means the delivery and transfer of the Product from Seller to Buyer in accordance with the Agreement.

"Early Termination Date" means the day designated by the Non-Defaulting Party pursuant to Section 5.2 as the early termination date, upon which date, all Transactions between Party A and Party will terminate.

"Effective Date" with respect to a given Party, unless as otherwise provided, means the earliest date on which both Parties A and B have signed up to transact on the SimpsX Trade Hub.

"Event of Default" means the occurrence of any of the events listed in Section 5.1.

"Force Majeure" means an event or circumstance which prevents a Party from performing its obligations under one or more Transactions, which is not within the reasonable control of, or the result of the negligence or willful misconduct of, the Claiming Party, and which, by the exercise of due diligence, the Claiming Party is unable to overcome or avoid or cause to be avoided. Force Majeure shall not include or be based on (i) the loss of Buyer's markets; (ii) Buyer's inability to economically use or resell the Product purchased hereunder; (iii) the loss or failure of Seller's supply (except as set forth above); or (iv) Seller's ability to sell the Product at a price greater than the Contract Price.

"GTCs" has the meaning set forth in the Preamble.

"Independent Amount" means with respect to a Margin Party, the amount determined by SimpsX as appropriate in its commercially reasonable discretion is warranted under the circumstances, or if no amount is specified, zero.

"Letter(s) of Credit" means one or more irrevocable, transferable standby letters of credit issued by a U.S. commercial bank or a foreign bank with a U.S. branch having a credit rating of at least A- by S&P and A3 by Moody's, in a form acceptable to the Party in whose favor the letter of credit is issued. Costs of a Letter of Credit shall be borne by the applicant for such Letter of Credit.

"Margin Party" shall have the meaning ascribed to it in the introductory paragraphs hereof.

"Non-Defaulting Party" means the Party that is not a Defaulting Party.

"Option" means the right but not the obligation to enter into a Transaction.

"Option Buyer" means the Party specified as the purchaser of an Option.

"Option Seller" means the Party specified as the seller of an Option.

"Party" or "Parties" means Party A and Party B, individually or collectively, as applicable and their respective permitted successors or assigns. For the avoidance of doubt, in providing access to the SimpsX Trade Hub, SimpsX shall not be considered a Party for purposes of these GTCs with respect to a Transaction.

"Party B" has the meaning set forth in the Transaction Confirmation.

"Payment Date" means, with respect to a Transaction, the Trade Date of such Transaction with payment made through the SimpsX Trade Hub and settlement made by SimpsX pursuant to the Terms of Service.

"Performance Assurance" means collateral (other than the Independent Amount, if any) in the form of either cash, Letter(s) of Credit, or other security acceptable to SimpsX with respect to Margin Parties.

"Person" means an individual, partnership, corporation, limited liability company, association, organization, business trust, joint stock company, trust, unincorporated association, joint venture, firm or other entity, or a government or any political subdivision or agency, department or instrumentality thereof.

"Premium" means the premium to be paid or collected, if any, related to the purchase or sale of an Option that is specified by the Parties.

"Present Value Discount Rate" means at a particular date, (i) if the term of the Terminated Transaction, as applicable, is one year or less, the "Ask Yield" interest rate for the appropriate U.S. Government Treasury bill or note with a term closest to the time remaining in such term, plus 100 basis points, or (ii) if the time remaining in the term of the Terminated Transaction is greater than one year, the "Ask Yield" interest rate for the appropriate U.S. Government Treasury note with a term closest to the time remaining in such term, plus 100 basis points, in each case, as quoted in the "Treasury, Bonds, Notes & Bills" section of the Default Rate Source most recently published as of such date.

"Product" means the specified Transportation Capacity Unit during a specified time window during the Period to be made available by Seller to Buyer in connection with a Transaction in accordance with these GTCs.

"Recording" has the meaning set forth in Section 2.4.

"Replacement Value" means, with respect to a Terminated Transaction, as applicable, the net present value (discounted at the Present Value Discount Rate to the first day of the term applicable to such Terminated Transaction) of the Termination Replacement Price.

"Seller" means the Party to an original Transaction or resale Transaction that is obligated to sell and make available, or cause to be made available, a Product.

"Settlement Amount" has the meaning set forth in Section 5.3(i).

"Taxes" means any and all present or future ad valorem, consumption, excise, gross receipts, privilege, property, sales, transaction, transport, use and other taxes, levies, duties, imposts, governmental charges, licenses, fees, permits and assessments or increases therein, other than (i) income taxes required to be withheld at the source, (ii) taxes based on net income or net worth, and (iii) gross receipts taxes imposed in lieu of income taxes in jurisdictions that do not assess a corporate income tax.

"Term" means the aggregate duration of all Periods in respect of a Product.

"Terminated Transaction" means each Transaction terminated pursuant to Section 5.2, such Transaction having a term deemed to (i) commence on the Early Termination Date, and (ii) end on the last day of the Term applicable to such Transaction.

"Termination Payment" means the payment made by either Party pursuant to Section 5.3(ii).

"Termination Replacement Price" means with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction). The Termination Replacement Price shall be based on an actual Termination Replacement Transaction or the applicable forward price for the Product posted by SimpsX on the SimpsX Trade Hub.

"Termination Replacement Transaction" means a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:

a.    commencing on the Early Termination Date; and b.    ending on the last day of the term of the Terminated Transaction had it not been terminated.

"Trade Date" means the date on which the Parties execute a trade and agree to enter into a Transaction on the SimpsX Trade Hub.

"Transaction" means a particular transaction (including an Option) agreed to by the Parties relating to the sale and purchase of one or more Products.

"Geolocation Exchange Unit" or "GXU" means the base unit of a given Product related to a ride for a given geolocation exchange product offered on the SimpsX Trade Hub.

ARTICLE II

TRANSACTION TERMS AND CONDITIONS 2.1 Transactions. Each of Party A and Party B shall be in full compliance with SimpsX's registration and other requirements to participate. A Transaction shall be entered into upon agreement of the Parties through SimpsX Trade Hub and the proprietary matching execution procedures, including by means of electronic communication. Each Party agrees not to contest, or assert any defense to, the validity or enforceability of the Transaction entered into in accordance with these GTCs (i) based on any law requiring agreements to be in writing or to be signed by the Parties, or (ii) based on any lack of authority of the Party or any lack of authority of any employee of the Party to enter into a Transaction.

2.2 Governing Terms. Each Transaction matched and executed through SimpsX Trade Hub between the Parties shall be governed by these GTCs, the applicable Confirmation and Terms of Service. These GTCs, all Transactions and all Confirmations, as the same may be amended, supplemented or otherwise modified from time to time, shall form a single integrated agreement (the "Agreement") between the Parties. The Parties shall comply with all rules for use and Terms of Service of SimpsX's Trade Hub.

2.3 Confirmation. SimpsX, through its proprietary electronic matching platform has in place a procedure for documenting the terms of a given Transaction, to which the Parties previously had agreed. SimpsX shall confirm any Transaction arranged on the SimpsX Trade Hub by electronically sending the Parties a Confirmation ("Confirmation"). If either other Party objects to any term(s) of such Confirmation, it shall notify SimpsX and the other Party in writing via facsimile or electronic communication of such objections within two (2) Business Days of the Parties' receipt thereof, failing which a Party shall be deemed to have accepted the terms as sent; provided, however, that upon receipt of such objection, SimpsX shall determine the prior agreed-upon commercial terms of the Transaction and shall confirm the Confirmation to the agreed-upon terms if different than the prior Confirmation. Any such amended Confirmation shall be binding.

2.4 Recording. Unless a Party expressly objects at the beginning of a telephone conversation, each Party consents to the creation of a tape or electronic recording ("Recording") of all telephone conversations between the Parties to these GTCs, and agrees that any such Recordings will be retained in confidence, secured from improper access, and may be submitted in evidence in any proceeding or action relating to this Agreement. Each Party waives any further notice of such monitoring or recording, and agrees to notify its officers and employees of such monitoring or recording and to obtain any necessary consent of such officers and employees. The Recording, and the terms and conditions described therein, if admissible, shall be the controlling evidence for the Parties' agreement with respect to a particular Transaction in the event a Confirmation is not fully executed (or deemed accepted) by both Parties.

2.5 Inconsistency. In the event of any inconsistency among the terms of a Confirmation, a Recording, or the GTCs, the terms of the following shall prevail in order listed: (i) these GTCs; (ii) a Confirmation; and (iii) such Recording.

2.6 Parties' Responsibilities. With respect to each Transaction, unless the Parties otherwise agree, (i) Seller agrees to provide Buyer a ride in the specified class or type of vehicle along the specified travel route within the agreed-upon time period during the designated Time Window in the contracted Market, pursuant to the Agreement and Terms of Service. Seller shall provide the services associated with the Transportation Capacity Unit via routes and during the Time Period specified for the Product sold. Seller and Buyer shall take such steps as necessary to comply with all the Terms of Service and rules of the SimpsX Trade Hub. Payments related to any Transaction, any Margin and/or collateral shall be made to and held by SimpsX through the SimpsX Trade Hub with settlement to occur through the SimpsX Trade Hub and conducted by SimpsX pursuant to the rules of the Terms of Service. Seller shall sell and make available, or cause to be made available, the Product(s) to Buyer for the Contract Price for the agreed upon Term. Buyer shall purchase the Product from Seller for the Contract Price for the agreed upon Term.

ARTICLE III
FORCE MAJEURE 3.1 To the extent either Party is prevented by Force Majeure from carrying out, in whole or part, its obligations in respect of a Transaction, such Party (the "Claiming Party") shall orally notify the other Party and SimpsX of the Force Majeure as soon as practicable after the occurrence thereof and shall provide to the other Party a written description of the details of such Force Majeure within one (1) Business Day after the date of such oral notice. The Claiming Party shall make reasonable efforts to mitigate the effects of such Force Majeure with reasonable dispatch. If the Claiming Party complies with the foregoing procedures, such Claiming Party shall be excused from the performance of its obligations with respect to such Transaction (other than the obligation to make payments then due or becoming due with respect to performance prior to the Force Majeure). The non-Claiming Party shall not be required to perform or resume performance of its obligations to the Claiming Party which correspond to the obligations of the Claiming Party excused by Force Majeure; provided, however, that upon the occurrence of a Force Majeure, Buyer shall have the ability to reschedule the GXU for a time after the Force Majeure has ended, and the Delivery Period shall be extended by the number of days that such Force Majeure lasted.

ARTICLE IV
REMEDIES FOR PRODUCT DELIVERY FAILURES 4.1 Unless excused by Force Majeure or caused by failure of Buyer to deliver the Product hereunder pursuant to the terms hereof and in the Confirmation, upon a Product Delivery Failure during any Period, the non-failing Party shall be entitled to the price of such GXU as liquidated damages.

ARTICLE V
EVENTS OF DEFAULT; REMEDIES 5.1 Events of Default. An Event of Default shall be deemed to have occurred with respect to a Party upon the occurrence of any of the following:

a. the failure to make or apply, when due, any payment required pursuant to this Agreement, if such failure is not remedied within five (5) days after written notice thereof;

b. any representation or warranty made by such Party under this Agreement is false or misleading in any material respect when made or when deemed made or repeated;

c. the failure to perform any material covenant or obligation set forth in this Agreement (other than an Event of Default under this Section 5.1, any default for which the exclusive remedy is provided in Article 3, Article 4 or any default that arises as a result of Buyer's failure to deliver Content to Seller pursuant to Section 2.7), if such failure is not remedied within ten (10) days after written notice thereof;

d. such Party becomes Bankrupt;

e. such Party merges with or into, or reorganizes, amalgamates, consolidates or enters into any other transaction in which substantially all of its assets are transferable to, another Person who either (a) fails to assume all of such Party's obligations under this Agreement, or (b) assumes such Party's obligation under this Agreement, but whose creditworthiness is materially weaker than that of such Party immediately prior to such merger, reorganization, amalgamation, consolidation or other transaction; or f. any event of default under the Credit terms with respect to a Margin Party.

5.2 Effect of Event of Default. If an Event of Default with respect to a Defaulting Party shall have occurred and be continuing or if the Non-Claiming Party shall have the right to terminate its obligations pursuant to Article 3, the Non-Defaulting Party or Non-Claiming Party, as applicable, shall have the right to designate an Early Termination Date and to liquidate and terminate all, but not less than all, Transactions. For purposes of Sections 5.3, 5.4 and 5.5, the Non-Claiming Party, shall be deemed to be the "Non-Defaulting Party" and the other Party shall be deemed to be the "Defaulting Party"; Section 5.6 shall not be applicable to any Transaction terminated pursuant to Article 3 and Section 5.2.

5.3 Calculation of Termination Payment.

a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

FIG. 65

6600 iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non- Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section 5.4.

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SimpsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and SimpsX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

5.4 Notice of Payment of Termination Payment. As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and SimpsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3, no such interest shall be payable. If the Termination Payment is due from the Non-Defaulting Party, the Non-Defaulting Party shall pay such Termination Payment, without interest, within twenty (20) Business Days after delivery of such notice.

5.5 Disputes With Respect to Termination Payment. If the Defaulting Party disputes the Non-Defaulting Party's calculation of the Termination Payment, in whole or in part, the Defaulting Party shall, within two (2) Business Days of receipt of Non-Defaulting Party's explanation of the calculation of the Termination Payment, provide to the Non-Defaulting Party and SimpsX a detailed written explanation of the basis for such dispute; provided, however, that if the Termination Payment is due from the Defaulting Party, the Defaulting Party shall pay any undisputed amount and transfer Performance Assurance, if any, to the Non-Defaulting Party in an amount equal to the disputed amount of the Termination Payment. Any disputes that the Parties are unable to resolve by mutual agreement shall be resolved in accordance with the arbitration mechanism elected on the Schedule.

5.6 Closeout Setoff. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the SimpsX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash.

ARTICLE VI
PAYMENT 6.1 Payments and Billings. All monthly payments and invoices shall be governed and will occur according to the SimpsX Terms of Service, unless otherwise specified herein. For the avoidance of doubt, payments for GXU Transactions shall occur online and provided to SimpsX for ultimate payment to the appropriate Party; provided, however, that payments associated with the early termination of a Transaction shall be invoiced and paid directly between the Parties. All payments shall be made in United States Dollars.

6.2 Disputes of Invoices. Payment terms and invoicing shall be done pursuant to the methods and procedures on the Terms of Service and credit card arrangements between the Parties and SimpsX. A Party may, in good faith, dispute the correctness of any credit and/or debit memos related to this Agreement within ten (10) days of the date that the invoice was rendered. In the event that any charge is disputed, payment of the undisputed portion shall be required to be made when due, with notice of the dispute given to the other Party and SimpsX in writing and stating the basis for the dispute. Payment of the disputed amount shall not be required until the dispute is resolved. Upon resolution of the dispute, any required payment shall be made within two (2) Business Days of such resolution along with interest accrued at the Default Rate from and including the due date to but excluding the date paid. Any dispute with respect to an invoice is waived unless the other Party is notified in accordance with this Section within sixty (60) days after the applicable invoice is rendered.

ARTICLE VII

LIMITATION OF REMEDIES, LIABILITY AND DAMAGES 7.1 NEITHER SIMPSX NOR SELLER MAKE ANY WARRANTY WITH RESPECT TO ANY PRODUCT, AND ANY AND ALL IMPLIED WARRANTIES ARE DISCLAIMED. IN PARTICULAR, SELLER MAKES NO WARRANTY WITH RESPECT TO THE EFFECT THAT ANY PRODUCT WILL HAVE ON BUYER'S SALES OR BUSINESS.

7.2 THE PARTIES CONFIRM THAT THE EXPRESS REMEDIES AND MEASURES OF DAMAGES PROVIDED IN THIS AGREEMENT SATISFY THE ESSENTIAL PURPOSES HEREOF. FOR BREACH OF ANY PROVISION FOR WHICH AN EXPRESS REMEDY OR MEASURE OF DAMAGES IS PROVIDED, SUCH EXPRESS REMEDY OR MEASURE OF DAMAGES SHALL BE THE SOLE AND EXCLUSIVE REMEDY OF THE NON-BREACHING PARTY. THE BREACHING PARTY'S LIABILITY SHALL BE LIMITED AS SET FORTH IN SUCH PROVISION AND ALL OTHER REMEDIES OR DAMAGES AT LAW OR IN EQUITY ARE WAIVED. IF NO REMEDY OR MEASURE OF DAMAGES IS EXPRESSLY PROVIDED HEREIN OR IN A TRANSACTION, THE BREACHING PARTY'S LIABILITY SHALL BE LIMITED TO DIRECT ACTUAL DAMAGES, WHICH SHALL BE THE SOLE AND EXCLUSIVE REMEDY AVAILABLE TO THE NON-BREACHING PARTY AND THE NON- BREACHING PARTY HEREBY WAIVES ALL OTHER REMEDIES OR DAMAGES AT LAW OR IN EQUITY.

7.3 NOTWITHSTANDING ANYTHING IN THIS AGREEMENT TO THE CONTRARY, NEITHER PARTY NOR SEATSX SHALL BE LIABLE FOR CONSEQUENTIAL, INCIDENTAL, PUNITIVE, EXEMPLARY OR INDIRECT DAMAGES, LOST PROFITS OR OTHER BUSINESS INTERRUPTION DAMAGES, BY STATUTE, IN TORT OR CONTRACT, UNDER THE INDEMNITY PROVISIONS SET FORTH IN THIS AGREEMENT OR OTHERWISE.

7.4 TO THE EXTENT ANY DAMAGES REQUIRED TO BE PAID HEREUNDER ARE LIQUIDATED, THE PARTIES ACKNOWLEDGE THAT THE DAMAGES ARE DIFFICULT OR IMPOSSIBLE TO DETERMINE, OR OBTAINING AN ADEQUATE REMEDY IS OTHERWISE INCONVENIENT AND THE DAMAGES CALCULATED HEREUNDER CONSTITUTE A REASONABLE APPROXIMATION OF THE HARM OR LOSS.

7.5 BOTH PARTIES AGREE THAT SIMPSX SHALL HAVE NO LIABILITY TO EITHER PARTY A OR PARTY B BASED UPON AN EVENT OF DEFAULT THAT MAY OCCUR WITH RESPECT TO ANY TRANSACTION HEREUNDER NOR FOR ANY PART IN ACCOMODATING AND ARRANGING ANY TRANSACTIION, UNLESS SUCH ACCOMODATING AND ARRANGING WAS SHOWN TO HAVE BEEN GROSSLY NEGLIGENT OR THAT SIMPSX ACTED IN BAD FAITH. BOTH PARTIES EXPRESSLY WAIVE ANY AND ALL CLAIMS AGAINST SIMPSX RELATED TO ANY ACTION OR INACTION TO THE SELLER OR THE BUYER, TO THE MAXIMUM EXTENT OF THE LAW.

7.6 ANY AND ALL ADDITIONAL LIMITATIONS OF LIABILITY IN FAVOR OF SEATSX CONTAINED IN THE TERMS OF SERVICE ARE EXPRESSLY INCORPORATED HEREIN IN THEIR ENTIRETY AND SHALL APPLY AS IF THE TEXT OF SUCH PROVISIONS ARE WRITTEN IN FULL HEREIN (BUT WITHOUT REGARD TO THE TERMS OF SERVICE CHOICE OF LAW.)

ARTICLE VIII
FINANCIAL INFORMATION 8.1  SimpsX may request periodically request either or both Parties to provide financial information, which may include, as applicable income statements, financial statements and/or credit reports, which the Party from which such financial information is requested shall provide SimpsX the information promptly.

ARTICLE IX
TAXES 9.1  Buyer is liable for and shall pay or cause to be paid (or reimburse Seller if Seller has paid) all Taxes applicable to the Transaction, including any Taxes imposed or collected by a taxing authority with jurisdiction over Buyer, unless Buyer has presented Seller with a valid tax exemption certificate. Buyer agrees to pay any such applicable Taxes and to defend, indemnify and hold Seller harmless from any Claims for such Taxes. Buyer shall provide all information reasonably required by Seller to ascertain the proper treatment and handling of tax liability hereunder.

ARTICLE X

CREDIT SUPPORT

10.1 Credit Protection. If at any time and from time to time during the term of this Agreement (and whether or not an Event of Default has occurred), SimpsX determines in its discretion that the financial condition of a Margin Client has materially changed so as to increase the likelihood of an Event of Default or of its ability to meet its payment obligations hereunder to the other Party or SimpsX, then SimpsX, on any Business Day, may request that such Party provide Performance Assurance in an amount of up to the amount SimpsX estimates would be due from such Party upon the occurrence of an Event of Default and early termination of all such Party's Transactions hereunder less any Performance Assurance already held by SimpsX from such Party. Such Performance Assurance shall be delivered to SimpsX within two (2) Business Days after the date of such request.

10.2 Grant of Security Interest/Remedies. To secure its obligations under these GTCs and, to the extent either or both Parties deliver Performance Assurance hereunder, each Party (a "Pledger") hereby grants to SimpsX (as Secured Party and/or as collateral agent for such other Party) and the other Party (collectively, the "Secured Party") a present and continuing security interest in, and lien on (and right of setoff against), and assignment of, all such Performance Assurance and any and all proceeds resulting therefrom or the liquidation thereof, whether now or hereafter held by, on behalf of, or for the benefit of, such Secured Party, and each Party agrees to take such action as the other Party reasonably requires in order to perfect the Secured Party's first- priority security interest in, and lien on (and right of setoff against), such Performance Assurance and any and all proceeds resulting therefrom or from the liquidation thereof. Any Secured Party (other than SimpsX) appoints to the extent necessary SimpsX as its collateral agent.

ARTICLE XI

MISCELLANEOUS 11.1 Representations and Warranties. On the Effective Date and on each Trade Date, each Party represents and warrants to the other Party that:

a. it is duly organized or registered, as applicable, validly existing and in good standing under the laws of the jurisdiction of its formation;

b. it has all authorizations, licenses and consents necessary for it to legally perform its obligations under this Agreement;

c. the execution, delivery and performance of this Agreement are within its powers, have been duly authorized by all necessary action and do not violate any of its governing documents, any contracts to which it is a party or any law, rule, regulation, order or the like applicable to it;

d. this Agreement and every other document and/or Terms of Service executed and delivered in accordance with this Agreement constitutes its legally valid and binding obligation enforceable against it in accordance with its terms, subject to any equitable defenses;

e. it is not Bankrupt and there are no proceedings pending or being contemplated by it or, to its knowledge, threatened against it which would result in it being or becoming Bankrupt;

f. there is not pending nor, to its knowledge, threatened against it or any of its Affiliates any legal proceedings that could materially adversely affect its ability to perform its obligations under this Agreement;

g. no Event of Default, or any event that with the passage of time would constitute an Event of Default, with respect to it has occurred and is continuing and no such event or circumstance would occur as a result of its entering into or performing its obligations under this Agreement;

FIG. 74

7500 h. it is acting for its own account, has made its own independent decision to enter into this Agreement and as to whether this Agreement is appropriate or proper for it based upon its own judgment, is not relying upon the advice or recommendations of the other Party in so doing, and is capable of assessing the merits of and understanding, and understands and accepts, the terms, conditions and risks of this Agreement;

i. the material economic terms of each Transaction are subject to individual negotiation by the Parties; and j. it has a valid, existing and current account on the SimpsX Trade Hub.

11.2 Indemnity. Each Party shall defend, indemnify and hold harmless the other Party and SimpsX, and each's Affiliates, directors, officers, employees, agents and representatives from and against any and all Claims for physical property damage, personal injury or wrongful death, to the extent that such Claims arise out of or result from the negligence or willful misconduct of the indemnifying Party or such Party's employees, agents or contractors in connection with the provision of a Product or any other performance hereunder. Buyer shall defend, indemnify and hold harmless Seller and its Affiliates, directors, officers, employees, agents and representatives from and against any Claims arising or resulting from any defect in or failure to provide a Product.

11.3 Successors and Assigns; Assignment.

a. Transactions arising under this Agreement shall be binding upon and inure to the benefit of, and may be performed by, the respective successors and assigns of the Parties, except that no assignment, pledge, or other transfer by either Party (the "Assigning Party") shall operate to release the Assigning Party from any of its obligations under this Agreement unless: (i) consent to such release is given in writing by the non-Assigning Party, which consent shall not be unreasonably withheld or delayed by SimpsX; (ii) such assignment, pledge or transfer is made to an Affiliate of the Assigning Party and such Affiliate is at least as creditworthy as the Assigning Party (as long as such Affiliate also has a valid account on the SimpsX Trade Hub and shall be deemed to make representations and warranties thereunder on the dated of such assignment), or (iii) such assignment, pledge or transfer is incident to a merger, reorganization, consolidation or other transaction in which substantially all of the assets of the Assigning Party are transferred to another Person who assumes all of the obligations of the Assigning Party under this Agreement and such Person is at least as creditworthy as the Assigning Party.

b. Seller hereby acknowledges and agrees that Buyer shall, without further consent of Seller have the ability to assign and transfer all its rights or obligations under a Transaction to any other Person qualified by SimpsX. Pursuant to a resale Transaction executed on the SimpsX Trade Hub.

11.4 Governing Law. THIS AGREEMENT AND THE RIGHTS AND DUTIES OF THE PARTIES HEREUNDER SHALL BE GOVERNED BY AND CONSTRUED, ENFORCED AND PERFORMED IN ACCORDANCE WITH THE LAWS OF NEW YORK, WITHOUT REGARD TO PRINCIPLES OF CONFLICTS OF LAW, IF APPLICABLE.

11.5 Dispute Resolution.

a. For any Dispute (as defined below) with an amount in controversy of less than $25,000, each Party shall provide a written summary of its position on the Dispute to SimpsX Designee who will evaluate and determine the validity of the Dispute and the appropriate amounts due with respect to the Dispute within fifteen (15) days. Such determination shall bind both Parties.

b. Agreement to Arbitrate. Any and all claims, counterclaims, demands, causes of action, disputes, controversies, and other matters in question arising out of or relating to these GTCs and any Transaction thereunder, or the alleged breach hereof or thereof, or in any way relating to the subject matter of any Transaction or the relationship between the Parties created by these GTCs and any Transaction thereunder (hereafter a "Dispute") with an amount in controversy of $25,000 or greater shall be finally resolved by binding arbitration administered by the American Arbitration Association ("AAA") under the Commercial Arbitration Rules (the "Rules") then in force, to the extent such Rules are not inconsistent with the provisions of these GTCs.

i. Number and Appointment of Arbitrators. Except as provided by this clause, the appointment and confirmation of the arbitrators shall be made in accordance with the relevant provisions of the Rules. The arbitral tribunal shall be composed of one arbitrator (the "Tribunal"). In the request for arbitration, the Party requesting arbitration (the "Claimant") shall ask SimpsX to appoint one arbitrator. The other Party other than the Claimant shall be the Respondent.

FIG. 77

7800 ii. Venue; Procedural Issues. The seat of the arbitration shall be in Houston, Texas in the United States of America. The hearings in this arbitration shall be held at the seat or at such other place as the Parties may agree. The arbitration shall be conducted and the award rendered in the English language. Subject to any relevant legal privilege against disclosure, the Tribunal shall have the power to make all orders necessary for the disclosure contemplated above, which orders the Parties consent in advance to obey. If a Party fails or refuses to comply with an order for discovery, the Tribunal may take that failure into account when deciding the issues and may infer that the documents not produced would have supported the opposing Party's claims.

iii. Powers of the Arbitrators; Limitations on Remedies. The validity, construction, and interpretation of this agreement to arbitrate, and all procedural aspects of the arbitration conducted pursuant to this agreement to arbitrate, including but not limited to, the determination of the issues that are subject to arbitration (i.e., arbitrability), the scope of the arbitrable issues, allegations of "fraud in the inducement" to enter into these GTCs or this agreement to arbitrate, allegations of corruption, allegations of waiver, laches, delay or other defenses to arbitrability, and the rules governing the conduct of the arbitration shall be decided by the Tribunal. The Tribunal shall have the power to award all remedies available under the applicable law, except as limited by these GTCs. The Tribunal shall not decide the Dispute ex aqueo et bono or as amiable compositeur or by reliance on any other doctrine or principle that would permit the Tribunal to avoid the application of these GTCs and/or the governing law. The Tribunal shall not have the authority to modify or amend any term or provision of these GTCs or any Transaction thereto.

FIG. 78

7900 iv. Arbitration Awards. The award shall be final and binding on the Parties and may be confirmed in, and judgment upon the award entered by, any court having jurisdiction over the Parties. The Tribunal's award shall be entitled to all of the protections and benefits of a final judgment as to any Dispute, including compulsory counterclaims, that were or could have been presented to the Tribunal, and shall be final and binding on the Parties and non-appealable to the maximum extent permitted by law.

v. Confidentiality. Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law. However, a violation of this covenant shall not affect the enforceability of this agreement to arbitrate or of the Tribunal's award.

vi. EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

FIG. 79

8000 iv. Arbitration Awards. The award shall be final and binding on the Parties and may be confirmed in, and judgment upon the award entered by, any court having jurisdiction over the Parties. The Tribunal's award shall be entitled to all of the protections and benefits of a final judgment as to any Dispute, including compulsory counterclaims, that were or could have been presented to the Tribunal, and shall be final and binding on the Parties and non-appealable to the maximum extent permitted by law.

v. Confidentiality. Except to the extent necessary for proceedings relating to enforcement of the arbitration agreement, the award or other, related rights of the Parties, the fact of the arbitration, the arbitration proceeding itself, all evidence, memorials or other documents exchanged or used in the arbitration and the arbitrators' award shall be maintained in confidence by the Parties to the fullest extent permitted by applicable law. However, a violation of this covenant shall not affect the enforceability of this agreement to arbitrate or of the Tribunal's award.

vi. EACH PARTY HEREBY EXPRESSLY WAIVES ANY RIGHT TO TRIAL BY JURY OF ANY CLAIM, DEMAND, ACTION OR CAUSE OF ACTION ARISING UNDER THIS AGREEMENT OR IN ANY WAY CONNECTED WITH OR RELATED OR INCIDENTAL TO THE DEALINGS OF THE PARTIES HERETO OR ANY OF THEM WITH RESPECT TO THESE GTCS OIR ANY TRANSACTION, IN EACH CASE WHETHER NOW EXISTING OR HEREAFTER ARISING, AND WHETHER FOUNDED IN CONTRACT OR TORT OR OTHERWISE.

11.6 Notices. All notices required or permitted to be given hereunder in writing shall, unless expressly provided otherwise, be in writing, properly addressed, postage pre-paid and delivered by hand, facsimile, certified or registered mail, courier or electronic messaging system to the appropriate address listed on the notice schedule hereto or such other address as either Party may designate from time to time by providing notice thereof to the other Party and SimpsX. A notice will be deemed effective as indicated: (i) if in writing and delivered in person or by courier, on the date it is delivered; (ii) if sent by facsimile transmission, on the date that transmission is received in legible form by a responsible employee of the recipient; (iii) if sent by certified or registered mail (airmail, if overseas) or the equivalent (return receipt requested), on the date that mail is delivered or its delivery is attempted; or (iv) if sent by electronic messaging system, on the date that the electronic message is received, unless, in each case, the date of that delivery (or attempted delivery) or that receipt, as applicable, is not a Business Day or that communication is delivered (or attempted) or received, as applicable, after the close of business in the location of the recipient on a Business Day, in which case that communication shall be deemed given and effective on the first following day that is a Business Day.

11.7 Entire Agreement. This Agreement constitutes the entire agreement between the Parties relating to the subject matter hereof and supersedes all prior agreements, understandings, negotiations, whether oral or written, of the Parties.

11.8 Non-Waiver; No Partnership or Third Party Beneficiaries. No waiver by any Party of any of its rights with respect to the other Party or with respect to these GTCs or any matter or default arising in connection with these GTCs, shall be construed as a waiver of any other right, matter or default. Any waiver shall be in writing signed by the waiving Party. Neither Party shall be deemed to be the employee, agent, partner, joint venturer or contractor of any other Party under or in connection with these GTCs. This Agreement is made and entered into for the sole benefit of the Parties, and their permitted successors and assigns, and no other Person shall be a direct or indirect legal beneficiary of, have any rights under, or have any direct or indirect cause of action or claim in connection with these GTCs.

11.9 Severability. If, at any time, any provision of these GTCs is or becomes illegal, invalid or unenforceable in any respect under the law of any jurisdiction, neither the legality, validity or enforceability of the remaining provisions hereof nor the legality, validity or enforceability of such provision under the law of any other jurisdiction shall in any way be affected or impaired thereby and the Parties shall promptly negotiate to restore these GTCs as near as possible to its original intent and economic effect.

11.10 Confidentiality. Neither Party shall disclose the terms of any Transaction to a third party (other than the employees, lenders, counsel or accountants of the Party and its Affiliates or prospective purchasers, directly or indirectly, of a Party of all or substantially all of a Party's assets or of any rights under these GTCs, provided such Persons shall have agreed to keep such terms confidential) except:

a. in order to comply with any applicable law, order, regulation or exchange rule, and (ii) to the extent necessary to implement any Transaction, or (iii) to the extent such information is delivered to such third party for the sole purpose of calculating a published index.

Each Party shall notify the other Party of any proceeding of which it is aware which may result in disclosure of the terms of any Transaction (other than as permitted hereunder) and use reasonable efforts to prevent or limit the disclosure. The existence of these GTCs is not subject to this confidentiality obligation. The Parties shall be entitled to all remedies available at law or in equity to enforce, or seek relief in connection with this confidentiality obligation.

11.11 Limitation on Rights. All rights related to the Product purchased and sold under these GTCs and all obligations incurred under these GTCs are purely contractual in nature. In the event of a dispute involving both Parties with a customer of one Party, both Parties shall assert the applicability of any limitations on liability to customers that may be contained in either Party's applicable contracts.

11.12 Headings and References. The headings contained in these GTCs are for convenience of reference only and do not constitute a part of these GTCs. Any reference to an "Article", "Section" or "Exhibit" refers to an article, section or exhibit, as the case may be, of these GTCs.

11.13 Bankruptcy Acknowledgments. The Parties intend that each Transaction and the Agreement shall constitute a "forward contract", that these General Terms shall constitute a "master netting agreement, and that each Party shall be a "forward contract merchant", and "master netting agreement participant", as such terms are defined in Title 11 of the United States Code, as amended from time to time (the "Bankruptcy Code"), and as such, that the Non-Defaulting Party shall have the rights granted in the Bankruptcy Code, including Sections 362, 546, 556, 560, 561, and 562, to terminate, liquidate, accelerate, net out, and offset in connection with the Agreement. This Agreement is entered into in reliance on the fact that these GTCs and all Transactions between the Parties form a single agreement between the Parties.

11.14 Counterparts. These GTCs may be executed in several counterparts, each of which is an original and all of which constitute one and the same instrument.

NOTICE

| Notices and Correspondence: _____ _____ _____ Attn: _____ Phone No.: _____ Fax No.: _____ | Notices and Correspondence: _____ _____ _____ Attn: _____ Phone No.: _____ Fax No.: _____ |
|---|---|
| Payments: Attn: _____ Phone: _____ Fax: _____ Bank: _____ Account No.: _____ ABA Routing No.: _____ | Payments: Attn: _____ Phone: _____ Fax: _____ Bank: _____ Account No.: _____ ABA Routing No.: _____ |
| Scheduling Matters: Attn: _____ Phone No.: _____ Fax No.: _____ Cell No.: _____ Email: _____ | Scheduling Matters: Attn: _____ Phone No.: _____ Fax No.: _____ Cell No.: _____ Email: _____ |

At a computing device with a touchscreen interface, audio interface, augmented reality interface, mixed reality interface, brain wave interface, visual interface, detect a transportation or freight capacity unit. 8502

Apply one or more transportation or freight capacity unit transformations to create a new geolocation exchange capacity unit. 8504 8503

Apply an interest rate to discount forward geolocation exchange units.

Apply a contract price to the forward geolocation exchange units. 8505

Apply a default interest rate to the forward geolocation exchange units. 8506

Apply an early termination date to the forward geolocation exchange units. 8507

Apply a force majeure event for forward geolocation exchange units. 8508

Apply a letter of credit or performance assurance for forward geolocation exchange units. 8509

Apply a termination replacement price meaning with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction) for forward transportation or freight capacity units. 8510

Process the geolocation exchange unit 8511

At a computing device with a touchscreen interface, audio interface, augmented reality interface, mixed reality interface, brain wave interface, visual interface, detect a geolocation exchange unit. 8602

Apply one or more geolocation exchange unit transformations to create a new geolocation exchange unit. 8604   8603

Apply a Termination Replacement Transaction meaning a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:
    a. commencing on the Early Termination Date; and
    b. ending on the last day of the term
for forward geolocation exchange units.

Apply a trade confirmation for forward geolocation exchange units. 8605

Apply a recorded confirmation for forward geolocation exchange units. 8606

Apply remedies for product delivery failures for forward geolocation exchange units as liquidated damages. 8607

Apply events of default for forward geolocation exchange units as liquidated damages. 8608

Process the geolocation exchange unit 8609

At a computing device with a touchscreen interface, audio interface, augmented reality interface, mixed reality interface, brain wave interface, visual interface, detect a geolocation exchange unit.    8702

Apply one or more geolocation exchange unit transformations to create a new geolocation exchange unit.    8703
8704

Apply a Calculation of a Termination Payment.
a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:
i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;
ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

for forward geolocation exchange units.

Process the geolocation exchange unit    8705

At a computing device with a touchscreen interface, audio interface, augmented reality interface, mixed reality interface, brain wave interface, visual interface, detect a geolocation exchange unit.    8802

Apply one or more geolocation exchange unit transformations to create a new geolocation exchange unit.    8803

8804

Apply a Calculation of a Termination Payment.

iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section for forward geolocation exchange units.

Process the geolocation exchange unit    8805

FIG. 88

TIME INTERVAL GEOLOCATION COMMUNITY OBJECTS WITH PRICE-TIME PRIORITY QUEUES FOR TRANSFORMED TIME INTERVAL GEOLOCATION UNITS

CROSS-REFERENCE TO RELATED APPLICATIONS

This application claims the benefit of and priority to U.S. Provisional Patent Application No. 63/027,344, filed 2020 May 19 and titled TIME INTERVAL GEOLOCATION COMMUNITY OBJECTS WITH PRICE-TIME PRIORITY QUEUES FOR TRANSFORMED TIME INTERVAL GEOLOCATION UNITS; U.S. Provisional Patent Application No. 63/039,918, filed 2020 Jun. 16 and titled VIRTUAL REALITY, AUGMENTED REALITY, MIXED REALITY DATA EXCHANGE SOCIAL NETWORK WITH MULTI DIMENSIONAL MAP TILE PORTING; U.S. Provisional Patent Application No. 63/044,997, filed 2020 Jun. 26 and titled MULTI-DIMENSION CLASSIFICATION OBJECT MATRICES TO ESTIMATE MULTI-DIMENSIONAL REPRESENTATIONS WITH MULTI FUNCTION DEVICE; U.S. Provisional Patent Application No. 63/051,373, filed 2020 Jul. 13 and titled VIRTUAL POWER PLANT OPTIMIZATION METHOD AND SYSTEM; and U.S. Provisional Patent Application No. 63/052,159, filed 2020 Jul. 15 and titled MULTI-DIMENSION INFORMATION SERVICE HELMET METHOD AND SYSTEM; each of which is herein incorporated by reference.

This application is a continuation-in-part of each of the following: U.S. patent application Ser. No. 17/082,254, filed 2020 Oct. 28 and titled TOLL AND CONGESTION COMMUNITY OBJECTS WITH PRICE-TIME PRIORITY QUEUES FOR TRANSFORMED TOLL AND CONGESTION CAPACITY UNITS, which claims the benefit of and priority to U.S. Provisional Application No. 62/927,081 filed 2019 Oct. 28; U.S. patent application Ser. No. 17/069,597, filed 2020 Oct. 13 and titled PRICE TIME PRIORITY QUEUE ROUTING FOR TRANSPORTATION CAPACITY UNITS, which claims the benefit of and priority to U.S. Provisional Application No. 62/914,427 filed 2019 Oct. 12; U.S. patent application Ser. No. 16/589,229, filed 2019 Oct. 1 and titled TRANSPORTATION AND FREIGHT CAPACITY UNITS; U.S. patent application Ser. No. 16/556,838, filed 2019 Aug. 30 and titled FINANCIAL SWAP INDEX METHOD AND SYSTEM ON TRANSPORTATION CAPACITY UNITS AND TRADING DERIVATIVE PRODUCTS BASED THEREON; U.S. patent application Ser. No. 16/397,685, filed 2019 Apr. 29 and titled TUTORING COMMUNITY OBJECTS WITH PRICE-TIME PRIORITY QUEUES FOR TRANSFORMED TUTORING UNITS; U.S. patent application Ser. No. 16/359,841, filed 2019 Mar. 20 and titled PARKING COMMUNITY OBJECTS WITH PRICE-TIME PRIORITY QUEUES FOR TRANSFORMED PARKING UNITS; U.S. patent application Ser. No. 16/357,241, filed 2019 Mar. 18 and titled RENEWABLE ENERGY COMMUNITY OBJECTS WITH PRICE-TIME PRIORITY QUEUES FOR TRANSFORMED RENEWABLE ENERGY UNITS; U.S. patent application Ser. No. 16/274,490, filed 2019 Feb. 13 and titled ROUTE COMMUNITY OBJECTS WITH PRICE-TIME PRIORITY QUEUES FOR TRANSFORMED TRANSPORTATION UNITS; U.S. patent application Ser. No. 16/258,658, filed 2019 Jan. 27 and titled NAVIGATION ROUTES AS COMMUNITY OBJECT VIRTUAL HUB SEQUENCES TO WHICH USERS MAY SUBSCRIBE; U.S. patent application Ser. No. 16/257,032, filed 2019 Jan. 24 and titled SECURITIZATION OF TRANSPORTATION UNITS; U.S. patent application Ser. No. 16/242,981, filed 2019 Jan. 8 and titled STRATEGY GAME LAYER OVER PRICE BASED NAVIGATION; U.S. patent application Ser. No. 16/242,967, filed 2019 Jan. 8 and titled PRICE BASED NAVIGATION; U.S. patent application Ser. No. 16/239,485, filed 2019 Jan. 3 and titled MARKET LAYER PRICE QUEUE MAP ROUTING FOR MULTI-LAYERED NODAL NETWORK TOPOLOGY FOR A MULTI-MODAL SECURE FORWARD MARKET AUCTION IN TRANSPORTATION CAPACITY AND SPACE; U.S. patent application Ser. No. 16/183,647, filed 2018 Nov. 7 and titled FINANCIAL SWAP PAYMENT STRUCTURE METHOD AND SYSTEM ON TRANSPORTATION CAPACITY UNIT ASSETS; U.S. patent application Ser. No. 16/167,525, filed 2018 Oct. 22 and titled MULTI-LAYERED NODAL NETWORK TOPOLOGY FOR A MULTI-MODAL SECURE FORWARD MARKET AUCTION IN TRANSPORTATION CAPACITY AND SPACE; U.S. patent application Ser. No. 15/877,393, filed 2018 Jan. 23 and titled ELECTRONIC FORWARD MARKET EXCHANGE FOR TRANSPORTATION SEATS AND CAPACITY IN TRANSPORTATION SPACES AND VEHICLES; U.S. patent application Ser. No. 15/266,326, filed 2016 Sep. 15 and titled IMPLEMENTATIONS OF A COMPUTERIZED BUSINESS TRANSACTION EXCHANGE FOR VARIOUS USERS; each of which is herein incorporated by reference.

BACKGROUND OF THE INVENTION

The following descriptions and examples are not admitted as prior art by virtue of their inclusion within this section.

In some scenarios, time interval units may not utilize dynamic virtual topology market queues or price time priority queues. Such queues may not be used to organize meetings or to place a value on a meeting time slot because systems may typically considered to be closed, non-transparent, non-substitutable, and/or non-transferrable, no cost of cover calculations exist, and the construct for dynamic routing based on time interval unit marketplaces may not be understood. Further, in such scenarios, legal or physical or technical transformations may not exist for time interval units to trade as commodities, which may prevent the formation of routing sequences that are based upon market dynamic, transparent market price-based inputs in edge weights or edge values. In these scenarios, methods and systems may lack the legal and physical calculation mechanics for time interval units, which may limit dimension routing analysis and equation usefulness.

Deficiencies in market structure for physical time interval units may not allow for the transferability of an underlying meeting or appointment, which may inhibit flexibility to exchange such an asset and may lead to the development of monopolistic systems. Not only is there a need to bid on a doctor appointment at the lowest cost with a doctor with excess time capacity, but job networking sites have no way of prioritizing meetings such that a job candidate may indicate the price they would be willing to pay for a meeting. An exemplary job candidate may take months to get a certain meeting with a company they would like to work for and if a system existed for the candidate to bid on a time slot, a meeting may be had immediately saving countless hours of worry and concern and frustration. Similarly, a medical professional may have a family emergency and it would benefit the medical professional and the patients if a system existed for the medical professional to sell the booked appointments to another medical professional and the patients would be able to see a medical professional at the appointed time rather than being required to reschedule. Further, in some scenarios, time interval options may allow for transferability, but they may lack structures which account for force majeure contingencies, remedies for time interval capacity unit delivery failures, events of default, remedies, calculation formulas for termination payments, or independent valuation transformations. In such scenarios, the ability to trade the value time interval capacity may be limited or technically not possible.

SUMMARY

Described herein are implementations of various relating to a price-time priority queues for time interval units. In one implementation, a method may include receiving origin location data and destination location data from a first user, where the origin location data corresponds to a geographic origin and the destination location data corresponds to a geographic destination. The method may also include generating a plurality of physical or virtual routes based on the origin location data and the destination location data. The method may further include determining a plurality of virtual hubs along the plurality of routes, where the plurality of virtual hubs includes a first virtual hub based on the origin location data and a second virtual hub based on the destination location data. The method may additionally include receiving travel cost data for the plurality of routes for one or more geolocation exchange units, where the one or more geolocation exchange units corresponds to a predetermined time interval traveling from the first virtual hub to the second virtual hub, and where the travel cost data includes data relating to travel time, travel expenses, or combinations thereof. In addition, the method may include receiving market depth data for a geolocation exchange for the one or more geolocation exchange units based on the plurality of physical or virtual routes, where the market depth data includes one or more bid prices and one or more offer prices for the one or more geolocation exchange units. The method may also include selecting an optimized route of the plurality of routes for the one or more geolocation exchange units based on an objective function, where the objective function uses the travel cost data, the market depth data, or combinations thereof.

In another implementation, a computing system may include one or more processors, and the computing system may also include one or more memory having program instructions executable by the one or more processors to receive origin location data and destination location data from a first user, where the origin location data corresponds to a geographic origin and the destination location data corresponds to a geographic destination. The one or more memory may also have program instructions executable by the one or more processors to generate a plurality of physical or virtual routes based on the origin location data and the destination location data. The one or more memory may further have program instructions executable by the one or more processors to determine a plurality of virtual hubs along the plurality of routes, where the plurality of virtual hubs includes a first virtual hub based on the origin location data and a second virtual hub based on the destination location data. The one or more memory may additionally have program instructions executable by the one or more processors to receive travel cost data for the plurality of routes for one or more geolocation exchange units, where the one or more geolocation exchange units corresponds to a predetermined space traveling from the first virtual hub to the second virtual hub, and where the travel cost data includes data relating to travel time, travel expenses, or combinations thereof. In addition, the one or more memory may have program instructions executable by the one or more processors to receive market depth data for a geolocation exchange for the one or more geolocation exchange units based on the plurality of physical or virtual routes, where the market depth data includes one or more bid prices and one or more offer prices for the one or more geolocation exchange units. The one or more memory may also have program instructions executable by the one or more processors to select an optimized route of the plurality of routes for the one or more geolocation exchange units based on an objective function, where the objective function uses the travel cost data, the market depth data, or combinations thereof.

In yet another implementation, a non-transitory computer-readable medium may have stored thereon a plurality of computer-executable instructions which, when executed by a computer, cause the computer to receive origin location data and destination location data from a first user, where the origin location data corresponds to a geographic origin and the destination location data corresponds to a geographic destination. The plurality of computer-executable instructions which, when executed by a computer, may also cause the computer to generate a plurality of routes based on the origin location data and the destination location data. The plurality of computer-executable instructions which, when executed by a computer, may further cause the computer to determine a plurality of virtual hubs along the plurality of routes, where the plurality of virtual hubs includes a first virtual hub based on the origin location data and a second virtual hub based on the destination location data. The plurality of computer-executable instructions which, when executed by a computer, may additionally cause the computer to receive travel cost data for the plurality of routes for one or more geolocation exchange units, where the one or more geolocation exchange units corresponds to a predetermined space traveling from the first virtual hub to the second virtual hub, and where the travel cost data includes data relating to travel time, travel expenses, or combinations thereof. In addition, the plurality of computer-executable instructions which, when executed by a computer, may cause the computer to receive market depth data for a geolocation exchange for the one or more geolocation exchange units based on the plurality of routes, where the market depth data includes one or more bid prices and one or more offer prices for the one or more geolocation exchange units. The plurality of computer-executable instructions which, when executed by a computer, may also cause the computer to select an optimized route of the plurality of routes for the one or more geolocation exchange units based on an objective function, wherein the objective function uses the travel cost data, the market depth data, or combinations thereof.

The above referenced summary section is provided to introduce a selection of concepts in a simplified form that are further described below in the detailed description section. The summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

FIG. 3 illustrates a user price-time priority queue system in accordance with implementations of various techniques described herein.

FIGS. 19-27 illustrate the user interface of a computing device in accordance with implementations of various techniques described herein.

FIGS. 40 and 41 illustrate a configuration module in accordance with implementations of various techniques described herein.

FIG. 52 illustrates an exemplary transformation preamble formula to create a "Time interval object Capacity Unit" for time interval object and time interval object and parking and tolling and curb management capacity units or "General Geolocation Exchange Unit" for general geolocation exchange units in accordance with some embodiments.

FIG. 53 illustrates an exemplary transformation preamble formula to create a "Time interval object Capacity Unit" for time interval object and time interval object and parking and tolling and curb management capacity units or "General Geolocation Exchange Unit" for general geolocation exchange units in accordance with some embodiments.

FIG. 54 illustrates an exemplary transformation definition formulas to create a "Time interval object Capacity Unit" for time interval object and time interval object and parking and tolling and curb management capacity units or "General Geolocation Exchange Unit" for general geolocation exchange units in accordance with some embodiments.

FIG. 55 illustrates an exemplary transformation definition formulas to create a "Time interval object Capacity Unit" for time interval object and time interval object and parking and tolling and curb management capacity units or "General Geolocation Exchange Unit" for general geolocation exchange units in accordance with some embodiments.

FIG. 56 illustrates an exemplary transformation definition formulas to create a "Time interval object Capacity Unit" for time interval object and time interval object and parking and tolling and curb management capacity units or "General Geolocation Exchange Unit" for general geolocation exchange units in accordance with some embodiments.

FIG. 57 illustrates an exemplary transformation definition formulas to create a "Time interval object Capacity Unit" for time interval object and time interval object and parking and tolling and curb management capacity units or "General Geolocation Exchange Unit" for general geolocation exchange units in accordance with some embodiments.

FIG. 58 illustrates an exemplary transformation definition formulas to create a "Time interval object Capacity Unit" for time interval object and time interval object and parking and tolling and curb management capacity units or "General Geolocation Exchange Unit" for general geolocation exchange units in accordance with some embodiments.

FIG. 59 illustrates an exemplary transformation definition formulas to create a "Time interval object Capacity Unit" for time interval object and time interval object and parking and tolling and curb management capacity units or "General Geolocation Exchange Unit" for general geolocation exchange units in accordance with some embodiments.

FIG. 60 illustrates an exemplary transformation definition and transaction terms and condition formulas to create a "Time interval object Capacity Unit" for time interval object and time interval object and parking and tolling and curb management capacity units or "General Geolocation Exchange Unit" for general geolocation exchange units in accordance with some embodiments.

FIG. 61 illustrates an exemplary transformation definition and transaction terms and condition formulas to create a "Time interval object Capacity Unit" for time interval object and time interval object and parking and tolling and curb management capacity units or "General Geolocation Exchange Unit" for general geolocation exchange units in accordance with some embodiments.

FIG. 62 illustrates an exemplary transformation definition and transaction terms and condition formulas to create a "Time interval object Capacity Unit" for time interval object and time interval object and parking and tolling and curb management capacity units or "General Geolocation Exchange Unit" for general geolocation exchange units in accordance with some embodiments.

FIG. 63 illustrates an exemplary transformation force majeure and remedies for product delivery failure formulas to create a "Time interval object Capacity Unit" for time interval object and time interval object and parking and tolling and curb management capacity units or "General Geolocation Exchange Unit" for general geolocation exchange units in accordance with some embodiments.

FIG. 64 illustrates an exemplary transformation event of default remedy formulas to create a "Time interval object Capacity Unit" for time interval object and time interval object and parking and tolling and curb management capacity units or "General Geolocation Exchange Unit" for general geolocation exchange units in accordance with some embodiments.

FIG. 65 illustrates an exemplary transformation event of default remedy formulas to create a "Time interval object Capacity Unit" for time interval object and time interval object and parking and tolling and curb management capacity units or "General Geolocation Exchange Unit" for general geolocation exchange units in accordance with some embodiments.

FIG. 66 illustrates an exemplary transformation event of default remedy formulas to create a "Time interval object Capacity Unit" for time interval object and time interval object and parking and tolling and curb management capacity units or "General Geolocation Exchange Unit" for general geolocation exchange units in accordance with some embodiments.

FIG. 67 illustrates an exemplary transformation event of default remedy formulas to create a "Time interval object Capacity Unit" for time interval object and time interval object and parking and tolling and curb management capacity units or "General Geolocation Exchange Unit" for general geolocation exchange units in accordance with some embodiments.

FIG. 68 illustrates an exemplary transformation event of default remedy formulas to create a "Time interval object Capacity Unit" for time interval object and time interval object and parking and tolling and curb management capacity units or "General Geolocation Exchange Unit" for general geolocation exchange units in accordance with some embodiments.

FIG. 69 illustrates an exemplary transformation event of default remedy and payment formulas to create a "Time interval object Capacity Unit" for time interval object and time interval object and parking and tolling and curb management capacity units or "General Geolocation Exchange Unit" for general geolocation exchange units in accordance with some embodiments.

FIG. 70 illustrates an exemplary transformation payment and limitation of remedy and liability and damages formulas to create a "Time interval object Capacity Unit" for time interval object and time interval object and parking and tolling and curb management capacity units or "General Geolocation Exchange Unit" for general geolocation exchange units in accordance with some embodiments.

FIG. 71 illustrates an exemplary transformation limitation of remedy and liability and damages formulas to create a "Time interval object Capacity Unit" for time interval object and time interval object and parking and tolling and curb management capacity units or "General Geolocation Exchange Unit" for general geolocation exchange units in accordance with some embodiments.

FIG. 72 illustrates an exemplary transformation limitation of remedy and liability and damages and financial information and tax formulas to create a "Time interval object Capacity Unit" for time interval object and time interval object and parking and tolling and curb management capacity units or "General Geolocation Exchange Unit" for general geolocation exchange units in accordance with some embodiments.

FIG. 73 illustrates an exemplary transformation credit supporting formulas to create a "Time interval object Capacity Unit" for time interval object and time interval object and parking and tolling and curb management capacity units or "General Geolocation Exchange Unit" for general geolocation exchange units in accordance with some embodiments.

FIG. 74 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 75 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 76 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 77 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 78 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 79 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 80 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 81 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 82 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 83 illustrates an exemplary transformation Time interval object Capacity Unit formulas to create a "Time interval object Capacity Unit" for time interval object and time interval object and parking and tolling and curb management capacity units or "General Geolocation Exchange Unit" for general geolocation exchange units in accordance with some embodiments.

FIG. 84 illustrates an exemplary transformation Time interval object Capacity Unit or "General Geolocation Exchange Unit" for general geolocation exchange units notice correspondence in accordance with some embodiments.

FIG. 85 illustrates an exemplary transformation of a Time interval object Capacity Unit flow chart of a plurality of formula transformations or "General Geolocation Exchange Unit" for general geolocation exchange units in accordance with some embodiments.

FIG. 86 illustrates an exemplary transformation of a Time interval object Capacity Unit flow chart of a plurality of formula transformations or "General Geolocation Exchange Unit" for general geolocation exchange units in accordance with some embodiments.

FIG. 87 illustrates an exemplary transformation of a Time interval object Capacity Unit flow chart of a plurality of formula transformations or "General Geolocation Exchange Unit" for general geolocation exchange units in accordance with some embodiments.

FIG. 88 illustrates an exemplary transformation of a Time interval object Capacity Unit flow chart of a plurality of formula transformations or "General Geolocation Exchange Unit" for general geolocation exchange units in accordance with some embodiments.

DETAILED DESCRIPTION

Figure 1:
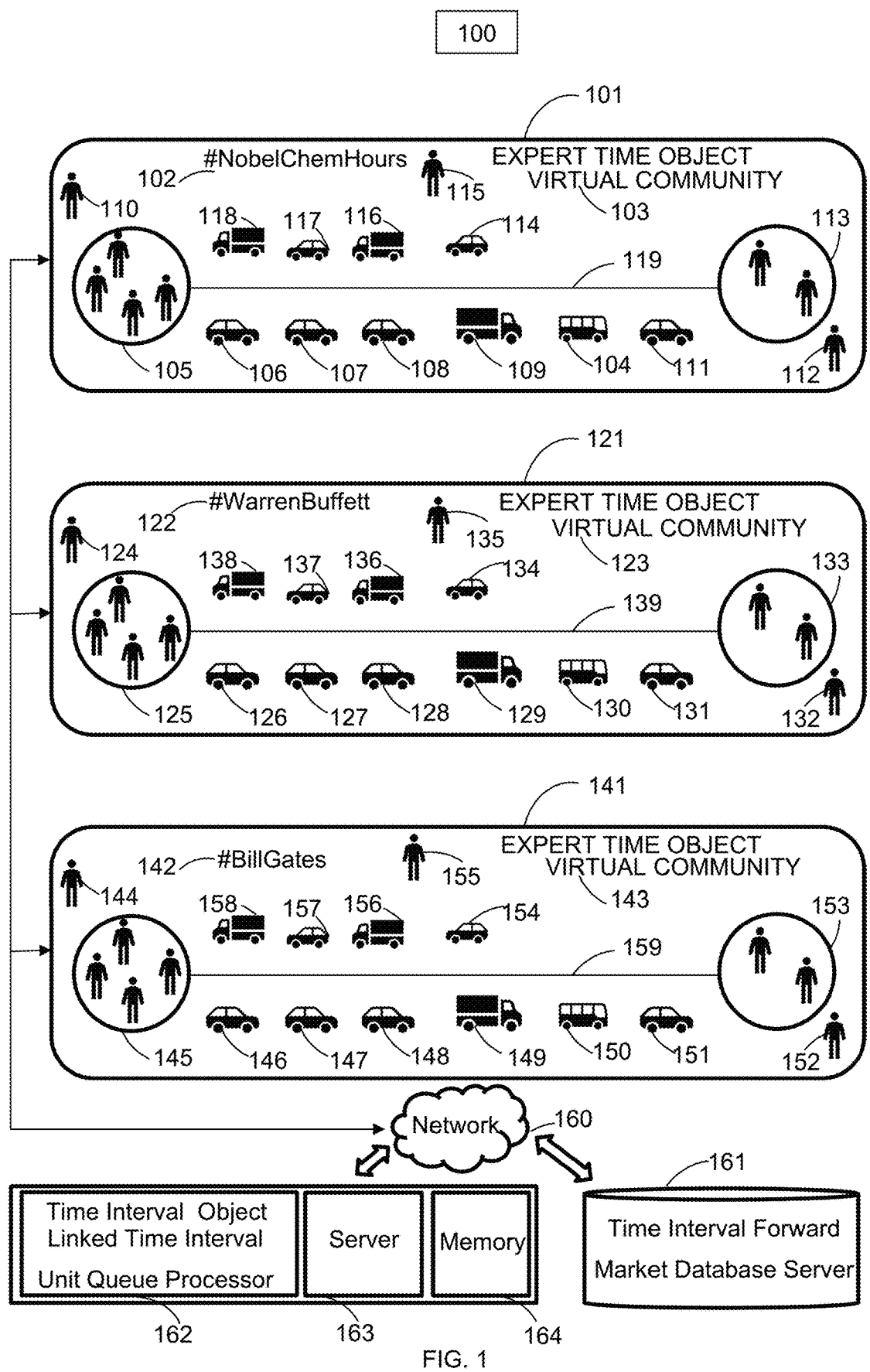
FIG. 1 illustrates a system using virtual hubs in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein. In other instances, well-known methods, procedures, components, circuits and networks have not been described in detail so as not to unnecessarily obscure aspects of the embodiments.

It will also be understood that, although certain elements of the invention and subject matter will be described in a certain order, the order is not intended to be limiting to the invention as many steps may be performed in a plurality of configurations to accomplish the invention of using various technologies to participate, trade and transact time interval object community linked time interval object units with associated price-time priority queues as a physical forward commodity. It will be further understood that the terms "comprises" or "comprising," when used in this specification, specify the presence of stated features, integers, steps, operations, elements, and/or components, but do not preclude the presence or addition of one or more other features, integers, steps, operations, elements, components, and/or groups thereof.

The terminology used in the description of the invention herein is for the purpose of describing particular embodiments only and is not intended to be limiting of the invention. As used in the description of the invention, the singular forms "a", "an" and "the" are intended to also include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

A computing device, as described herein, may include any computing implementation known to those skilled in the art, including mobile computing devices. Embodiments of a mobile computing device may be substituted for a fixed stationary computing device or a virtual reality headset or a mixed reality headset or an augmented reality headset or an audio interfaced computer device. Embodiments may also occur on a projection computing device or in any other method or system which communicates and integrates the use of a network, community time interval object processor, my time interval object processor, sequence time interval object processor, global positioning system network, mobile computing devices, servers, forward commodity time interval object forward market price-time priority auction database, price-time priority queues, grouping software instructions for hubs, securitization transformations and specifications, legal transformations, game servers, time interval object community linked objects, indexing algorithms for time interval object community linked time interval object unit securities on various navigation subjects, navigation servers, virtual hub topology methods and systems, social network creation objects with associated price time priority queues, transparent open access user interface pricing systems, blockchain medical records, blockchain education records, blockchain certification records, blockchain rating records, blockchain audit and safety methods, facial recognition, fingerprint recognition or photo recognition of users for security and identity check, algorithms for no arbitrage conditions and constraints. A computing device, as described herein, may utilize a user interface (e.g., a graphical user interface) formatted on mobile or stationary computing devices over various mediums. Such devices may be connected through a network for the purpose of grouping users into virtual hub sequences of community objects as a gateway to participating, transacting or trading time interval object community linked time interval object capacity units between combinations of virtual hubs as a forward commodity in an auction with price-time priority queues.

Various implementations directed to price time priority queue routing for time interval units will now be described in the following paragraphs with reference to FIGS. 1-106.

The following paragraphs provide various techniques of various embodiments described herein such as illustrated as in FIG. 1. In one implementation as illustrated in FIG. 1, a user 110 may be assigned or may join a time interval object community linked virtual subject community 101, 103 which is a sequence of virtual hub(s) on a given subject matter. In some embodiments, the time interval object community linked virtual hub sequence may be assigned a metadata tag such as #NobelChemHours 102 which is short for a longer full name sequence such as a time interval object with a Nobel Prize Winner in Chemistry and a time interval object product originating in a specified location 105 with a destination waypoint of a specified location 113. In some embodiments, the origin time interval object community linked virtual hub 105, may be a specific address and geolocation data in the city of Ithaca, NY or another location or a virtual address. In some embodiments, the time interval object subject 119 between the Ithaca, NY time interval object community linked virtual hub 105 and the New York City, NY time interval object community linked virtual hub 113 may be a sequence of two time interval object community linked virtual hubs with an exemplary subject matter of Nobel Prize Winner in Chemistry 102. In some embodiments, there may be many one or more trucks 118 along the subject 119 or cars 117 or additional trucks 116 or additional cars 114 or the subject path may be a virtual communication route such as a computer connected video link, audio link, virtual reality link, augmented reality link, mixed reality link or other connected computer medium link which are headed in a certain direction along the subject 119 capable of delivering the time interval object community linked time interval object unit. In some embodiments, additional vehicles 106, 107, 108, 109, 104, 111 may be headed the other direction along the virtual hub sequence 119 between two time interval object community linked virtual hub points 105, 113. In some embodiments, additional user(s) 112 may join the virtual hub subject sequence community 103. In yet another exemplary implementation, a user 110 may be assigned or may join a time interval object community linked virtual subject community 121, 123 which is a sequence of virtual hub(s). In some embodiments, the virtual hub sequence may be assigned a metadata tag such as #WarrenBuffett 122 which is short for a longer full name time interval object community linked sequence such as a meeting with Warren Buffett as a time interval object product originating in Katy, Texas with a destination waypoint of Houston, Texas. In some embodiments, the origin time interval object community linked virtual hub 125, may be a specific address and geolocation data in the city of Katy, Texas. In some embodiments, the time interval object community linked subject of a meeting with Warren Buffett 139 between the Katy, Texas virtual hub 125 and the Houston, Texas virtual hub 133 may be a sequence of two virtual hubs. In some embodiments, there may be many one or more trucks 138 along the time interval object community linked subject 139 or cars 137 or additional trucks 136 or additional cars 134 or virtual time interval object 139 which are headed in a certain direction along the subject of trinomials in algebra 139. In some embodiments, additional vehicles 126, 127, 128, 129, 130, 131 may be headed the other direction along the virtual hub sequence 139 between two time interval object community linked virtual hub points 125, 133. In some embodiments, additional user(s) 132 may join the time interval object community linked virtual hub subject sequence community 123. In yet another exemplary implementation, a user 144 may be assigned or may join a time interval object community linked virtual subject community 141, 143 which is a sequence of virtual hub(s). In some embodiments, the time interval object community linked virtual hub sequence may be assigned a metadata tag such as #BillGates 142 which is short for a longer full name sequence such as a time interval object community linked sequence such as a language arts topic or subject of a virtual or physical meeting with Bill Gates as an time interval object product originating in Palo Alto, California with a waypoint destination of San Francisco, California. In some embodiments, the origin virtual hub 145, may be a specific address and geolocation data in the city of Palo Alto, California. In some embodiments, the time interval object community linked subject 159 between the Palo Alto, California time interval object community linked virtual hub 145 and the San Francisco time interval object community linked virtual hub 153 may be a sequence of two virtual hubs. In some embodiments, there may be many one or more trucks 158 along the subject 159 or cars 157 or additional trucks 156 or additional cars 154 or virtual transport 159 which are headed in a certain direction along the subject of a meeting with Bill Gates at a given time interval object 159. In some embodiments, additional vehicles 146, 147, 148, 149, 150, 151 may be headed the other direction along the virtual hub sequence 159 between two virtual hub points 145, 153. In some embodiments, additional user(s) 152 may join the time interval object community linked virtual hub subject sequence community 143.

In some embodiments, time interval object community linked virtual hub sequences such as Ithaca, NY time interval object community linked virtual hub 105 to New York City, NY time interval object community linked virtual hub 113 are transformed into community objects which may then be assigned a plurality of attributes in the same sense as a class in the Java programming language has methods as a part of the class object in object oriented programming. In some embodiments, the data transformation of a time interval object community linked virtual hub sequence into a community object allows the similar benefits of the data transformations involved in computing languages with methods which help the instructions of the computer program communicate in an organized manner using modular logic. In some embodiments, time interval object community linked virtual hub sequences such as 105 to 113 #NobelChemHours 102 may be combined with other time interval object community linked virtual hub sequences to extend the series sequence. In some embodiments, time interval object community linked virtual hub sequences such as 105 to 113 #NobelChemHours 102 which is short for a longer full name sequence such as a time interval object community linked sequence such as a meeting with a Nobel Prize Winner in Chemistry as a time interval object product originating in Ithaca, NY with a waypoint destination of New York, NY In some embodiments, time interval object community linked virtual hub sequences with price-time priority queues may be two virtual hubs that are next door to your home and only 500 feet between waypoints or they may be many miles apart. As we have discussed at length in the previous sections of the disclosed invention, while there may be hundreds or thousands or millions of people along various time interval object community linked time interval object virtual hub sequences, there currently exists no method or system of organizing an time interval object community linked subject or time interval object community linked virtual hub sequence into a transformed data community time interval object which is a tradable commodity. The attributes of communities allow for superior communication, accountability and even transactions to occur within a community object 101. In some embodiments, the data transformation of a time interval object community linked virtual hub sequence community object 101 allows a plurality of network members 110, 112 to be assigned time interval object community linked virtual subject communities 103 based on a plurality of attributes, prior GPS location histories, subject search, navigation search queries or other attributes. In some embodiments, time interval object community linked virtual hub sequences which have been transformed into community objects 101 provide greater communication and organizational ability for a market to transact time interval object community linked time interval object unit(s) and provide a gateway for those time interval object unit transactions as described in U.S. patent application Ser. No. 15/877,393, "Electronic Forward market exchange for time interval object seats and capacity in time interval object spaces and vehicles," filed Jan. 23, 2018, the entirety of which is incorporated by reference herein. In some embodiments, time interval object community linked virtual hub sequences which have been transformed into community objects 101 provide greater communication and organizational ability for a market to transact time interval object community linked time interval object unit(s) and provide a gateway for those time interval object unit transactions as described in U.S. patent application Ser. No. 15/266,326, "Implementations of a computerized business transaction exchange for various users," filed Sep. 15, 2016, the entirety of which is incorporated by reference herein.

In some embodiments, time interval object community linked virtual hub sequences which have been transformed into community objects 141 communicate through a network 160 to associate a price-time priority queue for a transformed time interval object community linked time interval object community object using a time interval object community linked time interval object unit queue processor 162, a server 163, memory 164 and a time interval object community linked time interval object forward market database server 161. In some embodiments, the virtual hub sequences or community objects 141, 121, 101 may be independent or sequenced to construct a waypoint sequence of multiple linked time interval object community linked virtual hub subject community objects 101, 121, 141. In some embodiments, the associated price-time priority queue 300 for time interval object community linked time interval object units may have generated processing and user interface display instructions from the time interval object community linked time interval object unit queue processor 162, the server 163, the memory 164 and a time interval object community linked time interval object forward market database server 161 through a network 160. In some embodiments, the price-time priority queue 300 for transformed time interval object community linked time interval object units may process and display a plurality of time and date sequences for a plurality of forward delivery periods for time interval object community linked transformed time interval object unit(s).

Figure 2:
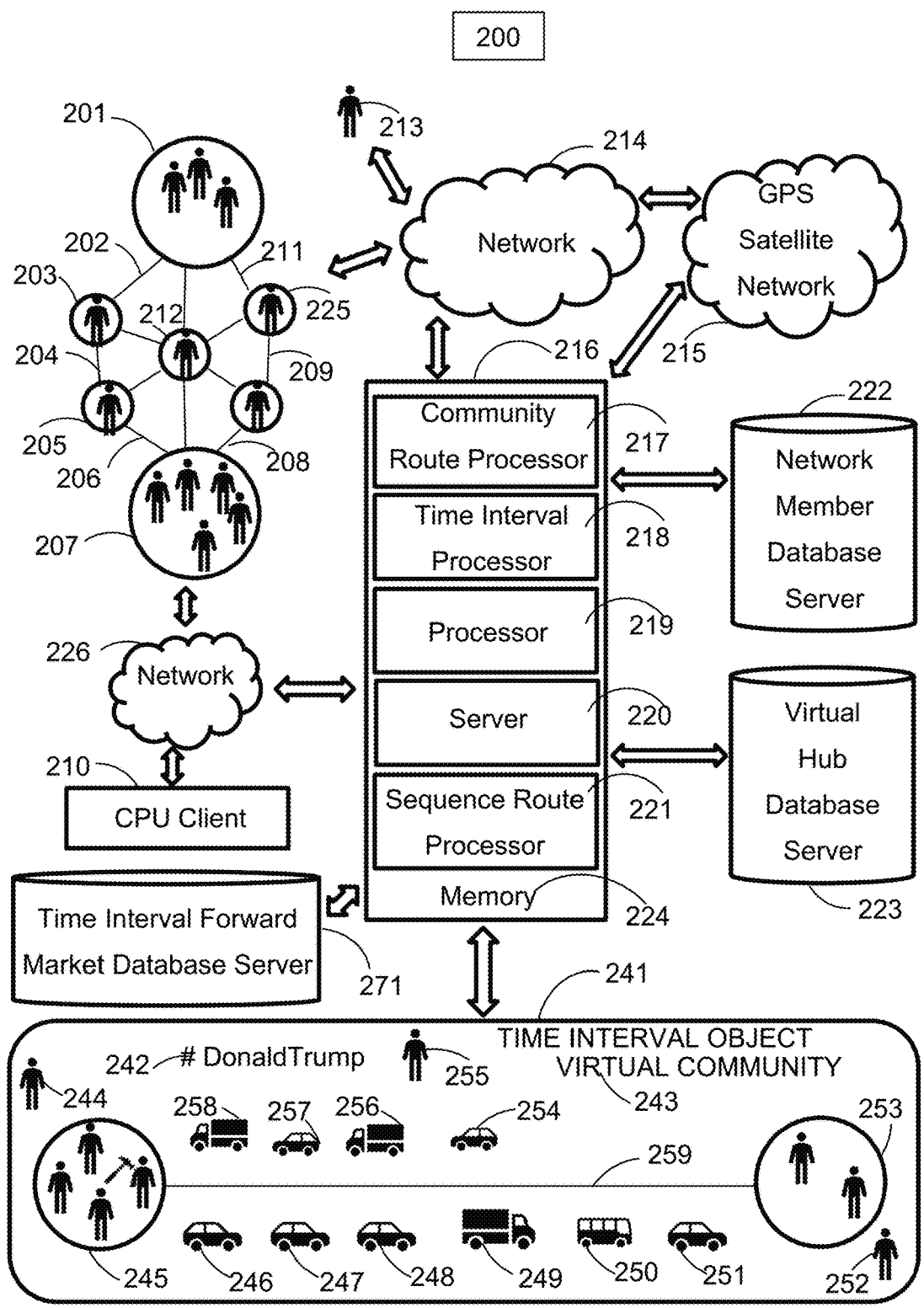
FIG. 2 illustrates a network configuration in accordance with implementations of various techniques described herein.

FIG. 2 illustrates in some embodiments, an exemplary network configuration 200. In some embodiments a network of time interval object community linked virtual time interval object hubs 201, 203, 205, 207, 212, 225 may represent a time interval object community linked virtual time interval object network of a neighborhood, village, city, county, state, country, continent or even inter-virtual hub network across geographies. Prior art as well as current inventions carry no methods or data transformations to transform time interval object community linked navigation subjects 202 which are a virtual hub sequence 202 between a series of virtual time interval object hubs 201 and 203 or 203 and 212 or even multi-leg time interval object community linked combinations such as 201 to 203 and 203 to 212 as a sequence. In some embodiments, user(s) 213 or the network 214 have input hundreds or thousands or millions or more time interval object community linked virtual hubs 201 to form a network topology for time interval object community linked time interval object virtual hub sequences 241. In some embodiments, the time interval object community is linked time interval object data transformation to a series of virtual time interval object hubs 245, 253 allows for network structure 201, 203, 212, 205, 207, 225, 212 and organization such as a hub and spoke model which is heavily utilized within the airline time interval object industry or a plurality of other competing network topologies which are not dependent on road pathways as they may be dependent on virtual network pathways or any combination or subset or superset therein. In some embodiments, the time interval object community linked virtual time interval object hub network 201, 203, 212, 205, 207, 225, 212 has been input into the network 214. In some embodiments, the topology of the virtual hub network 201, 203, 212, 205, 207, 225, 212 then moves for further data transformation in the community subject processor 217 which transforms subsections of the time interval object community linked time interval object network topology 201, 203, 212, 205, 207, 225, 212 into a time interval object community linked virtual hub sequence 241 which represents two addresses 245, 253 along a time interval object community linked virtual hub sequence 242 such as Palo Alto, California 245 to San Francisco, California 253 corresponding each time interval object community linked virtual hub address 245, 252 with a physical address or a mobile virtual address 253. Time interval object community linked virtual subject communities 243 may be one to one, one to two or one to many and any superset or subset combination thereof in both physical and virtual delivery of the time interval object unit. The My time interval object Processor 218 further processes time interval object community linked virtual hub combination and time interval object community linked virtual time interval object hub sequences into a specific network members account on the network member database server 222. In some embodiments, the time interval object community linked sequence subject processor 221 may connect a plurality of virtual hub sequences 201, 203 205, 207 in a logical order to complete a path combination 201 to 207 for time interval object community linked navigation or community object construction. In some embodiments, community objects may be made from simple direct path subjects 202 between two virtual hubs 201 and 203 or multi-virtual hub constructions between two time interval object community linked virtual hub sequences 201 to 207 by waypoints of 201 to 203 to 212 to 207 or any combination or superset or subset thereof. In some embodiments, the time interval object community linked virtual subject community objects 243 allow attributes to be assigned to the community objects. In some embodiments, users may be assigned to a plurality or time interval object community virtual hub sequence objects 241. In some embodiments, network members 213 may be assigned to a time interval object community linked virtual subject community 241 because the user(s) subject history on the GPS satellite network 215 suggests the subject has overlap with time interval object community linked virtual hub subject sequences the user has used or queried on various search methods on the system for the time interval object product. In some embodiments, the search interface 5000 interprets a keyword, such as calculus, which then queries the time interval object community linked virtual subject object, which then indexes search results based on the following priority of time interval object 242, then geolocation 242, 245, 253, then time interval object community linked virtual subject object price-time priority queue 271. In some embodiments the user 213 may use a CPU client 210 that is a visual, audio or other type of computing interface with the network 226 of time interval object community linked navigation subject communities 243. In some embodiments, the time interval object community linked time interval object forward market database server 271 may interface with a processor 219 or sequence subject processor 221 or my subject processor 218 or time interval object community linked community subject object processor 217 to process a plurality of price-time priority queues 300 for transformed time interval object unit(s). In some embodiments, a plurality of vehicles 258, 257, 256, 254, 246, 247, 248, 249, 250, 251 may be in subject between a said first virtual hub 245 and a second said virtual hub 253. In some embodiments, vehicles 257, 247 may be moving in opposite directions along a subject 259. In some embodiments, a truck 258 may contain a transformed time interval object unit(s) or a car 251 may contain a transformed time interval object unit(s) or a bus 250 may contain a transformed time interval object unit(s) or a plurality of other vehicle types may contain a transformed time interval object community linked time interval object unit(s) under a specification which is substitutable. In some embodiments, the time interval object community linked virtual hub or community object sequence of waypoints may be reversed from waypoint 245 to waypoint 253 to waypoint 253 to waypoint 245. In some embodiments, the time interval object community linked subject object 241 or time interval object linked community subject object sequence 101, 121, 141 may have an infinite series of associated price-time queues 300 whereby any subset or superset comprise a forward market for transformed time interval object community linked time interval object unit(s), transformed time interval object community linked subject object(s) and the associated transformed time interval object community linked time interval object unit(s). In some embodiments time interval object community linked virtual subject communities 241, 101, 121, 141 are transformed data structures that form objects which community users 213 may subscribe, friend, join, follow to more efficiently have news and understanding for the time interval object community linked time interval object unit transactions as described in U.S. patent application Ser. No. 15/877,393, "Electronic Forward market exchange for time interval object seats and capacity in time interval object spaces and vehicles," filed Jan. 23, 2018, the entirety of which is incorporated by reference herein. In yet other embodiments time interval object community linked virtual subject communities 241, 101, 121, 141 are transformed data structures that form objects which community users 213 may subscribe, friend, join, follow to more efficiently have news and understanding for the time interval object community linked time interval object unit transactions as described in U.S. patent application Ser. No. 15/266,326, "Implementations of a computerized business transaction exchange for various users," filed Sep. 15, 2016, the entirety of which is incorporated by reference herein.

FIG. 3 illustrates exemplary user price-time priority queue 300 for transacting or matching transformed time interval object community linked time interval object unit data, participating, transacting and/or trading time interval object community linked time interval object, representing the transformed time interval object community linked time interval object unit value as a homogeneous asset specification as a physical forward commodity security between combinations of virtual hubs over various time interval object modes. In some embodiments, user transformed time interval object community linked time interval object unit(s) or transformed time interval object community linked time interval object unit(s) associated with time interval object community linked subject community objects interface 300 includes the following instructions, transformations and elements, or a subset or superset thereof:

exemplary transformed time interval object community linked time interval object unit price-time priority sell queue 320;

exemplary transformed time interval object community linked time interval object unit price-time priority buy queue 321;

exemplary transformed time interval object community linked time interval object unit price priority bucket 305 in the time interval object unit buy queue of $5.10;

exemplary transformed time interval object community linked time interval object unit price priority bucket 306 in the time interval object unit buy queue of $5.30;

exemplary transformed time interval object community linked time interval object unit price priority bucket 310 in the time interval object unit buy queue of $5.60;

exemplary transformed time interval object community linked time interval object unit price priority bucket 314 in the time interval object unit sell queue of $5.70;

exemplary transformed time interval object community linked time interval object unit price priority bucket 315 in the time interval object unit sell queue of $5.80;

exemplary transformed time interval object community linked time interval object unit price priority bucket 316 in the time interval object unit sell queue of $6.60;

exemplary transformed time interval object community linked time interval object unit price-time priority buy price 304 in the first time position of the price priority bucket 305 of $5.10;

exemplary transformed time interval object community linked time interval object unit price-time priority buy price 303 in the second time position of the price priority bucket 305 of $5.10;

exemplary transformed time interval object community linked time interval object unit price-time priority buy price 302 in the third time position of the price priority bucket 305 of $5.10;

exemplary transformed time interval object community linked time interval object unit price-time priority buy price 307 in the first time position of the price priority bucket 306 of $5.30;

exemplary transformed time interval object community linked time interval object unit price-time priority buy price 309 in the first time position of the price priority bucket 310 of $5.60;

exemplary transformed time interval object community linked time interval object unit price-time priority buy price 308 in the second time position of the price priority bucket 310 of $5.60;

exemplary transformed time interval object community linked time interval object unit price-time priority sell price 311 in the first time position of the price priority bucket 314 of $5.70;

exemplary transformed time interval object community linked time interval object unit price-time priority sell price 312 in the second time position of the price priority bucket 314 of $5.70;

exemplary transformed time interval object community linked time interval object unit price-time priority sell price 313 in the third time position of the price priority bucket 314 of $5.70;

exemplary transformed time interval object community linked time interval object unit price-time priority sell price 318 in the first time position of the price priority bucket 315 of $5.80;

exemplary transformed time interval object community linked time interval object unit price-time priority sell price 319 in the second time position of the price priority bucket 315 of $5.80;

exemplary transformed time interval object community linked time interval object unit price-time priority sell price 317 in the first time position of the price priority bucket 316 of $6.60;

exemplary transformed time interval object community linked time interval object unit price time priority limit order book ("LOB") 325 is represented by the vector q(t) 301, such that the i-th coordinate for i>0, $q_i(t)$, is the number of sell limit orders of transformed time interval object units that are waiting in the LOB at time t a price $i\delta$ ($\delta$ is the price unit tick size of the transformed time interval object community linked time interval object unit), the number of buy limit orders for transformed time interval object community linked time interval object units at iδ are represented with a negative sign $q_i$ (t);

exemplary benchmark price 326 of all sell limit orders at time t are computed as s(t)=s(q(t))=min (min {0<iδ: $q_i$ (t)>0}), if $q_i$ (t) is less than or equal to 0 for all i>0, then s (q (t))=infinity;

exemplary benchmark price 327 of all buy limit orders at time t are computed as b(t)=b (q(t))=max (max {iδ>0: $q_i$ (t)<0}), if $q_i$ (t) is greater than or equal to 0 for all i>0, then b(q(t))=negative infinity;

exemplary order match 328 in the transformed time interval object community linked time interval object unit limit order book where s(t)=b(t), which then moves the method and system to the matched transformed time interval object community linked time interval object unit limit order confirmation and delivery process;

exemplary limit order book status of no order match 329, where s (t)>b (t);

exemplary limit order book i-th $q_i$ (t) element 330 of LOB is cancelled, remove from queue;

exemplary i-th qi (t) element is a new transformed time interval object community linked time interval object unit order 331 in LOB, insert into respective limit order buy queue 321 or limit order sell queue 320 with priority of price, then time into the price time priority queues 300.

In some embodiments, the price—time priority queue 300 for transformed time interval object community linked time interval object units may be assigned to a time interval object community linked commute community object 241 which is a waypoint sequence of transformed time interval object community linked time interval object units. In some embodiments, the price—time priority queue 300 may be assigned to two waypoints as an time interval object community linked commute community object 241 or the price—time prior queue 300 may be assigned to an time interval object community linked commute community waypoint object sequence of many waypoints 203 to 205 to 207 to 212 which have been added together to form one continuous time interval object community linked commute community object 241 and respective price—time priority queue for transformed time interval object community linked time interval object units through processing instructions from the time interval object community linked Community Subject Processor 217 and time interval object community linked Sequence Subject Processor 221 via the network(s) 226 and 214 and 215. In some embodiments, the limit order book 301 vector may be assigned to a specific date and time for the time interval object community linked commute community waypoint object which is a forward market price for transformed time interval object community linked time interval object unit(s) 271 and time interval object community linked commute community waypoint object(s) 241. In some embodiments, a specific transformed time interval object community linked time interval object unit price—time priority queue limit buy order 304 with a specific price stamp bucket 305 of $5.10, may be cancelled, if the 304 order is cancelled, the 303 price—time priority limit order book buy queue price then moves to the higher price—time priority queue position of 304 and price—time priority price of 302 moves to position 303. In some embodiments, the price—time priority limit order sell price 319 of price—time priority bucket price 315 of $5.80 may be cancelled, if 319 price—time priority of the transformed time interval object community linked time interval object unit is cancelled, then order 317 moves to a higher position in the overall transformed time interval object community linked time interval object queue 320 even though the limit order book price 317 remains in the price bucket of 316 which is $6.60. In some embodiments, price—time priority insertion may occur where a new order is inserted into either the transformed time interval object community linked time interval object unit buy queue 320 or transformed time interval object community linked time interval object unit sell queue 321. In some embodiments, by example but not limiting by example, a new price—time limit order for a transformed time interval object community linked time interval object unit may be inserted as a sell order at a price of $5.70 at position 313 which would then assume order 312 was also at a price of $5.70 and that order 312 was placed with a time that was before order 313 was placed. In the aforementioned example of the price—time order insertion of 313, price—time orders of 319, 318 and 317 have moved lower in their relative position even though they remain in distinctly different price buckets of 315 and 316 respectively as the price—time priority queue 300, price is first priority, then time stamp in the price—time priority queue 300 for transformed time interval object community linked time interval object units.

In some embodiments, the lowest selling price s(t) 326 may equal the highest buying price b(t) 327, in which case the highest transformed time interval object community linked time interval object unit buy queue price bucket 310 is equal to the lowest transformed time interval object community linked time interval object unit sell queue 320 selling bucket price 314. In the example 300 of the limit order book 301, but not limiting by example, the highest transformed time interval object community linked time interval object unit buy price 310 of $5.60 is lower than the lowest time interval object community linked time interval object unit sell queue 320 lowest selling bucket 314 of $5.70 so no match occurs because s (t)>b (t) 329. In some embodiments, many order insertions 331 or order cancellations 330 may occur for transformed time interval object community linked time interval object units from the time interval object community linked time interval object forward market database server 271 associated with time interval object community linked community objects which are series of waypoints 241.

In some embodiments, the LOB 300 for transformed time interval object community linked time interval object units may contain many different types of instruction structures and specifications such as limit orders 720, market orders 720, market if touched orders 720, snap market orders 720, snap mid orders 720, snap to primary orders 720, peg to benchmark orders 720, or adaptive custom orders 720 which are custom customer designed instructions which are all standard order types for anyone skilled in the art of markets. In some embodiments, the LOB 300 for transformed time interval object units may also contain instructions for order times such as good for the day 710, good till cancelled 710, immediate or cancel 710, good till date 710, day till cancelled 710 or a plurality of additional custom instructions for the timing of the order of the transformed time interval object unit in the LOB 300 that is associate with an time interval object community linked commute community object 241. In some embodiments, a plurality of additional instructions and specifications may also be unique to each transformed time interval object community linked time interval object unit LOB 300 such as virtual mode 811, air mode 812, autonomous vehicle mode 813, bike mode 814, boat mode 815, bus mode 816, drone mode 817, limo mode 818, motorcycle mode 819, moped mode 820, shuttle mode 821, spaceship mode 822, subway mode 823, taxi mode 824, train mode 825, fastest optimized mode 826, automobile mode 830 which may combine many modes 810 or a single mode 810 for a waypoint commute community object 241 or waypoint time interval object community linked sequence 201 to 203 to 205 to 212 to 207 of many time interval object community linked commute communities 241.

In some embodiments, the LOB 300 may be assigned to transformed time interval object community linked time interval object unit packages 828 that have associated time interval object community linked commute community objects 241 with educational material in the unitized transformed time interval object community linked time interval object. In some embodiments, the LOB 300 for transformed time interval object units may be assigned to cargo 829 such as a trailer of a rig or container of a boat or container on a truck or any type of cargo that takes up the space of a transformed time interval object community linked time interval object unit. In some embodiments, the LOB 300 may even be assigned to the virtual transformed time interval object community linked time interval object unit 811 which would be space along a packet moving medium such as a telecom pipeline, satellite telecom or wireless telecom that moves packets of data which are transformed time interval object community linked time interval object units.

Figure 4:
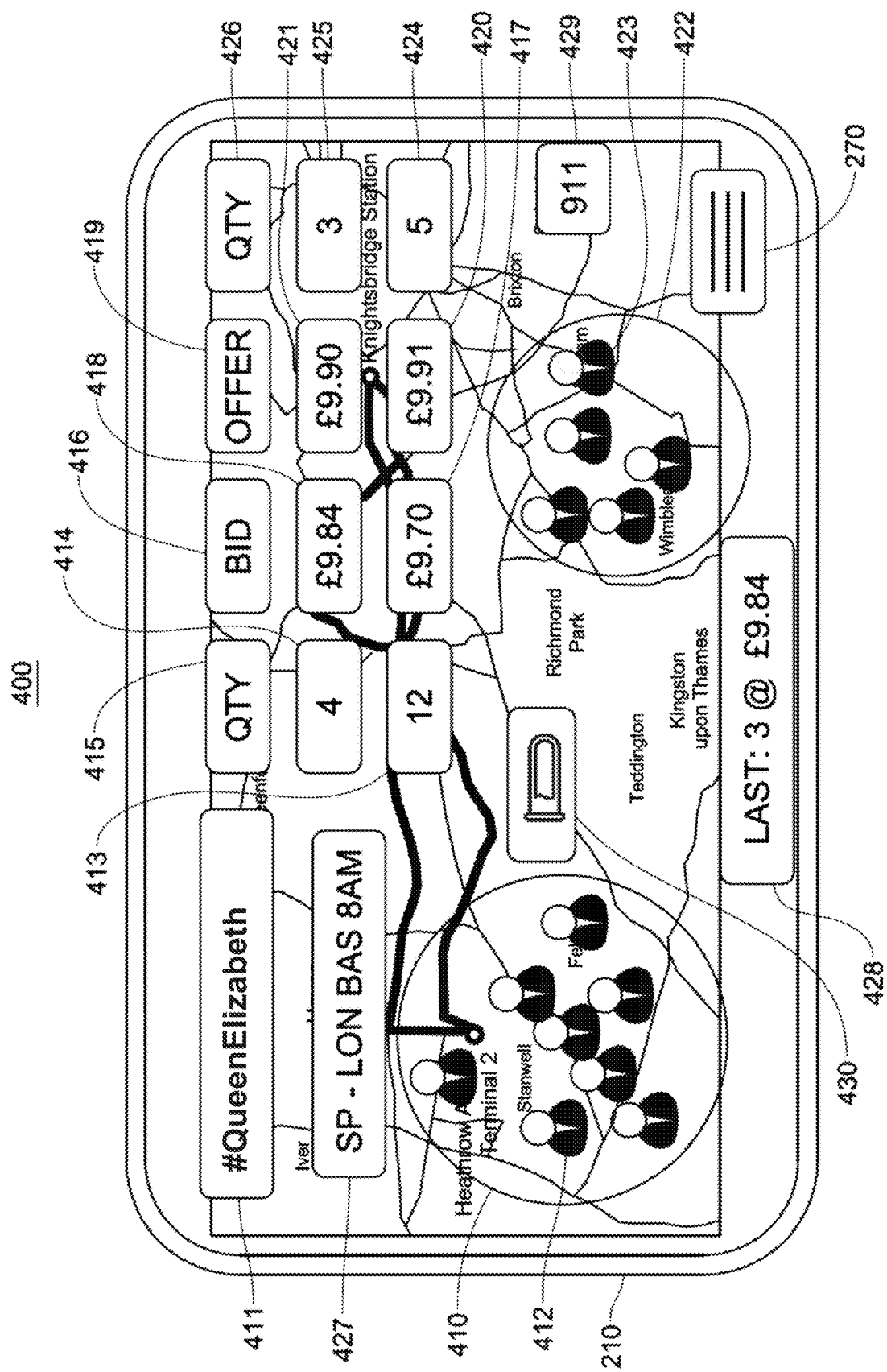
FIGS. 4-14 illustrate a user interface of a computing device in accordance with implementations of various techniques described herein.

FIG. 4 illustrates exemplary user interfaces 210 for participating, transacting and/or trading time interval object community linked time interval object as a physical forward data transformed time interval object community linked time interval object unit commodity or security between combinations of virtual hubs which may be community objects 241 over various time interval object modes. In some embodiments, the user interface 210 includes the following elements, or a subset or superset thereof:

exemplary time interval object community linked virtual hub combination 411;

exemplary time interval object community linked virtual hub origin/from location 410 with users 412 within the time interval object community linked virtual hub location 310;

exemplary specification summary of the market, level of service and time of delivery commencement 427, in this particular embodiment the GUI 210 has moved to an international time interval object community linked virtual market hub combination market such as within London;

exemplary mode of time interval object community linked time interval object capacity type of high tea with the queen 430;

exemplary time interval object community linked transaction summary of the last trade price-time priority queue auction quantity and price 428 in the local currency or another currency set by the user 110;

exemplary time interval object community linked virtual hub destination/to location 422 and user who is being delivered on the time interval object community linked time interval object or time interval object capacity unit 423;

exemplary bid/buy quantity title header 415 for an exemplary time interval object community linked virtual time interval object hub market;

exemplary bid/buy price title header 416 for an exemplary time interval object community linked virtual time interval object hub market;

exemplary offer/sell price title header 419 for an exemplary time interval object community linked virtual time interval object hub market;

exemplary offer/sell quantity title header 426 for an exemplary time interval object community linked virtual time interval object hub market;

exemplary bid/buy quantity 414 for the best bid quantity for the associated LOB 300 from a plurality of users 110 for an exemplary respective time interval object capacity time interval object community linked virtual hub combination that has undergone a plurality of data transformations in the method 411;

exemplary bid/buy quantity 413 for the second-best bid quantity for the associated LOB 300 from a plurality of users 110 for an exemplary respective time interval object community linked time interval object or time interval object capacity virtual hub combination that has undergone a plurality of data transformations in the method 411;

exemplary bid/buy price 418 for the best bid price for the associated LOB 300 from a plurality of users 110 for an exemplary respective time interval object community linked time interval object capacity virtual hub combination that has undergone a plurality of data transformations in the method 411;

exemplary bid/buy price 417 for the second-best bid price for the associated LOB 300 from a plurality of users 110 for an exemplary respective time interval object community linked time interval object or time interval object capacity virtual hub combination that has undergone a plurality of data transformations in the method 411;

exemplary offer/sell price 421 for the best offer price for the associated LOB 300 from a plurality of users 110 for an exemplary respective time interval object community linked time interval object or time interval object capacity virtual hub combination that has undergone a plurality of data transformations in the method 411;

exemplary offer/sell price 420 for the second-best offer price for the associated LOB 300 from a plurality of users 110 for an exemplary respective time interval object community linked time interval object or time interval object capacity virtual hub combination that has undergone a plurality of data transformations in the method 411;

exemplary offer/sell quantity 425 for the best offer quantity for the associated LOB 300 from a plurality of users 110 for an exemplary respective time interval object community linked time interval object or time interval object capacity virtual hub combination that has undergone a plurality of data transformations in the method 411;

exemplary offer/sell quantity 424 for the second-best offer quantity for the associated LOB 300 from a plurality of users 110 for an exemplary respective time interval object community linked time interval object capacity virtual hub combination that has undergone a plurality of data transformations in the method 411;

exemplary safety dispatch "911" button 429 to enact video and audio recording of the user 110 environment and dispatch of that information to authorities or for recording documentation purposes of the session.

exemplary hamburger menu button 270 to move back to menu options and settings away from the participation, transaction, trading GUI 210 embodiment.

In some embodiments the user 110 may enter a time interval object community linked transaction quantity and price for transformed time interval object community linked time interval object or time interval object capacity unit securities to participate, transact and/or trade by the GUI 210 detecting user 110 contact with a bid/buy price 418 or offer/sell price 421. The GUI 210 detects user 110 contact with any of the GUI 210 buttons which have been aforementioned. The GUI 210 may detect user contact 110 with any of the GUI 210 buttons 418, 417, 420, 421 or user 110 voice interface with the application 210 method. Upon user 110 contact with buttons on the GUI 210, instructions are instantiated which allows the user 110 to change the specifications of the respective time interval object community linked virtual hub combination 411. A plurality of prices and markets may be presented based on a plurality of contract specifications. In some embodiments, the best bid/buy price 418 may be moving up in price or down in price depending on the market conditions at any given time. In some embodiments the last auction trade or last transacted price for a given specification is listed to help the user 110 understand how the market is moving so that the user 110 may submit a competitive offer/selling price 421 or bid/buying price 414. In some embodiments, users 110 may adjust settings of the GUI 210 to show more bid/buying prices 417 or more offer/selling prices 420. In some embodiments the matrix of time interval object community linked market quantities and prices 413, 414, 415, 416, 417, 418, 419, 420, 421, 424, 425, 426 may be referred to as market depth in the GUI 210 embodiment. In some embodiments the number of users 110 may be displayed as user icons 412 or 423 for the amount of people logged in which desire to transact, trade or participate in a given time interval object community linked virtual hub 410 to time interval object community linked virtual hub 422 combination auction with price-time priority queues. In some embodiments, users 110 may select the time interval object community linked time interval object mode 430 such that the user allows a market for only one form of transformed time interval object community linked time interval object capacity as a commodity or security or the user 110 may allow the system to show multiple forms of transformed time interval object community linked time interval object capacity between two virtual time interval object community linked time interval object capacity hubs 410, 411, 422. In some embodiments the GUI 210 may detect a user 110 selecting the 911 button 429 which may activate voice and video recording functions on the mobile or stationary device 111 and transmit the data with a confirmation from the user 110 to the authorities to provide enhanced security while participating, transacting or trading forward transformed time interval object community linked time interval object or time interval object as a commodity or security. In some embodiments the user may toggle between the GUI 210 market view screen in FIG. 4 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs 410, 422 with a plurality of specifications 427 at specific market prices.

Figure 5:
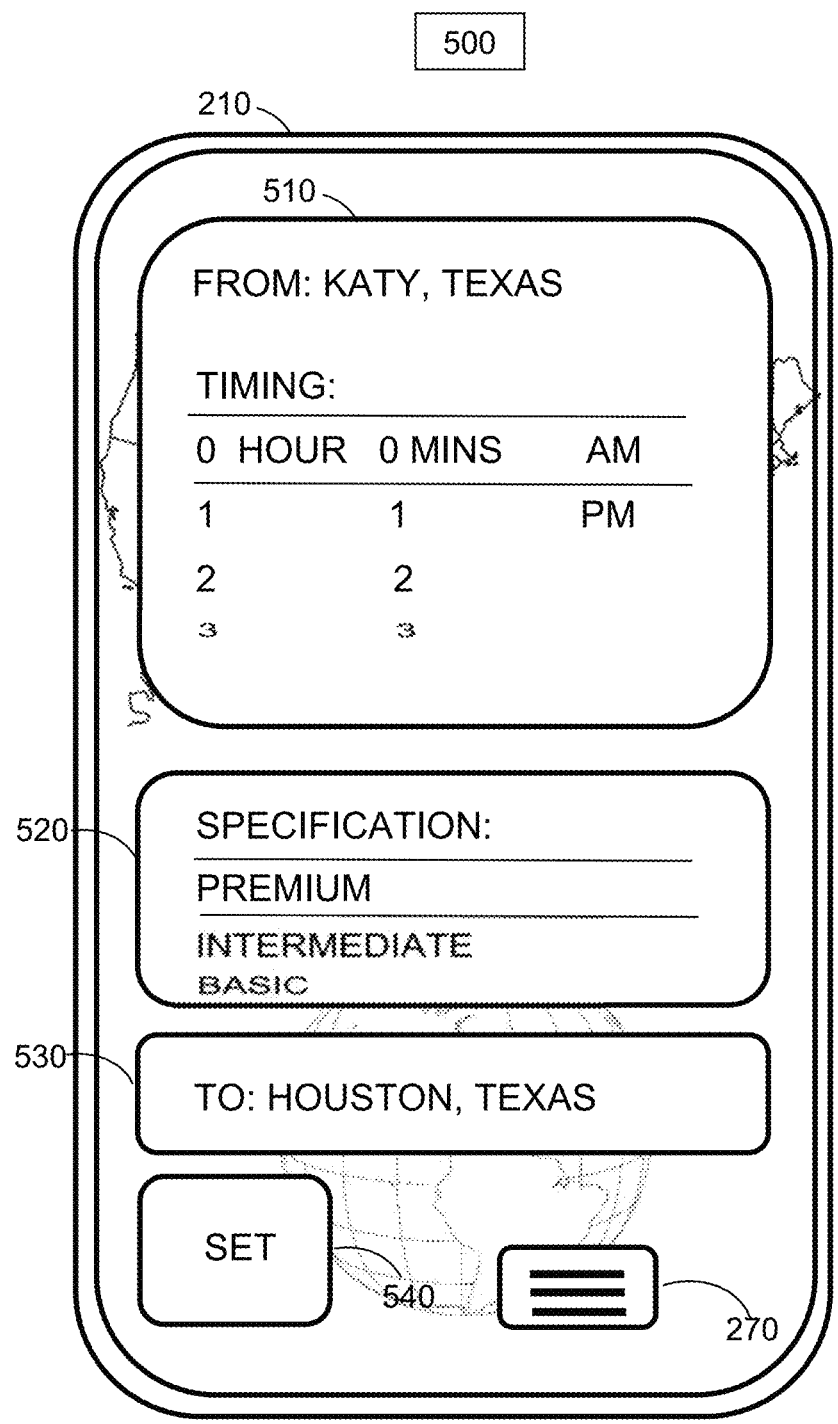

FIG. 5 illustrates an exemplary user interface 210 for listing timing specifications 510 on a portable multifunction device 111 in accordance with some embodiments. In some embodiments, user interface 210 includes the following elements, ora subset or superset thereof:

origin/From virtual hub timing (a data transformation) 510;

specification of quality of time interval object community linked time interval object capacity (a data transformation) 520;

destination/To virtual hub (a data transformation) 530;

setting button 540 to transmit the timings 510 and quality specification grade 520 (a data transformation);

hamburger button 270 to instruct the GUI 210 to take the user 110 to the menu screen.

In some embodiments, the user 110 may select a plurality of timing options in the timing selection specification 510. The timing specification constraint may be the time at which the transformed time interval object community linked time interval object capacity unit security departs from the origin/from time interval object community linked virtual hub 410. As in any commodity market, if a user 110 is late and they have purchased the time interval object community linked time interval object capacity unit, the user must still pay for the time interval object community linked time interval object or time interval object capacity unit regardless if the user 110 is present at the time of delivery, departure or not. The user has the option if they know they will be late to sell back the time interval object community linked time interval object or time interval object capacity unit to the market at the then current price. Accordingly, for the purpose of example, but not limiting by example, if a user 110 bought a transformed time interval object community linked time interval object capacity unit security for £9.90 421 and the user 110 realized they would be late for the 8 am departure specification 427, then the user 110 may either pay for the time interval object community linked time interval object unit even though the user 110 was present and did not take delivery of the time interval object community linked time interval object unit security, or the user 110 may preemptively sell back the time interval object community linked time interval object capacity unit security to the market at the then current bid price 418. The user 110 would then have offset their obligation in a timely manner and another user 110 on the network 140, 160 may then purchase the available time interval object community linked time interval object or time interval object capacity unit security. By eliminating the initial obligation by an creating an offset obligation, the additional data time interval object community linked transformation concepts such as cost of cover, liquidated damages or force majeure are not employed by the method. In some embodiments, virtual time interval object community linked time interval object or time interval object hub combination units may or may not have the available liquidity if the user 110 were to wait too long before delivery of the time interval object community linked time interval object capacity unit to make an adjustment and therefore may need to take delivery even if they are not present. In some embodiments, the user 110 may select a grade specification 520. For the purpose of example, but not limiting by example, a plurality of specification grades may exist, such as "premium" which may be defined by certain classes of time interval object community linked time interval object capacity units and/or certain quality levels. Similarly, for the purpose of example, but not limiting by example, a plurality of specification grades may exist such as "intermediate" or "basic" which may be defined by certain classes of time interval object community linked time interval object capacity unit securities and/or certain quality levels. For additional purpose of example, but not limiting by example, a user of the system may have a quality ranking submitted by people they have transacted with on the system that ranks their quality of time interval object community linked time interval object units so that they may be placed in a certain quality level for the purposes of transactions on the system. In some embodiments, the user 110 may select the destination/to time interval object community linked virtual hub 530 to change the time interval object community linked virtual hub combination. In some embodiments, the user 110, may contact the "set" button 540 to transmit the transformed time interval object community linked time interval object capacity unit security specification data by using the GUI 210 detecting the user 110 input or contact. In some embodiments the GUI 210 may instantiate instructions in the memory of the mobile computing device 210 which then transmits time interval object community linked time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs 410, 422 with a plurality of specifications at specific market prices.

Figure 6:
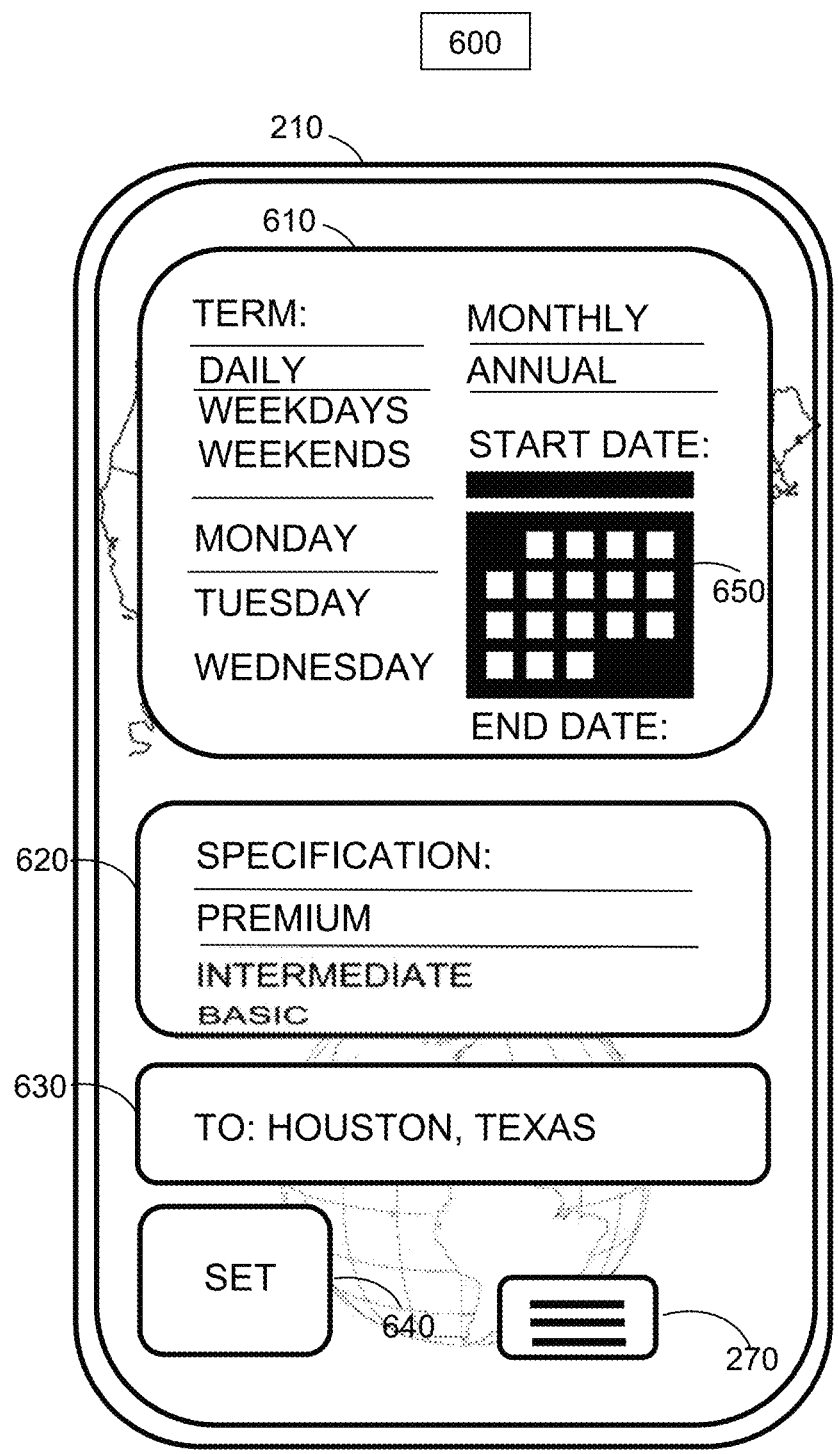

FIG. 6 illustrates an exemplary user interface 210 for selecting the term transformation specification 610 on a portable multifunction device in accordance with some embodiments. In some embodiments, user interface 210 includes the following elements, or a subset or superset thereof:

term specification options (a data transformation) 610;

specification of quality of time interval object community linked time interval object or time interval object capacity (a data transformation) 620;

destination/To time interval object community linked virtual hub (a data transformation) 630;

setting button 640 to transmit the term 610 and quality specification grade (a data transformation) 620;

calendar button 650 to select specification start dates and end dates for a plurality of time interval object community linked virtual time interval object hub combinations (a data transformation);

hamburger button 270 to instruct the GUI 210 to take the user 110 to the menu screen.

In some embodiments, the term specification 610 may be used to participate, transact and/or trade in a specific time interval object community linked virtual hub combination for a specific time period specification. Users 110 may set the term to daily, weekly, monthly, annual, weekdays, weekends, specific days such as Monday, Tuesday, Wednesday, Thursday, Friday, Saturday, Sunday or any combination of term selections 610 the user 110 sets as relevant for participating, transacting or trading in the transformed time interval object community linked time interval object capacity unit securities market. Not limiting by example, but for use of illustrating a possible subset of term selections, the user 110 may select "weekdays" 610 during a specific calendar time period 650 of a given year. In some embodiments, specific time start dates and end dates may be set by the user with the calendar button 650. In some embodiments a user 110 may select "Mondays" 610 within a specification date window 650 (a data transformation). In some embodiments, the user 110 may select "weekends" 610 during a specification calendar window of dates 650 (a data transformation). In some embodiments, the user 110, may contact the "set" button 640 to transmit the transformed time interval object community linked time interval object or time interval object capacity unit specification data by using the GUI 210 detecting the user 110 input or contact. In some embodiments the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs 410, 422 with a plurality of specifications at specific market prices.

Figure 7:
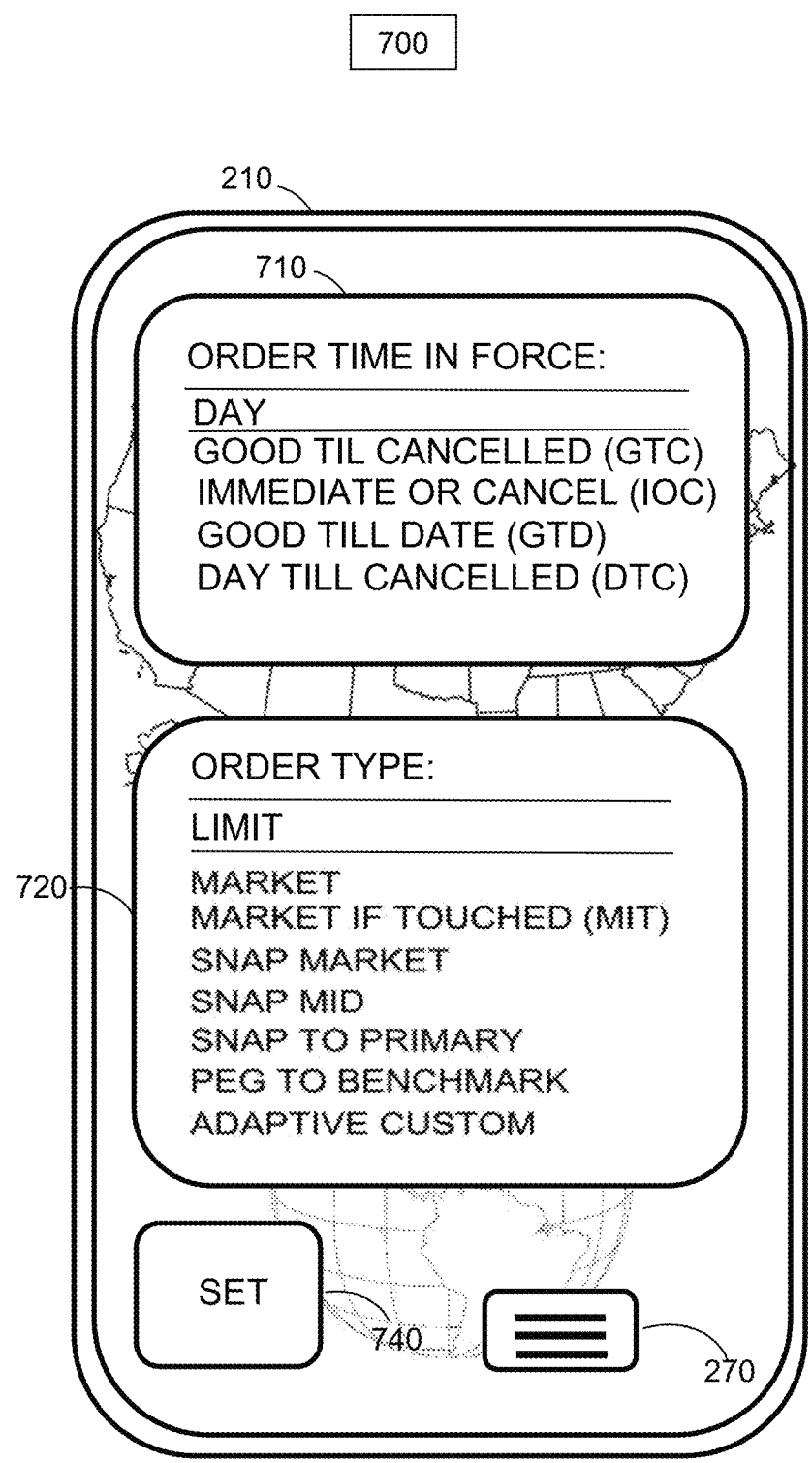

FIG. 7 illustrates an exemplary user interface 210 for selecting order time in force order types 710 (a data transformation) as well as order types 720 (a data transformation) on a portable multifunction device in accordance with some embodiments. In some embodiments, user interface 210 includes the following elements, or a subset or superset thereof:

order time in force specification options (a data transformation) 710;

order type specification options (a data transformation) 720;

setting button 740 to transmit the order time in force specification 710 and Order type specification option 720 (a data transformation);

hamburger button 270 to instruct the GUI 210 to take the user 110 to the menu screen.

In some embodiments, user interface 210 may be used by the user 110 to select a plurality of order time in force 710 specifications. In some embodiments, order time in force selections 710 may include a subset or superset thereof: day (DAY) order 710; good till cancelled order (GTC) 710; immediate or cancel order (IOC) 710; good till date order (GTD) 710; day till cancelled order (DTC) 710. Order time in force 710 specifications may be used to designate how long a user 110 order may be valid. In some embodiments, the GUI 210 may display the definitions of a plurality of order time in force 710 characteristics so that the user 110 may select the appropriate order time in force 710 specification for the time interval object community linked time interval object or time interval object capacity unit that the user 110 may participate, transact and/or trade. In some embodiments, the user interface 210 may be used to select the order type 720 specifications. In some embodiments, order type selections 720 may include a subset or superset thereof: Limit 720, Market 720, Market if Touched (MIT) 720; Snap to Market 720; Snap to Mid 720; Snap to primary 720; Peg to benchmark 720; adaptive custom 720. In some embodiments, the GUI 210 may display the definitions of a plurality of order types 720 characteristics so that the user 110 may select the appropriate order type 720 specification for the time interval object community linked time interval object or time interval object capacity unit that the user 110 may participate, transact and/or trade. In some embodiments, the user, 110, may contact the "set" button 740 to transmit the time interval object community linked time interval object or time interval object capacity unit specification data by using the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs 410, 422 with a plurality of specifications at specific market prices.

Figure 8:
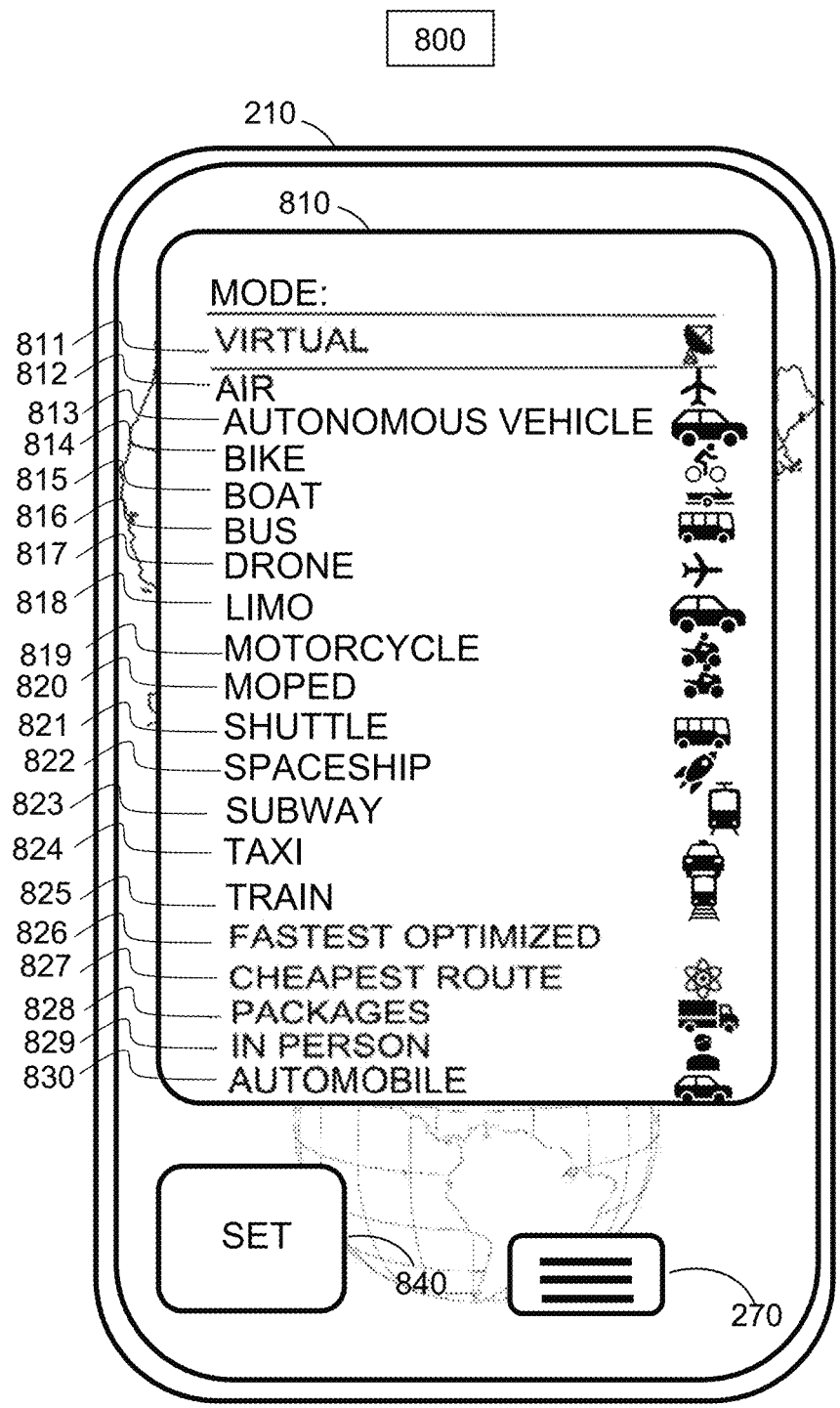

FIG. 8 illustrates an exemplary user interface 210 for selecting time interval object community linked virtual hub time interval object capacity unit modes 810 (a data transformation) on a portable multifunction device in accordance with some embodiments. In some embodiments, user interface 210 includes the following elements, or a subset or superset thereof:

virtual hub time interval object community linked time interval object capacity unit modes 810 (a data transformation);

setting button 840 to transmit the time interval object community linked virtual hub time interval object capacity unit modes 810;

hamburger button 270 to instruct the GUI 210 to take the user 110 to the menu screen.

In some embodiments, user interface 210 may be used by the user 110 to select a plurality of time interval object community linked virtual hub transformed time interval object capacity unit security modes 810 specifications. In some embodiments, time interval object community linked virtual hub time interval object capacity unit mode selections 810 may include a subset or superset thereof: virtual 811; air 812; autonomous vehicle 813; bike 814; boat 815; bus 816; drone 817; limo 818; motorcycle 819; moped 820; shuttle 821; space 822; subway 823; taxi 824; train 825; fastest optimized 826; cheapest subject 827; packages 828; cargo 829; automobile 830. In some embodiments, virtual hub time interval object community linked time interval object capacity unit modes are simply that a user 110 would have a virtual 811 time interval object community time interval object capacity unit in an automobile or an airplane as examples, but not limiting by example. In some embodiments, the user 110 may bid on cargo 829 or package capacity 828 in any mode or multi-modal of transformed time interval object community linked time interval object capacity between a combination of virtual time interval object community linked time interval object hub locations. In some embodiments, the user 110 may use one or multiple modes of time interval object community linked time interval object between a combination of time interval object community linked virtual time interval object hub capacity points. In some embodiments, the user 110, may contact the "set" button 840 to transmit the transformed time interval object community linked time interval object capacity unit specification mode data by using the GUI 210 may instantiate instructions in the memory of the mobile computing device 210 which then transmits time interval object community linked time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object or time interval object capacity units to users 110 from and to a plurality of virtual hubs 410, 422 with a plurality of specifications at specific market prices.

Figure 9:
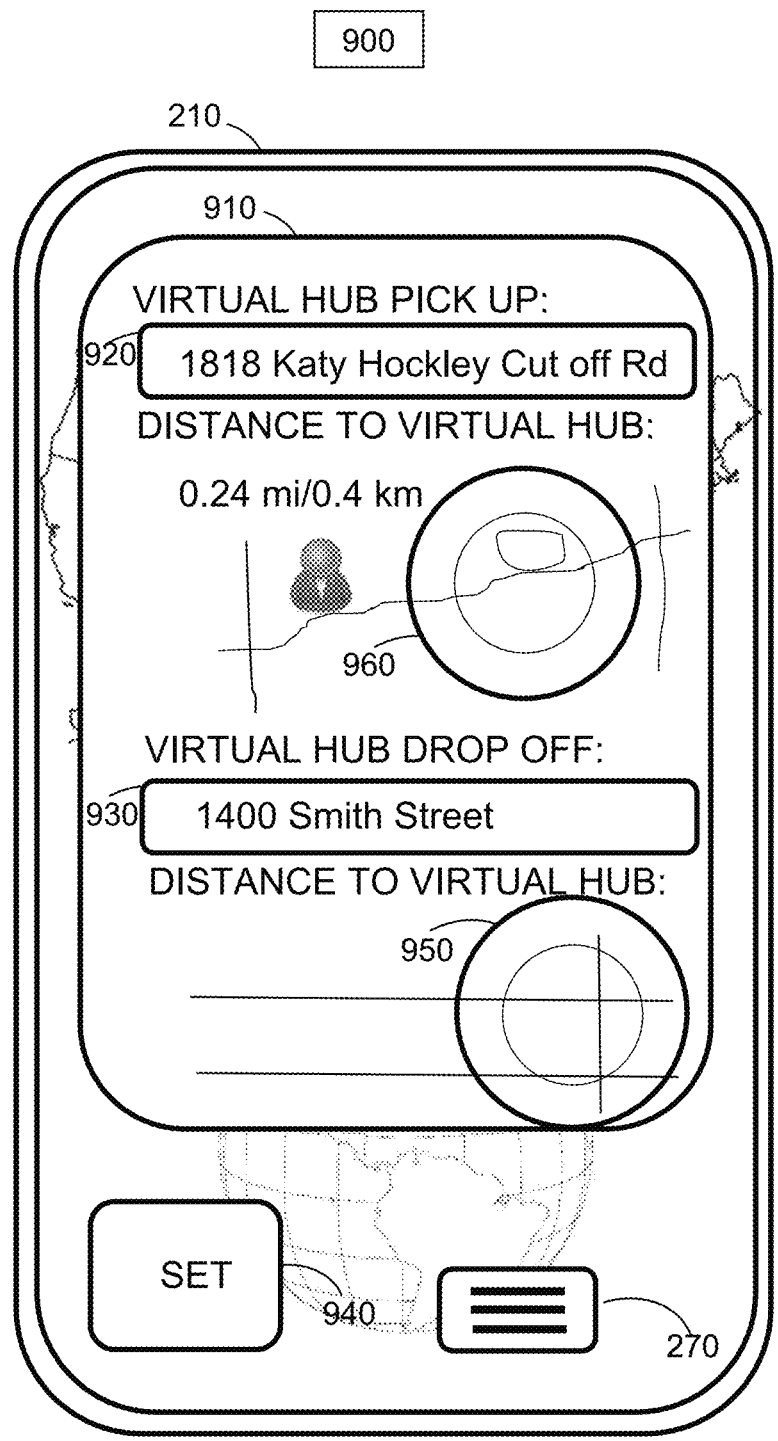

FIG. 9 illustrates an exemplary user interface 210 for identifying the distance the user 110 is from the time interval object community linked virtual hub from a map and distance perspective on a portable multifunction device in accordance with some embodiments. In some embodiments, user interface 210 includes the following elements, or a subset or superset thereof:

virtual hub time interval object community linked time interval object capacity unit pick up display 910;

virtual hub time interval object community linked time interval object capacity unit pick up address 920 which may be a physical or virtual location;

virtual hub time interval object community linked time interval object capacity unit drop off address 930 which may be a physical or virtual location;

virtual hub time interval object community linked time interval object capacity pick-up target zone 960 which may be a physical or virtual location;

virtual hub time interval object community linked time interval object capacity drop-off target zone 950 which may be a physical or virtual location;

setting button 940 to transmit the time interval object community linked virtual hub time interval object capacity unit addresses 920, 930;

hamburger button 270 to instruct the GUI 210 to take the user 110 to the menu screen.

In some embodiments, user interface 210 may be used by the user 110 to select a plurality of time interval object community linked virtual hub time interval object capacity unit address 910 specifications. In some embodiments, time interval object community linked virtual hub time interval object capacity unit address selections 910 may include a subset or superset thereof: time interval object community linked virtual hub pick up address 920 which may be a physical or virtual location; time interval object community linked virtual hub drop off address 930 which may be a physical or virtual location. In some embodiments, delivery may occur virtually through video conference, augmented reality conference, virtual reality conference, mixed reality conference or a plurality of other virtual or physical methods. In some embodiments, time interval object community linked virtual hub time interval object capacity unit addresses 920 and 930 may be changed before delivery of a time interval object community linked virtual time interval object capacity unit. The user interface map and address screen 910 displays the users 110 distance from the address of the time interval object community linked virtual time interval object or time interval object hub as well as a map to assist the user 110 in finding the location of the time interval object community linked virtual time interval object hub. In some embodiments, user interface 210 displays the virtual hub pick up zone 960 on a map in context to the user's 110 location. In some embodiments, user interface 210 displays the virtual hub drop off zone 950 on a map in context to the user's 110 location. In some embodiments, the user 110, may contact the "set" button 940 to transmit the time interval object community linked time interval object capacity unit specification address data by using the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object or time interval object capacity units to users 110 from and to a plurality of virtual hubs 410, 422 with a plurality of specifications at specific market prices.

Figure 10:
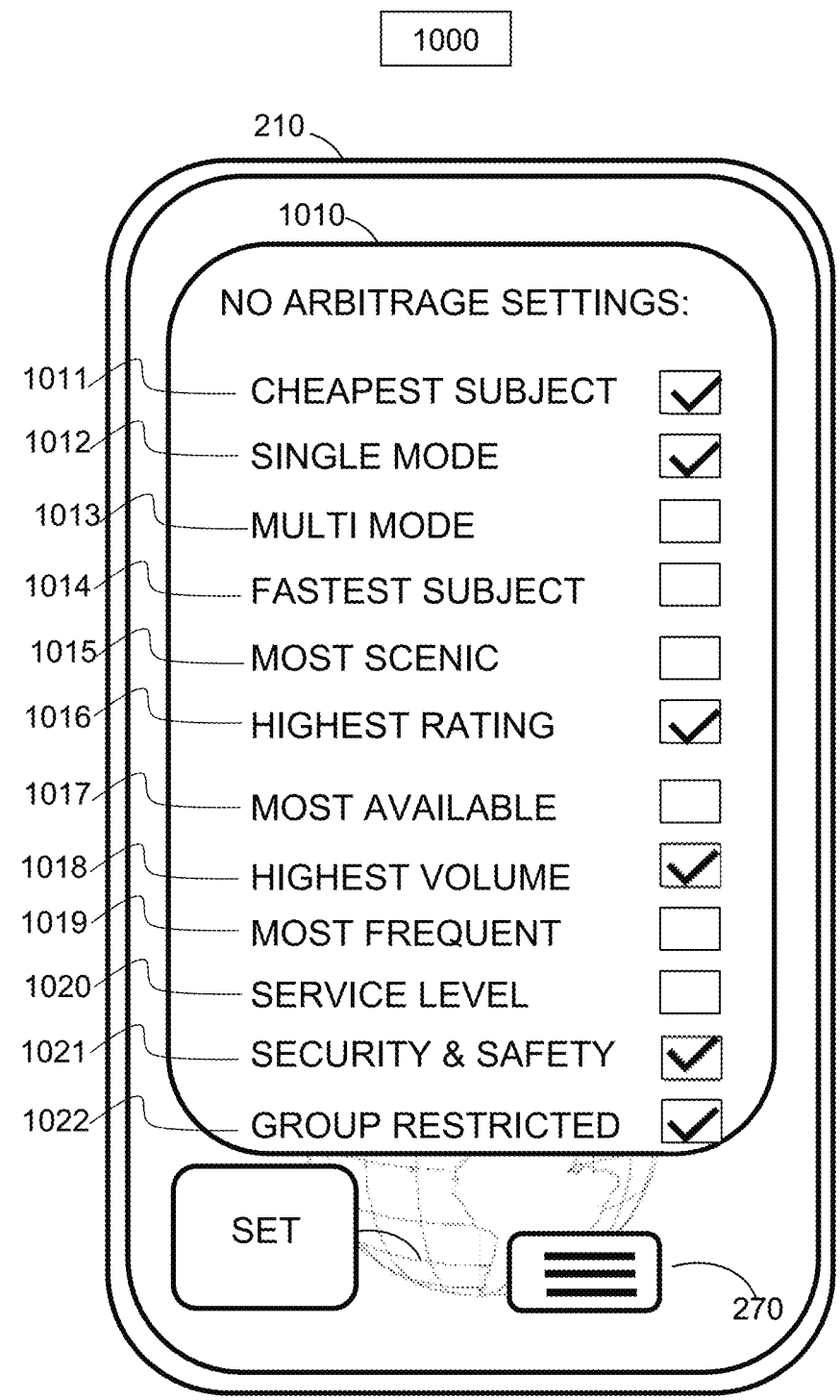

FIG. 10 illustrates an exemplary user interface 210 for identifying the constraints and no arbitrage settings 1010 the user 110 selects on a portable multifunction device in accordance with some embodiments (multiple data transformations). In some embodiments, user interface 210 includes the following elements, or a subset or superset thereof:

constraint and no arbitrage settings 1010 (a data transformation);

setting button 1040 to transmit the time interval object community linked virtual hub time interval object capacity constraints and no arbitrage settings;

hamburger button 270 to instruct the GUI 210 to take the user 110 to the menu screen.

In some embodiments, user interface 210 may be used by the user 110 to select a plurality of time interval object community linked virtual hub time interval object capacity constraint and no arbitrage settings 1010. In some embodiments, time interval object community linked virtual hub time interval object capacity unit constraint and no arbitrage selections 1010 may include a subset or superset thereof: cheapest time interval object subject 1011 (a data transformation); single mode which may be physical or virtual 1012 (a data transformation); multi-mode which may be a physical group or a virtual group 1013 (a data transformation); fastest subject 1014 (a data transformation); most scenic 1015 (a data transformation); highest rating 1016 (a data transformation); most available 1017 (a data transformation); highest volume 1018 (a data transformation); most frequent 1019 (a data transformation); service level 1020 (a data transformation); security and safety 1021 (a data transformation). In some embodiments, the "cheapest subject setting" 1011 instantiates instructions in the memory of the CPU 190 to complete a standard cost minimization linear program to assist the user 110 to complete the time interval object community linked time interval object capacity unit between two virtual hubs with the lowest cost. In some embodiments, the "single mode" 1012 instantiates instructions in the memory of the CPU 190 to set a constraint for the user 110 to complete the time interval object community linked time interval object capacity unit between two virtual hubs with the only one mode of time interval object. In some embodiments, the "multi mode" 1013 instantiates instructions in the memory of the CPU 190 to set a constraint for the user 110 to complete the time interval object community linked time interval object capacity unit between two virtual hubs with more than one mode of time interval object. In some embodiments, the "fastest subject" 1014 instantiates instructions in the memory of the CPU 190 to complete standard linear programming equation to minimize travel time for the user 110 to complete the time interval object community linked time interval object capacity unit between two virtual hubs with the shortest time. In some embodiments, the settings 1010 may set instructions for the time interval object community linked price based navigation routing index and GUI presentation on the user(s) 110 interface 111. In some embodiments, the "most scenic" 1015 instantiates instructions in the memory of the CPU 190 to complete an algorithm with the highest ratings for scenery to assist the user 110 to complete the transformed time interval object community linked time interval object capacity unit between two virtual hubs with highest scenery rating. In some embodiments, the "highest rating" 1016 instantiates instructions in the memory of the CPU 190 to complete a rating algorithm to assist the user 110 to complete the time interval object community linked time interval object capacity unit between two virtual hubs with the highest rating. In some embodiments, the "most available" 1017 instantiates instructions in the memory of the CPU 190 to complete an algorithm to search for the subject with the most open time interval object community linked time interval object capacity units to assist the user 110 to complete the time interval object community linked time interval object capacity unit between two time interval object community linked virtual hubs with the most available open seats or open time interval object community linked time interval object capacity units. In some embodiments, the "highest volume" 1018 instantiates instructions in the memory of the CPU 190 to complete an algorithm to select the subject with the highest volume of participants to assist the user 110 to complete the transformed time interval object community linked time interval object capacity unit between two virtual hubs with the largest number of users 110. In some embodiments, the "most frequent" 1019 instantiates instructions in the memory of the CPU 190 to complete most frequent subject analysis from a timing constraint perspective to assist the user 110 to complete the time interval object community linked time interval object capacity unit between two time interval object community linked virtual hubs with the most frequent departures. In some embodiments, the "service level" 1020 instantiates instructions in the memory of the CPU 190 to align the constraint to select the service level to assist the user 110 to complete the time interval object community linked time interval object capacity unit between two virtual hubs with the correct level of service. In some embodiments, the "security and safety" 1021 instantiates instructions in the memory of the CPU 190 to run safety and security algorithms on the user's 110 based on block chain performance of drivers and riders to assist the user 110 to complete the time interval object community linked time interval object capacity unit between two virtual hubs with the highest level of safety and security. In some embodiments, the "group restricted" 1022 instantiates instructions in the memory of the CPU 190 to run grouping limitation algorithms on the user's 110 price-time priority queue market auction based on limiting the pool of time interval object community linked drivers and riders or time interval object providers and shippers to assist the user 110 to complete the time interval object community linked time interval object or time interval object capacity unit between two time interval object community linked virtual hubs with a limit on the pool of available users. In some embodiments, a plurality of settings which transform the data may be sequenced for presenting as a transformed market 400 or as a transformed market as a layer on a navigation system with indexed subjects based on price 4200. A user(s) 110 pool for group restricted 1022 (a data transformation) settings may limit the user pool displayed by email, security, sex, rating or a plurality of other restrictions. In some embodiments, the user 110, may contact the "set" button 1040 to transmit the time interval object community linked time interval object or time interval object capacity unit security specification constraint and arbitrage data by using the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object or time interval object capacity units to users 110 from and to a plurality of virtual hubs 410, 422 with a plurality of specifications at specific market prices in an price-time priority queue auction format.

Figure 11:
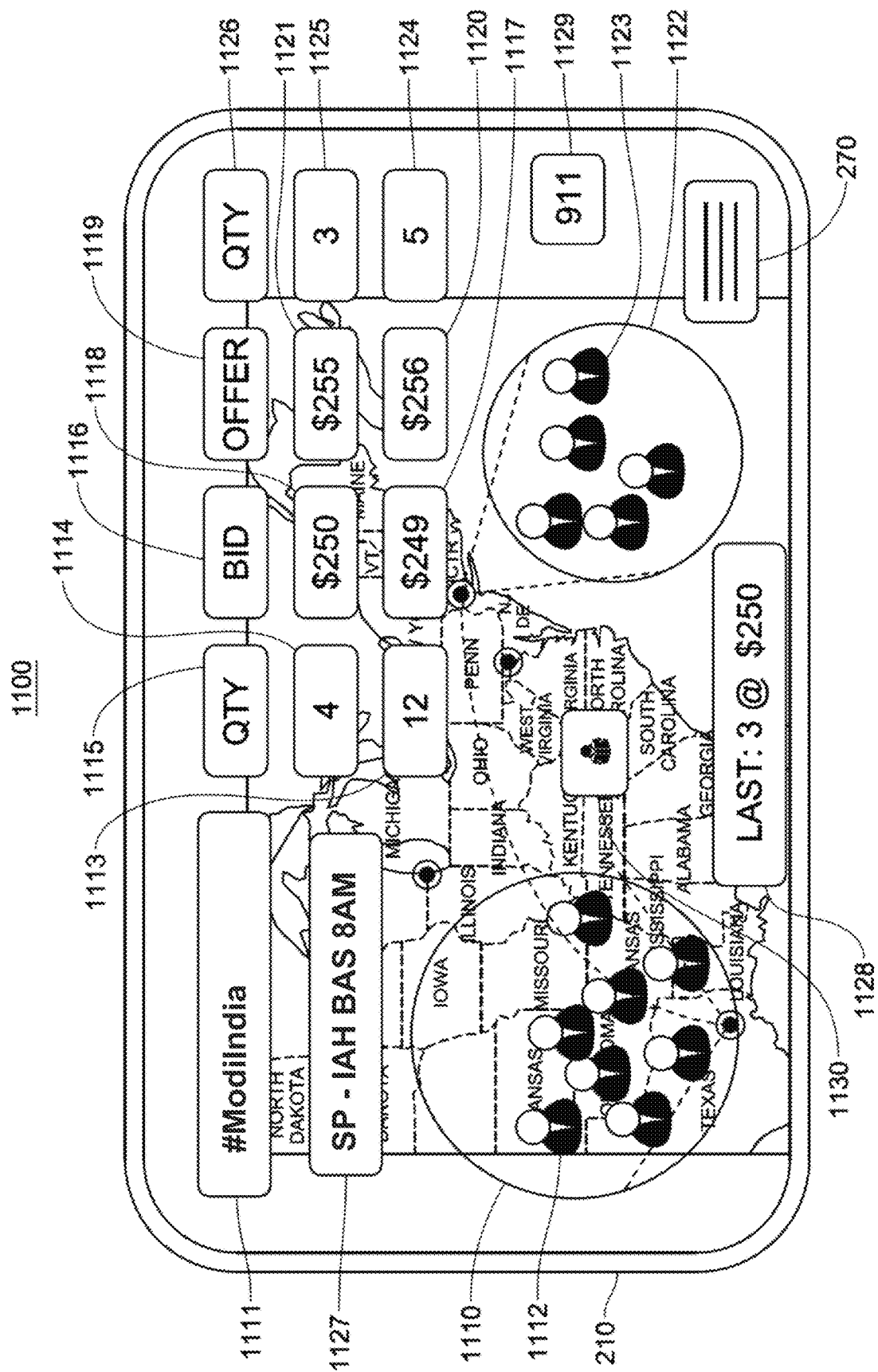

FIG. 11 illustrates exemplary user interfaces 210 for participating, transacting and/or trading transformed time interval object community linked time interval object or as a physical forward commodity or security between combinations of time interval object community linked virtual hubs over various time interval object modes. In some embodiments, user interface 210 includes the following elements, or a subset or superset thereof:

exemplary time interval object community linked virtual hub time interval unit for a time interval unit meeting with Prime Minister Modi of India 1111;

exemplary time interval object community linked virtual hub origin/from location 1110 with users 1112 within the time interval object community linked virtual hub location 1110;

exemplary specification summary of the market, level of service and time of delivery commencement 1127;

exemplary mode of time interval object community time interval object unit capacity type 1130;

exemplary transaction summary of the last trades quantity and price 1128;

exemplary time interval object community linked virtual hub destination/to location 1122 and user who is being delivered on the time interval object community linked time interval object capacity unit 1123;

exemplary bid/buy quantity title header 1115 for an exemplary time interval object community linked virtual time interval object hub market;

exemplary bid/buy price title header 1116 for an exemplary time interval object community linked virtual time interval object or time interval object hub market;

exemplary offer/sell price title header 1119 for an exemplary time interval object community linked virtual time interval object or time interval object hub market;

exemplary offer/sell quantity title header 1126 for an exemplary time interval object community linked virtual time interval object hub market;

exemplary bid/buy quantity 1114 for the best bid quantity from a plurality of users 110 for an exemplary respective time interval object community linked time interval object capacity time interval object community linked virtual hub combination that has undergone a plurality of data transformations in the method 1111;

exemplary bid/buy quantity 1113 for the second-best bid quantity from a plurality of users 110 for an exemplary respective time interval object community linked time interval object capacity virtual hub combination that has undergone a plurality of data transformations in the method 1111;

exemplary bid/buy price 1118 for the best bid price from a plurality of users 110 for an exemplary respective time interval object community linked time interval object or time interval object capacity virtual hub combination that has undergone a plurality of data transformations in the method 1111;

exemplary bid/buy price 1117 for the second-best bid price from a plurality of users 110 for an exemplary respective time interval object community linked time interval object or time interval object capacity virtual hub combination that has undergone a plurality of data transformations in the method 1111;

exemplary offer/sell price 1121 for the best offer price from a plurality of users 110 for an exemplary respective time interval object community linked time interval object or time interval object capacity virtual hub combination that has undergone a plurality of data transformations in the method 1111;

exemplary offer/sell price 1120 for the second-best offer price from a plurality of users 110 for an exemplary respective time interval object community linked time interval object or time interval object capacity virtual hub combination that has undergone a plurality of data transformations in the method 1111;

exemplary offer/sell quantity 1125 for the best offer quantity from a plurality of users 110 for an exemplary respective time interval object community linked time interval object or time interval object capacity virtual hub combination that has undergone a plurality of data transformations in the method 1111;

exemplary offer/sell quantity 1124 for the second-best offer quantity from a plurality of users 110 for an exemplary respective time interval object community linked time interval object or time interval object capacity virtual hub combination that has undergone a plurality of data transformations in the method 1111;

exemplary safety dispatch "911" button 1129 to enact video and audio recording of the user 110 environment and dispatch of that information to archive or authorities.

exemplary hamburger menu button 270 to move back to menu options and settings away from the participation, transaction, trading auction GUI 210 embodiment.

In some embodiments the user 110 may enter a transaction quantity and price for transformed time interval object community linked time interval object or time interval object capacity unit securities to participate, transact and/or trade by the GUI 210 detecting user 110 contact or audio interface with a bid/buy price 1118 or offer/sell price 1121. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub subject combination 1111. A plurality of prices and markets may be presented based on a plurality of contract specifications. In some embodiments, the best bid/buy price 1118 may be moving up in price or down in price depending on the market conditions at any given time. In some embodiments the last trade or last transacted price for a given specification is listed to help the user 110 understand how the market is moving so that the user 110 may submit a competitive offer/selling price 1121 or bid/buying price 1118. In some embodiments, users 110 may adjust settings of the GUI 210 to show more bid/buying prices 1117 or more offer/selling prices 1120. In some embodiments the matrix of market quantities and prices 1113, 1114, 1115, 1116, 1117, 1118, 1119, 1120, 1121, 1124, 1125, 1126 may be referred to as market depth in the GUI 210 embodiment. In some embodiments the number of users 110 may be displayed as user icons 1112 or 1123 for the amount of people logged in which desire to transact, trade or participate in a given virtual hub 1110 to virtual hub 1122 combination for a given time interval object community time interval object linked unit. In some embodiments, users 110 may select the time interval object community linked time interval object mode 1130 such that the user allows a market for only one form of time interval object community linked time interval object capacity as a commodity or the user 110 may allow the system to show multiple forms of time interval object capacity between two time interval object community linked virtual time interval object capacity hubs 1110, 1111, 1122. In some embodiments the GUI 210 may detect a user 110 selecting the 911 button 1129 which may activate voice and video recording functions on the mobile or stationary device 111 and transmit the data with a confirmation from the user 110 to the authorities to provide enhanced security while participating, transacting or trading transformed time interval object community linked forward time interval object as a commodity or security. In some embodiments the user may toggle between the GUI 210 market view screen in FIG. 11 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object or time interval object capacity units to users 110 from and to a plurality of virtual hubs 1110, 1122 with a plurality of specifications at specific market prices.

Figure 12:
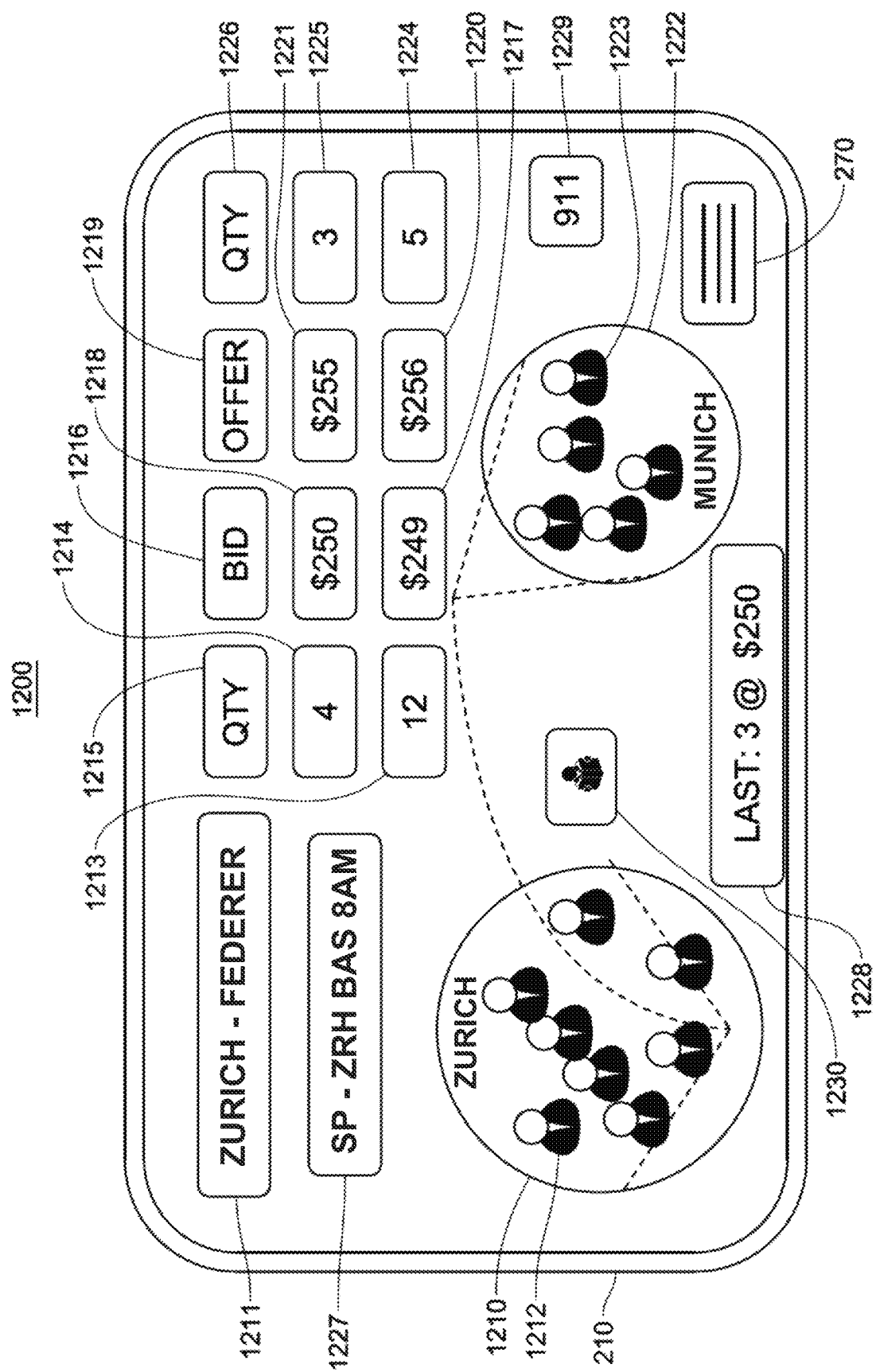

FIG. 12 illustrates exemplary user interfaces 210 for participating, transacting and/or trading transformed time interval object community linked time interval object as a physical forward commodity or security between combinations of time interval object community linked virtual hubs over various time interval object modes. In some embodiments, user interface 210 includes the following elements, or a subset or superset thereof:

exemplary time interval object community linked virtual hub combination of a time interval unit meeting with Roger Federer delivered to a user in Zurich, Switzerland 1211;

exemplary time interval object community linked virtual hub origin/from location 1210 with users 1212 within the time interval object community linked virtual hub location 1210;

exemplary specification summary of the market, level of service and time of delivery commencement 1227;

exemplary mode of language time interval object community linked time interval object capacity type 1230;

exemplary transaction summary of the last trades quantity and price 1228;

exemplary time interval object community linked virtual hub destination/to location 1222 and user who is being delivered on the time interval object community linked time interval object capacity unit 1223;

exemplary bid/buy quantity title header 1215 for an exemplary virtual time interval object community linked time interval object hub market;

exemplary bid/buy price title header 1216 for an exemplary time interval object community linked virtual time interval object hub market;

exemplary offer/sell price title header 1219 for an exemplary time interval object community linked virtual time interval object hub market;

exemplary offer/sell quantity title header 1226 for an exemplary time interval object community linked virtual time interval object hub market;

exemplary bid/buy quantity 1214 for the best bid quantity from a plurality of users 110 for an exemplary respective time interval object community linked time interval object capacity virtual hub combination that has undergone a plurality of data transformations in the method 1211;

exemplary bid/buy quantity 1213 for the second-best bid quantity from a plurality of users 110 for an exemplary respective time interval object community linked time interval object capacity virtual hub combination that has undergone a plurality of data transformations in the method 1211;

exemplary bid/buy price 1218 for the best bid price from a plurality of users 110 for an exemplary respective time interval object community linked time interval object capacity virtual hub combination that has undergone a plurality of data transformations in the method 1211;

exemplary bid/buy price 1217 for the second-best bid price from a plurality of users 110 for an exemplary respective time interval object community linked time interval object capacity virtual hub combination that has undergone a plurality of data transformations in the method 1211;

exemplary offer/sell price 1221 for the best offer price from a plurality of users 110 for an exemplary respective time interval object community linked time interval object capacity virtual hub combination that has undergone a plurality of data transformations in the method 1211;

exemplary offer/sell price 1220 for the second-best offer price from a plurality of users 110 for an exemplary respective time interval object community linked time interval object capacity virtual hub combination that has undergone a plurality of data transformations in the method 1211;

exemplary offer/sell quantity 1225 for the best offer quantity from a plurality of users 110 for an exemplary respective time interval object community linked time interval object capacity virtual hub combination that has undergone a plurality of data transformations in the method 1211;

exemplary offer/sell quantity 1224 for the second-best offer quantity from a plurality of users 110 for an exemplary respective time interval object community linked time interval object capacity virtual hub combination that has undergone a plurality of data transformations in the method 1211;

exemplary safety dispatch "911" button 1229 to enact video and audio recording of the user 110 environment and dispatch of that information to archives or authorities.

exemplary hamburger menu button 270 to move back to menu options and settings away from the participation, transaction, trading GUI 210 embodiment.

In some embodiments the user 110 may enter a transaction quantity and price for time interval object community linked time interval object capacity units to participate, transact and/or trade by the GUI 210 detecting user 110 contact with a bid/buy price 1218 or offer/sell price 1221. The GUI 210 detects user 110 contact with any of the GUI 210 buttons which have been aforementioned. Upon user 110 contact with buttons or audio interface on the GUI 210, instructions are instantiated which allows the user 110 to change the specifications of the respective time interval object community linked virtual hub time interval unit meeting with Roger Federer combination 1211. A plurality of transformed prices and transformed markets may be presented based on a plurality of transformed contract specifications. In some embodiments, the best bid/buy price 1218 may be moving up in price or down in price depending on the market conditions at any given time. In some embodiments the last trade or last transacted price for a given specification is listed to help the user 110 understand how the market is moving so that the user 110 may submit a competitive offer/selling price 1221 or bid/buying price 1214. In some embodiments, users 110 may adjust settings of the GUI 210 to show more bid/buying prices 1217 or more offer/selling prices 1120. In some embodiments the matrix of market quantities and prices 1213, 1214, 1215, 1216, 1217, 1218, 1219, 1220, 1221, 1224, 1225, 1226 may be referred to as market depth in the GUI 210 embodiment. In some embodiments the number of users 110 may be displayed as user icons 1212 or 1223 for the amount of people logged in which desire to transact, trade or participate in a given time interval object community linked virtual hub 1210 to time interval object community linked virtual hub 1222 combination. In some embodiments, users 110 may select the time interval object community linked time interval object mode 1230 such that the user allows a market for only one form or mode of time interval object community linked time interval object capacity as a commodity or security or the user 110 may allow the system to show multiple forms (multi-modal) of time interval object capacity between two virtual time interval object community linked time interval object capacity hubs 1210, 1211, 1222. In some embodiments the GUI 210 may detect a user 110 selecting the 911 button 1229 which may activate voice and video recording functions on the mobile or stationary device 210 and transmit the data with a confirmation from the user 110 to the authorities to provide enhanced security while participating, transacting or trading transformed forward time interval object community linked time interval object or time interval object units as a commodity or security. In some embodiments the user may toggle between the GUI 210 market view screen in FIG. 12 and other menu 270 options and settings by the user 110 selecting the hamburger button 270 and the GUI 210 detecting the user 110 input or contact or audio instructions. In some embodiments the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs to users 110 from and to a plurality of virtual hubs 1210, 1222 with a plurality of specifications at specific market prices.

Figure 13:
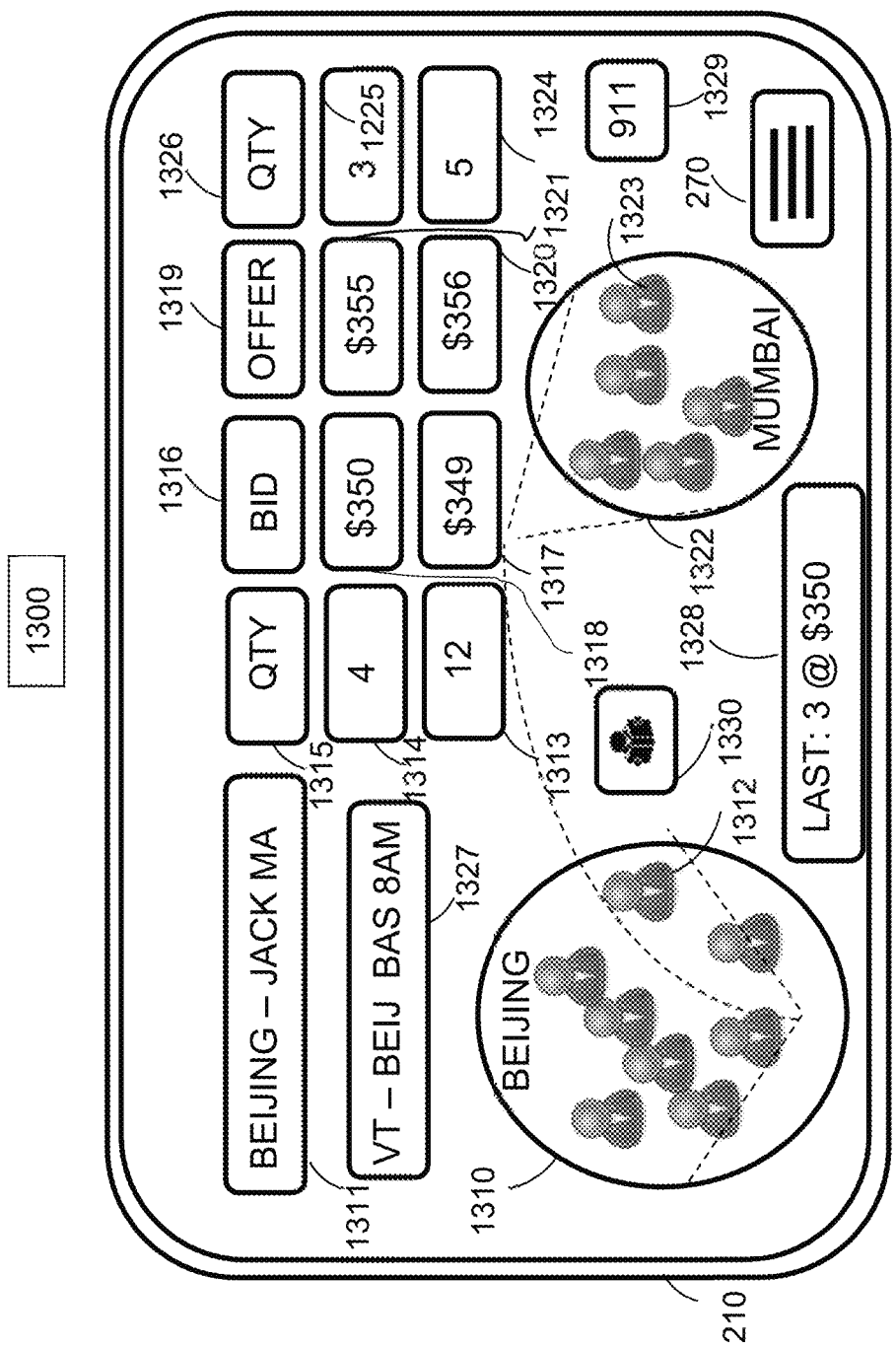

FIG. 13 illustrates exemplary user interfaces 210 for participating, transacting and/or trading transformed time interval object community linked time interval object as a physical forward commodities or securities between combinations of time interval object community linked virtual hubs over various time interval object modes. In some embodiments, user interface 210 includes the following elements, or a subset or superset thereof:

exemplary time interval object community linked virtual hub combination for a time interval unit with Jack Ma delivered to Beijing, China 1311;

exemplary time interval object community linked virtual hub origin/from location 1310 with users 1312 within the time interval object community linked virtual hub location 1310;

exemplary specification summary of the market, level of service and time of delivery commencement 1327;

exemplary mode of train time interval object community linked time interval object capacity type 1330;

exemplary transaction summary of the last trades quantity and price 1328;

exemplary time interval object community linked virtual hub destination/to location 1322 and user who is being delivered on the time interval object community linked time interval object capacity unit 1323;

exemplary bid/buy quantity title header 1315 for an exemplary time interval object community linked virtual time interval object hub market;

exemplary bid/buy price title header 1316 for an exemplary time interval object community linked virtual time interval object hub market;

exemplary offer/sell price title header 1319 for an exemplary time interval object community linked virtual time interval object hub market;

exemplary offer/sell quantity title header 1326 for an exemplary time interval object community linked virtual time interval object hub market;

exemplary bid/buy quantity 1314 for the best bid quantity from a plurality of users 110 for an exemplary respective time interval object community linked time interval object capacity virtual hub combination that has undergone a plurality of data transformations in the method 1311;

exemplary bid/buy quantity 1313 for the second-best bid quantity from a plurality of users 110 for an exemplary respective time interval object community linked time interval object capacity virtual hub combination that has undergone a plurality of data transformations in the method 1311;

exemplary bid/buy price 1318 for the best bid price from a plurality of users 110 for an exemplary respective time interval object community linked time interval object capacity virtual hub combination that has undergone a plurality of data transformations in the method 1311;

exemplary bid/buy price 1317 for the second-best bid price from a plurality of users 110 for an exemplary respective time interval object community linked time interval object or time interval object capacity virtual hub combination that has undergone a plurality of data transformations in the method 1311;

exemplary offer/sell price 1321 for the best offer price from a plurality of users 110 for an exemplary respective time interval object community linked time interval object capacity virtual hub combination that has undergone a plurality of data transformations in the method 1311;

exemplary offer/sell price 1320 for the second-best offer price from a plurality of users 110 for an exemplary respective time interval object community linked time interval object or time interval object capacity virtual hub combination that has undergone a plurality of data transformations in the method 1311;

exemplary offer/sell quantity 1325 for the best offer quantity from a plurality of users 110 for an exemplary respective time interval object community linked time interval object capacity virtual hub combination that has undergone a plurality of data transformations in the method 1311;

exemplary offer/sell quantity 1324 for the second-best offer quantity from a plurality of users 110 for an exemplary respective time interval object community linked time interval object capacity virtual hub combination that has undergone a plurality of data transformations in the method 1311;

exemplary safety dispatch "911" button 1329 to enact video and audio recording of the user 110 environment and dispatch of that information to authorities.

exemplary hamburger menu button 270 to move back to menu options and settings away from the participation, transaction, trading GUI 210 embodiment.

In some embodiments the user 110 may enter a transaction quantity and price for time interval object community linked time interval object capacity units to participate, transact and/or trade by the GUI 210 detecting user 110 contact or audio instructions with a bid/buy price 1318 or offer/sell price 1321. The GUI 210 detects user 110 contact with any of the GUI 210 buttons which have been aforementioned. Upon user 110 contact or audio interface with buttons or audio instructions on the GUI 210, instructions are instantiated which allows the user 110 to change the specifications of the respective virtual hub combination of a time interval unit with Jack Ma in Beijing, China 1311. A plurality of prices and markets may be presented based on a plurality of transformed contract specifications. In some embodiments, the best bid/buy price 1318 may be moving up in price or down in price depending on the market conditions at any given time. In some embodiments the last trade or last transacted price for a given transformed specification is listed to help the user 110 understand how the market is moving so that the user 110 may submit a competitive offer/selling price 1321 or bid/buying price 1314. In some embodiments, users 110 may adjust settings of the GUI 210 to show more bid/buying prices 1317 or more offer/selling prices 1320. In some embodiments the matrix of market quantities and prices 1313, 1314, 1315, 1316, 1317, 1318, 1319, 1320, 1321, 1324, 1325, 1326 may be referred to as market depth in the GUI 210 embodiment. In some embodiments the number of users 110 may be displayed as user icons 1312 or 1323 for the amount of people logged in which desire to transact, trade or participate in a given virtual hub 1310 to virtual hub 1322 transformed combination. In some embodiments, users 110 may select the time interval object community linked time interval object mode 1330 such that the user allows a market for only one form of time interval object community linked time interval object capacity as a commodity or the user 110 may allow the system to show multiple forms of transformed time interval object community linked time interval object capacity or securities between two time interval object community linked virtual time interval object capacity hubs 1310, 1311, 1322. In some embodiments, by way of example and not to limit by example to avoid doubt, transformed time interval object community linked time interval object units or transformed time interval object unit securities may even be substitutable between modes if the other specifications meet the grade category of the transformed time interval object community linked time interval object unit specification or transformed time interval object community linked time interval object unit security. A user(s) 110 may have bought a transformed time interval object community linked time interval object unit with a specification and the delivery mechanism was a time interval unit with Jack Ma in Beijing, China virtual unit from Delhi, India, however the time interval unit with Jack Ma in Beijing, China virtual unit user 110 bought back their transformed time interval object community linked time interval object unit or transformed time interval object community linked time interval object unit security and now the original purchaser may be matched with a time interval unit with Jack Ma in Beijing, China virtual unit of another user 110 who will deliver the transformed time interval object community linked time interval object unit or transformed time interval object community linked time interval object unit security and the seller may now be a time interval unit with Jack Ma in Beijing, China virtual unit from Melbourne, Australia. In some embodiments, virtual 811, train 825, airplane 812, car 830, or a plurality of other modes may be substitutable if the transformed time interval object community linked time interval object unit or transformed time interval object community linked time interval object unit security meets the delivery transformed specification grade. In some embodiments the GUI 210 may detect a user 110 selecting the 911 button 1329 which may activate voice and video recording functions on the mobile or stationary device 111 and transmit the data with a confirmation from the user 110 to the authorities to provide enhanced security while participating, transacting or trading forward time interval object community linked time interval object as a commodity. In some embodiments the user may toggle between the GUI 210 market view screen in FIG. 13 and other menu 270 options and settings by the user 110 selecting the hamburger button 270 and the GUI 210 detecting the user 110 input or contact. In some embodiments the GUI 210 may instantiate instructions in the memory of the mobile computing device 210 which then transmits time interval object community linked time interval object or time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object or time interval object capacity units to users 110 from and to a plurality of virtual hubs 1310, 1322 with a plurality of specifications at specific market prices.

Figure 14:
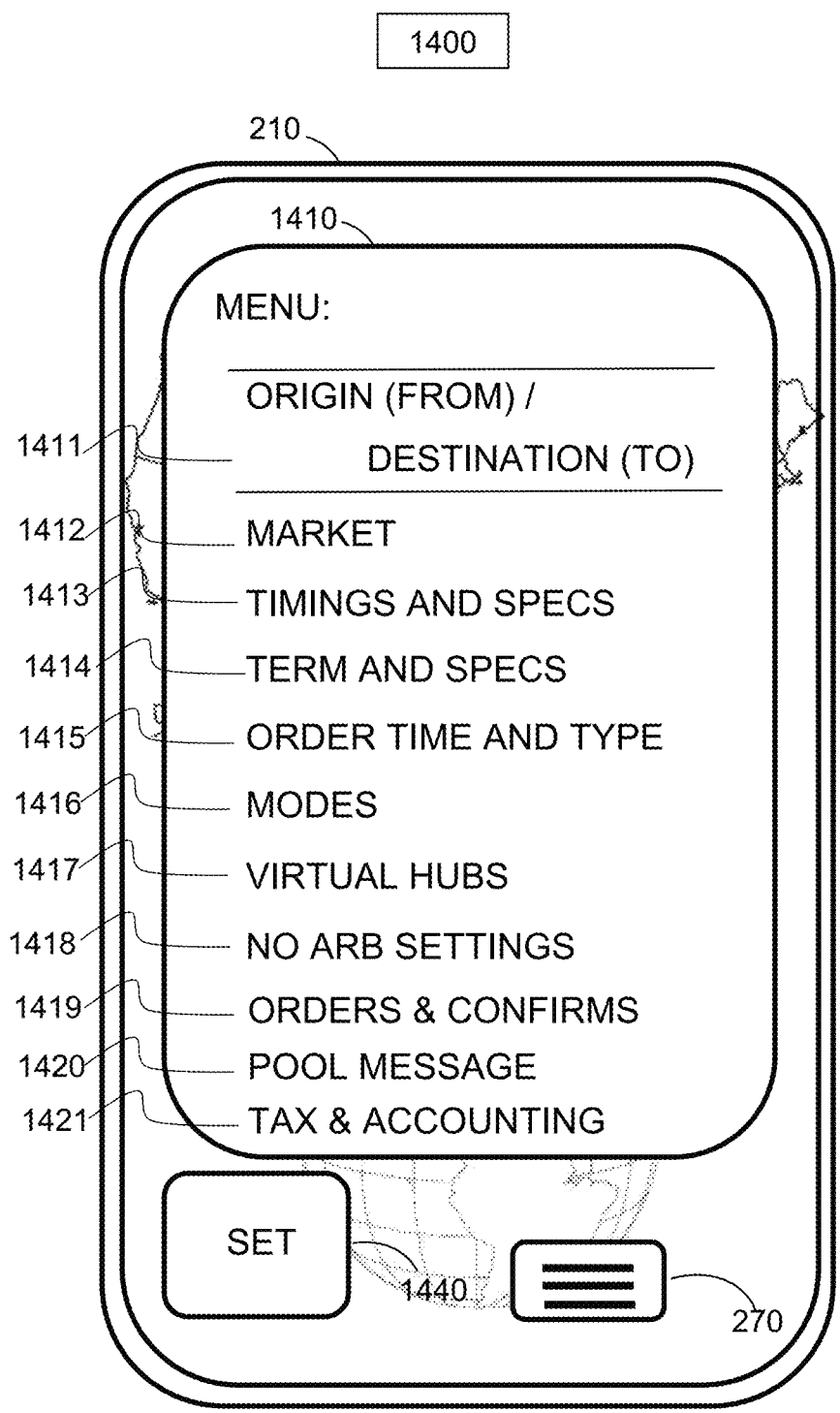

FIG. 14 illustrates an exemplary user interface 210 for selecting menu options 1410 on a portable multifunction device in accordance with some embodiments. In some embodiments, user interface 210 includes the following elements, or a subset or superset thereof:

menu options 1410;
origin (From)/Destination (to) menu option 1411;
market menu option 1412;

timings and Specs menu option 1413;
term and Specs menu option 1414;
order time and type menu option 1415;
modes menu option 1416;
virtual Hubs menu option 1417;
no arb settings menu option 1418;
orders and Confirms menu option 1419;
pool Message menu option 1420;
tax and Accounting menu option 1421;
setting button 1440 to transmit the menu option;
hamburger button 270 to instruct the GUI 210 to take the user 110 to the menu screen.

In some embodiments, user interface 210 may be used by the user 110 to select a plurality of menu options 1410. In some embodiments, the user 110 may select the origin (from)/destination (to) menu option 1411 which may instruct the GUI 210 to go to an address input rendering 910 and/or FIG. 9. In some embodiments, the user 110, may contact the "market" menu option 1412 which may instruct the GUI 210 to render a market participation, transaction and/or trading screen such as 400, 1100, 1200, or 1300. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110, may contact the "timings and specs" menu option 1413 which may instruct the GUI 210 to render a timings and specs screen such as 500. In some embodiments, the user 110, may contact the "term and specs" menu option 1414 which may instruct the GUI 210 to render a term and specs screen such as 600. In some embodiments, the user 110, may contact the "order time and type" menu option 1415 which may instruct the GUI 210 to render an order time and type screen such as 700. In some embodiments, the user 110, may contact the "modes" menu option 1416 which may instruct the GUI 210 to render a mode screen such as 800. In some embodiments, the user 110, may contact the "Virtual Hubs" menu option 1417 which may instruct the GUI 210 to render a virtual hubs screen such as 900. In some embodiments, the user 110, may contact the "no arb settings" menu option 1418 which may instruct the GUI 210 to render a no arbitrage constraint screen such as 1000. In some embodiments, the user 110, may contact the "orders and confirms" menu option 1419 which may instruct the GUI 210 to render the market orders and transaction confirmations for the user 110. In some embodiments, the user 110, may contact the "pool message" menu option 1420 which may instruct the GUI 210 to message either the actual time interval object community linked time interval object capacity unit 115 or the opposite seller user 110 or buyer user 110 depending on if the user 110 was an opposite buyer or seller of the time interval object community linked time interval object capacity unit. In some embodiments, the user 110, may contact the "tax and accounting" menu option 1421 which may instruct the GUI 210 to render tax and accounting information for the respective user 110. In some embodiments the GUI 210 menu option selection 1410 may instantiate instructions in the memory of the mobile computing device 210 which then transmits time interval object community linked time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs 410, 422 with a plurality of specifications at specific market prices.

Figure 15:
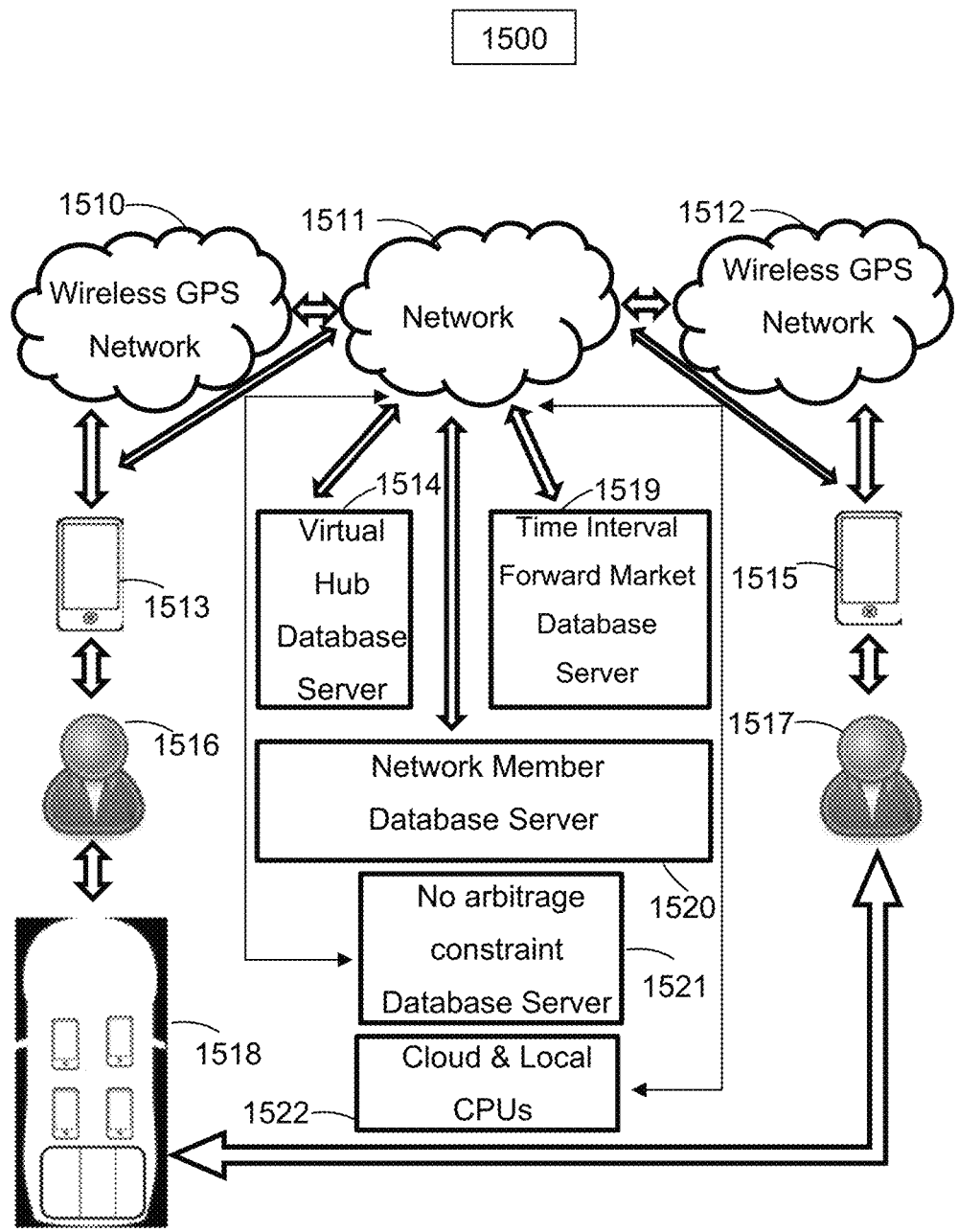
FIG. 15 illustrates a network configuration in accordance with implementations of various techniques described herein.

FIG. 15 illustrates an exemplary network configuration 1500 in one exemplary implementation of participating, transacting and/or trading transformed time interval object community linked time interval object capacity units or securities in accordance with some embodiments. In some embodiments, network configuration 1500 includes the following elements, or a subset or superset thereof:

wireless global positioning system (GPS) network 1510;
networks 1511;
additional global positioning system (GPS) network 1512;
user member portable multifunction device 1513;
virtual hub database server 1514;
time interval object community linked time interval object forward market database server 1519;
additional user member portable multifunction device 1515;
network member database server 1520;
network member user 1516;
additional network member user 1517;
no arbitrage constraint database server 1521;
cloud and Local CPUs 1522;
time interval object community linked time interval object capacity unit mode of a vehicle or virtual location 1518.

In some embodiments, the software and/or instructions stored in memory of the cloud & local CPUs 1522 and portable multifunction devices 1513, 1515 may include additional instructions to instantiate specification requirements, participation, transactions, and/or trading on the time interval object community linked time interval object capacity unit network 1511. In some embodiments, instructions may include standard database web services with the database as service provider (i.e. calling from the outside in, which lets the client GUI 210 or 1513 call each of the time interval object community linked virtual hub database server 1514 and/or time interval object community linked time interval object forward market database server 1519 and/or network member database server 1520 and/or no arbitrage constraint database server 1521 and/or cloud & local CPUs 1522 through the wireless GPS network 1510 or network 1511. In some embodiments, each of the time interval object community linked virtual hub database server 1514 and/or time interval object community linked time interval object forward market database server 1519 and/or network member database server 1520 and/or no arbitrage constraint database server 1521 and/or cloud & local CPUs 1522 may instruct the network to instantiate the database servers 1514, 1519, 1520, 1521, 1522 as service consumers (i.e. calling from the inside out, which lets a SQL query or application module in the database session consume an external web service. In some embodiments, users 1516 and/or 1517 may use portable multifunction devices 1513 and/or 1515 to access the time interval object community linked time interval object capacity unit market GUI 210 so that the users 1516 and/or 1517 may participate, transact and/or trade time interval object community linked time interval object or time interval object capacity units. In some embodiments, the virtual hub database server 1514 stores map tile data in addition to user location data which is utilized by the GUI 210 to display or render location of virtual hubs and user 1516 proximity to those virtual hubs 400, 900, 1100, 1200, 1300. In some embodiments, the time interval object community linked time interval object forward market database server 1519 stores bid and offer data for respective quantities of users as well as transaction data and a plurality of market data for each time interval object community linked virtual hub combination. In some embodiments, the network member database server 1520 stores user profile, user transaction, user trade, user settings, user specifications, user rating, user criminal history or background check data or facial recognition data or fingerprint recognition data or photo scan recognition data or ride history data, user track record, user bank data, user credit card data, user history data, user tax data and a plurality of other data. In some embodiments, the no arbitrage constraint database server 1521 stores data and algorithms to identify user 110 constraints 1000 and run algorithm calculations for users on specific constraints to check for compliance with constraints. In some embodiments, network servers and CPUs 1514, 1519, 1520, 1521, 1522, 1513, 1515 my interface through the network 1511 and/or wireless GPS networks 1510, 1512 such that time interval object community linked time interval object or time interval object capacity units may be participated in, transacted and/or traded efficiently in the context of a market for time interval object capacity units or securities. Included aforementioned data elements may be a subset or superset of data used for any specific calculation or transformation to participate, transact or trade time interval object community linked time interval object capacity units or securities.

Figure 16:
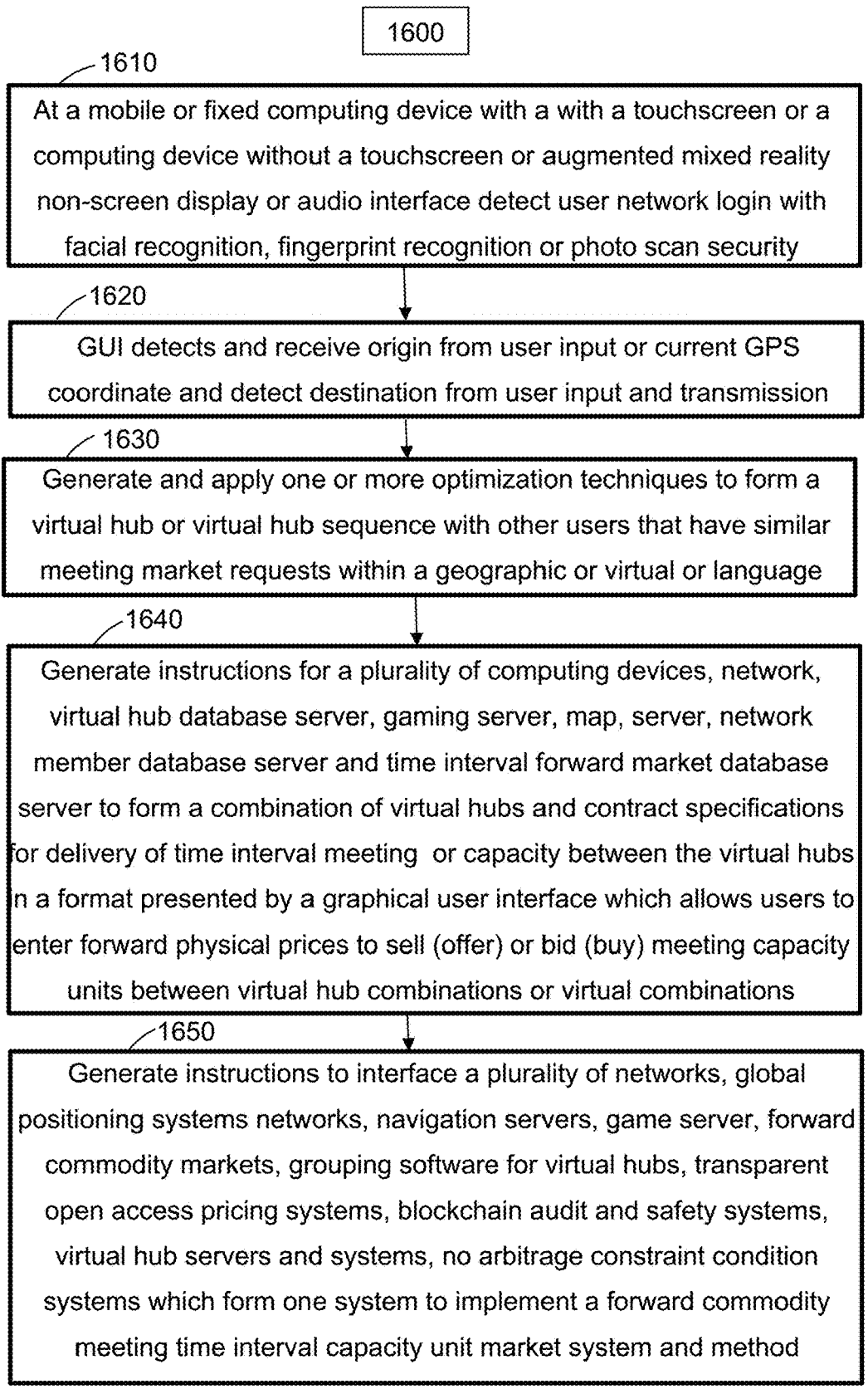
FIG. 16 illustrates a flow diagram of a method in accordance with implementations of various techniques described herein.

FIG. 16 illustrates a flowchart embodiment of steps a user may perform to participate, transact and/or trade transformed time interval object community linked time interval object capacity units or securities between virtual hub combinations. In some embodiments a user at a mobile or portable multifunction device and/or fixed computing device with a touchscreen or a computing device without a touchscreen or augmented, audio interface computing device, mixed reality non-screen display may detect user login to the time interval object community linked time interval object capacity unit network 1610. In some embodiments, the GUI of the time interval object capacity unit network may detect and receive origin location from user input or current GPS coordinate information and detect destination address from user input and transmission of data 1620. In some embodiments, the GUI and/or CPUs and/or databases may generate and apply one or more optimization techniques to form a time interval object community linked virtual hub with other users that have similar time interval object community linked time interval object requests within a geographic boundary 1630. In some embodiments, the GUI and/or CPUs and or databases may generate instructions for a plurality of computing devices, network, virtual hub database server, network member database server and time interval object community linked time interval object forward market database server 130 to form a combination of virtual hubs and transformed contract specifications for delivery of time interval object community linked time interval object services or time interval object capacity between the virtual hubs in a format presented by a graphical user interface which allows users to enter forward physical prices to sell (offer) or bid (buy) time interval object community linked time interval object capacity units or securities between virtual hub combinations 1640 in an open market auction format. In some embodiments, the GUI and/or CPUs and or databases may generate instructions to interface a plurality of networks, global positioning systems networks, servers, forward commodity market auctions, map routing servers, grouping instruction software for virtual hubs, navigation servers, transparent open access pricing systems, game servers, blockchain audit and safety systems, virtual hub servers and systems, no arbitrage constraint condition systems which form one system to implement a forward commodity time interval object community linked time interval object capacity unit forward market system and method 1650.

Figure 17:
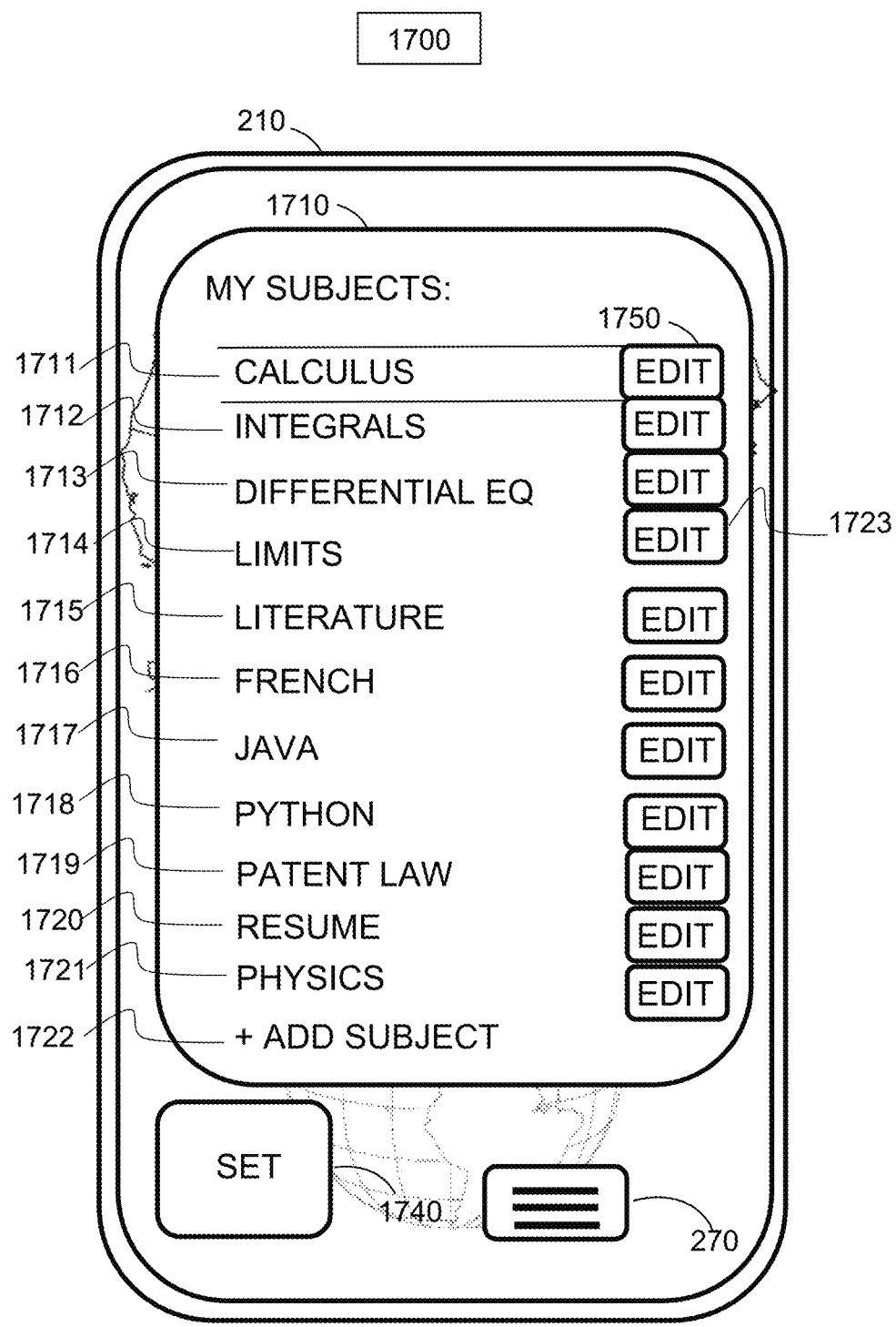
FIG. 17 illustrates a user interface of a computing device in accordance with implementations of various techniques described herein.

FIG. 17 illustrates an exemplary embodiment of a user 110 most frequent time interval object community linked time interval object unit subjects 1710 in one exemplary implementation of participating, transacting and/or trading time interval object community linked time interval object capacity units in accordance with some embodiments. In some embodiments, most frequent my subjects include the following elements, or a subset or superset thereof:

calculus 1711 (may have subsets of transformed data);
integrals 1712 (may have subsets of transformed data);
differential equations 1713 (may have subsets of transformed data);
limits 1714 (may have subsets of transformed data);
literature 1715 (may have subsets of transformed data);
French 1716 (may have subsets of transformed data);
java 1717 (may have subsets of transformed data);
python 1718 (may have subsets of transformed data);
patent law 1719 (may have subsets of transformed data);
resume 1720 (may have subsets of transformed data);
physics 1721 (may have subsets of transformed data);
+Add Subject 1722 (may have subsets of transformed data);
Edit 1723 (may have subsets of transformed data);
Setting button 1740 to transmit the My Subjects data;
Hamburger button 270 to instruct the GUI 210 to take the user 110 to the menu screen.

In some embodiments, the GUI 210 may be used to select, store and/or edit user 110 frequent or preferred subjects ("MY SUBJECTS") 1710 for more efficient access to time interval object community linked time interval object capacity unit markets over various modes and specifications of time interval object capacity. In some embodiments, the user 110 may select, store and/or edit address and specification data for "calculus" 1711 and/or "integrals" 1712 and/or "differential equations" 1713 and/or "limits" 1714 and/or "literature" 1715 and/or "French" 1716 and/or "java" 1717 and/or "python" 1718 and/or "patent law" 1719 and/or "resume" 1720 and/or "physics" 1721 and/or "+Add Subject" 1722. In some embodiments, the My Subjects 1710 module may include any subject a user 110 may request on any time interval object community linked time interval object capacity unit mode and/or specification. In some embodiments the user may toggle between the GUI 210 market view screen in FIG. 3 and other menu 270 options and settings by the user 110 selecting the hamburger button 270 and the GUI 210 detecting the user 110 input or contact. In some embodiments, the user 110 is notified via SMS text, in application, email or a plurality of other well-known communication methods when market activity occurs on a given subject or virtual hub combination. In other words, the "my subjects" 1710 feature not only allows for one touch access to a saved subject, but also performs notification features between users. Lastly, in some embodiments, the EDIT 1750 button allows a user 110 to modify a plurality of notification settings such as email, SMS text, in application, voice, messaging or other notification methods.

Figure 18:
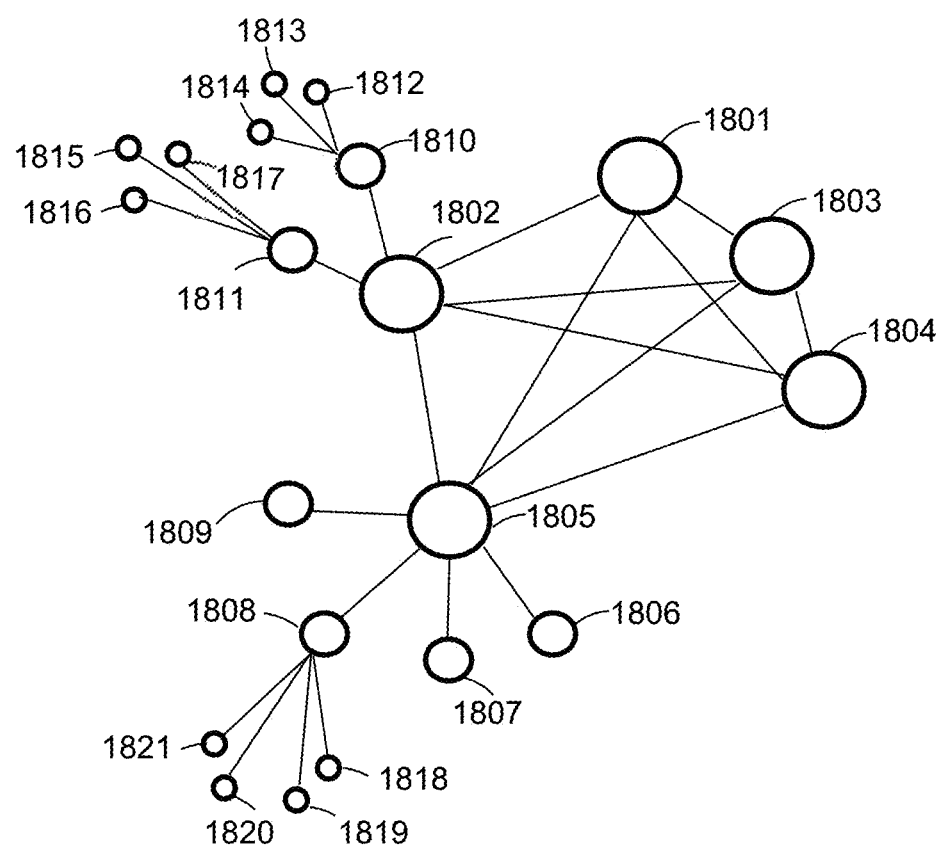
FIG. 18 illustrates a network topology configuration in accordance with implementations of various techniques described herein.

FIG. 18 illustrates an exemplary network topology configuration 1800 in one exemplary implementation of participating, transacting and/or trading transformed time interval object community linked time interval object or time interval object capacity units or securities in accordance with some embodiments. In some embodiments, network configuration 1800 includes the following elements, or a subset or superset thereof:

large time interval object community linked Virtual Hub nodes such as 1801, 1802, 1803, 1804, 1805;

medium time interval object community linked Virtual Hub nodes such as 1810, 1811, 1809, 1808, 1807, 1806;

small time interval object community linked Virtual Hub nodes such as 1812, 1813, 1814, 1815, 1816, 1816, 1817, 1818, 1819, 1820, 1821;

In some embodiments, the overall network node topology 1800 is comprised of large virtual hub nodes 1801, 1802, 1803, 1804, 1805 and medium virtual hub nodes 1810, 1811, 1809, 1808, 1807, 1806 and small virtual hub nodes 1812, 1813, 1814, 1815, 1816, 1816, 1817, 1818, 1819, 1820, 1821, or a subset or superset thereof. In some embodiments a user may input a starting point of 1815 and an ending point of 1818 which represent specific geographic virtual hub locations in a city, multiple cities or even countries or multiple countries and the hub locations may be virtual or physical. In some embodiments, routing and delivery may occur physically or virtually. In some embodiments, time interval object community linked forward time interval object market price-time priority queue auctions may occur directly between two exemplary points such as 1815 and 1818 or the method and system may combine a series of smaller auctions to comprise a larger price-time priority queue auction between two endpoints on the system. In some embodiments, a series of smaller price-time priority queue auctions may be combined between 1815 and 1811 as well as 1811 and 1802 as well as 1802 and 1805 as well as 1805 and 1808 as well as 1808 and 1818 which would be added together to make a combined time interval object community linked virtual hub price-time priority queue auction. A combined series of smaller auctions may be constrained by instructions which form auctions based on cheapest time interval object community linked time interval object or time interval object subject 1011, single mode time interval object community linked transport or time interval object auctions 1012, multi-mode transport or time interval object 1013, fastest transport constraints 1014, most scenic auctions 1015, highest rating auctions 1016, most available or liquid auctions 1017, highest volume time interval object community linked auctions 1018, most frequent time interval object community linked auctions 1019, service level time interval object community linked auctions 1020, security and safety level time interval object community linked auctions 1021, group restricted auctions by sex, email, organization, gender or other 1022. In some embodiments, the constraints allow for many types of auctions which are unique and novel for time interval object community linked transformed time interval object capacity units or securities in a forward time interval object community linked time interval object market. In some embodiments, the user 110 may specify instructions that set time interval object community linked forward market price-time priority queue auction constraints based on one or a plurality of constraints. In some embodiments, the constrained auctions may have fungible units which allow many participants to transact in the auctions. In some embodiments, the disclosed creation of a time interval object community linked forward market of time interval object units between virtual hubs 1801 and 1804 or other combinations along map subjects has the attributes of a fungible forward contract which allows for one time interval object community linked time interval object unit to be substitutable for another time interval object unit because the unit has been transformed and defined as a commodity contract. In other words, if user A bought a time interval object community linked time interval object unit from user B between 1801 virtual hub and 1804 virtual hub, but then user A was not able to perform the obligation to purchase the time interval object community linked time interval object unit between 1801 time interval object community linked virtual hub and 1804 time interval object community linked virtual hub from user B, user A could resell the time interval object community linked time interval object unit contract between time interval object community linked virtual hub 1801 and time interval object community linked virtual hub 1804 to a third party user C on the time interval object community linked forward time interval object unit auction market between virtual hub 1804 and time interval object community linked virtual hub 1801 to retrieve the financial payment made for their original purchase from user B and then user C would replace user A and be matched with user B for the time interval object community linked time interval object unit transformation between time interval object community linked virtual hub 1804 and time interval object community linked virtual hub 1801. No other prior art system or method performs the aforementioned data transformation combination. In some embodiments, the time interval object community linked time interval object unit auction substitutability dynamic creates a unique and novel invention that does not exist in the world today. In some embodiments, user 110 input 220, 230 instructions use constrained optimization to form one auction between two points or a series of multiple auctions that form one larger auction with price-time priority queues.

In some embodiments, the forward time interval object community linked time interval object unit auctions subject to various constraints may be presented as a linear programming cost minimization problem in the exemplary case where the user 110 selects the cheapest subject 1011 constraint. In such exemplary case, the series of auctions may be combined that utilize the lowest cost path between the start point 1815 and the ending point 1818. In such exemplary case, the linear programming cost minimization function may select the following path of 1815 to 1811 to 1802 to 1804 to 1805 to 1808 to 1818 if that combination is the lowest cost auction path. In another such exemplary case, the user 110 may select instructions for the auction to minimize both cost and shortest subject. In such exemplary case the linear programming function may minimize cost subject to a constraint that time is the shortest along the path and the resulting auction may combine a different and unique series of auctions between the starting point of 1815 and ending point 1818. Accordingly, the path may be optimized to minimize cost subject to the shortest path that yields a path of 1815 to 1811 to 1802 to 1805 to 1808 to 1818. The plurality of combinations of linear programming sequences of auctions for time interval object community linked time interval object units between two points may consider an infinite set of combinations and permutations.

In some embodiments, the forward transformed time interval object community linked time interval object unit or transformed time interval object community linked time interval object security unit auctions may be held side by side between two competing subjects 4200. By way of example but not limiting by example a user may input instructions for the method and system to subject between 1801 time interval object community linked virtual hub and 1805 time interval object community linked virtual hub. One subject may be directly between 1801 time interval object community linked virtual hub and 1805 time interval object community linked virtual hub. Another subject may be between time interval object community linked virtual hub 1801 and time interval object community linked virtual hub 1805 by way of time interval object community linked virtual hub 1802. The time between the subjects may vary due to traffic, construction, road conditions, accidents or a plurality of other exogenous factors, however, the data transformation of the disclosed method allows for two price-time priority queue auctions to form side by side. Side by side price-time priority auctions may be displayed on a market based user interface 1300 or as a software layer of instructions over a navigation system 4200. The first time interval object community linked time interval object unit price-time priority queue auction may be between time interval object community linked virtual hub 1805 and time interval object community linked virtual hub 1801 directly as one auction. A second auction may be by combining two smaller price-time priority queue auctions between time interval object community linked virtual hub 1805 and time interval object community linked virtual hub 1802 with the auction between 1802 time interval object community linked virtual hub and 1801 time interval object community linked virtual hub which could be expressed independently or as a combined auction. The plurality of subject auctions for the time interval object unit (auction one directly between 1801 virtual hub and 1805 virtual hub) (auction two between 1801 time interval object community linked virtual hub and 1805 time interval object community linked virtual hub by way of 1802 time interval object community linked virtual hub) may allow for the user to have transparent price auction information for the value of various proposed subjects which have different price values. In yet another embodiment, time interval object community linked time interval object unit auctions may also place virtual paths alongside physical paths with the condition that the same time interval object community linked time interval object unit auction is delivered to contract specification under the data transformation.

Figure 19:
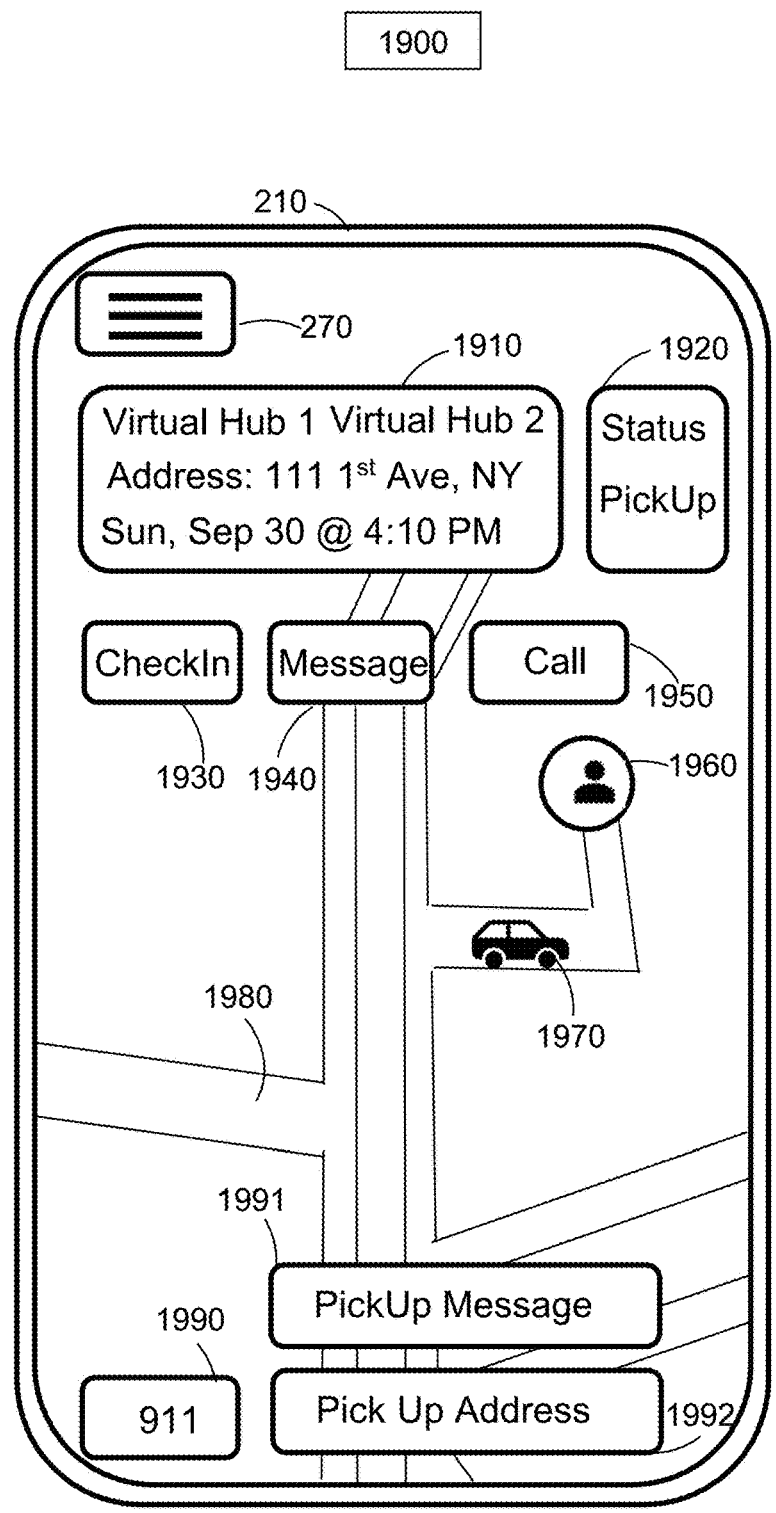

FIG. 19 illustrates an exemplary delivery and pick up status configuration 1900 in one exemplary implementation of participating, transacting and/or trading transformed time interval object community linked time interval object capacity units or securities in accordance with some embodiments. In some embodiments, the delivery and pick up status configuration 1900 includes the following elements, or a subset or superset thereof:

computing device unit GUI 210 to display method of multi layered network node topology for forward market of time interval object community linked time interval object units.

hamburger menu toggle 270 to move between different application configurations;

time interval object community linked virtual hub 1 pickup address and time interval object community linked virtual hub 2 destination address at a contract specification with regards to quality, day, date and time 1910;

subject status for PickUp of time interval object community linked time interval object unit 1920 which may be physical or virtual;

checkIn passenger status for time interval object community linked time interval object unit 1930 which may be physical or virtual;

messaging texts and instructions between users to make pick up and delivery of time interval object community linked time interval object capacity units 1940;

call between users with number masking for privacy security 1950;

GPS map location of user 110 who is a student or learning buyer;

GPS map location of user who is a teacher or learning seller 1970;

GPS map of time interval object community linked time interval object unit delivery and pickup 1980;

texting message window for time interval object community linked time interval object unit communication between users 1991;

PickUp address data window during PickUp status 1992 which may be physical or virtual;

security button to report security issues to 911 and system database 1990;

In some embodiments, the GUI 210 transmits delivery instructions to the users 110 to help the user have a rendering or map of their GPS location 1960 relative to the selling user 1970 of the time interval object community linked time interval object units. In some embodiments, the GUI 210 displays the trips status such as PickUp 1920 status, the trip status may include subsets or supersets of various status conditions such as PickUp, start, leaving, on-going, in-progress, arriving, arrived or a plurality of other trip status conditions. In some embodiments, the trip view of the GUI 210 may include a CheckIn 1930 button to confirm a passenger or time interval object community linked transformed time interval object unit has been moved into the transformed time interval object community linked time interval object unit object which could be a calculus, accounting, Greek, anthropology, art, biochemistry, biotechnology, business, business economics, sustainability, chemistry, Chinese, cinema, civil engineering, chemical engineering, criminal justice, classics, data science, digital humanities, early childhood education, ecology, economics, engineering, English, environmental science, environmental health, film, EU studies, fine arts, financial engineering, French, Hindi, Mandarin, geology, geography, graphic design, German, history, human services, human resource management, industrial design, industrial product design, information systems, Japanese, journalism, Latin, law, linguistics, artificial intelligence, machine learning, management, mathematics, painting, performance, philosophy, photography, physics, political communication, power engineering, product design, political science, psychology, public health, Russian, algorithms, science, patents, java, python, C++, sports science, software engineering, sociology, statistics, linear algebra, differential equations, econometrics, taxation, energy management, renewable energy, nanotechnology, combination of transformed modes or other type of time interval unit subject mode representing a plurality of learning time interval object subjects. In some embodiments, further a time interval unit may simply represent time with a specific person, leader, athlete, personality, business person, musician, chef, scientist, doctor, lawyer or other professional service. In some embodiments, the user 110 may transmit a message using the message 1940 button which may transmit audio, visual or text messages between users 110, 1970, 1960. In some embodiments, the users 110, 1960, 1970 may call each other using the call 1950 button to communicate pickup or delivery instructions. In some embodiments, a user 110, 1960, 1970 may message another user 110, 1960, 1970 to communicate using the PickUp Message window 1991 which may utilize visual, audio or text communication modes as well as log a message history between users. In some embodiments the users 110, 1960, 1970 may toggle to other modes of the application using the menu hamburger button 270. In some embodiments the GPS display of a map with the relative position of a time interval object community linked time interval object unit seller 1970 and a time interval object or time interval object unit buyer 1960 are displayed to help users 110 understand each others relative position and location on a map 1980. In some embodiments the GPS location of the time interval object community linked time interval object unit seller 1970 and time interval object community linked time interval object unit buyer 1960 are tracked in real time with location updates on the map 1980.

Figure 20:
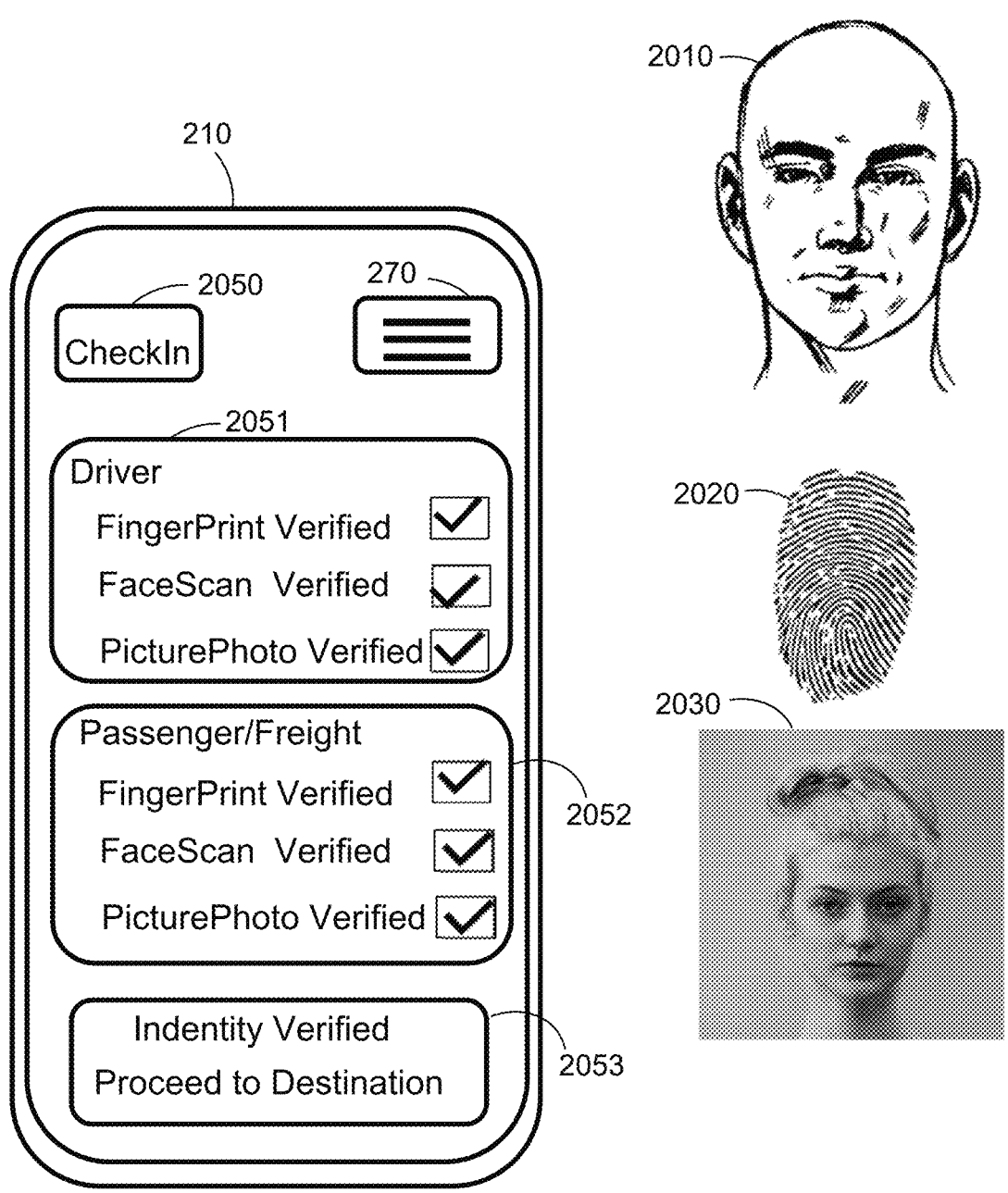

FIG. 20 illustrates an exemplary CheckIn configuration 2000 in one exemplary implementation of participating, transacting and/or trading time interval object community linked time interval object capacity units in accordance with some embodiments. In some embodiments, the CheckIn 2050 for a buyer or seller of a time interval object community linked time interval object or time interval object unit includes the following elements, or a subset or superset thereof:

computing device unit GUI 210 to display method of multi layered network node topology for forward market of time interval object community linked time interval object units with security CheckIn;

hamburger menu toggle 270 to move between different application configurations;

instructor or seller of time interval object community linked time interval object unit scan check for finger print, face scan or picture photo scan to verify identity of user 2051 and multi-factor authentication may also occur;

Learning student or worker or buyer of time interval object community linked time interval object unit buyer unit scan check for finger print, face scan or picture photo scan to verify identity of user 2052 and multi-factor authentication may also occur;

transport verification confirmation window to confirm identities of users in the system at the application system level 2053;

buyer and seller of time interval object community linked time interval object unit facial recognition confirmation 2010 and multi-factor authentication may also occur;

buyer and seller of time interval object community linked time interval object unit finger print recognition confirmation 2020 and multi-factor authentication may also occur;

buyer and seller of time interval object community linked time interval object unit photo recognition confirmation 2030 and multi-factor authentication may also occur;

In some embodiments, the GUI 210 of a computing device transmits and confirms the identity of users against identity records in the Network Member Database Server 222 which also confirms security checks for criminal records or other activity that would suspend a user from the platform environment. In some embodiments, the driver verification window 2051 may fail an identity verification due to a user not being the registered user 2010 on the Network Member Database Server 222. In some embodiments, verification may also occur for virtual delivery environments for authentication, and multi-factor authentication may also occur. In some embodiments, the passenger or time interval object verification window 2052 may fail an identity verification due to a user 2010 not being the registered user on the network member database server 222. In some embodiments, the transport verification window 2053 may instruct the user 2010 to proceed to destination if verification is successful. In some embodiments, the transport verification window 2053 may instruct the user not to proceed to the destination if the verification is not successful. The identity verification system is unique and novel and dependent on a novel and unique price-time priority queue auction forward market for transformed time interval object community linked time interval object unit or securities over multiple nodes or virtual hubs topologies.

Figure 21:
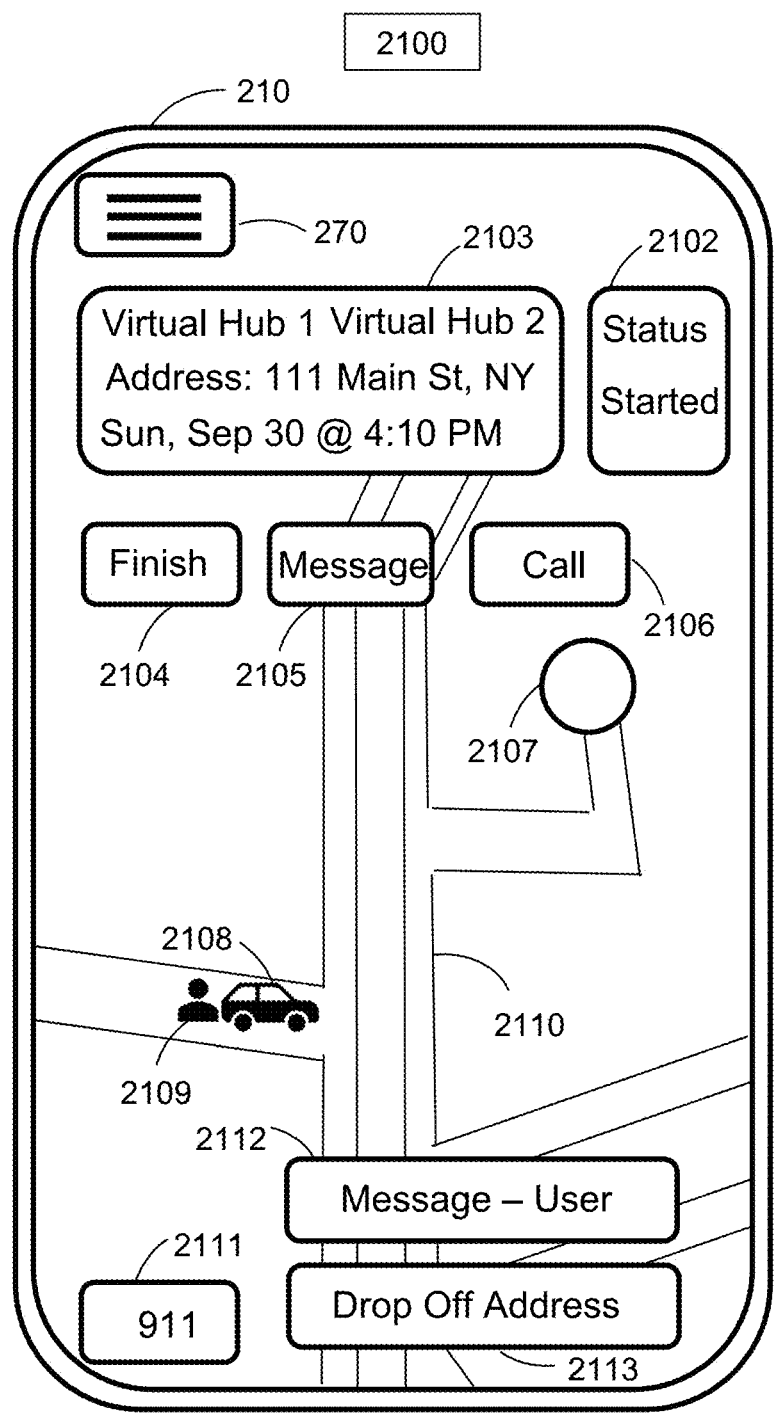

FIG. 21 illustrates an exemplary delivery and pick up status configuration 2100 once a time interval object community linked time interval object unit delivery has started in one exemplary implementation of participating, transacting and/or trading time interval object community linked time interval object capacity units in accordance with some embodiments. In some embodiments, the delivery and pick up status configuration 2100 includes the following elements, or a subset or superset thereof:

computing device unit GUI 210 to display method of multi layered network node topology for time interval object community linked forward market of time interval object units;

hamburger menu toggle 270 to move between different application configurations;

time interval object community linked virtual Hub 1 pickup address and time interval object community linked Virtual Hub 2 destination address at a transformed contract specification with regards to quality, day, date and time 2103 of delivery of a time interval object community linked time interval object unit;

subject status of started of time interval object community linked time interval object unit or security 2102;

finish subject user status for time interval object community linked time interval object unit 2104 once a time interval object community linked time interval object unit has been delivered;

messaging texts and instructions between users to make pick-up, on-going subject status and delivery complete of time interval object community linked time interval object capacity units 2105;

call between system users with number masking for privacy security 2106;

GPS map location of user 2109 who is a student of a time interval object community linked time interval object unit;

GPS map location of user 2108 who is an instructor of a time interval object community linked time interval object unit;

GPS map of time interval object community time interval object unit delivery and pickup 2110;

texting message window for time interval object community linked time interval object unit communication between users 2112;

starting point of virtual hub for forward time interval object community linked time interval object units 2107;

security button to report security issues to 911 and system database 2111;

drop off address for delivery of passenger or time interval object for time interval object unit 2111.

In some embodiments, the GUI 210 transmits delivery instructions to the users 110 to help the user have a rendering or map of their GPS location 2109 relative to the selling user 2108 of transformed time interval object community linked time interval object units or securities. In some embodiments, the GUI 210 displays the subject status such as Started 2102 status, the subject status may include subsets or supersets of various status conditions such as PickUp, Started, leaving, on-going, in-progress, arriving, arrived or a plurality of other subject status conditions over both physical and virtual delivery environments. In some embodiments, the subject view of the GUI 210 may include a Finish 2104 button to confirm a subject or time interval object community linked time interval object unit has been delivered or completed by the time interval object community linked time interval object unit object which could be a plurality of subjects delivered in person or over virtual communication time interval object methods. In some embodiments, the user 110 may transmit a message using the message 2105 button which may transmit audio, visual or text messages between users 110, 2109, 2108. In some embodiments, the users 110, 2109, 2108 may call each other using the call 2106 button to communicate pickup or delivery instructions or preparation or other necessary communication. In some embodiments, the users 110, 2109, 2108 may call each other using the call button 2106 to start an audio, video, augmented reality, mixed reality, virtual reality or additional computing based communication methods between the buyer and seller of the time interval object community linked time interval object unit. In some embodiments, the call button 2106 may use instructions to utilize a communication interface or use external communication interfaces for virtual delivery such as Skype, Zoom, FaceTime, Google Hangout or other interface methods. In some embodiments, the call interface 2106 may be recorded for quality and safety monitoring. In some embodiments, a user 110, 2109, 2108 may message another user 110, 2109, 2108 to communicate using the Message—User window 2112 which may utilize visual, audio or text communication modes as well as log a message history between users. In some embodiments the users 110, 2109, 2108 may toggle to other modes of the application using the menu hamburger button 270. In some embodiments the GPS display of a map with the relative position of a transformed time interval object community linked time interval object unit or security seller 2108 and a transformed time interval object community linked time interval object unit or security buyer 2109 are displayed to help users 110 understand each others relative position and location on a map 2110. In some embodiments the GPS location of the time interval object community linked time interval object unit seller 2108 and time interval object community linked time interval object unit buyer 2109 are tracked in real time with location updates on the map 2110.

Figure 22:
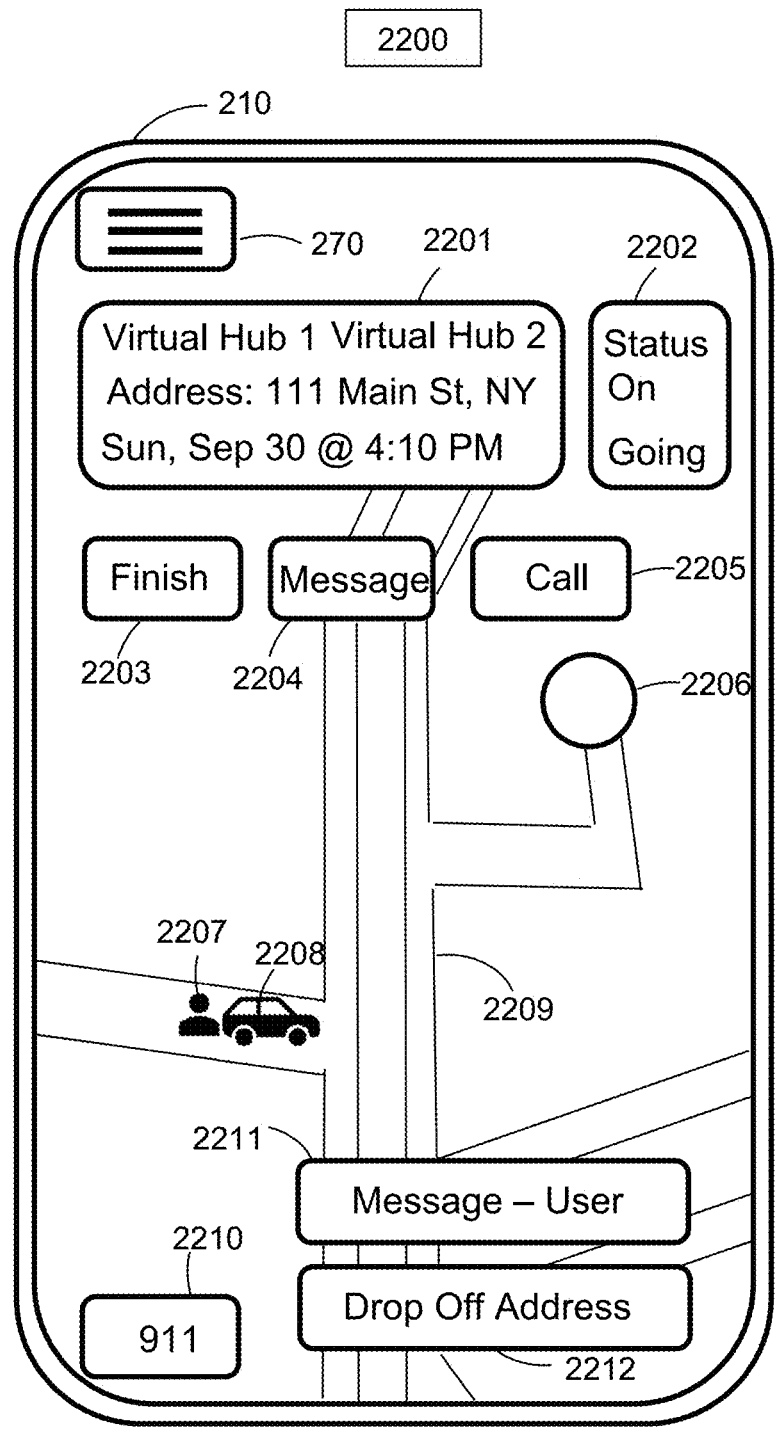

FIG. 22 illustrates an exemplary delivery and pick up status configuration 2200 once a time interval object unit delivery is ongoing in one exemplary implementation of participating, transacting and/or trading transformed time interval object community linked time interval object capacity units or securities in accordance with some embodiments. In some embodiments, the delivery and pick up status configuration 2200 includes the following elements, or a subset or superset thereof:

computing device unit GUI 210 to display method of multi layered network node topology for forward market of time interval object community linked time interval object units;

hamburger menu toggle 270 to move between different application configurations;

time interval object community linked virtual Hub 1 pickup address and time interval object community linked virtual Hub 2 destination address at a contract specification with regards to quality, day, date and time 2201 of delivery of a time interval object community linked time interval object unit;

subject status of ongoing for time interval object community linked time interval object unit 2202;

finish subject student status button for time interval object community linked time interval object unit 2203 once a time interval object community linked time interval object unit has been delivered;

messaging texts and instructions between users to make pick-up, on-going subject status and delivery complete of time interval object community linked time interval object capacity units 2204;

call between system users with number masking for privacy security 2205;

GPS map location of user 2209 who is a student or worker learner or buyer;

GPS map location of user 2208 who is an instructor or seller 2207;

GPS map of time interval object community linked time interval object unit delivery and pickup 2206;

texting message window for time interval object community linked time interval object unit communication between users 2211;

starting point of virtual hub for forward time interval object community linked time interval object units 2206 which may be virtual;

security button to report and record security issues to 911 and system database 2210;

drop off address for delivery of passenger or time interval object community linked time interval object unit 2212, the address may be virtual.

In some embodiments, the GUI 210 transmits delivery instructions to the users 110 to help the user 110 have a rendering or map of their GPS location 2207 relative to the selling user 2208 of time interval object community linked time interval object units. In some embodiments, the GUI 210 displays the trips status such as On-Going 2202 status, the trip status may include subsets or supersets of various status conditions such as PickUp, Started, leaving, on-going, in-progress, arriving, arrived or a plurality of other trip status conditions. In some embodiments, the trip view of the GUI 210 may include a Finish 2203 button to confirm a passenger or time interval object community linked time interval object unit or security has been delivered or completed by the time interval object unit object which could be a plurality of subjects such as calculus, accounting, Greek, anthropology, art, biochemistry, biotechnology, business, business economics, sustainability, chemistry, Chinese, cinema, civil engineering, chemical engineering, criminal justice, classics, data science, digital humanities, early childhood education, ecology, economics, engineering, English, environmental science, environmental health, film, EU studies, fine arts, financial engineering, French, Hindi, Mandarin, geology, geography, graphic design, German, history, human services, human resource management, industrial design, industrial product design, information systems, Japanese, journalism, Latin, law, linguistics, artificial intelligence, machine learning, management, mathematics, painting, performance, philosophy, photography, physics, political communication, power engineering, product design, political science, psychology, public health, Russian, algorithms, science, patents, java, python, C++, sports science, software engineering, sociology, statistics, linear algebra, differential equations, econometrics, taxation, energy management, renewable energy, nanotechnology, lawyer, doctor, scientist, personality, celebrity, athlete, musician or other types of subject modes. In some embodiments, the user 110 may transmit a message using the message 2204 button which may transmit audio, visual or text messages between users 110, 2207, 2208. In some embodiments, the users 110, 2207, 2208 may call each other using the call 2205 button to communicate pickup or delivery instructions or other necessary communication. In some embodiments, a user 110, 2207, 2208 may message another user 110, 2207, 2208 to communicate using the Message—User window 2211 which may utilize visual, audio or text communication modes as well as log a message history between users 110, 2207, 2208. In some embodiments the users 110, 2207, 2208 may toggle to other modes of the application using the menu hamburger button 270. In some embodiments the GPS display of a map with the relative position of a time interval object community linked time interval object unit seller 2208 and a time interval object community linked time interval object unit buyer 2207 are displayed to help users 110 understand each others relative position and location on a map 2209. In some embodiments the GPS location of the time interval object community linked time interval object unit seller 2208 and time interval object community linked time interval object unit buyer 2207 are tracked in real time with location updates on the map 2209. In some embodiments, the GUI 210 may display the Drop Off Address 2212 of the time interval object community linked time interval object unit. In some embodiments a user 110, 2207, 2208 may use a 911 button 2210 to submit a recording to the system servers and to authorities who are connected to the system if anything has occurred that may compromise the security of any user or time interval object community linked time interval object unit.

Figure 23:
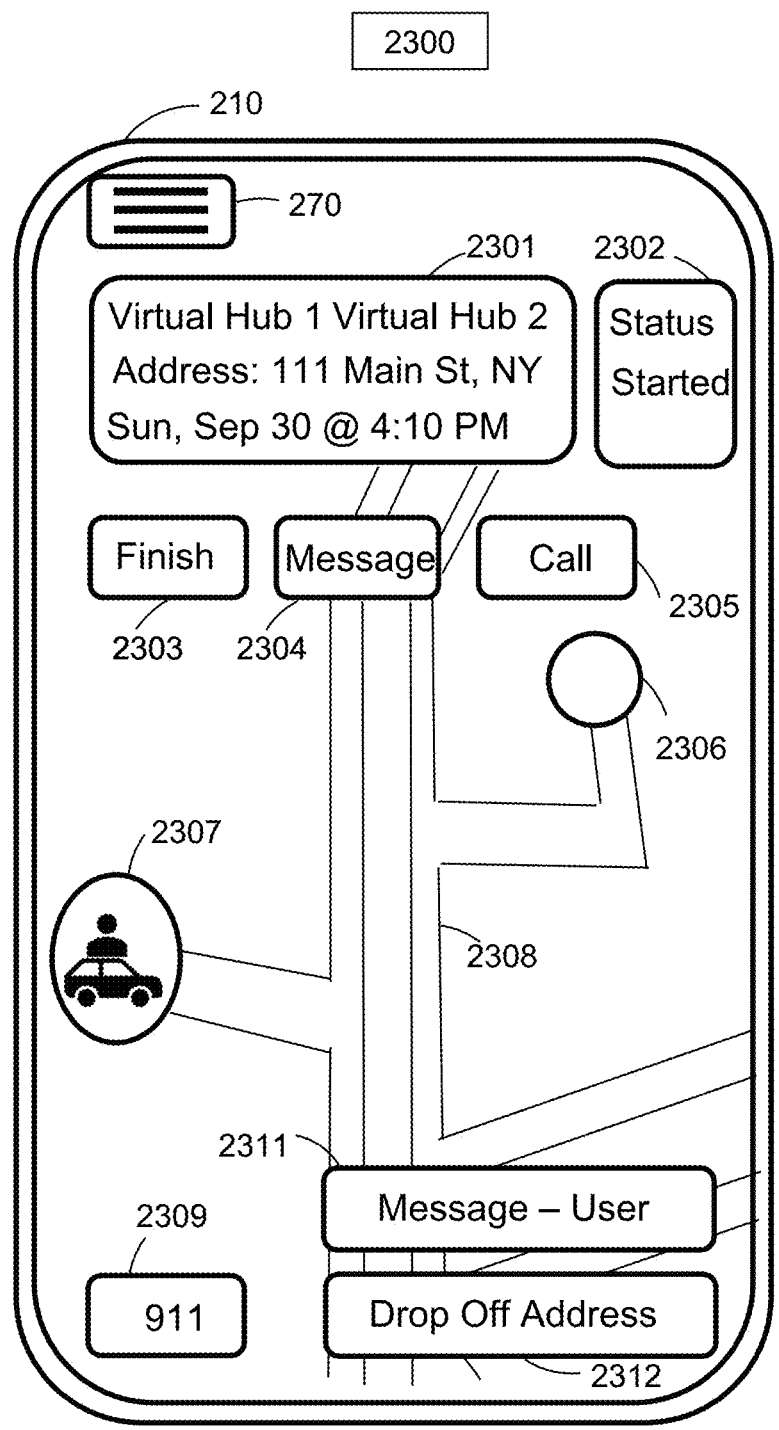

FIG. 23 illustrates an exemplary delivery and pick up status configuration 2300 once a time interval object community linked time interval object unit delivery has arrived in one exemplary implementation of participating, transacting and/or trading time interval object community linked time interval object capacity units in accordance with some embodiments. In some embodiments, the delivery and pick up status configuration 2300 includes the following elements, or a subset or superset thereof:

computing device unit GUI 210 to display method of multi layered network node topology for forward market of time interval object community linked time interval object units.

hamburger menu toggle 270 to move between different application configurations;

time interval object community linked virtual hub 1 pickup address and time interval object community linked virtual hub 2 destination address at a contract specification with regards to quality, day, date and time 2301 of delivery of a time interval object community linked time interval object unit;

subject status of arrived for time interval object community linked time interval object unit 2302;

finish subject student status button for time interval object community linked time interval object unit 2303 once a time interval object community linked time interval object unit has been delivered;

messaging texts and instructions between users to make pick-up, on-going subject status and delivery complete of time interval object community linked time interval object capacity units 2304;

call between system users with number masking for privacy security 2305;

GPS map location of user 2307 who is student or working learner 2307;

GPS map location of user 2307 who is a instructor;

GPS map of time interval object community linked time interval object unit delivery and pickup 2308;

texting message window for time interval object community linked time interval object unit communication between users 2311;

starting point of virtual hub for time interval object community linked forward transformed time interval object units or securities 2306;

ending point of virtual hub for time interval object community linked forward transformed time interval object units units or securities 2307;

security button to report and record security issues to 911 and system database 2309;

drop off address for delivery of time interval object community linked time interval object unit 2312;

In some embodiments, the GUI 210 transmits delivery instructions to the users 110 to help the user 110 have a rendering or map of their GPS location 2307 relative to the selling user 2307 of time interval object community linked time interval object units. In some embodiments, the GUI 210 displays the subject status such as "Arrived" 2302 status, the subject status may include subsets or supersets of various status conditions such as PickUp, Started, leaving, on-going, in-progress, arriving, arrived or a plurality of other subject status conditions. In some embodiments, the trip view of the GUI 210 may include a Finish 2303 button to confirm a time interval object community linked time interval object unit has been delivered or completed by the time interval object community linked time interval object unit object which could be calculus, accounting, Greek, anthropology, art, biochemistry, biotechnology, business, business economics, sustainability, chemistry, Chinese, cinema, civil engineering, chemical engineering, criminal justice, classics, data science, digital humanities, early childhood education, ecology, economics, engineering, English, environmental science, environmental health, film, EU studies, fine arts, financial engineering, French, Hindi, Mandarin, geology, geography, graphic design, German, history, human services, human resource management, industrial design, industrial product design, information systems, Japanese, journalism, Latin, law, linguistics, artificial intelligence, machine learning, management, mathematics, painting, performance, philosophy, photography, physics, political communication, power engineering, product design, political science, psychology, public health, Russian, algorithms, science, patents, java, python, C++, sports science, software engineering, sociology, statistics, linear algebra, differential equations, econometrics, taxation, energy management, renewable energy, nanotechnology, or other types of subject modes. In some embodiments, the user 110 may transmit a message using the message 2304 button which may transmit audio, visual or text messages between users 110, 2307. In some embodiments, the users 110, 2307 may call each other using the call 2305 button to communicate pickup or delivery instructions or other necessary communication. In some embodiments, a user 110, 2307 may message another user 110, 2307 to communicate using the Message—User window 2311 which may utilize visual, audio or text communication modes as well as log a message history between users 110, 2307. In some embodiments the users 110, 2307 may toggle to other modes of the application using the menu hamburger button 270. In some embodiments the GPS display of a map with the relative position of a time interval object community linked time interval object unit seller 2307 and a time interval object community linked time interval object unit buyer 2307 are displayed to help users 110 understand each others relative position and location on a map 2308. In some embodiments the GPS location of the time interval object community linked time interval object unit seller 2307 and transformed time interval object community linked time interval object unit or security buyer 2307 are tracked in real time with location updates on the map 2308. In some embodiments, the GUI 210 may display the Drop Off Address 2312 of the transformed time interval object community linked time interval object or time interval object unit or security. In some embodiments a user 110, 2307 may use a 911 button 2309 to submit a recording to the system servers and to authorities or audit verification who are connected to the system if anything has occurred that may compromise the security of any user or time interval object community linked time interval object unit.

FIG. 24 illustrates an exemplary delivery and pick up configuration 2400 for a time interval object community linked time interval object unit multi layered network node topology in one exemplary implementation of participating, transacting and/or trading time interval object community linked time interval object capacity units in accordance with some embodiments. In some embodiments, the multi layered network node topology of participating, transacting and/or trading time interval object community linked time interval object capacity configuration 2400 includes the following elements, or a subset or superset thereof:

computing device unit GUI 210 to display method of multi layered network node topology for forward market of time interval object community linked time interval object units;

hamburger menu toggle 270 to move between different application configurations;

from node starting point 2401 of a multi layered network node topology for forward market of time interval object community linked time interval object units;

to or destination node ending point 2402 of a multi layered network node topology for forward market of time interval object community linked time interval object units;

date module 2403 in GUI 210 of an auction for a multi layered network node topology for time interval object community linked forward market of transformed time interval object community linked time interval object units or securities;

time module 2404 in GUI 210 of pickup and delivery of an auction for a multi layered network node topology for time interval object community linked forward market of time interval object community linked time interval object units;

go button 2405 to form an auction for a multi layered network node topology for time interval object community linked forward market of transformed time interval object units or securities;

My Subjects button 2406 to quickly obtain common From 2401 or To 2402 points in a price-time priority auction for a multi layered network node topology for time interval object community linked forward market of transformed time interval object units for a user on the system;

multi-hub network 2407, 2408, 2409, 2410 which may form a single dual node price-time priority auction 2407 to 2408 or 2407 to 2410 or any possible node combination or a multi-node auction series for a multi layered network node topology for time interval object community linked forward market of time interval object units for a user on the system.

In some embodiments, the GUI 210 transmits a From node 2401 and To node 2402 with instructions to the users 110 with a specific date 2403 and time 2404 of a multi layered network node topology for forward market of transformed time interval object community linked time interval object units for a user on the system to perform an auction by pressing the Go button 2405. The system may use a plurality of constraints such as but not limited by cheapest subject 1011, single mode of time interval object community linked time interval object 1012, multi method mode of time interval object community linked time interval object 1013, fastest subject 1014, most scenic subject 1015, highest rated subject or highest rated driver 1016, most available subject 1017, highest volume subject 1018, most frequent subject 1019, service level subject 1020, security and safety of subject 1021, group restricted email or group criteria 1022 to use any two node points 2407, 2408, 2409, 2410 or any combination of points 2407, 2408, 2409, 2410. In some embodiments the system may use no constraint, one constraint or a plurality of constraints to allow the user 110 to participate, transact or trade in a multi layered network node topology for time interval object community linked forward market of time interval object community linked time interval object units in an auction. In some embodiments the price-time priority queue auction for time interval object community linked forward market transformed time interval object units or securities may be comprised of an auction between only two points or a plurality of points subject to a plurality of constraints. In some embodiments the from or starting point or starting virtual hub may be 2407, but the system selects an auction between 2408 and 2409 rather than starting at 2407 because one or more constraints were selected to frame the price-time priority queue auction for time interval object community linked forward market time interval object units. In some embodiments, an auction may be comprised of multiple modes of time interval object community linked time interval object comprising a subject time interval object community linked time interval object unit auction between 2407 and 2408 points, followed by an time interval object community linked calculus time interval object unit auction between 2408 and 2409, followed by an time interval object community linked French language auction between 2410 and 2409 for time interval object community linked time interval object units. In some embodiments the various plurality of auctions may be displayed as one price-time priority auction or a series of price-time priority auctions. In some embodiments, auctions for a multi layered network node topology for a time interval object community linked forward market of time interval object units may consist of any subset or superset of the aforementioned possibilities including any constraints 1000 or any plurality of modes 800.

Figure 25:
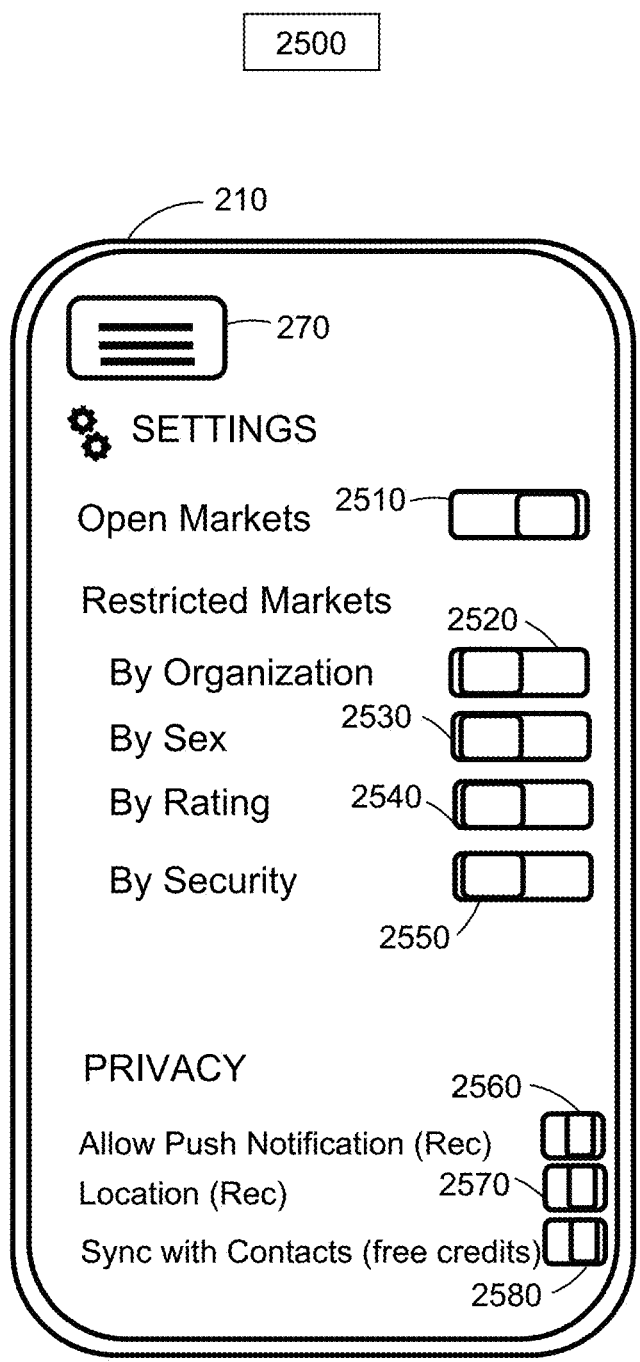

FIG. 25 illustrates an exemplary setting configuration 2500 for a time interval object community linked time interval object unit multi layered network node topology in one exemplary implementation of participating, transacting and/or trading time interval object community linked time interval object capacity units in accordance with some embodiments. In some embodiments, the multi layered network node topology of participating, transacting and/or trading time interval object community linked time interval object capacity configuration 2500 includes the following setting elements, or a subset or superset thereof:

computing device unit GUI 210 to display method of multi layered network node topology for forward market of transformed time interval object community linked time interval object units or securities.

hamburger menu toggle 270 to move between different application configurations;

open markets setting toggle 2510 which allows a user to see all market participants of a given auction on a multi layered network node topology for a forward market of transformed time interval object community linked time interval object units or securities;

restricted markets setting By Organization 2520, By Sex 2530, By Rating 2540, By Security 2550 or by any other restriction the user 110 defines which limit the price-time priority queue auction participants for the user;

privacy settings which restrict push notifications 2560, location information 2570; Sync with contacts 2580, or other privacy settings;

In some embodiments, a user 110 may select open markets 2510 which show every participant in a given auction for a multi layered network node topology for a forward market of time interval object community linked time interval object units. In some embodiments, participants or users 110 may select to restrict the market view of the GUI such as 400 by organization email 2520 or by sex 2530 or by rating of driver 2540 or rating of user 2540 or by security 2550 or by a plurality of other restrictions but not limited to those restrictions. In some embodiments, users 110 may change privacy settings which restrict push notifications 2560, location settings 2570, Sync with Contacts settings 2580 or a plurality of other settings. In some embodiments, the toggle switches 2510, 2520, 2530, 2540, 2550, 2560, 2570, 2580 may be set to off or on depending on if they hold a right or left toggle switch position. The restricted market settings 2520, 2530, 2540, 2550 may be a subset or superset of the aforementioned in the formation of an open market price-time priority auction for a multi layered network node topology for a forward market of time interval object community linked time interval object units.

Figure 26:
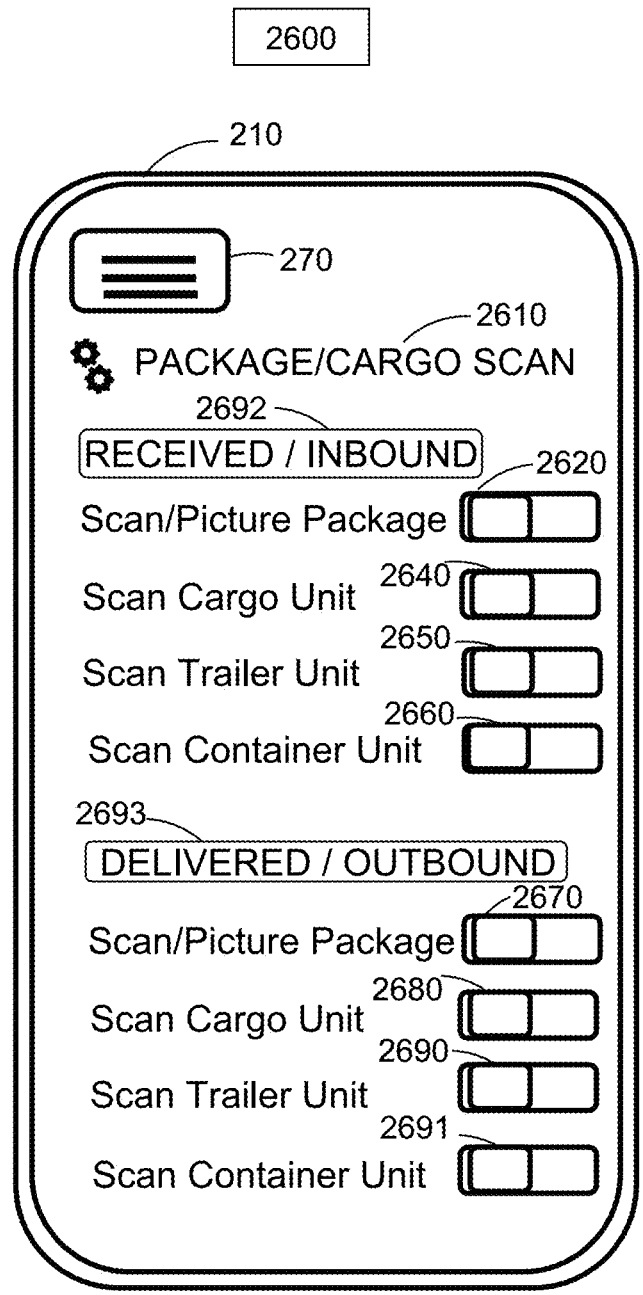

FIG. 26 illustrates an exemplary setting for a package or cargo scan configuration 2600 for a transformed time interval object community linked time interval object unit multi layered network node topology in one exemplary implementation of participating, transacting and/or trading time interval object community linked time interval object capacity units in accordance with some embodiments. In some embodiments, the multi layered network node topology of participating, transacting and/or trading time interval object community linked time interval object capacity configuration 2600 includes the following setting for a package or cargo scan elements, or a subset or superset thereof:

computing device unit GUI 210 to display method of multi layered network node topology for forward market of time interval object community linked time transformed time interval object and time interval object units.

hamburger menu toggle 270 to move between different application configurations;

package or Cargo Scan module 2610 to document the status and position of transformed forward market time interval object or time interval object community linked time interval object units or security;

package or Cargo Inbound or received module 2692 to scan a picture, universal product code barcode, QR code, or other transformed time interval object community linked time interval object or time interval object unit identifier or security;

package or Cargo Inbound scan toggle switch 2620 to scan a picture, universal product code barcode, QR code, or other transformed time interval object community linked time interval object or time interval object unit identifier or security;

cargo unit Inbound scan toggle switch 2640 to scan a picture, universal product code barcode, QR code, or other transformed time interval object community linked time interval object or time interval object unit identifier or security;

trailer unit Inbound scan toggle switch 2650 to scan a picture, universal product code barcode, QR code, or other transformed time interval object community linked time interval object or time interval object unit identifier or security;

container unit Inbound scan toggle switch 2660 to scan a picture, universal product code barcode, QR code, or other transformed time interval object community linked time interval object or time interval object unit identifier or security;

package or Cargo Outbound or delivered module 2693 to scan a picture, universal product code barcode, QR code, or other transformed time interval object community linked time interval object or time interval object unit or security identifier or security;

package or Cargo Outbound or delivered scan toggle 2670 to scan a picture, universal product code barcode, QR code, or other transformed time interval object community linked time interval object or time interval object unit identifier or security;

cargo outbound or delivered scan toggle 2680 to scan a picture, universal product code barcode, QR code, or other transformed time interval object community linked time interval object or time interval object unit identifier;

trailer Outbound or delivered scan toggle 2690 to scan a picture, universal product code barcode, QR code, or other transformed time interval object community linked time interval object or time interval object unit identifier;

container unit outbound or delivered scan toggle 2691 to scan a picture, universal product code barcode, QR code, or other transformed time interval object community linked time interval object or time interval object unit identifier.

In some embodiments, a user 110 may select the package or cargo unit scan module 2610 to scan or take a picture of an education subject package or cargo identification code such as a QR code, Uniform Product code or other identifying an education subject package or cargo characteristic. In some embodiments, the user 110 may select the inbound Scan/Picture Package toggle 2620 which captures the identification characteristic which may include QR Codes, Uniform Product Codes, Serial Numbers or other cargo identification characteristics of an education subject package or cargo time interval object community linked time interval object unit. In some embodiments, inbound an education subject cargo may include a larger unit structure than a an education subject package such as a crate or large movable unit with identification characteristics which may include QR Codes, Uniform Product Codes, Serial Numbers or other cargo identification characteristics, for such larger units a user 110 may use the Scan Cargo Unit toggle 2640 to capture the cargo identification characteristic for inbound receipt of the time interval object community linked time interval object or time interval object unit. In some embodiments, an inbound Scan Trailer Unit toggle 2650 option may be used by a user 110 to instruct the system configuration that receipt of a large trailer unit such as an eighteen wheel trailer unit or smaller trailer, may be scanned to identify the time interval object community linked time interval object or time interval object unit. In some embodiments, an inbound Scan Container Unit 2660 toggle may be utilized to track the receipt or location of a shipping container. In some embodiments, a user 110 may select the outbound package or cargo unit scan module 2693 to scan or take a picture of a package or cargo identification code such as a QR code, Uniform Product code or other identifying package or cargo characteristic to confirm delivery to a delivery address of the time interval object community linked time interval object or time interval object unit. In some embodiments, the user 110 may select the outbound Scan/Picture Package toggle 2670 which captures the identification characteristic of a package or cargo time interval object community linked time interval object or time interval object unit once the unit is delivered to the delivery address. In some embodiments, an education subject cargo may include a larger unit structure than a package such as a crate or large movable unit with identification characteristics which may include QR Codes, Uniform Product Codes, Serial Numbers or other cargo identification characteristics, for such larger units a user 110 may use the outbound Scan Cargo Unit toggle 2680 to capture the cargo identification characteristic for outbound receipt of the transformed time interval object community linked time interval object or time interval object unit or security. In some embodiments, an outbound Scan Trailer Unit toggle 2690 option may be used by a user 110 to instruct the system configuration that delivery of a large trailer unit such as an eighteen wheel trailer unit or smaller trailer, may be scanned to identify the time interval object community linked time interval object or time interval object unit and confirm delivery. In some embodiments, an outbound Scan Container Unit 2691 toggle may be utilized to track the delivery or location of a shipping container which has been delivered. In some embodiments, transformed time interval object community linked time interval object or time interval object units or securities may be a subset or superset of the aforementioned in the formation of an open forward market auction for a multi layered network node topology for a forward market of transformed time interval object community linked time interval object and time interval object units or securities.

Figure 27:
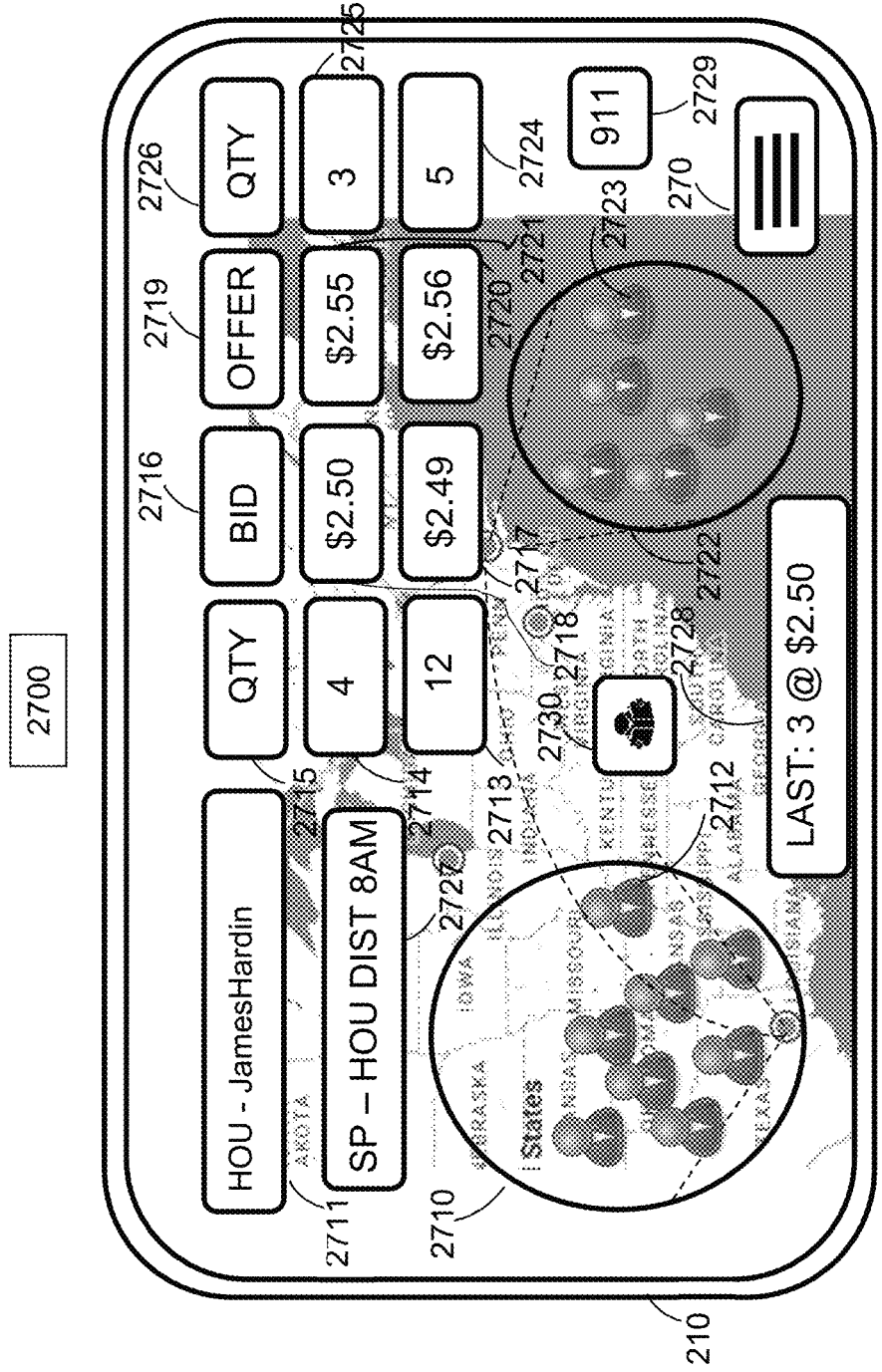

FIG. 27 illustrates an exemplary setting for a time interval object community linked time interval object unit biology configuration 2700 for a transformed time interval object community linked time interval object unit or security multi layered network node topology in one exemplary implementation of participating, transacting and/or trading transformed time interval object community linked time interval object capacity units or securities in accordance with some embodiments. In some embodiments, user interface 210 includes the following elements, or a subset or superset thereof:

exemplary time interval object community linked virtual hub combination subject of a time interval unit meeting with James Harden (a data transformation) 2711;

exemplary time interval object community linked virtual hub origin/from location 2710 with users or instructor originators 2712 within the time interval object community linked virtual hub location 2710 (a data transformation);

exemplary specification summary of the market, level of service and time of delivery commencement 2727 (a data transformation);

exemplary mode of ground time interval object capacity type 2730 (a data transformation);

exemplary transaction summary of the last trades quantity and price 2728;

exemplary time interval object community linked virtual hub destination/to location 2722 and user who is being delivered on the time interval object community linked time interval object capacity unit 2723 (a data transformation);

exemplary bid/buy quantity title header 2715 for an exemplary time interval object community linked virtual time interval object unit hub market (a data transformation);

exemplary bid/buy price title header 2716 for an exemplary virtual time interval object community linked time interval object hub market (a data transformation);

exemplary offer/sell price title header 2719 for an exemplary virtual time interval object community linked time interval object hub market (a data transformation);

exemplary offer/sell quantity title header 2726 for an exemplary virtual time interval object community linked time interval object hub market (a data transformation);

exemplary bid/buy quantity 2414 for the best bid quantity from a plurality of users 110 for an exemplary respective time interval object community linked time interval object capacity virtual hub combination 2711 (a data transformation);

exemplary bid/buy quantity 2713 for the second-best bid quantity from a plurality of users 110 for an exemplary respective time interval object community linked time interval object capacity virtual hub combination 2711 (a data transformation);

exemplary bid/buy price 2718 for the best bid price from a plurality of users 110 for an exemplary respective time interval object community linked time interval object capacity virtual hub combination 2711 (a data transformation);

exemplary bid/buy price 2717 for the second-best bid price from a plurality of users 110 for an exemplary respective time interval object community linked time interval object capacity virtual hub combination 2711 (a data transformation);

exemplary offer/sell price 2721 for the best offer price from a plurality of users 110 for an exemplary respective time interval object community linked time interval object capacity virtual hub combination 2711 (a data transformation);

exemplary offer/sell price 2720 for the second-best offer price from a plurality of users 110 for an exemplary respective time interval object community linked time interval object capacity virtual hub combination (a data transformation) 2711;

exemplary offer/sell quantity 2725 for the best offer quantity from a plurality of users 110 for an exemplary respective time interval object community linked time interval object capacity virtual hub combination (a data transformation) 2711;

exemplary offer/sell quantity 2724 for the second-best offer quantity from a plurality of users 110 for an exemplary respective time interval object community linked time interval object capacity virtual hub combination (a data transformation) 2711;

exemplary safety dispatch "911" button 2729 to enact video and audio recording of the user 110 environment and dispatch of that information to authorities and system servers.

exemplary hamburger menu button 270 to move back to menu options and settings away from the participation, transaction, trading price-time priority auction GUI 210 embodiment.

In some embodiments, the user 110 may enter a transaction quantity and price for time interval object community linked time interval object capacity units to participate, transact and/or trade by the GUI 210 detecting user 110 contact or audio interface with a bid/buy price 2718 or offer/sell price 2721. The GUI 210 detects user 110 contact with any of the GUI 210 buttons which have been aforementioned. Upon user 110 contact or audio interface with buttons on the GUI 210, instructions are instantiated which allow the user 110 to change the specifications of the respective virtual hub or subject combination 2711. A plurality of prices and markets may be presented based on a plurality of transformed time interval object community linked contract specifications. In some embodiments, the best bid/buy price 2718 may be moving up in price or down in price depending on the market conditions at any given time. In some embodiments the last trade or last transacted price for a given specification is listed to help the user 110 understand how the market is moving so that the user 110 may submit a competitive offer/selling price 2721 or bid/buying price 2718. In some embodiments, users 110 may adjust settings of the GUI 210 to show more bid/buying prices 2717 or more offer/selling prices 2720. In some embodiments the matrix of market quantities and prices 2713, 2714, 2715, 2716, 2717, 2718, 2719, 2720, 2721, 2724, 2725, 2726 may be referred to as market depth in the GUI 210 embodiment. In some embodiments the number of users 110 may be displayed as user icons 2712 or 2723 for the amount of people logged in which desire to transact, trade or participate in a given virtual hub 2710 to virtual hub 2722 combination for time interval object community linked time interval object units. In some embodiments, users 110 may select the subject mode 2730 such that the user allows a market for only one form of transformed time interval object community linked time interval object capacity as a commodity or the user 110 may allow the system to show multiple forms of time interval object community linked time interval object capacity between two time interval object community linked virtual time interval object capacity hubs 2710, 2711, 2722. In some embodiments the GUI 210 may detect a user 110 selecting the 911 button 2729 which may activate voice and video recording functions on the mobile or stationary device 111 and transmit the data with a confirmation from the user 110 to the authorities and system servers to provide enhanced security while participating, transacting or trading forward transformed time interval object community linked time interval object as a commodity or security. In some embodiments the user may toggle between the GUI 210 market view screen in FIG. 3 and other menu 270 options and settings by the user 110 selecting the hamburger button 270 and the GUI 210 detecting the user 110 input or contact or audio instruction. In some embodiments the GUI 210 may instantiate instructions in the memory of the mobile computing device 210 which then transmits time interval object community linked time interval object capacity data 241 through the network 226, 214 or wireless GPS network 215 to call upon instruction routines and instruction sub-routines on the time interval object community linked time interval object forward market database server 271, virtual hub database server 223, network member database server 222, time interval object community subject processor 217, my subject virtual hub processor 218, application processor 219, server 220, sequence subject processor 221, and memory which all interface together to make one system which may deliver time interval object community linked time interval object capacity units to users 110 from and to a plurality of virtual hubs 2710, 2722 with a plurality of specifications at specific market prices.

Figure 28:
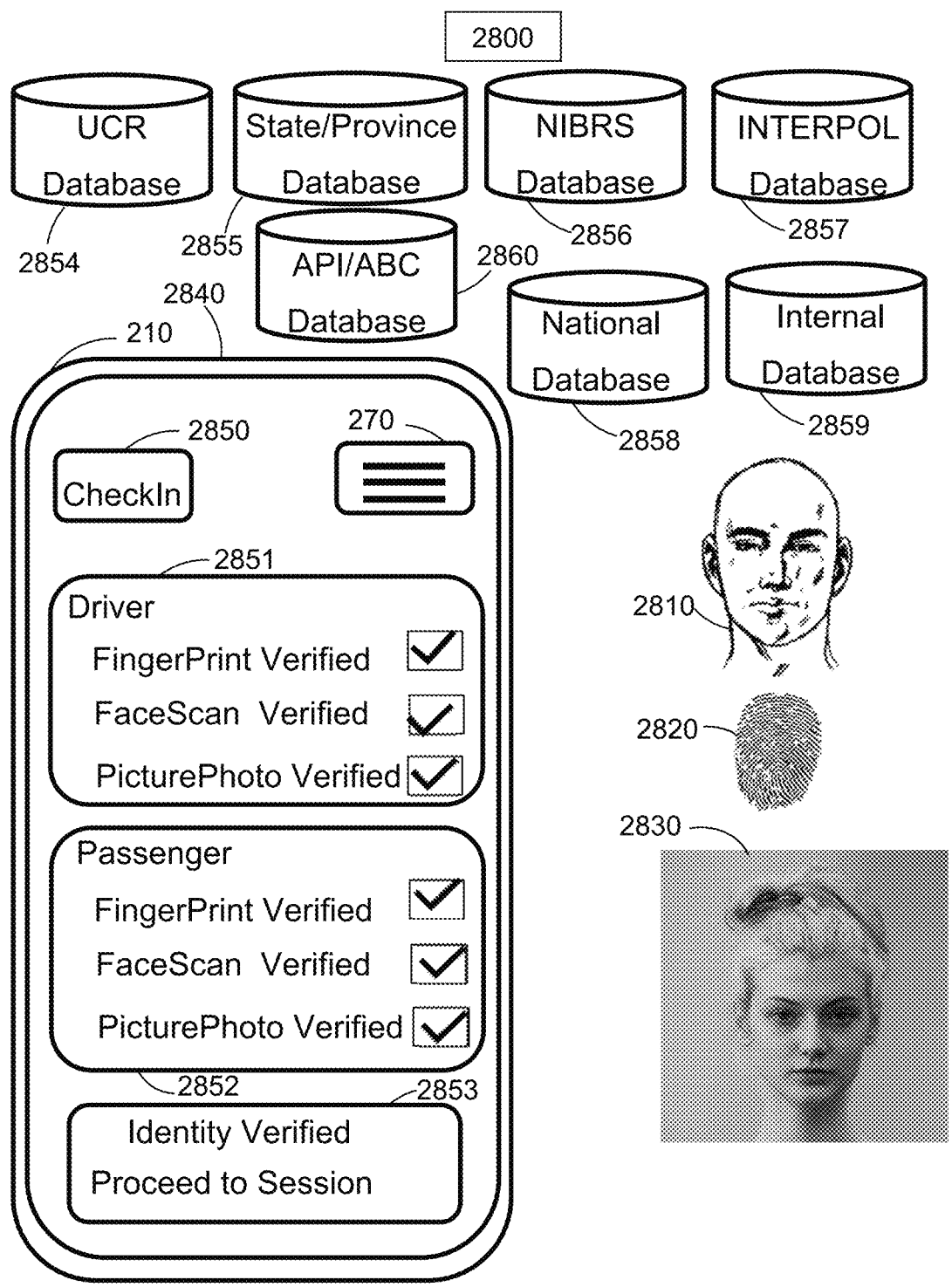
FIG. 28 illustrates a check in and security database configuration for a time interval unit multi-layered network node topology for use with participating, transacting and/or trading transformed time interval units or securities in accordance with implementations of various techniques described herein.

FIG. 28 illustrates an exemplary check in and security database configuration 2800 for a time interval object community linked time interval object unit multi layered network node topology in one exemplary implementation of participating, transacting and/or trading transformed time interval object community linked time interval object capacity units or securities in accordance with some embodiments. In some embodiments, the multi layered network node topology of participating, transacting and/or trading time interval object community linked time interval object capacity configuration 2800 includes the following security configuration elements, or a subset or superset thereof:

exemplary uniform crime reporting ("UCR") database 2854 from international agencies who report crime;

exemplary International State or Provincial crime reporting database 2855 from international governments who report crime;

exemplary International National Incident Based Reporting System ("NIBRS") crime reporting database 2856 from international governments who report crime;

exemplary Interpol crime reporting database 2857 from international governments who report crime which connects National Central Bureaus ("NCBs");

exemplary International application program interface and ABC ("API/ABC") crime reporting database 2860 from international governments who report crime;

exemplary national crime reporting database 2858 from international governments who report crime;

exemplary internal system crime reporting database 2859 from crimes which occurred on system;

exemplary facial scan to identify user 2810 against a plurality of crime databases;

exemplary fingerprint scan to identify user 2820 against a plurality of crime databases;

exemplary photo or photo scan to identify user 2830 against a plurality of crime databases;

exemplary voice scan to identify user 2810 against a plurality of crime databases;

exemplary Computing device unit GUI 210 to display method of multi layered network node topology for forward market of time interval object community linked time interval object units.

hamburger menu toggle 270 to move between different application configurations;

exemplary time interval object community linked Instructor or Driver transport time interval object seller unit user interface 2851 to confirm identity verification against a plurality of crime databases;

exemplary time interval object community linked student unit time interval object unit user interface 2852 to confirm identity verification against a plurality of crime databases;

exemplary handshake verification user interface 2853 to confirm both buyer and seller of time interval object community linked time interval object units were correctly verified against crime databases;

In some embodiments, a plurality of crime databases UCR Database 2854, State and Province Database 2855, NIBRS database 2856, INTERPOL database 2857, API/ABC database 2860, National database 2858, Internal system database 2859 are used to confirm a user 110, has been confirmed not to have criminal history in accordance with instructions on the method and system. In some embodiments, time interval object community linked time interval object unit security may be a subset or superset of the aforementioned in the formation of an open forward market auction for a multi layered network node topology for a forward market of time interval object community linked time interval object units. Such security checks are standard in airports, but they are not automated and they are not utilized in other modes of time interval object which degrades the overall safety of other time interval object methods if they are not utilized. In some embodiments, the check in instructions may reject a user from confirmed verified transport if they fail the plurality of safety checks. In some embodiments, confirmed no crime history users 110 do not have activity reported in the plurality of crime databases UCR Database 2854, State and Province Database 2855, NIBRS database 2856, INTERPOL database 2857, API/ABC database 2860, National database 2858, Internal system database 2859 and are confirmed to time interval object community linked transport verified status 2853 in the system.

Figure 29:
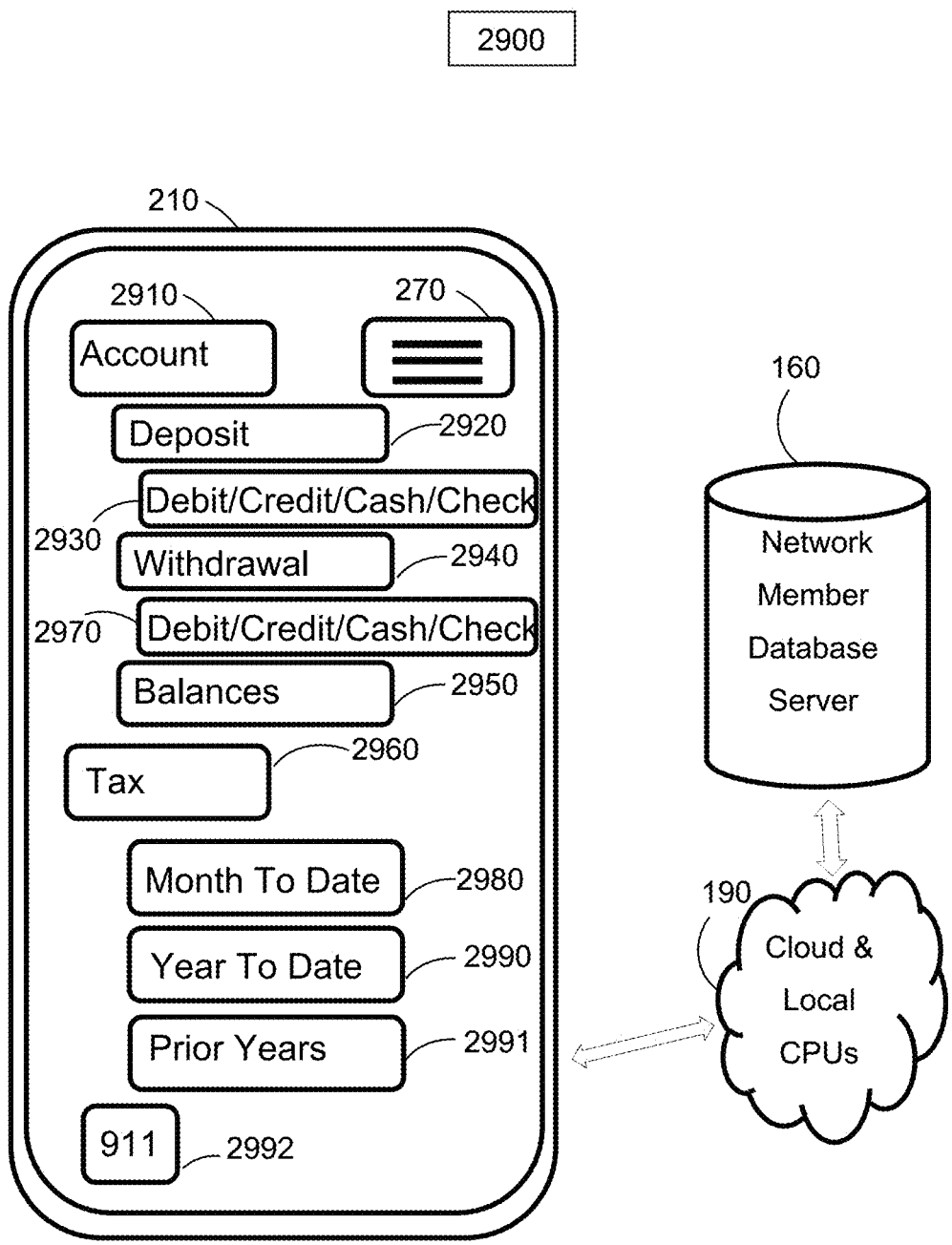
FIG. 29 illustrates a user accounting configuration for a transformed time interval unit or security multi-layered network node topology for use with participating, transacting and/or trading transformed time interval unit auctions in accordance with implementations of various techniques described herein.

FIG. 29 illustrates an exemplary user accounting configuration 2900 for a transformed time interval object community linked time interval object unit or security multi layered network node topology in one exemplary implementation of participating, transacting and/or trading transformed time interval object community linked time interval object capacity unit auctions in accordance with some embodiments. In some embodiments, the multi layered network node topology of participating, transacting and/or trading transformed time interval object community linked time interval object capacity configuration 2900 includes the following accounting elements, or a subset or superset thereof:

computing device unit GUI 210 to display method of multi layered network node topology for forward market of time interval object community linked time interval object units.

exemplary hamburger menu toggle 270 to move between different application configurations;

exemplary account button 2910 to edit or confirm user account data;

exemplary deposit button 2920 to add transaction funds or transaction currency or transaction balances to the user account;

exemplary deposit method button 2930 to add transaction funds or transaction currency or transaction balances to the user account through Debit, Credit, Cash, Check, virtual currency, digital currency or a plurality of other payment methods;

exemplary withdrawal button 2940 to send transaction funds or transaction currency or transaction balances to the user account in a different institution;

exemplary withdrawal method button 2970 to send transaction funds or transaction currency or transaction balances to the user account at a different institution through Debit, Credit, Cash, Check, virtual currency, digital currency or a plurality of other payment methods;

exemplary balances button 2950 to confirm user account balances;

exemplary tax button 2960 to track user account activity for taxation reporting;

exemplary month to date tax reporting button 2980;
exemplary year to date tax reporting button 2990;
exemplary prior year tax reporting button 2991;
exemplary "911" security button 2991;
exemplary Network Member Database Server 160;
exemplary cloud and CPU and Network configuration 190 to send and receive Network Member account data.

In some embodiments, user account 2910 data may be displayed with voice or screen or non-screen computing devices with instructions from the GUI 210 in accordance with instructions on the method and system. In some embodiments, user deposit 2920 data may be displayed with voice or screen or non-screen computing devices with instructions from the GUI 210 in accordance with instructions on the method and system. In some embodiments, user deposit method 2930 data such as Debit, Credit, Cash, Check, virtual currency, digital currency or a plurality of other payment methods may be displayed with voice or screen or non-screen computing devices with instructions from the GUI 210 in accordance with instructions on the method and system. In some embodiments, user withdrawal 2940 data may be displayed with voice or screen or non-screen computing devices with instructions from the GUI 210 in accordance with instructions on the method and system. In some embodiments, user withdrawal method 2970 data such as Debit, Credit, Cash, Check, virtual currency, digital currency or a plurality of other payment methods may be displayed with voice or screen or non-screen computing devices with instructions from the GUI 210 in accordance with instructions on the method and system to place money in the system account into a different institution specified by the user 110. In some embodiments, user balances 2950 data may be displayed with voice or screen or non-screen computing devices with instructions from the GUI 210 in accordance with instructions on the method and system. In some embodiments, user tax button 2960 data may be displayed with voice or screen or non-screen computing devices with instructions from the GUI 210 in accordance with instructions on the method and system. In some embodiments, user month to date tax data button 2980, year to date tax data button 2990, prior year tax data button 2991 may be displayed with voice or screen or non-screen computing devices with instructions from the GUI 210 in accordance with instructions on the method and system. In some embodiments, the accounting and tax information may be stored in the Network Member Database Server 222 and transmitted through the cloud, network and CPUs 224, 214 to the GUI computing device 210. In some embodiments, time interval object or time interval object unit accounting and fund interfaces may be a subset or superset of the aforementioned in the formation of an open forward market price-time priority auction for a multi layered network node topology for a forward market of time interval object community linked time interval object units.

Figure 30:
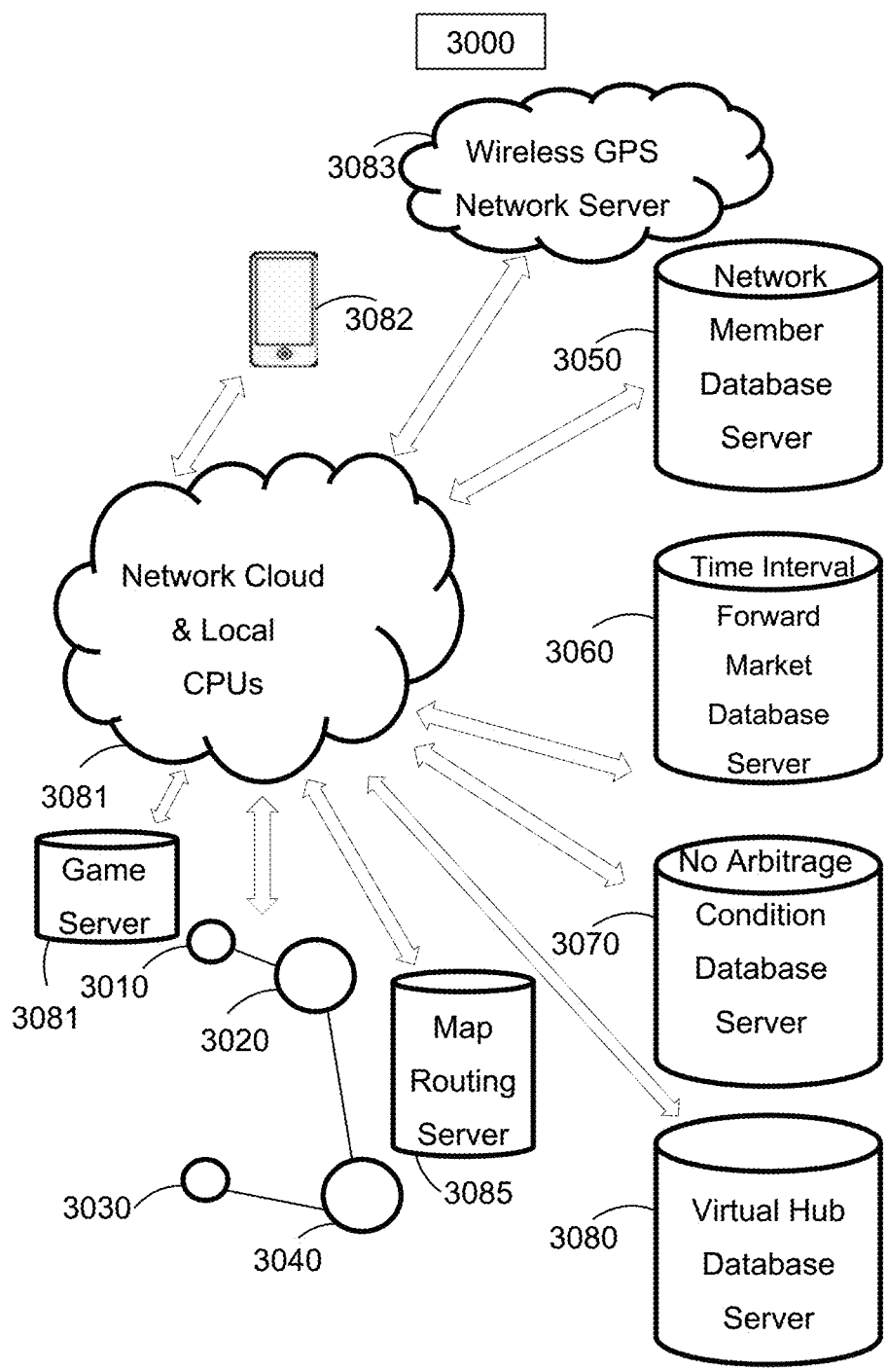
FIG. 30 illustrates a network configuration for a time interval unit multi-layered network node topology.

FIG. 30 illustrates an exemplary network configuration 3000 for a time interval object community linked time interval object or time interval object unit multi layered network node topology in one exemplary implementation of participating, transacting and/or trading time interval object or time interval object capacity unit auctions in accordance with some embodiments. In some embodiments, the multi layered network node topology of participating, transacting and/or trading time interval object community linked time interval object capacity configuration 3000 includes the following accounting elements, or a subset or superset thereof:

exemplary wireless GPS Network and Server 3083;
exemplary wireless computing device that is audio, video, screen or non-screen interfaced 3082;
exemplary Network Member Database Server 3050;
exemplary time interval object community linked Time interval object Forward Market Database Server 3060;
exemplary time interval object community linked Time interval object Forward Market Database Server 3060;
exemplary time interval object community linked No Arbitrage Condition Database Server 3070;
exemplary time interval object community linked Virtual Hub Database Server 3080;
exemplary Network, Network Cloud, and local CPUs 3081;

Exemplary Network Multi Layered Network Virtual Hub Node Topology for forward market time interval object community linked time interval object unit price-time priority auctions 3010, 3020, 3030, 3040.

In some embodiments, the network topology 3010 may utilize a voice or screen or non-screen computing device 3082 to interface with system and method instructions over a Network and Network Cloud and Networked CPUs 3081 to use instructions on CPUs to order a constrained or unconstrained virtual hub network topology auction over two or more virtual hub nodes 3010, 3020, 3030, 3040 over one or multiple modes of time interval object community linked time interval object with instructions and data from the Virtual Hub Database Server 3080, the No Arbitrage Condition Database Server 3070, the time interval object community linked Time interval object Forward Market Database Server 3060, the Network Member Database Server 3050 and the Wireless GPS Network Server 3083. Network Data may be displayed with voice or screen or non-screen computing devices with instructions from the GUI 210 in accordance with instructions on the method and system.

Figure 31:
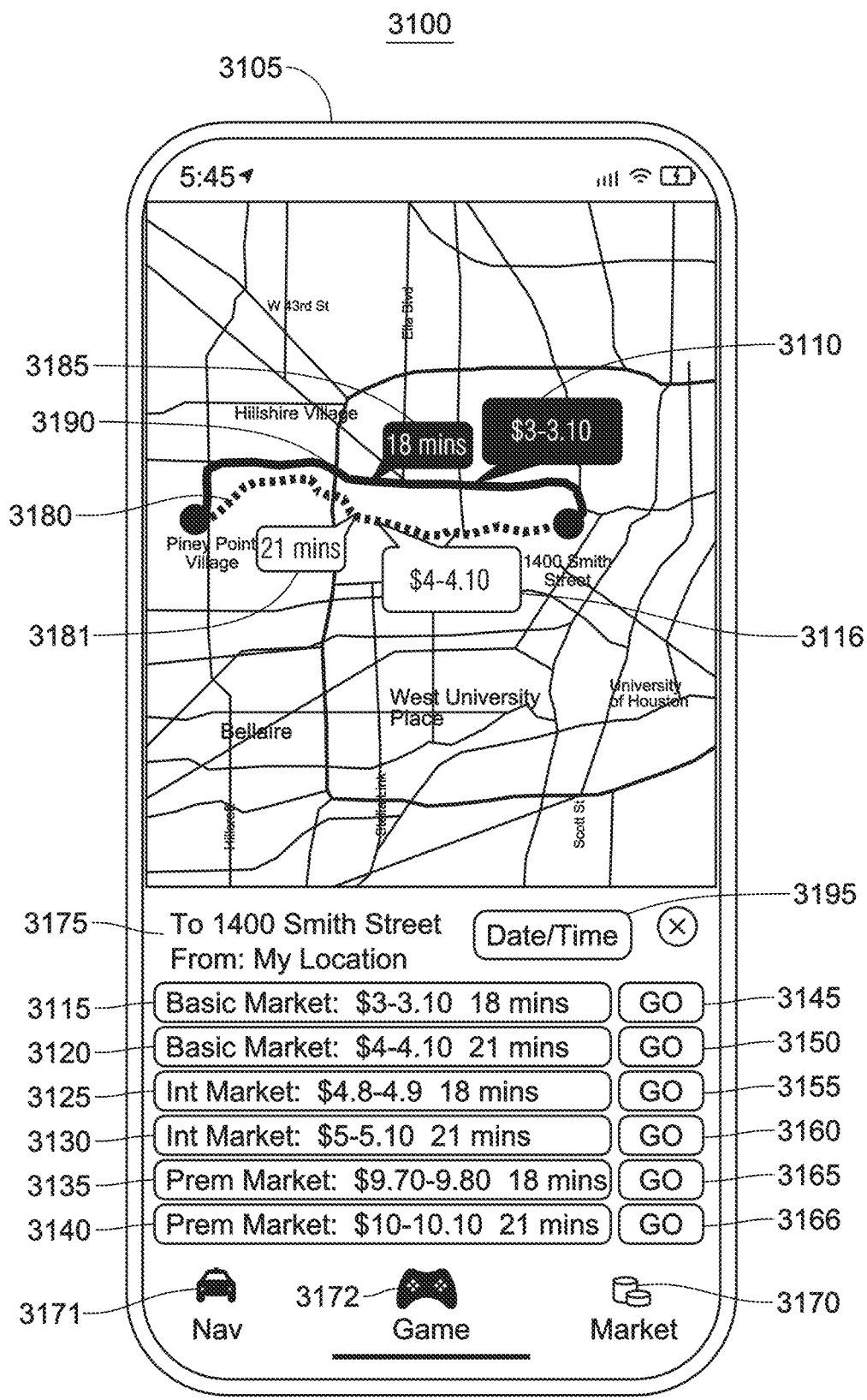
FIGS. 31-35 illustrate a market configuration in accordance with implementations of various techniques described herein.

FIG. 31 illustrates an exemplary network configuration 3100 integrating the disclosed method and system as a time interval object community linked layer on a traditional third party map software. In some embodiments, the multi layered network node topology of participating, transacting and/or trading transformed time interval object community linked time interval object capacity configuration 3100 includes the following accounting elements, or a subset or superset thereof:

exemplary computing device 3105;
exemplary subject input by user 3175;
exemplary subject node structure 3190 to satisfy user time interval object community linked subject request 3175;
exemplary alternative subject node structure 3180 to satisfy user time interval object community linked subject request 3175 with associated time 3181;
exemplary time estimate 3185 for subject 3190;
exemplary live price-time priority queue auction price value 3110 for subject 3190;
exemplary alternative live price-time priority queue auction price value 3116 for time interval object community linked subject 3180;
exemplary navigation mode button 3171;
exemplary game mode button 3172;
exemplary date and time modification button 3195 for disclosed subject 3175;
exemplary transformed forward time interval object community linked time interval object unit price-time priority auction value and modification feed 3115 and selection GO 3145 button to transact the given subject with a basic time interval object community linked time interval object unit or security feature and characteristic for one subject 3190 that satisfies the user subject request 3175;
exemplary alternative transformed forward time interval object community linked time interval object unit price-time priority auction value and modification feed 3120 and selection GO 3150 button to transact the given subject with a basic time interval object community linked time interval object unit or security feature and characteristic for one alternative subject 3180 that satisfies the user subject request 3175;
exemplary transformed forward time interval object community linked time interval object unit auction value and modification feed 3125 and selection GO 3155 button to transact the given subject with an intermediate time interval object community linked time interval object unit or security feature and characteristic for one subject 3190 that satisfies the user subject request 3175;
exemplary alternative transformed forward time interval object community linked time interval object unit auction value and modification feed 3130 and selection GO 3160 button to transact the given subject with an intermediate time interval object community linked time interval object unit or security feature and characteristic for one alternative subject 3180 that satisfies the user subject request 3175;
exemplary transformed forward time interval object community linked time interval object unit auction value and modification feed 3135 and selection GO 3165 button to transact the given subject with a premium time interval object community linked time interval object unit or security feature and characteristic for one subject 3190 that satisfies the user subject request 3175;
exemplary alternative time interval object community linked transformed forward time interval object community linked time interval object unit auction value and modification feed 3140 and selection GO 3165 button to transact the given subject with a premium time interval object community linked time interval object unit or security feature and characteristic for one alternative subject 3180 that satisfies the user subject request 3175;
exemplary market display feature 3170 as an overlay onto map routing for user requests 3175.

In some embodiments, map routing interfaces 3105 such as Apple Maps or TomTom or another third party, may integrate the disclosed method and system to display the transformed forward time interval object community linked time interval object unit or security market auction price along a various subject given various virtual hub topologies 1800 over the user 110 defined subject request 3175. The computing device 3105 may disclose over visual, audio or other communication methods the forward transformed time interval object community linked time interval object unit auction price 3110 on a given subject 3190. In yet other embodiments, the disclosed time interval object community linked time interval object unit transformation may communicate the forward transformed time interval object community linked time interval object unit or security auction price 3116 of an alternative subject 3180 such that a user may select either subject 3190 or 3180 based on the disclosed method and system price 3110 or 3116 which was generated by instructions from a plurality of users between two virtual hubs on the user defined subject 3175. The disclosed forward market time interval object community linked time interval object unit auction may be communicated on an on demand basis representing the current time and day or on a forward basis by changing the Date/Time 3195 user interface button feature to represent the then current market pricing for future time intervals on a plurality of given subjects 3190 and 3180 along the user requested virtual hub combination 3175. Time interval object community linked virtual hubs may represent the end points of a subject defined by the user 3175 or time interval object community linked virtual hubs may represent points along a given subject but not including the endpoints or time interval object community linked virtual hubs may represent points not along the time interval object community linked subject the user defined 3175. Time interval object community linked virtual hub combinations transform time interval object community linked time interval object capacity units into a forward market which allow users of the method and system to transact in the physical market by either delivering transformed time interval object community linked time interval object units as a instructor of a subject or capacity holder or by receiving them as a student or learning worker if the time interval object community linked unit is a package rather than a subject. A time interval object community linked time interval object unit or security represents an object which may be filled by a time interval object community linked time interval object unit. Further the forward transformed time interval object community linked time interval object unit market price-time priority queue auction 3170 overlay may be a layer on traditional GPS map routing software or as an alternative to time based routing or mileage based routing. The forward time interval object community linked time interval object unit market specification such as "Basic" 3115, 3120 or "Intermediate" 3125, 3130 or "Premium" 3135, 3140 may also have a plurality of other characteristics or levels which form the basis of a fungible transformed contract or substitutable contract between users which is exchangeable with the same terms and conditions if one user is unable to fulfil their contract obligations for the transformed time interval object community linked time interval object unit. In some embodiments, the navigation mode 3171 may move the user to step by step directions along the price based navigation time interval object community linked subject 3190. In some embodiments, the game mode 3172 may move the user to a game based overlay on the price based navigation time interval object community linked subject 3190. In some embodiments, the market mode 3170 may move the user to a market based overlay on the priced based navigation time interval object community linked subject 3190.

The disclosed method and system of a transformed time interval object community linked time interval object capacity unit may be fully functional as a layer in map routing software or as a stand-alone application 400, etc.

In some embodiments, the disclosed method and system time interval object community linked time interval object unit price-time priority queue auction price 3110 and 3116 has two prices or more in other embodiments. Two time interval object community linked subject prices 3110 are disclosed at $3 and $3.10. The former price of $3 is the price where a user is willing to buy or pay for a time interval object community linked time interval object unit along the given subject 3190. The later price of $3.10 is the price at which a user is willing to sell a time interval object community linked time interval object unit along the given subject 3190. The instructions of the auction may match the highest bidding price of $3 with the lowest selling price in the price queue when the prices match. In other words, in the exemplary embodiment, if a user wanted to sell a time interval object community linked time interval object unit at the current forward market price-time priority auction queue 3110 on subject 3190, the user would enter a price of $3 which is the current highest bidding price in the method and system queue 3110. By way of further example, another user may desire to buy a time interval object community linked time interval object unit on the forward transformed time interval object community linked time interval object unit auction method and system on subject 3190, to match, the user would enter a price of $3.10 which is the lowest selling price of a seller on the forward market time interval object community linked time interval object unit auction method and system.

Figure 32:
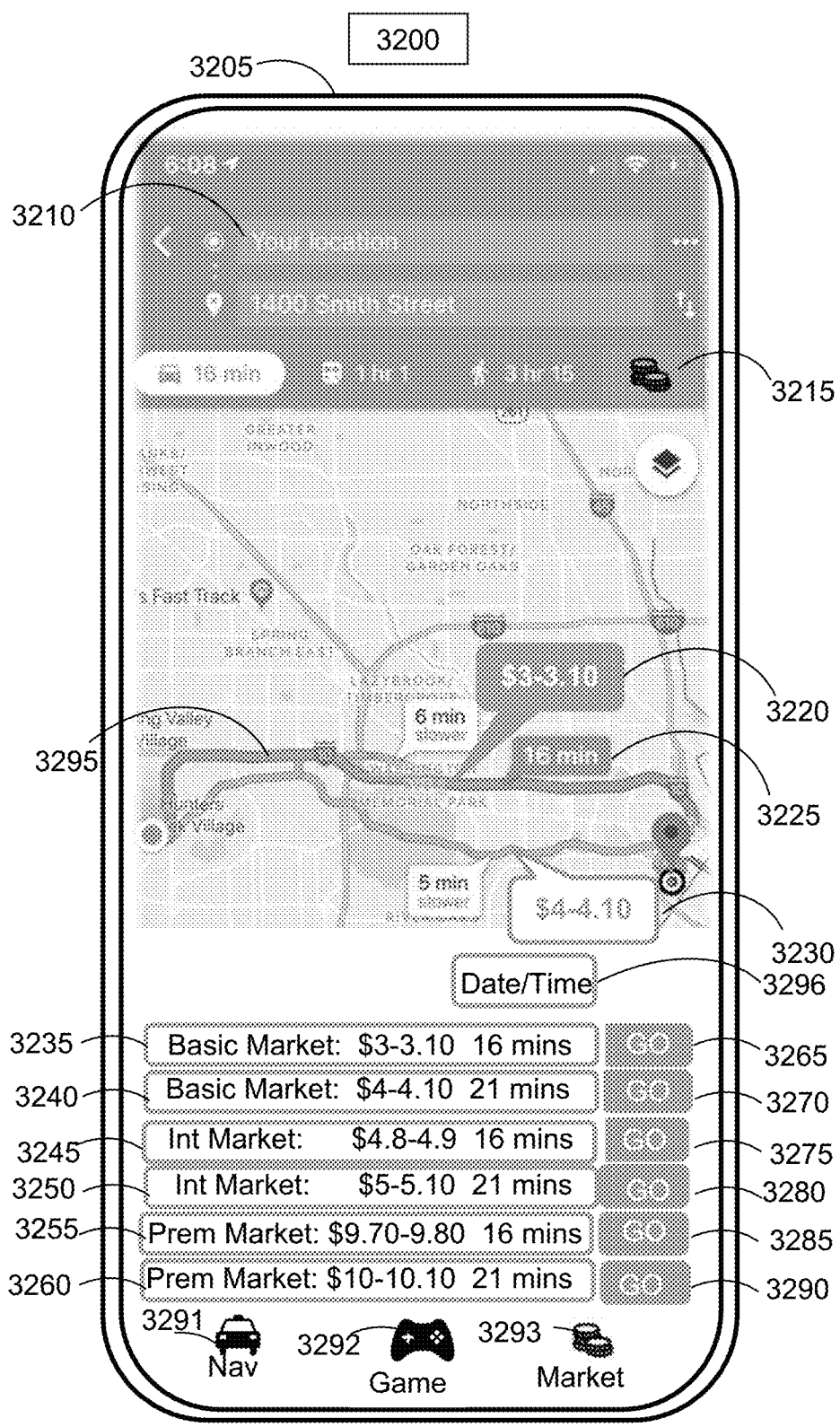

FIG. 32 illustrates another exemplary network configuration 3200 integrating the disclosed method and system as a time interval object community linked layer on another traditional third party map software. In some embodiments, the multi layered network node topology of participating, transacting and/or trading time interval object community linked time interval object capacity unit configuration 3200 includes the following accounting elements, or a subset or superset thereof:

exemplary computing device 3205;
exemplary subject input by user 3210;
exemplary time interval object community linked subject node structure 3295 to satisfy user time interval object community linked subject request 3210;

exemplary alternative time interval object community linked subject node structure 3230 to satisfy user time interval object community linked subject request 3210 with associated time;
exemplary time estimate 3225 for subject 3295;
exemplary navigation mode button 3291;
exemplary game mode button 3292;
exemplary market mode button 3293;
exemplary live price-time priority queue auction price value 3220 for subject 3295;
exemplary alternative live price-time priority auction price value 3230 for time interval object community linked subject 3230;
exemplary date and time modification button 3296 for disclosed time interval object community linked subject 3210;
exemplary transformed forward time interval object community linked time interval object unit or security auction value and modification feed 3235 and selection GO 3265 button to transact the given subject with a basic time interval object community linked time interval object unit feature and characteristic for one subject 3295 that satisfies the user subject request 3210;
exemplary alternative transformed forward time interval object community linked time interval object unit or security price-time priority auction value and modification feed 3240 and selection GO 3270 button to transact the given subject with a basic time interval object community linked time interval object unit feature and characteristic for one alternative subject 3230 that satisfies the user subject request 3210;
exemplary transformed forward time interval object community linked time interval object unit or security auction value and modification feed 3245 and selection GO 3275 button to transact the given subject with an intermediate time interval object community linked time interval object unit feature and characteristic for one subject 3295 that satisfies the user time interval object community linked subject request 3210;
exemplary alternative transformed forward time interval object community linked time interval object unit or security auction value and modification feed 3250 and selection GO 3280 button to transact the given subject with an intermediate time interval object community linked time interval object unit feature and characteristic for one alternative time interval object community linked subject 3230 that satisfies the user time interval object community linked subject request 3210;
exemplary transformed forward time interval object community linked time interval object unit or security auction value and modification feed 3255 and selection GO 3285 button to transact the given subject with a premium time interval object community linked time interval object unit feature and characteristic for one time interval object community linked subject 3295 that satisfies the user time interval object community linked subject request 3210;
exemplary alternative transformed forward time interval object community linked time interval object unit or security price-time priority auction value and modification feed 3260 and selection GO 3290 button to transact the given subject with a premium transformed time interval object community linked time interval object unit feature and characteristic for one alternative time interval object community linked subject 3230 that satisfies the user time interval object community linked subject request 3210;

exemplary market display feature 3215 as an overlay onto map time interval object community linked routing for user requests 3210.

In some embodiments, map routing interfaces 3205 such as Google Maps or Garmin or another third party navigation method, may integrate the disclosed method and system to display the transformed forward time interval object community linked time interval object unit or security market auction price along a various subject given various virtual hub topologies 1800 over the user 110 defined subject request 3210. The computing device 3205 may disclose over visual, audio or other communication methods the forward transformed time interval object community linked time interval object unit or security auction price 3220 on a given subject 3295. In yet other embodiments, the disclosed time interval object community linked time interval object unit transformation may communicate the forward transformed time interval object community linked time interval object unit auction price 3230 of an alternative subject 3230 such that a user may select either subject 3295 or 3230 based on the disclosed method and system price 3230 or 3220 which was generated by instructions from a plurality of users between two time interval object community linked virtual hubs on the user defined time interval object community linked subject 3210 and instructions to generate a price-time priority queue for buyers and sellers of time interval object community linked time interval object units for given subjects. In some embodiments, the user(s) 110 may alter the date 3296 such that the transformed time interval object community linked time interval object unit or security may be updated with user 110 submitted prices 3235 for forward looking time periods. The disclosed forward market transformed time interval object community linked time interval object unit or security price-time priority queue auction may be communicated on an on demand basis representing the current time and day or on a forward basis by changing the Date/Time 3296 user interface button feature to represent the then current market pricing for future time intervals on a plurality of given subjects 3295 and 3230 along the user requested virtual hub combination 3210. Time interval object community linked virtual hubs may represent the end points of a subject defined by the user 3210 or virtual hubs may represent points along a given subject but not including the endpoints or time interval object community linked virtual hubs may represent points not along the subject the user defined 3210. Time interval object community linked virtual hub combinations transform time interval object capacity units or securities into a forward market which allow users of the method and system to transact in the virtual delivery or physical market or financial swap market by either delivering transformed time interval object community linked time interval object units as a driver of a vehicle or capacity holder or by receiving them as a passenger or package if the unit is a package rather than a person. In some embodiments, a transformed time interval object community linked time interval object unit represents subject matter on a particular topic. Further the forward transformed time interval object community linked time interval object unit market auction 3215 overlay may be a layer on traditional GPS map routing software as an alternative to time based routing. The forward time interval object community linked time interval object unit market specification such as "Basic" 3235, 3240 or "Intermediate" 3245, 3250 or "Premium" 3255, 3260 may also have a plurality of other characteristics or levels which form the basis of a fungible contract or substitutable contract between users which is exchangeable with the same terms and conditions if one user is unable to fulfil their contract obligations for the transformed time interval object community linked time interval object unit. In some embodiments, the navigation mode 3291 may move the user to turn by turn directions along the price based navigation time interval object community linked subject 3295. In some embodiments, the game mode 3292 may move the user to a game based overlay on the price based navigation time interval object community linked subject 3295. In some embodiments, the market mode 3293 may move the user to a market based overlay on the priced based navigation time interval object community linked subject 3295.

The disclosed method and system of a transformed time interval object community linked time interval object capacity unit may be fully functional as a layer in map routing software 3200 or as a stand alone application 400, etc.

In some embodiments, the disclosed method and system transformed time interval object community linked time interval object unit or security price-time priority auction price 3220 and 3230 has two prices or more in other embodiments. Two subject prices 3220 are disclosed at $3 and $3.10. The former price of $3 is the price where a user is willing to buy or pay for a time interval object community linked time interval object unit along the given subject 3295. The later price of $3.10 is the price at which a user is willing to sell a time interval object community linked time interval object unit along the given subject 3295. The instructions of the price-time priority auction may match the highest bidding price of $3 with the lowest selling price in the price queue when the prices match. In other words, in the exemplary embodiment, if a user wanted to sell a time interval object community linked time interval object unit at the current forward market price-time auction queue 3220 on subject 3295, the user would enter a price of $3 which is the current highest bidding price in the method and system queue 3220. By way of further example, another user may desire to buy a transformed time interval object community linked time interval object unit on the forward transformed time interval object unit or security auction method and system on subject 3295, to match, the user would enter a price of $3.10 which is the lowest selling price of a seller on the forward market transformed time interval object community linked time interval object unit price-time priority auction method and system.

Figure 33:
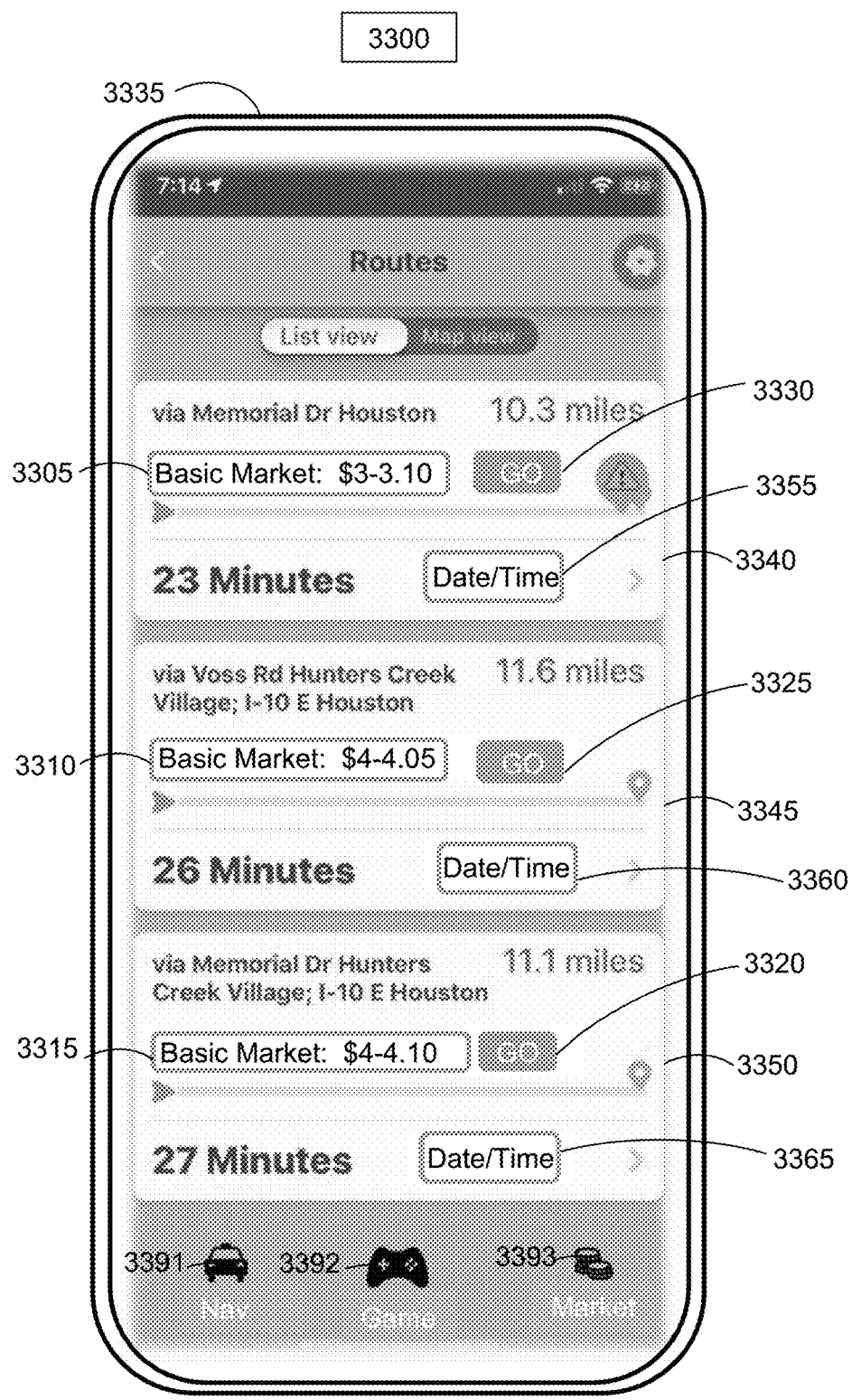

FIG. 33 illustrates another exemplary network configuration 3300 integrating the disclosed method and system as a layer on another traditional third party map software. In some embodiments, the multi layered network node topology of participating, transacting and/or trading time interval object community linked time interval object capacity configuration 3300 includes the following accounting elements, or a subset or superset thereof:

exemplary computing device 3335;

exemplary time interval object community linked subject node structure 3340 to satisfy user subject requests with associated time and price;

exemplary alternative time interval object community linked subject node structure 3345 to satisfy user subject request with associated time and price;

exemplary alternative subject node structure 3350 to satisfy user subject request with associated time and price;

exemplary live price-time priority auction queue price value 3305 for price based time interval object community linked subject 3340;

exemplary navigation mode button 3391;

exemplary game mode button 3392;

exemplary market mode button 3393;

exemplary go 3330 button to transact or modify the price based time interval object community linked routing;

exemplary go 3325 button to transact or modify the price based time interval object community linked routing;

exemplary go 3320 button to transact or modify the price based time interval object community linked routing;

exemplary alternative live price-time priority auction price value 3310 for time interval object community linked subject 3345;

exemplary alternative live price-time priority auction price value 3315 for time interval object community linked subject 3350;

exemplary date and time modification button 3355 for disclosed time interval object community linked subject 3340;

exemplary date and time modification button 3360 for disclosed time interval object community linked subject 3345;

exemplary date and time modification button 3365 for disclosed time interval object community linked subject 3350;

In some embodiments, map routing interfaces 3335 such as Waze Maps or another third party, may integrate the disclosed method and system to display the transformed forward time interval object unit market price-time priority auction price along a various subject given various virtual hub topologies 1800 over the user 110 defined subject requests. The computing device 3335 may disclose over visual, audio or other communication methods the forward transformed time interval object community linked time interval object unit or security auction price 3305 on a given subject 3340. In yet other embodiments, the disclosed time interval object unit time interval object community linked transformation may communicate the forward transformed time interval object unit auction price 3310 of an alternative subject 3345 such that a user may select either subject 3340 or 3345 or 3350 based on the disclosed method and system price 3305 or 3310 or 3315 which was generated by instructions from a plurality of users between two time interval object community linked virtual hubs on the user defined subject and instructions to generate a price-time queue for buyers and sellers of time interval object community linked time interval object units along given subjects. In some embodiments, the disclosed forward market transformed time interval object community linked time interval object unit or security auction may be communicated on an on demand basis representing the current time and day or on a forward basis by changing the Date/Time 3340, 3360, 3365 user interface button feature to represent the then current market pricing for future time intervals on a plurality of given subjects 3340 or 3345 or 3350 along the user requested virtual hub combination. In some embodiments, the user(s) 110 may alter the date 3355 such that the transformed time interval object community linked time interval object unit or security may be updated with user 110 submitted prices 3305 for forward looking time periods. Time interval object community linked virtual hubs may represent the end points of a subject defined by the user or virtual hubs may represent points along a given subject but not including the endpoints or time interval object community linked virtual hubs may represent points not along the physical path the user defined but on a given subject. Virtual hub combinations transform time interval object community linked time interval object capacity units into a forward market which allow users of the method and system to transact in the physical market by either delivering time interval object community linked time interval object units as a driver of a vehicle or capacity holder or by receiving them as a passenger or package if the unit is a package rather than a person. In some embodiments, a time interval object community linked time interval object unit represents a subject which has been transformed, unitized or securitized. Further the forward time interval object unit market price-time priority auction 3305 overlay may be a layer on traditional GPS map routing software or as an alternative to time based routing. The forward time interval object community linked time interval object unit market specification such as "Basic" 3305 may also have a plurality of other transformed characteristics or levels which form the basis of a fungible contract or substitutable contract specifications between users which is exchangeable with the same terms and conditions if one user is unable to fulfil their contract obligations for the transformed time interval object community linked time interval object unit or security. In some embodiments, the navigation mode 3391 may move the user to turn by turn directions along the price based navigation time interval object community linked subject 3350. In some embodiments, the game mode 3392 may move the user to a game based overlay on the price based navigation time interval object community linked subject 3340. In some embodiments, the market mode 3393 may move the user to a market based overlay on the priced based navigation time interval object community linked subject 3350.

The disclosed method and system of a transformed time interval object community linked time interval object capacity unit may be fully functional as a layer in map routing software 3300 or as a stand alone application 400, etc.

In some embodiments, the disclosed method and system time interval object unit price-time priority auction price 3305 and 3310 and 3315 has two prices or more in other embodiments. Two subject prices 3305 are disclosed at $3 and $3.10. The former price of $3 is the price where a user is willing to buy or pay for a time interval object community linked time interval object unit along the given subject 3340. The later price of $3.10 is the price at which a user is willing to sell a time interval object community linked time interval object unit along the given subject 3340. The instructions of the price-time priority auction may match the highest bidding price of $3 with the lowest selling price in the price queue when the prices match. In other words, in the exemplary embodiment, if a user wanted to sell a time interval object community linked time interval object unit at the current forward market auction queue 3305 on subject 3340, the user would enter a price of $3 which is the current highest bidding price in the method and system queue 3305. By way of further example, another user may desire to buy a time interval object community linked time interval object unit on the forward time interval object community linked time interval object unit auction method and system on subject 3340, to match, the user would enter a price of $3.10 which is the lowest selling price of a seller on the forward market time interval object community linked time interval object unit price-time priority auction method and system.

Figure 34:
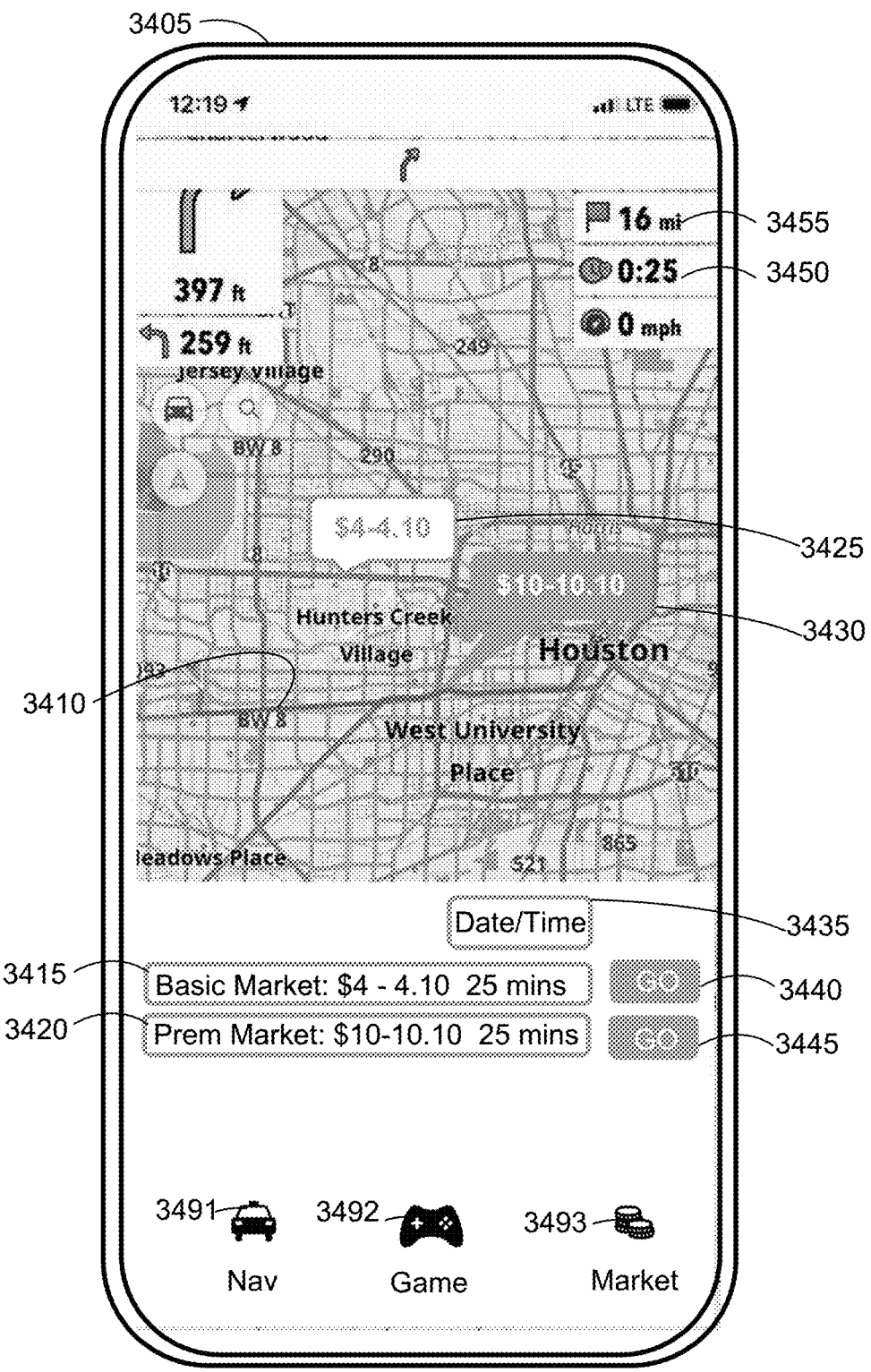

FIG. 34 illustrates another exemplary network configuration 3400 integrating the disclosed method and system as a layer on another traditional third party map software. In some embodiments, the multi layered network node topology of participating, transacting and/or trading transformed time interval object community linked time interval object capacity unit or security configuration 3400 includes the following accounting elements, or a subset or superset thereof:

exemplary computing device 3405;

exemplary subject 3410;

exemplary live price-time priority auction price value 3430 for time interval object community linked subject 3410;

exemplary alternative live price-time priority auction price value 3425 for time interval object community linked subject 3425;

exemplary navigation mode button 3491;

exemplary game mode button 3492;

exemplary market mode button 3493;

exemplary date and time modification button 3435 for disclosed time interval object community linked subject 3410;

exemplary mileage estimate 3455 for disclosed subject 3410;

exemplary subject estimate 3450 for disclosed subject 3410;

exemplary transformed forward time interval object community linked time interval object unit auction value and modification feed 3415 and selection GO 3440 button to transact the given subject with a basic time interval object unit or security feature and characteristic for one subject 3425 that satisfies the user subject request;

exemplary transformed forward time interval object community linked time interval object unit or security auction value and modification feed 3420 and selection GO 3445 button to transact the given subject with a premium time interval object community linked time interval object unit feature and characteristic for one subject 3410 that satisfies the user subject request;

In some embodiments, the navigation mode 3491 may move the user to turn by turn directions along the price based navigation time interval object community linked subject 3410. In some embodiments, the game mode 3492 may move the user to a game based overlay on the price based navigation subject 3410. In some embodiments, the market mode 3493 may move the user to a market based overlay on the priced based navigation subject 3410.

Figure 35:
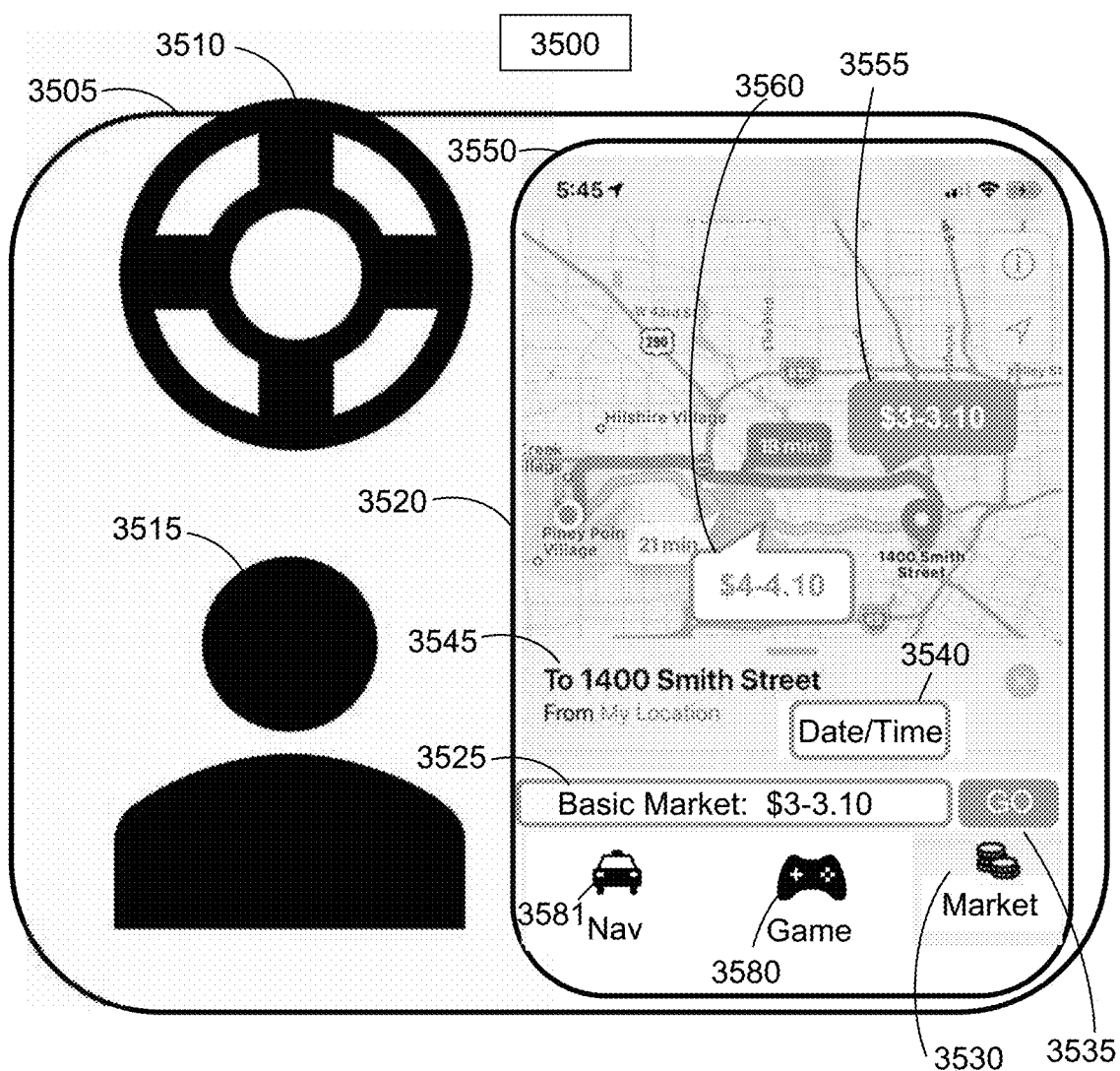

FIG. 35 illustrates another exemplary network configuration 3500 integrating the disclosed method and system as a layer on another traditional third party map software in the setting of a vehicle GPS navigation system or in a entertainment system of a vehicle or remote computerized environment. In some embodiments, the multi layered network node topology of participating, transacting and/or trading time interval object community linked time interval object capacity configuration 3500 includes the following accounting elements, or a subset or superset thereof:

exemplary computing device 3550;

exemplary vehicle time interval object community linked time interval object unit carrier unit 3505;

exemplary vehicle time interval object community linked time interval object unit steering wheel 3510;

exemplary navigation mode button 3581;

exemplary game mode button 3580;

exemplary market mode button 3530;

exemplary user of time interval object community linked time interval object unit as seller or driver 3515;

exemplary user subject request address information 3545;

exemplary date and time modification button 3540 for disclosed subject 3545;

exemplary transformed forward time interval object community linked time interval object unit auction value and modification feed 3525 and selection GO 3535 button to transact the given subject with a basic time interval object unit feature and characteristic for one subject 3545 that satisfies the user subject request;

exemplary live price-time priority auction price value 3555 for price based time interval object community linked subject 3555;

exemplary live price-time priority auction price value 3560 for price based alternative time interval object community linked subject 3560;

exemplary market layer routing overlay 3530;

In some embodiments, the disclosed method and system transformed time interval object community linked time interval object unit or security auction market layer may be in a vehicle unit GPS navigation system 3550. In some embodiments, the user 3515 may input driving address instructions 3545 that have an origin location and a destination location. In some embodiments, the user 3515 may communicate with the computing device 3550 through a touchscreen 3520 or and audio interface or another interface. In some embodiments the user 3515 may edit the date/time 3540 button to communicate the market price-time priority auction price based time interval object community linked subject 3555 from on demand or current time to a forward time or date. Market price-time priority auction based pricing 3555 may vary by date and time due to a plurality of market factors. In some embodiments the user 3515 may edit the market based auction price for the time interval object community linked time interval object units by selecting the market feature button 3525. In some embodiments the user 3515 may select a give time interval object community linked time interval object unit auction price to transact by selecting the go button 3535. In some embodiments, the navigation mode 3581 may move the user to turn by turn directions along the price based navigation time interval object community linked subject 3555. In some embodiments, the game mode 3580 may move the user to a game based overlay on the price based navigation subject 3555. In some embodiments, the market mode 3530 may move the user to a market based overlay on the priced based navigation time interval object community linked subject 3555.

In some embodiments, the disclosed method and system time interval object community linked time interval object unit auction price 3555 and 3560 has two prices or more in other embodiments. Two subject prices 3555 are disclosed at $3 and $3.10. The former price of $3 is the price where a user is willing to buy or pay for a time interval object community linked time interval object unit along the given subject 3545. The later price of $3.10 is the price at which a user is willing to sell a time interval object community linked time interval object unit along the given subject 3545. The instructions of the auction may match the highest bidding price of $3 with the lowest selling price in the price queue when the prices match. In other words, in the exemplary embodiment, if a user 3515 wanted to sell a time interval object community linked time interval object unit at the current forward market auction queue 3555 on subject 3545, the user 3515 would enter a price of $3 which is the current highest bidding price in the method and system queue 3555. By way of further example, another user may desire to buy a time interval object community linked time interval object unit on the forward transformed time interval object community linked time interval object unit or security auction method and system on subject 3545, to match, the user would enter a price of $3.10 which is the lowest selling price of a seller on the forward market transformed time interval object community linked time interval object unit or security auction method and system. In some embodiments, alternative time interval object community linked subjects based on prices in alternative time interval object community linked time interval object unit price-time priority auctions 3560 may have different prices based on supply and demand conditions. In some embodiments the market based routing layer 3530 serves as an alternative to time based routing or mileage based routing which are fundamentally different premises. In some embodiments, the overall software system 3505 and associated instructions may ask the user 3515 with visual or audio interface if the user 3515 would like to monetize their subjects upon starting any navigation sequence for transformed time interval object community linked time interval object units or securities.

Figure 36:
FIGS. 36-39 illustrate a gaming configuration in accordance with implementations of various techniques described herein.

FIG. 36 illustrates another exemplary network configuration 3600 integrating the disclosed method and system as a game layer on another internal mapping system or traditional third party map system in the setting of a mobile computing device. In some embodiments, the multi layered network node topology of participating, transacting and/or trading transformed time interval object community linked time interval object capacity unites or securities for price based navigation configuration 3600 includes the following accounting elements, or a subset or superset thereof:

exemplary computing device 3605;
exemplary game overlay user score 3610;
exemplary game overlay user power 3615;
exemplary game overlay SOV (single occupancy vehicle) count 3620;
exemplary game overlay weapon strength 3625;
exemplary game overlay account balance 3630;
exemplary game overlay passenger pick ups 3688;
exemplary game overlay Single Occupancy Vehicle target 3645;
exemplary game overlay Single Occupancy Vehicle weapon 3650;
exemplary game overlay GPS standard map view 3655;
exemplary game overlay augmented or mixed reality view 3660;
exemplary game overlay passenger mode 3687;
exemplary game overlay fire button 3665;
exemplary game overlay multi-purpose direction button 3670;
exemplary game overlay go button 3680;
exemplary game overlay stop button 3675;
exemplary navigation overlay button 3686;
exemplary game overlay button 3689;
exemplary market overlay button 3685;
exemplary market overlay weapon selection button 3683, 3682, 3681, 3694;
exemplary market overlay aim finder toggle 3684.

In some embodiments, the game overlay 3689 awards score and points for destroying the single occupancy vehicle 3620, compute and distribute positive or negative time interval object community linked time interval object unit game auction strategy points 3610 or power 3615 or rewards 3630 based on any superset combination or subset combination of price 3635, subject mileage or subject matter 3640, number of single occupancy vehicles destroyed or passed 3620, number of passengers 3688, subject time estimates 3640, time interval object community linked time interval object unit subject 3640, time interval object community linked time interval object unit specifications 3415, time interval object community linked time interval object unit model type 4000 based on model type and age 4000, time interval object community linked time interval object unit make type 4000, time interval object unit age 4000, matched time interval object unit specification 800 and 620, matched time interval object unit fuel type 4000, matched time interval object community linked time interval object unit emission specification 4000, cumulative user time interval object community linked time interval object unit specifications 4100, time interval object unit rating 4100, time interval object unit safety 4100, time interval object unit time 4100, time interval object community linked time interval object unit delay, time interval object community linked time interval object unit driver or instructor rating 4100, time interval object community linked time interval object unit rider or student rating 4100, time interval object community linked time interval object unit timeliness relative to contract specification 4100.

In some embodiments, the game overlay 3689 may use a plurality of weapon or scoring configurations such as a rifle 3683, an axe 3681, a flower gift 3682, a X logo 3694 to take away points or gain points from other users on the system. In some embodiments the scoring may be independent of other players on the system, but dependent on the users actions in the game overlay 3689. In some embodiments a selected weapon 3650 may be used to destroy single occupancy vehicles. In some embodiments the user may accelerate with the go button 3680 to avoid an attack or fire. In some embodiments the user may slow down or stop with the stop button 3675 to avoid enemy fire or attack. In some embodiments, the stop button 3675 may interface with an autonomous driving system of a vehicle to pick up passengers along a price based navigation time interval object community linked subject to increase the score of the player 3610 and increase the balances 3630 by earning money on the system. In some embodiments user(s) may be identified by the X logo 3694 or by a person logo who is a bidder on the priced based navigation time interval object community linked subject 3640 to increase score and balances 3630. In some embodiments user(s) may scan navigation view 3655 or augmented reality view 3660 to look for single occupancy vehicle targets or X logo(s) 3694 or 3645 for users who are bidding on the price based navigation time interval object community linked subject 3640.

In some embodiments, the strategy of the priced based navigation game overlay may to instruct as many students as possible over virtual transport to reduce pollution as much as possible along the price based navigation subject 3640, destroy as many single occupancy vehicles along the price based navigation subject 3640 and to give flowers 3682 and rewards to time interval object community linked time interval object unit providers who have more than one person in the vehicle along the price based navigation subject 3640. In some embodiments user(s) may work independently or collectively in tribes to maximize user score in strategy. In some embodiments, the price-time priority queue time interval units and associated secondary markets and creation of geolocation exchange units may be as a layer on third party gaming systems for people, gamers, celebrities, workers, doctors, lawyers, ranked players, athletes, musicians, chefs, or other skill based people with time interval units to sell to play a game with a user.

Figure 37:
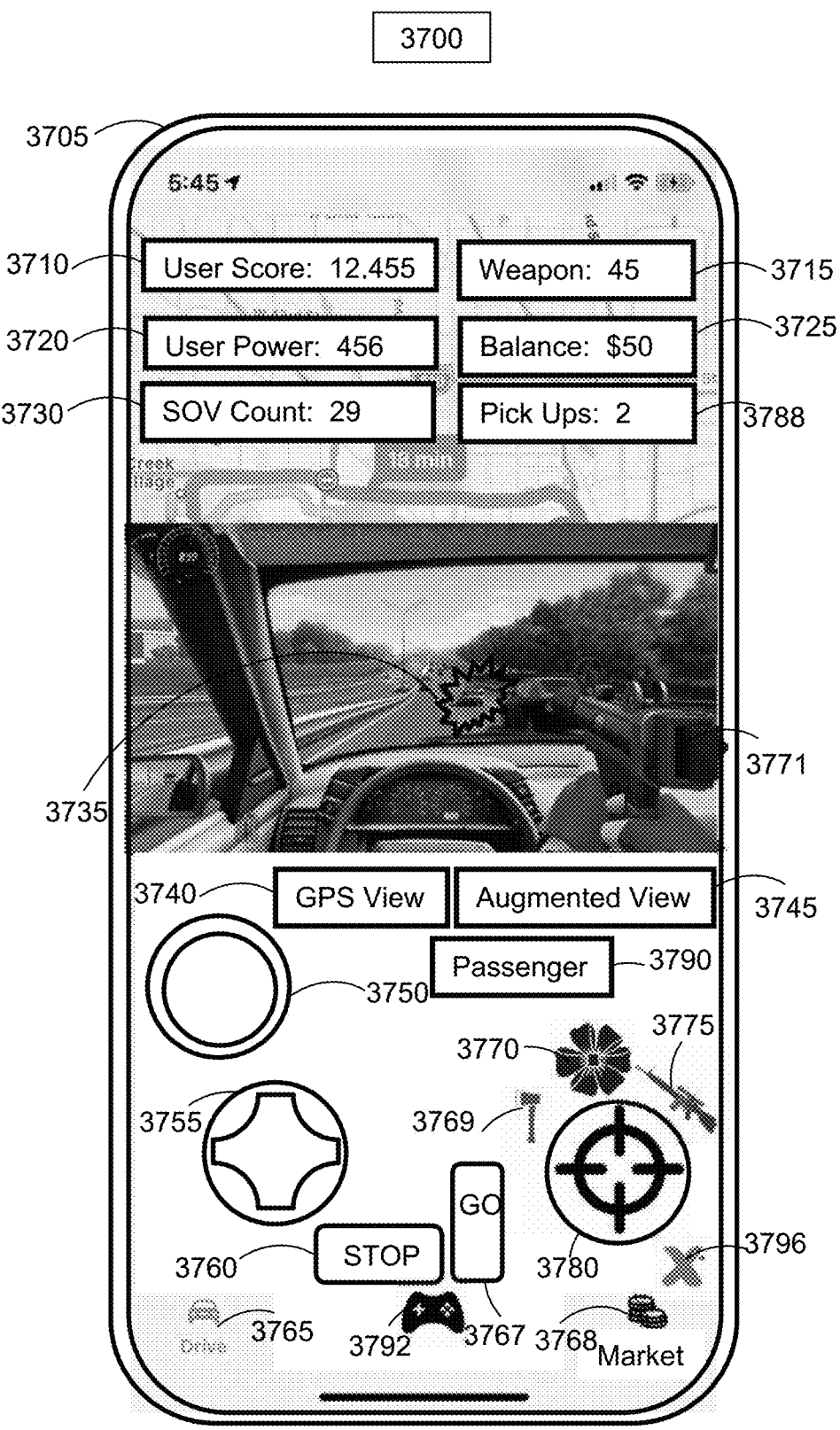

FIG. 37 illustrates another exemplary network configuration 3700 integrating the disclosed method and system as a game layer on another internal mapping navigation system or traditional third party navigation map system in the setting of a mobile computing device. In some embodiments, the multi layered network node topology of participating, transacting and/or trading time interval object community linked time interval object capacity for price based navigation time interval object community linked configuration 3700 includes the following accounting elements, or a subset or superset thereof:

exemplary computing device 3705;
exemplary game overlay user score 3710;

exemplary game overlay user power 3720;
exemplary game overlay SOV (single occupancy vehicle) count 3730;
exemplary game overlay weapon strength 3715;
exemplary game overlay account balance 3725;
exemplary game overlay passenger pick ups 3788;
exemplary game overlay Single Occupancy Vehicle target 3735;
exemplary game overlay Single Occupancy Vehicle weapon 3771;
exemplary game overlay GPS standard map view 3740;
exemplary game overlay augmented or mixed reality view 3745;
exemplary game overlay passenger mode 3790;
exemplary game overlay fire button 3750;
exemplary game overlay multi-purpose direction button 3755;
exemplary game overlay go button 3767;
exemplary game overlay stop button 3760;
exemplary navigation overlay button 3765;
exemplary game overlay button 3792;
exemplary market overlay button 3768;
exemplary market overlay weapon selection button 3775, 3770, 3769, 3796;
exemplary market overlay aim finder toggle 3780.

In some embodiments, the game overlay view 3768 of the price based navigation system 3705 may alert the user to a single occupancy vehicle 3735 which would then be a target for the user to use a weapon 3771, 3775, 3769 to destroy the single occupancy vehicle to increase user score 3710. In some embodiments, the user may identify a vehicle as having more than one passenger in the vehicle and therefore award or gift flowers 3770 to the vehicle or time interval object community linked time interval object user in the price based navigation time interval object community linked game strategy. In some embodiments, the user may use a weapon 3771 against a single occupancy vehicle 3735 at which point the vehicle would explode and the passenger would be left without a vehicle in the augmented reality view 3745 or GPS view 3740. In some embodiments, the user may award flowers 3770 to a vehicle with more than one passenger to increase their score 3710 and the score of the user that has more than one passenger in their vehicle. In some embodiments user(s) may work independently or collectively in tribes to maximize user score in strategy. In some embodiments, the price-time priority queue time interval units and associated secondary markets and creation of geolocation exchange units may be as a layer on third party gaming systems for people, gamers, celebrities, workers, doctors, lawyers, ranked players, athletes, musicians, chefs, or other skill based people with time interval units to sell to play a game with a user.

Figure 38:
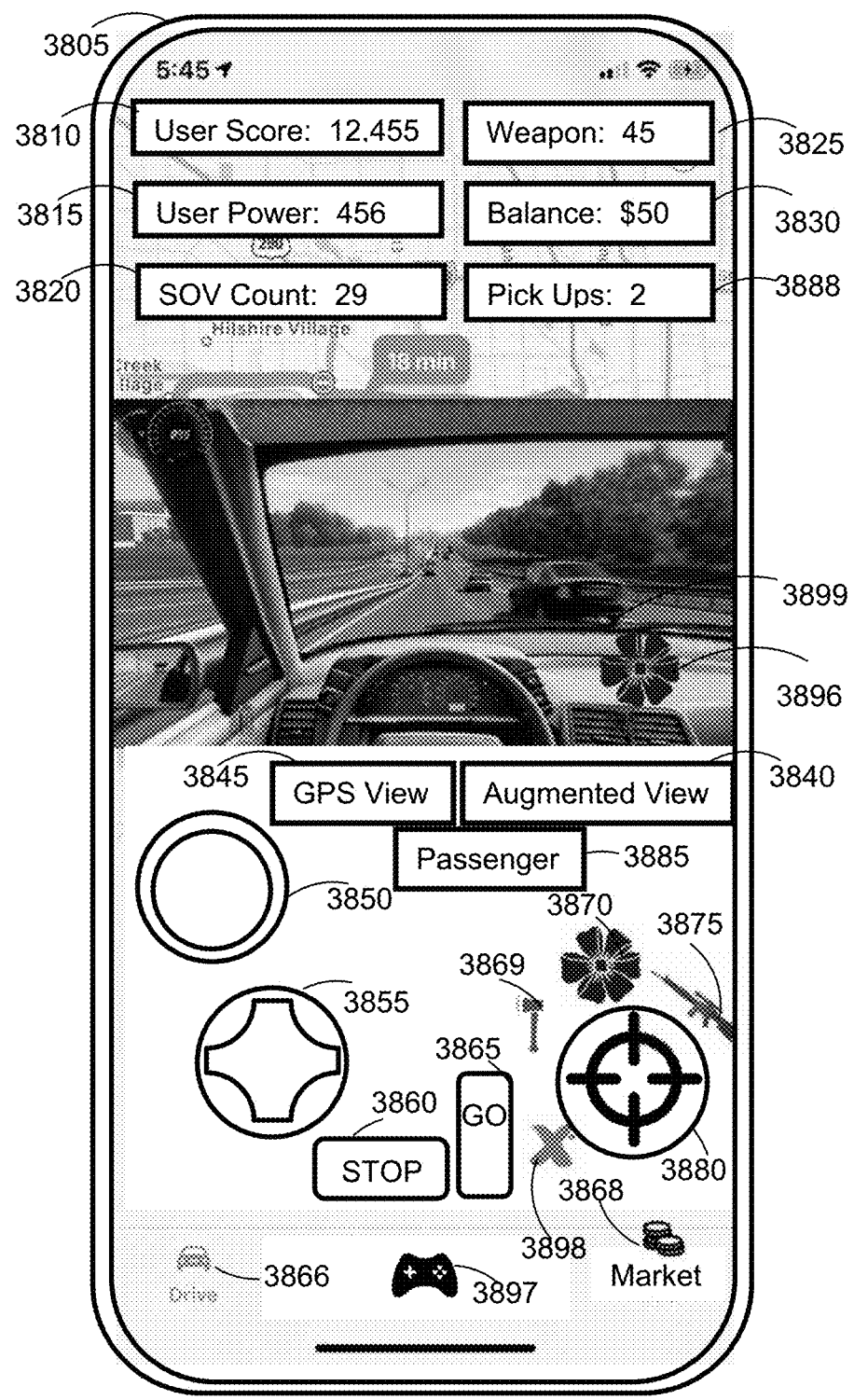

FIG. 38 illustrates another exemplary network configuration 3800 integrating the disclosed method and system as a game layer on another internal mapping navigation system or traditional third party navigation map system in the setting of a mobile computing device. In some embodiments, the multi layered network node topology of participating, transacting and/or trading time interval object community linked time interval object capacity for price based navigation configuration 3800 includes the following accounting elements, or a subset or superset thereof:
exemplary computing device 3805;
exemplary game overlay user score 3810;
exemplary game overlay user power 3815;
exemplary game overlay SOV (single occupancy vehicle) count 3820;
exemplary game overlay weapon strength 3825;
exemplary game overlay account balance 3830;
exemplary game overlay passenger pick ups 3888;
exemplary game overlay flower gift 3896;
exemplary game overlay GPS standard map view 3845;
exemplary game overlay augmented or mixed reality view 3840;
exemplary game overlay passenger mode 3885;
exemplary game overlay fire button 3850;
exemplary game overlay multi-purpose direction button 3855;
exemplary game overlay go button 3865;
exemplary game overlay stop button 3860;
exemplary navigation overlay button 3866;
exemplary game overlay button 3897;
exemplary market overlay button 3868;
exemplary market overlay weapon selection button 3869, 3870, 3875, 3898;
exemplary market overlay aim finder toggle 3880.

In some embodiments, the game overlay view 3897 of the price based navigation time interval object community linked time interval object unit system 3805 may alert the user to a vehicle with more than one passenger or student 3899 which would then be a way for the user to gift a flower to the other user 3899. In some embodiments user(s) may work independently or collectively in tribes to maximize user score in strategy. In some embodiments, the price-time priority queue time interval units and associated secondary markets and creation of geolocation exchange units may be as a layer on third party gaming systems for people, gamers, celebrities, workers, doctors, lawyers, ranked players, athletes, musicians, chefs, or other skill based people with time interval units to sell to play a game with a user.

Figure 39:
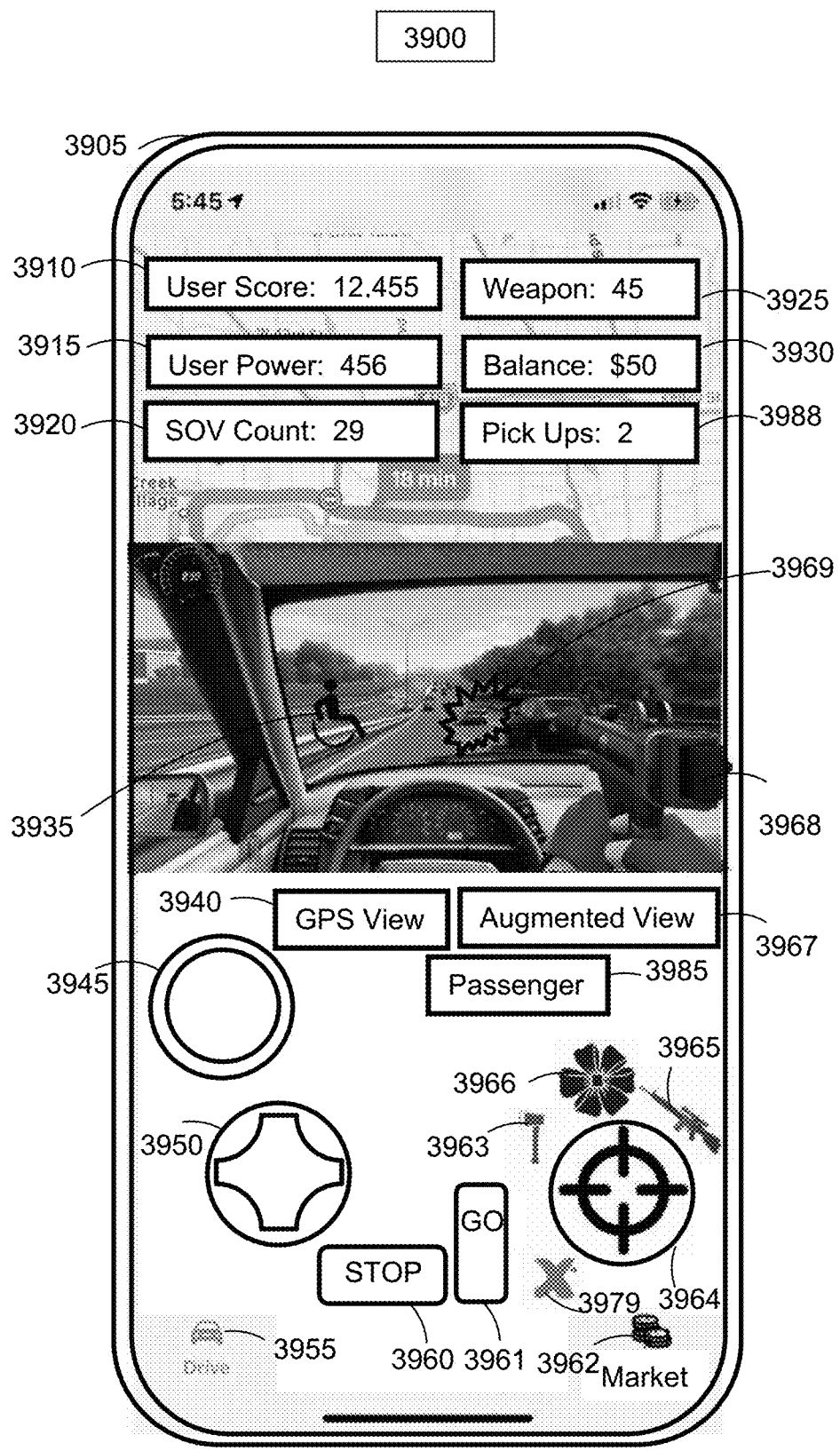

FIG. 39 illustrates another exemplary network configuration 3900 integrating the disclosed method and system as a game layer on another internal mapping navigation system or traditional third party navigation map system in the setting of a mobile computing device. In some embodiments, the multi layered network node topology of participating, transacting and/or trading time interval object community linked time interval object capacity for price based navigation configuration 3900 includes the following accounting elements, or a subset or superset thereof:
exemplary computing device 3905;
exemplary game overlay user score 3910;
exemplary game overlay user power 3915;
exemplary game overlay SOV (single occupancy vehicle) count 3920;
exemplary game overlay weapon strength 3925;
exemplary game overlay account balance 3930;
exemplary game overlay passenger pick ups 3988;
exemplary game overlay weapon 3968;
exemplary game overlay GPS standard map view 3940;
exemplary game overlay augmented or mixed reality view 3967;
exemplary game overlay passenger mode 3985;
exemplary game overlay fire button 3945;
exemplary game overlay multi-purpose direction button 3950;
exemplary game overlay go button 3961;
exemplary game overlay stop button 3960;
exemplary navigation overlay button 3955;

exemplary market overlay button 3962;
exemplary market overlay weapon selection button 3963, 3966, 3965, 3979;
exemplary market overlay aim finder toggle 3964;
exemplary user in augmented reality view who has had their single occupancy vehicle destroyed 3935.

In some embodiments, the game overlay view 3905 of the price based navigation time interval object community linked system 3905 may show a user who has had their single occupancy vehicle destroyed 3935 which increases the score of the user 3910. In some embodiments, the user may target additional single occupancy vehicles 3969 to destroy along the priced based navigation subject. In some embodiments, the price-time priority queue time interval units and associated secondary markets and creation of geolocation exchange units may be as a layer on third party gaming systems for people, gamers, celebrities, workers, doctors, lawyers, ranked players, athletes, musicians, chefs, or other skill based people with time interval units to sell to play a game with a user.

FIG. 40 illustrates another exemplary network configuration 4000 module of the disclosed method and system which records the vehicle specifications for a given user on the system 4010 in the setting of a mobile computing device. In some embodiments, the multi layered network node topology of participating, transacting and/or trading transformed time interval object community linked time interval object capacity units or securities for price based navigation configuration 4000 includes the following elements, or a subset or superset thereof:

exemplary computing device 4010;
exemplary time interval object unit model make 4015;
exemplary time interval object unit model type 4025;
exemplary time interval object unit model year 4035;
exemplary system menu toggle box 4051;
exemplary time interval object community linked time interval object unit model fuel type 4045;
exemplary time interval object community linked time interval object unit model make selection box toggle 4020;
exemplary time interval object community linked time interval object unit model type selection box toggle 4030;
exemplary time interval object community linked time interval object unit model year selection box toggle 4040;
exemplary time interval object community linked time interval object unit model fuel type selection box toggle 4050;

In some embodiments, the disclosed method and system may allow the user to select the model make such as by example an Acura 4020 as a model make 4015. In some embodiments the user may select an unlimited variety of vehicle types in the method and system not limiting the system to those vehicle make 4015 or model 4025 types in FIG. 40. In some embodiments, the user may configure the system for the time interval object community linked time interval object unit specification model year 4035 or the model fuel type 4045 or a plurality of other vehicle specifications for the purpose of recording specification for the priced based navigation time interval object community linked unit system 4010. In some embodiments, the data transformation of the transformed time interval object community linked time interval object unit or security links the attributes or supersets or subsets of the model make 4015, model type 4025, model year 4035, model fuel type 4045, or a plurality of other vehicle features to create specification pools as a feature in the data transformations for the transformed time interval object units or securities. In some embodiments, the combinations of similar vehicle model make 4015, model type 4025, model year 4035, model fuel type 4045 and plurality of other vehicle attributes are fungible or substitutable in the method of the transformed time interval object community linked time interval object unit or security. To avoid confusion, and to provide further example, but not limit by example, calculus, differential equations, python, algebra, geometry or other transformed time interval object community linked time interval object units or securities may be substitutable under broad specifications of the transformed time interval object or security pool provided that the broad transformed specifications are met for delivery specification within the transformed time interval object community linked time interval object unit or security pool. In some embodiments user(s) may work independently or collectively in tribes to maximize user score in strategy. In some embodiments, virtual delivery efficiency may also be evaluated such as the type of electricity or power to conduct the virtual meeting for the time interval unit.

Figure 41:
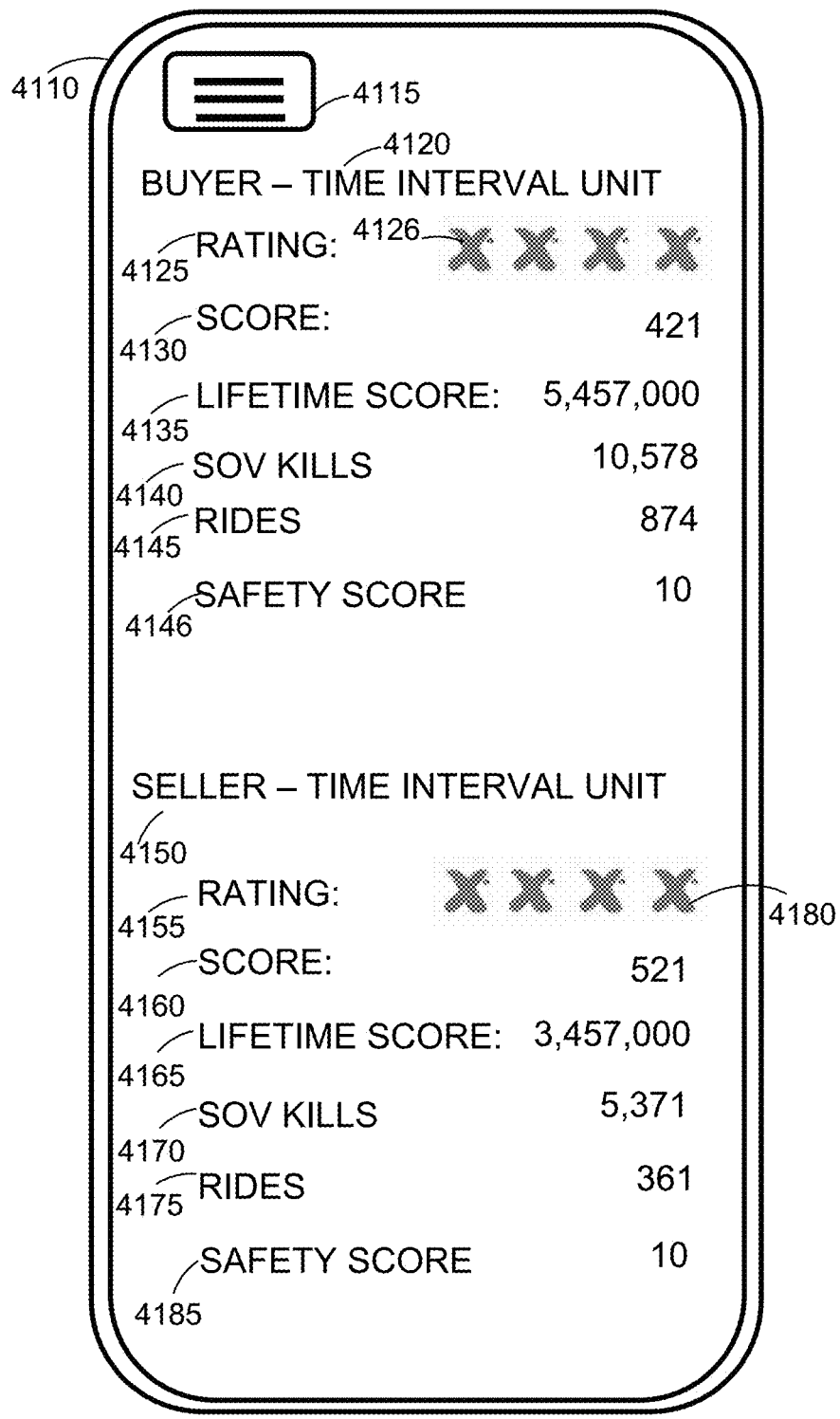

FIG. 41 illustrates another exemplary network configuration 4100 module of the disclosed method and system which records the student or teacher or instructor time interval object community linked time interval object unit specification ratings for a given user on the system 4110 in the setting of a mobile computing device. In some embodiments, the multi layered network node topology of participating, transacting and/or trading time interval object community linked time interval object capacity for price based navigation configuration 4100 includes the following elements, or a subset or superset thereof:

exemplary menu toggle box 4115;
exemplary student time interval object community linked time interval object unit rating category summary 4120;
exemplary student time interval object community linked time interval object unit rating summary 4125;
exemplary student time interval object community linked time interval object unit rating X logo amount 4126;
exemplary student time interval object community linked time interval object unit rating score for navigation subject 4130;
exemplary student time interval object community linked time interval object unit rating lifetime score 4135;
exemplary student time interval object community linked time interval object unit SOV kills 4140;
exemplary student time interval object community linked time interval object unit ride count 4145;
exemplary student time interval object community linked time interval object unit ride safety score 4146;
exemplary instructor time interval object community linked time interval object unit rating category summary 4150;
exemplary instructor time interval object community linked time interval object unit rating summary 4155;
exemplary instructor time interval object community linked time interval object unit rating X logo amount 4180;
exemplary instructor time interval object community linked time interval object unit rating score for navigation subject 4160;
exemplary instructor time interval object community linked time interval object unit rating lifetime score 4165;
exemplary instructor time interval object community linked time interval object unit SOV kills 5,371;
exemplary instructor time interval object community linked time interval object unit ride count 4175;
exemplary instructor time interval object community linked time interval object unit ride safety score 4185;

In some embodiments the price based navigation time interval object community linked system game overlay layer uses a plurality of the aforementioned combinations to account for user actions in the game overlay of the disclosed method and system.

Figure 42:
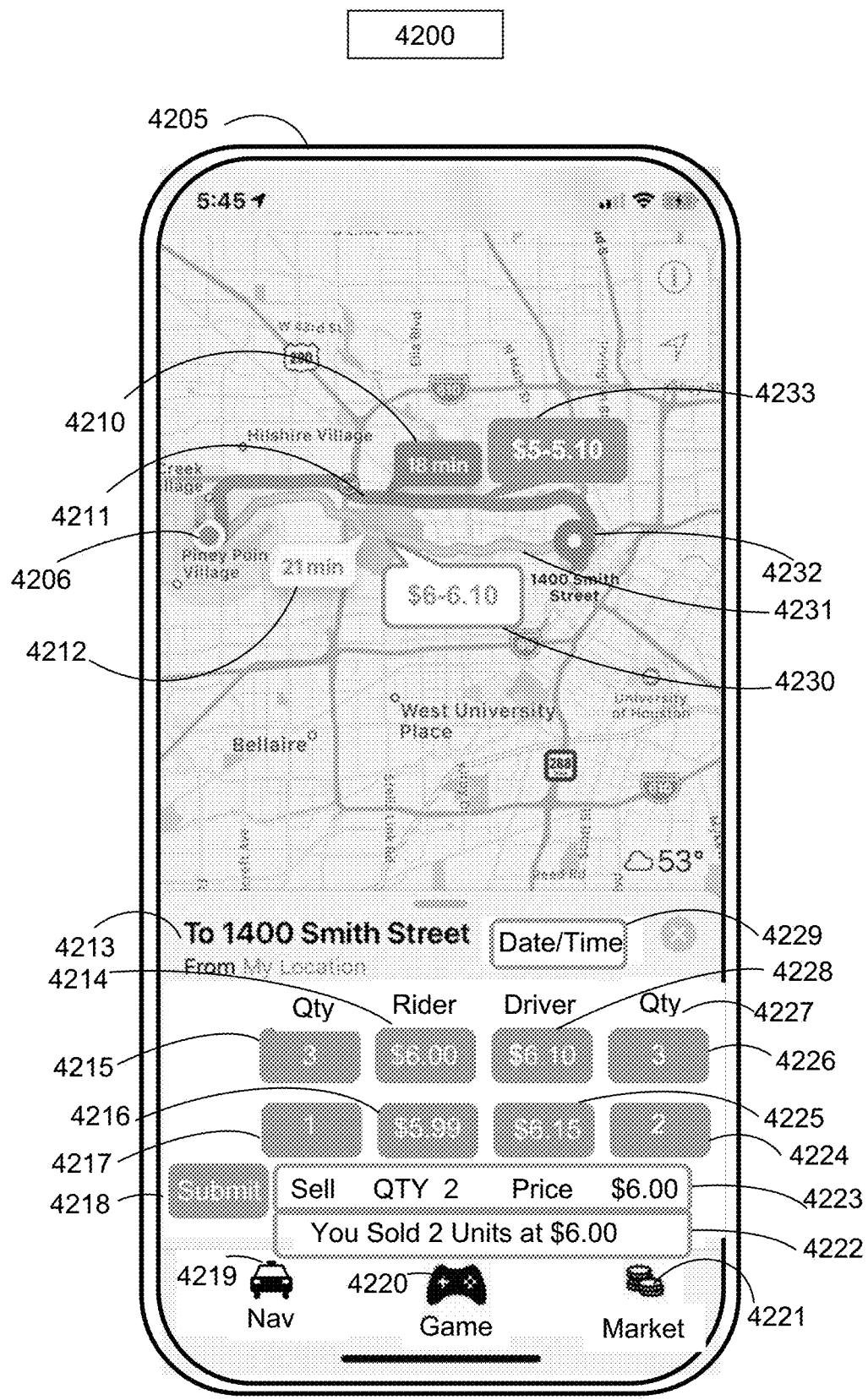
FIG. 42 illustrates a market configuration module in accordance with implementations of various techniques described herein.

FIG. 42 illustrates another exemplary network configuration 4200 module of the disclosed method and system which records the rider or driver transformed time interval object community linked time interval object unit or security specification and market framework for the transformation for a specified plurality of subjects. In some embodiments, the multi layered network node topology of participating, transacting and/or trading transformed time interval object community linked time interval object capacity units or securities for price based navigation configuration 4200 includes the following elements, or a subset or superset thereof:

exemplary computing device to display the method or system 4205;

exemplary estimated time of a primary indexed price based navigation subject of a transformed time interval object community linked time interval object unit or security 4120;

exemplary market price of a buyer and seller of primary price based navigation subject of a transformed time interval object community linked time interval object unit or security 4233;

exemplary price based navigation subject of a primary transformed time interval object community linked time interval object unit or security 4211;

exemplary estimated time of a secondary indexed price based navigation time interval object community linked subject of a transformed time interval object community linked time interval object unit or security 4231;

exemplary estimated time of a secondary indexed price based navigation time interval object community linked subject of a transformed time interval object community linked time interval object unit or security 4212;

exemplary market price of a buyer and seller of secondary price based navigation subject of a transformed time interval object unit or security 4230;

exemplary starting point virtual hub of an indexed price based navigation time interval object community linked subject of a transformed time interval object community linked time interval object unit or security 4206;

exemplary ending point virtual hub of an indexed price based navigation time interval object community linked subject of a transformed time interval object community linked time interval object unit or security 4232;

exemplary ending point and starting point address of virtual hub(s) of an indexed price based navigation time interval object community linked subject of a transformed time interval object community linked time interval object unit or security 4213;

exemplary date and time specification of an indexed price based navigation time interval object community linked subject of a transformed time interval object community linked time interval object unit or security 4213;

exemplary number or quantity of transformed time interval object community linked time interval object units or securities that are bidding or buying for purchase by riders of a secondary indexed price based navigation subject of a transformed time interval object community linked time interval object unit or security which is first in the student or rider queue indexed by highest price 4215;

exemplary price of transformed time interval object community linked time interval object units or securities that are bidding or buying for purchase by riders of a secondary indexed price based navigation subject of a transformed time interval object community linked time interval object unit or security which is first in the student or rider queue indexed by highest price 4214;

exemplary price of transformed time interval object community linked time interval object units or securities that are bidding or buying for purchase by riders of a secondary indexed price based navigation subject of a transformed time interval object community linked time interval object unit or security which is second in the student or rider queue indexed by second highest price 4216;

exemplary number or quantity of transformed time interval object community linked time interval object units or securities that are bidding or buying for purchase by riders of a secondary indexed price based navigation subject of a transformed time interval object community linked time interval object unit or security which is second in the student or rider queue indexed by second highest price 4217;

exemplary number or quantity of transformed time interval object community linked time interval object units or securities that are offering or selling by drivers of a secondary indexed price based navigation subject of a transformed time interval object community linked time interval object unit or security which is first in the instructor or driver queue indexed by lowest price 4226;

exemplary price of transformed time interval object community linked time interval object units or securities that are offering or selling by drivers of a secondary indexed price based navigation subject of a transformed time interval object community linked time interval object unit or security which is first in the instructor or driver queue indexed by lowest price 4228;

exemplary number or quantity of transformed time interval object community linked time interval object units or securities that are offering or selling by drivers of a secondary indexed price based navigation subject of a transformed time interval object community linked time interval object unit or security which is second in the instructor or driver queue indexed by second lowest price 4224;

exemplary price of transformed time interval object community linked time interval object units or securities that are offering or selling by drivers of a secondary indexed price based navigation subject of a transformed time interval object community linked time interval object unit or security which is second in the instructor or driver queue indexed by second lowest price 4225;

exemplary order entry submit button to the method and system for a user order 4218;

exemplary order on the method and system by a instructor or driver to sell a specified quantity of transformed time interval object community linked time interval object units or securities 4223;

exemplary order confirmation on the method and system by a instructor or driver sold two units of transformed time interval object community linked time interval object units or securities 4222;

exemplary market view of priced based navigation layer to display indexed prices of a plurality subjects which may be one, two, three, or an infinite number of subjects between two virtual hubs 4222;

exemplary game view layer of a transformed time interval object community linked time interval object unit or security 4220;

exemplary navigation view layer of a transformed time interval object community linked time interval object unit or security 4219;

In some embodiments, the disclosed method and system may allow the user to select the model make such as by example an Acura 4020 as a model make 4015 which is placed in a certain transformed time interval object community linked time interval object specification subject pool that may be aggregated with similar transformed time interval object unit subject specification participants or units that then display a user 110 selected navigation subject 4211 or plurality of subjects 4231 and 4211 or an infinite number of subjects between the time interval object community linked virtual hub start point 4206 and time interval object community linked virtual hub endpoint 4232. In some embodiments the prices 4230 on a subject 4231 may display the buy price of the highest bidder or student or rider on a given subject 4231 which is listed in more detail in the rider queue display for highest indexed price bid 4214 for a subject 4231. In some embodiments, the highest bid price 4214 for a rider on a given subject 4231 has an associated quantity 4215 of transformed time interval object community linked time interval object units or securities. Similarly in some embodiments, the lowest offer or sale price 4228 for a driver on a given subject 4231 has an associated quantity 4226 of transformed time interval object community linked time interval object units or securities. In some embodiments, the student or rider quantity 4215 listed as three units, may be one student or rider, two students or riders, or three students or riders who desire to purchase a given transformed time interval object community linked time interval object unit(s) or securities so long as the indexed price is queued to the top based on a highest price index and time stamp for a given specification of a transformed time interval object community linked time interval object unit or security. In some embodiments, transformed time interval object community linked time interval object units or securities may represent a similar pool of transformed time interval object community linked time interval object units or securities based on a superset or subset or the plurality of attributes such as vehicle mode make 4015, vehicle mode model type 4025, vehicle model year 4035, cheapest subject 1011, single mode 1012, multi modal 1013, fastest subject 1014, most scenic 1015, highest rating 1016, most available 1017, highest volume 1018, most frequent 1019, service level 1020, security and safety 1021, group restricted 1022, modes 810, virtual 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest subject 827, packages 828, cardo 829, automobile 830, order types 710, 720, term specification 600, timing specification 500, virtual hub end point 230 and start point 220, or a plurality of other specifications. In some embodiments, the match of student or rider price 4214 and instructor or driver price 4228 for a transformed time interval object community linked time interval object unit(s) or securities occurs when the lowest price in the driver queue 4228 equals the highest price in the rider queue 4214. In some embodiments, if no such match of prices occur between driver and rider queues for a given specification of a transformed time interval object community linked time interval object unit or security, then prices remain in the queue until a match or a new order entry re-indexes the order of all the deals because the price is higher than the current highest bid in the student or rider queue 4214 or the queue entries for the transformed time interval object community linked time interval object unit or security may become re-indexed to place an order with the appropriate price index ranking in a queue that places the highest student or rider price 4214 in the top and descends by price 4216, then time of order entry all other things equal. In some embodiments, the driver price queue 4228, 4225 similarly ranks from lowest driver price 4228 at the top of the queue to highest instructor or driver price 4228 at the bottom on the queue, then indexing by time subordinate to price for a given pool specification of transformed time interval object community linked time interval object units or securities. In some embodiments, a plurality of subjects 4231 and 4211 may be displayed as price based time interval object community linked navigation options indexed by market pricing. In some embodiments, the user may select one, two or many, many more subjects as to how many they desire to be displayed as options between their virtual hubs to perform calculations that may maximize the number of time interval object community linked time interval object units or securities they sell on a given subject specification or the prices which they obtain or any combination of specifications or objectives the user may have in the price based navigation method and display of transformed time interval object community linked time interval object unit or security.

Figure 43:
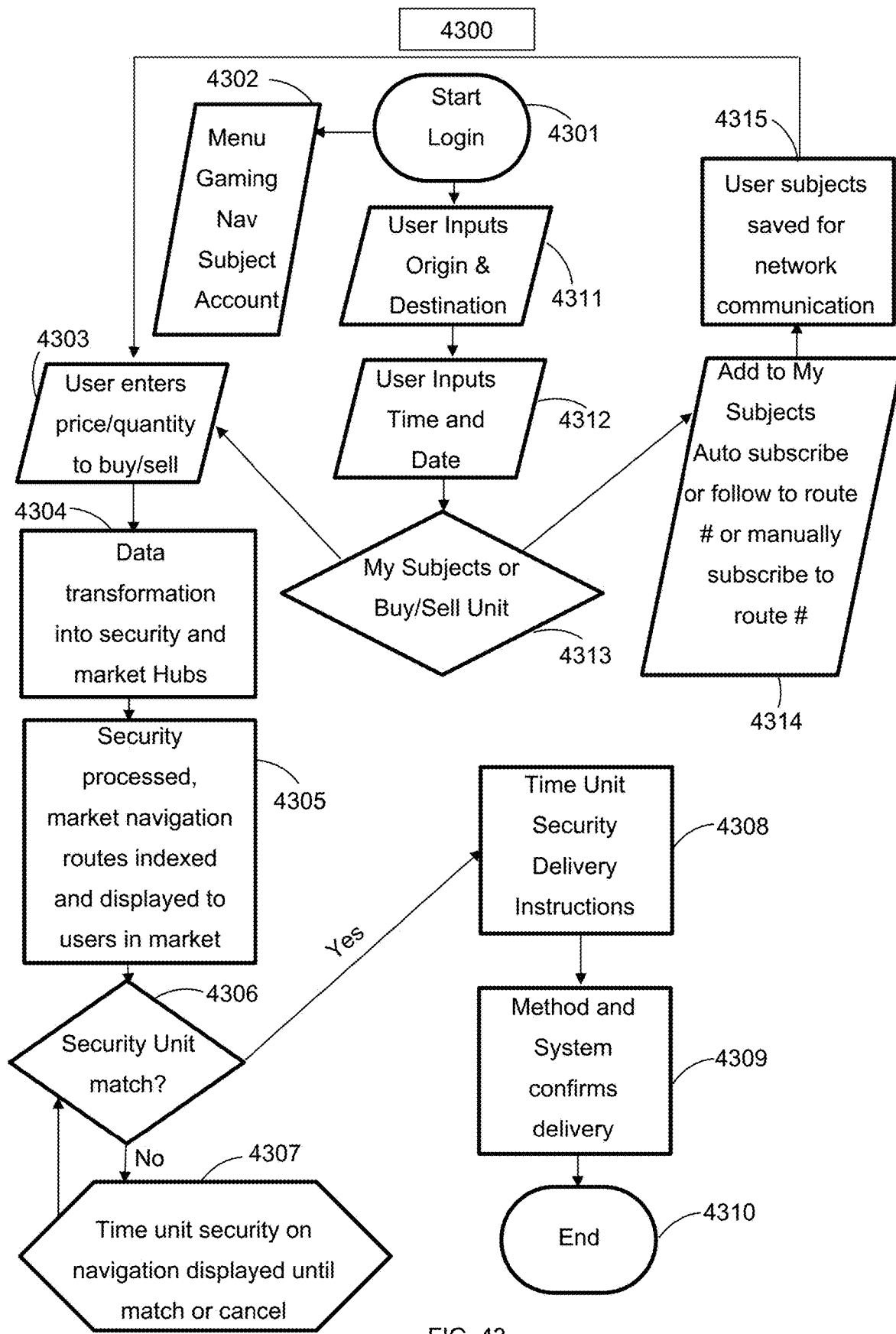
FIG. 43 illustrates a flow diagram of a method in accordance with implementations of various techniques described herein.

FIG. 43 illustrates an exemplary flow chart 4300 of user 110 experience during a transformed time interval object unit or security life cycle. In some embodiments the user 110 may login 4301 to the system which requires the user to go to a plurality of menu options 4302 or user input for subject and origin and destination of time interval object community linked virtual hubs 4311 alongside user inputs of time and date 4312 for a given subject specification that may contain a subset or superset of attributes such as vehicle mode make 4015, vehicle mode model type 4025, vehicle model year 4035, cheapest subject 1011, single mode 1012, multi modal 1013, fastest subject 1014, most scenic 1015, highest rating 1016, most available 1017, highest volume 1018, most frequent 1019, service level 1020, security and safety 1021, group restricted 1022, modes 810, virtual 811, air 812, autonomous vehicle 813, bike 814, boat 815, bus 816, drone 817, limo 818, motorcycle 819, moped 820, shuttle 821, spaceship 822, subway 823, taxi 824, train 825, fastest optimized 826, cheapest subject 827, packages 828, cardo 829, automobile 830, order types 710, 720, term specification 600, timing specification 500, time interval object community linked virtual hub end point 245 and start point 253, or a plurality of other specifications. In some embodiments, the user may save a subject to the "My Subjects" 4313 in "Add My Subjects" 4314 whereby the user subject is saved in the system for one touch retrieval in the future. In some embodiments, the user may enter a price or quantity to buy or sell a transformed time interval object community linked time interval object unit or security of a given specification or specification combination 4303 which has many steps involved with the transformation of the time interval object community linked time interval object unit or security. In some embodiments, additional data transformations occur to process 4305, market navigation subject options and indexing 4305, virtual hub or virtual hub or subject combination data transformations 4305, time interval object community linked time interval object unit subject transformations 4305 and many other subsets or supersets of transformed time interval object unit combinations and combination specifications 4305. In some embodiments, if a transformed time interval object community linked time interval object unit or security matches 4306 in price and specification, then the transformed time interval object community linked time interval object unit or security moves into delivery 4308 and the deliver process has many steps of electric signal handoff 4308, 4309 and security checks 4308, 4309, 911 system checks 4308, 4309, GPS server and user 110 position checks 4308, 4309 as well as time interval object unit rating checks 4308, 4309 and many other possible checks for all the data elements of the transformed time interval object community linked time interval object unit or security for verification of delivery 4308, 4309. In some embodiments, if prices of the buyer and seller queue do not match 4307, then the steps of processing 4304, 4305, 4306 repeat until a match is made 4306 to 4308 or an order is cancelled before it expires for the transformed time interval object community linked time interval object unit or security.

Figure 44:
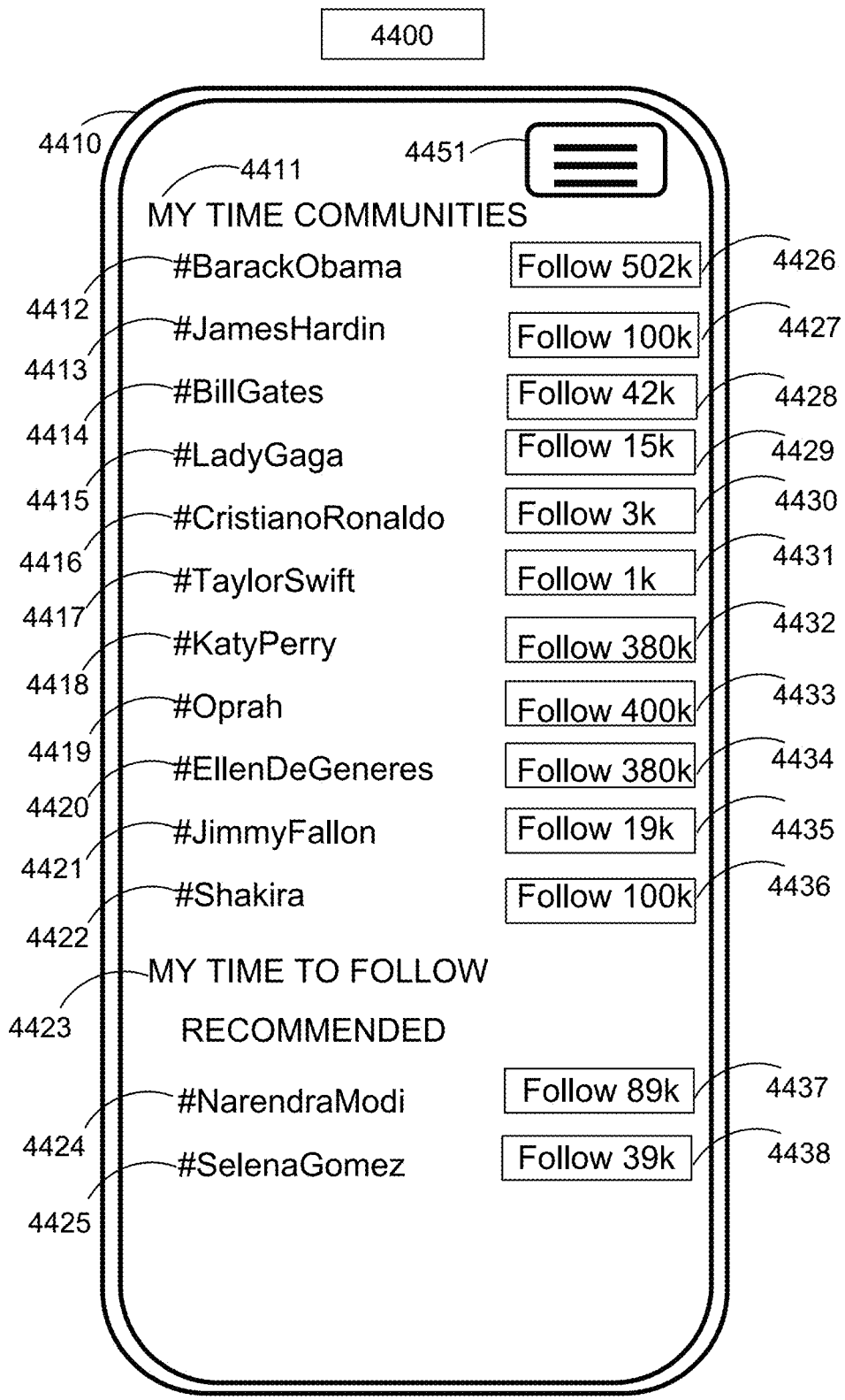
FIGS. 44-46 illustrate a configuration module in accordance with implementations of various techniques described herein.

FIG. 44 illustrates an exemplary user interface 4410 for the My Subjects Communities functions 4411. In some embodiments, the user interface 4410 may have a menu option 4451 to move to other areas of the method and system. In some embodiments, the virtual time interval object community linked time interval object hub sequence as an object may be meta data tag #BarackObama 4412 to represent a time interval object community unit for time with former President Barack Obama. In some embodiments, #BarackObama 4412 may have an option for the user 110 to Follow or Join or subscribe, or add 4426 the time interval object community linked virtual time interval object hub sequence #BarackObama 4412. In some embodiments, the number of followers or network members who are joined to that community object transformed data structure 4412 are 502 k 4426. In some embodiments, the virtual time interval object hub sequence as an object may be meta data tag #JamesHarden 4413 to represent a time interval object community unit with James Harden the NBA all star which may be delivered in person or virtually. In some embodiments, #JamesHarden 4413 may have an option for the user 110 to Follow or Join or subscribe, or add 4427 the virtual time interval object community linked time interval object hub sequence #JamesHarden 4413. In some embodiments, the number of followers or network members who are joined to JamesHarden community object transformed data structure 4413 are 100 k 4427. In some embodiments, the virtual time interval object community linked time interval object hub sequence as an object may be meta data tag #BillGates 4414 to represent a time interval object community unit for a time interval unit with Bill Gates which may be delivered virtually or in person. In some embodiments, #BillGates 4414 may have an option for the user 110 to Follow or Join or subscribe, or add 4428 the virtual time interval object community linked time interval object hub sequence #BillGates 4414. In some embodiments, the number of followers or network members who are joined to Bill Gates community object transformed data structure 4414 are 42 k 4428. In some embodiments, the virtual time interval object community linked time interval object hub sequence as an object may be meta data tag #LadyGaga 4415 to represent a time interval object community unit for a time interval with Lady Gaga the musician. In some embodiments, #LadyGaga 4415 may have an option for the user 110 to Follow or Join or subscribe, or add 4429 the virtual time interval object community linked time interval object hub sequence #LadyGaga 4415. In some embodiments, the number of followers or network members who are joined to Lady Gaga community object transformed data structure 4415 are 15 k 4429. In some embodiments, the virtual time interval object community linked time interval object hub sequence as an object may be meta data tag #CristianoRonaldo 4416 to represent a time interval object community unit for a time interval with Christiano Ronaldo. In some embodiments, #CristianoRonaldo 4416 may have an option for the user 110 to Follow or Join or subscribe, or add 4430 the virtual time interval object community linked time interval object hub sequence #CristianoRonaldo 4416. In some embodiments, the number of followers or network members who are joined to the Cristiano Ronaldo community object transformed data structure 4416 are 3 k 4430. In some embodiments, the virtual time interval object community linked time interval object hub sequence as an object may be meta data tag #TaylorSwift 4417 to represent a time interval object community unit for a time interval unit with Taylor Swift the musician. In some embodiments, #TaylorSwift 4417 may have an option for the user 110 to Follow or Join or subscribe, or add 4431 the virtual time interval object community linked time interval object hub sequence #TaylorSwift 4417. In some embodiments, the number of followers or network members who are joined to that community object transformed data structure 4417 are 1 k 4431. In some embodiments, the virtual time interval object community linked time interval object hub sequence as an object may be meta data tag #KatyPerry 4418 to represent a time interval object community unit for a time interval with the musician Katy Perry. In some embodiments, #KatyPerry 4418 may have an option for the user 110 to Follow or Join or subscribe, or add 4432 the virtual time interval object community linked time interval object hub sequence #KatyPerry 4418. In some embodiments, the number of followers or network members who are joined to the oracle community object transformed data structure 4418 are 380 k 4432. In some embodiments, the virtual time interval object community linked time interval object hub sequence as an object may be meta data tag #Oprah 4419 to represent a time interval object community unit with Oprah Winfrey. In some embodiments, #Oprah 4419 may have an option for the user 110 to Follow or Join or subscribe, or add 4433 the virtual time interval object community linked time interval object hub sequence #Oprah 4419. In some embodiments, the number of followers or network members who are joined to the Oprah community object transformed data structure 4419 are 400 k 4433. In some embodiments, the virtual time interval object hub sequence as an object may be meta data tag #EllenDeGeneres 4420 to represent a time interval object community unit with the famous personality Ellen DeGeneres. In some embodiments, #EllenDeGeneres 4420 may have an option for the user 110 to Follow or Join or subscribe, or add 4434 the virtual time interval object community linked time interval object hub sequence #EllenDeGeneres 4420. In some embodiments, the number of followers or network members who are joined to the Ellen DeGeneres community object transformed data structure 4420 are 280 k 4434. In some embodiments, the virtual time interval object hub sequence as an object may be meta data tag #JimmyFallon 4421 to represent a time interval object community unit for a time interval with Jimmy Fallon. In some embodiments, #JimmyFallon 4421 may have an option for the user 110 to Follow or Join or subscribe, or add 4435 the virtual time interval object community linked time interval object hub sequence #JimmyFallon 4421. In some embodiments, the number of followers or network members who are joined to the Jimmy Fallon community object transformed data structure 4421 are 19 k 4435. In some embodiments, the virtual time interval object community linked time interval object hub sequence as an object may be meta data tag #Shakira 4422 to represent a time interval object community unit for the entertainer Shakira. In some embodiments, #Shakira 4422 may have an option for the user 110 to Follow or Join or subscribe, or add 4436 the virtual time interval object community linked time interval object hub sequence #Shakira 4422. In some embodiments, the number of followers or network members who are joined to the Shakira time interval object community linked community object transformed data structure 4422 are 100 k 4436. In some embodiments, the virtual time interval object community linked time interval object hub sequences may be recommended 4423 to follow as an object may be meta data tag #NarendraModi 4424 to represent a time interval object community unit to meet with Narendra Modi. In some embodiments, #NarendraModi 4424 may have an option for the user 110 to Follow or Join or subscribe, or add 4437 the virtual time interval object community linked time interval object hub sequence #NarendraModi 4424. In some embodiments, the number of followers or network members who are joined to the Narendra Modi community object transformed data structure 4424 are 89 k 4437. In some embodiments, the virtual time interval object community linked time interval object hub sequences may be recommended 4423 to follow as an object may be meta data tag #SelenaGomez 4425 to represent a time interval object community unit for time with Selena Gomez. In some embodiments, #SelenaGomez 4425 may have an option for the user 110 to Follow or Join or subscribe, or add 4438 the virtual time interval object community linked time interval object hub sequence #SelenaGomez 4425. In some embodiments, the number of followers or network members who are joined to the language arts time interval object community linked community object transformed data structure 4425 are 39 k 4438. In some embodiments, the subject of the time interval object community linked time interval object may be any plurality of subjects that have been transformed and unitized and securitized to trade on the price time priority queue.

Figure 45:
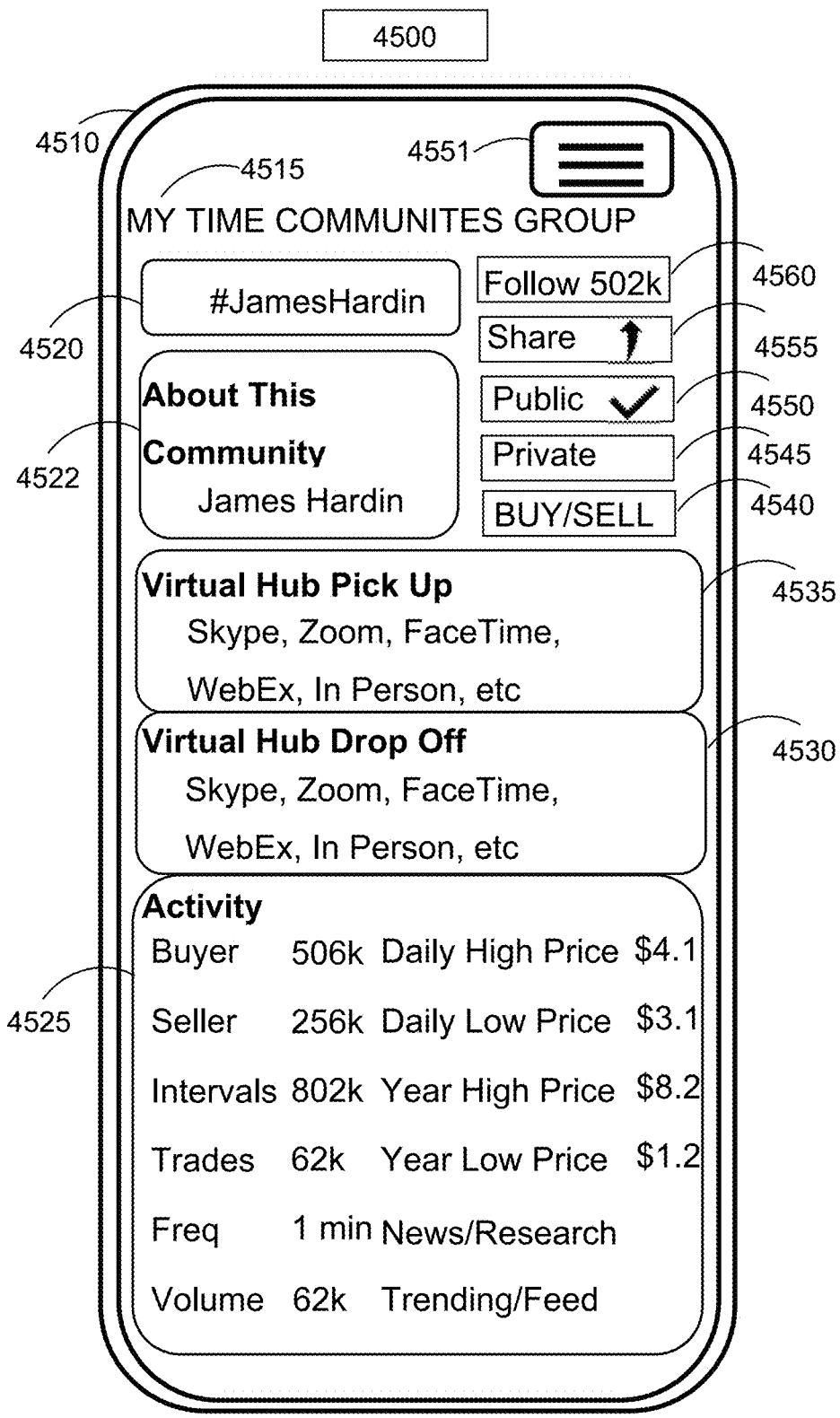

FIG. 45 illustrates an exemplary user interface 4500 for the My Subjects Communities Group 4515 for a specific transformed data structure of a transformed time interval object community linked community virtual hub sequence 4520. In some embodiments, the meta data virtual hub sequence #JamesHarden 4520 may list the long form subject details in the about the time interval object community linked subject section 4522. In some embodiments, the specific hub sequence #JamesHarden 4520 may list the amount of followers and an option to follow 4560. In some embodiments, the specific time interval object community linked time interval object unit hub sequence #JamesHarden 4520 may list the ability to share the time interval object community linked community group with another social network or text or email or other network protocol. In some embodiments, the specific hub sequence #JamesHarden 4520 may list group as public 4550 or private 4545. In some embodiments, the specific hub sequence #JamesHarden 4520 may list gateway to buy or sell 4540 transformed time interval object units using the LOB 300 for a time interval object community linked time interval object unit 241. In some embodiments, the specific hub sequence #JamesHarden 4520 may list specific pick up hub address location 4535 or drop off point address 4530 or the delivery may be virtual. In some embodiments, the specific subject hub sequence #JamesHarden 4520 may list the activity statistics and data with respect to the number of buyers 4525, number of sellers 4525, number of classes 4525, number of trades 4525, frequency of time interval object community linked time interval object units 4525, volume of time interval object community linked time interval object units 4525, daily high price for time interval object units 4525, daily low price for time interval object community linked time interval object units on the community object of #JamesHarden 4520, yearly high price 4525, yearly low price 4525, news, research, trending, feeds for the #JamesHarden 4520 virtual hub subject sequence.

Figure 46:
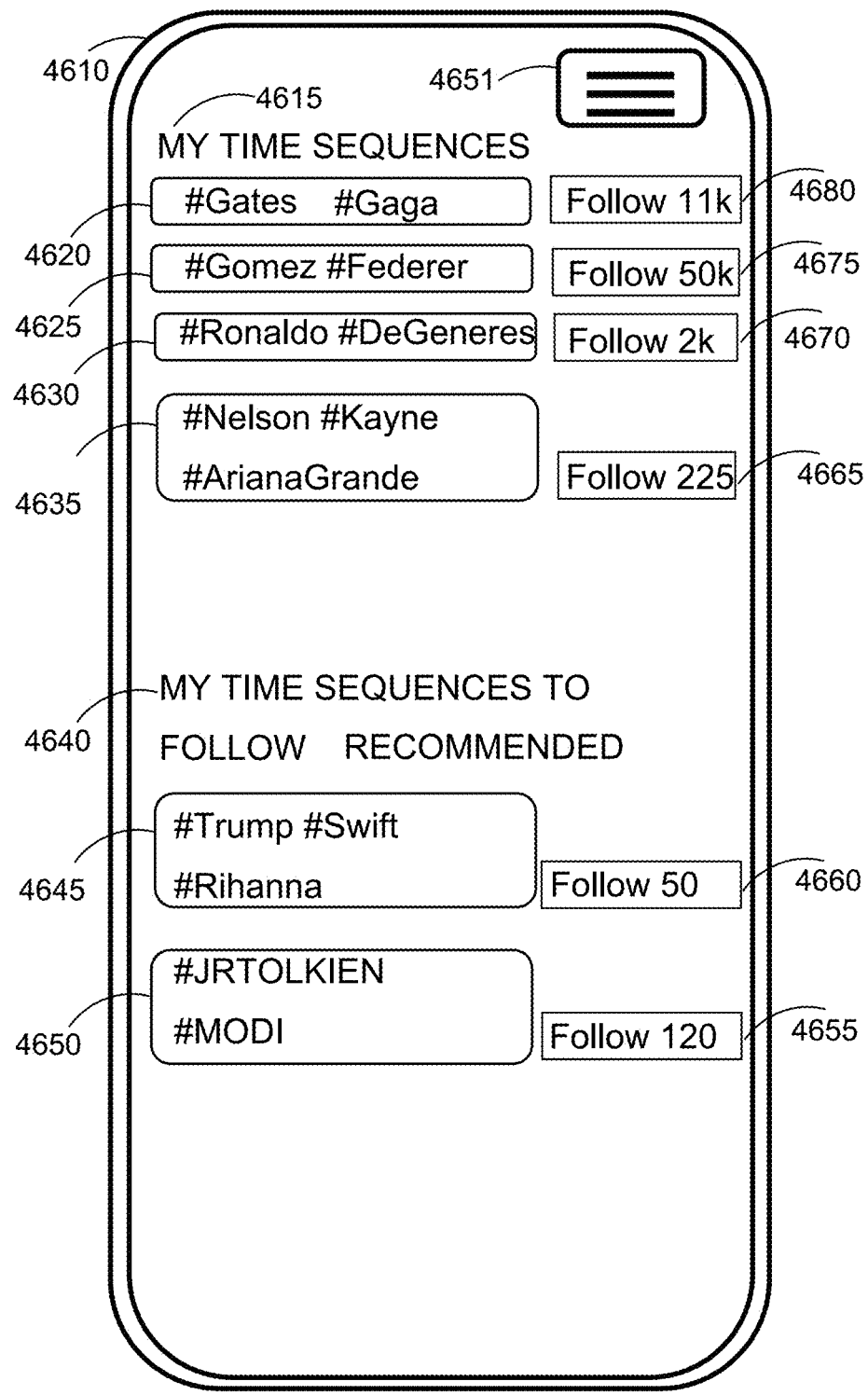

FIG. 46 illustrates an exemplary user interface 4600 with respect to My Subject Sequences or time interval unit sequences 4615 which may transform subject sequences with more than two virtual hubs into sequences as two or three or more series of subject sequences 4620. In some embodiments, #Gates #Gaga 4620 may represent subject sequence of trinomials followed by a secondary sequence completing the square subject 4620. Multi leg virtual hub sequences allow for the power of the data transformation to link the villages, cities or states from a network time interval object community linked time interval object topology structure from multiple providers of time interval object community linked time interval object units to provide higher levels of frequency and market opportunity to link public and private systems among many other benefits. In some embodiments, #Gates #Gaga 4620 may allow input from users to join, follow, subscribe or become a member of multi leg subject sequences which help solve potential detailed information issues within time interval object community linked time interval object systems 4680. In some embodiments, #Gomez #Federer 4625, may allow for a time interval object community linked time interval object unit seller or buyer to connect two disparate time interval object community linked time interval object networks to provide detailed time interval object community linked time interval object to a destination at the lowest market cost because each leg or series of time interval object community linked virtual hub sequences has an independent market associated with the leg or time interval object community linked virtual hub sequence #Gomez #Federer 4625. In some embodiments, #Gomez #Federer 4625 may allow input from users to join, follow, subscribe or become a member of multi leg sequences which help solve potential last mile issues within time interval object community linked time interval object systems 4675. In some embodiments, three two leg sequences may be attached through data transformations such that #Gates then takes a time interval object community linked time interval object unit to #Gaga which then takes a time interval object unit to #Gomez. The #Nelson #Kayne #ArianaGrande 4635 three leg virtual hub sequence combination may further solve subject detail issues for knowledge depth or meeting sequence may be an issue 4665, but the sequence time interval object community linked community object transformation helps buyers and sellers understand options and piece multiple time interval object community linked time interval object systems onto a single community based object to aggregate communication and transaction benefits of the system. In some embodiments, prior history subject searches and locations may be used to build recommended additional sequences 4640 which may be recommended for users to subscribe, join, follow or become a member. In some embodiments, the virtual hub subject sequence may link 4 or more virtual hub sequence pairs or even combinations of already linked community object pairs 4645. In some embodiments, #Trump #Swift #Rihanna 4645 may be linked to provide a detailed subject sequence to a student o instructor on a given subject or geolocation area if in person. Traversing a series of linked time interval object subjects may allow for the cost of non-linked time interval object subjects to be dramatically lower due to using a series of connected local time interval object subject units rather than a private for hire tutor which may be 10 times the cost and add a time reviewing that could be spent learning and instructing. In some embodiments, the sequence may simply lower travel and meeting costs. The transformed virtual hub subject sequence methodology allows for time interval object community linked time interval object systems to be integrated in ways that were not formerly possible because the systems were disparate or simply did not allow for linked subjects or linked community objects that could optimize topological network structures over existing inefficient structures. In some embodiments, virtual hub subject sequences which have been linked 4645 may also allow users to subscribe 4660. In some embodiments, #JRTOLK-IEN #Modi 4650 may be linked to provide a detailed subject sequence to a student or instructor. In some embodiments, virtual hub subject sequences which have been linked 4650 may also allow users to subscribe 4655.

Figure 47:
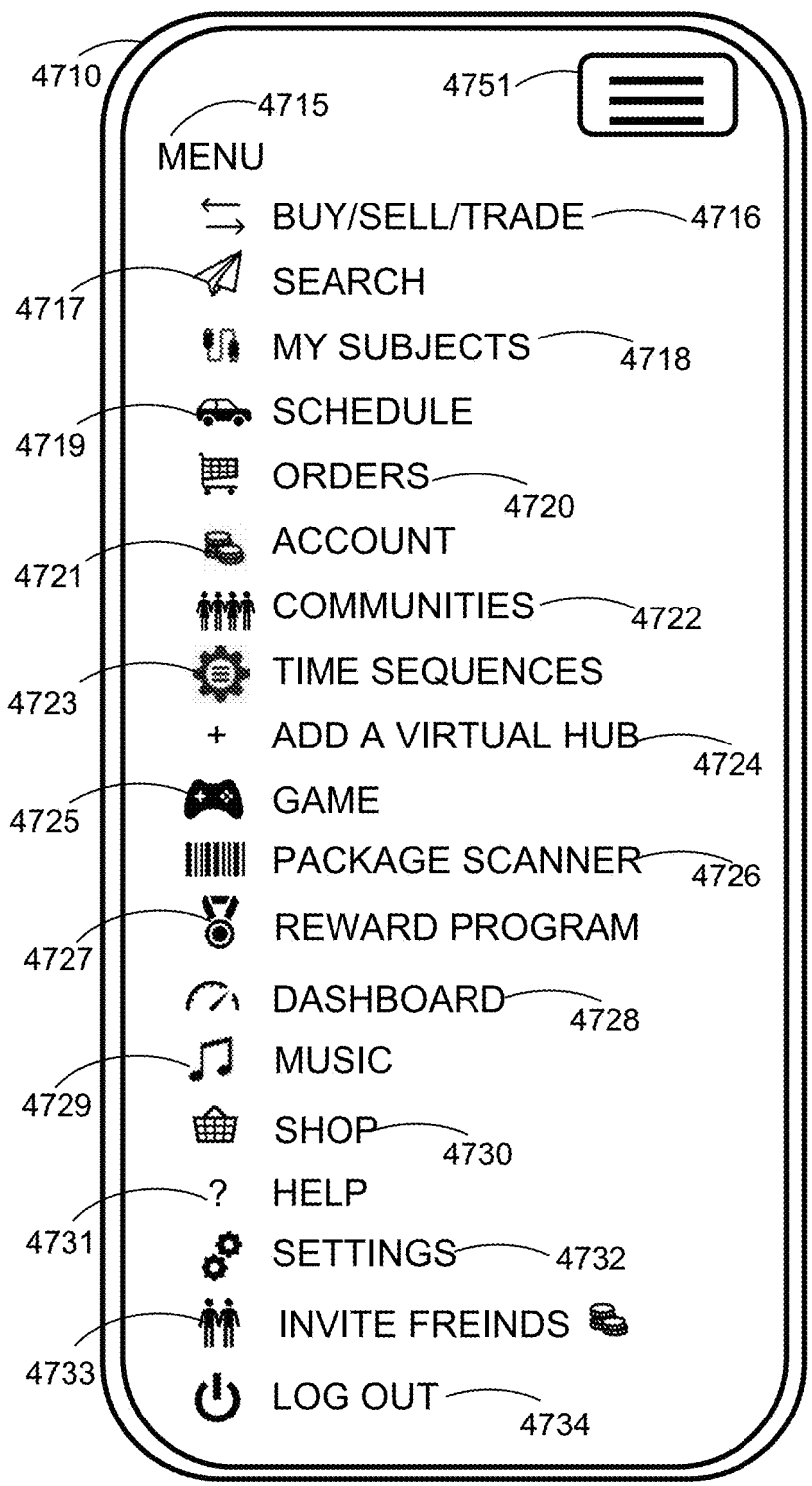
FIG. 47 illustrates a menu options configuration in accordance with implementations of various techniques described herein.

FIG. 47 illustrates an exemplary user menu interface 4700. In some embodiments, menu options may list as buy/sell/trade 4716 to go to the time interval object community linked time interval object unit gateway trading platform for virtual hub subject combinations and virtual hub subject sequences with associated price time priority queues. In some embodiments, the user interface may allow a user to go to the navigation 4717 module for price based navigation or subject selection based on cost or earnings from a subject as described in U.S. patent application Ser. No. 16/242,967, "Price Based Navigation," filed Jan. 8, 2019; the entirety of which is incorporated by reference herein. In some embodiments, time interval object community linked virtual hub sequences which have been transformed into community objects 101 provide greater communication and organizational ability for a market to transact time interval object community linked time interval object unit(s) and provide a gateway for those time interval object community unit transactions as described in U.S. patent application Ser. No. 15/266,326, "Implementations of a computerized business transaction exchange for various users," filed Sep. 15, 2016, the entirety of which is incorporated by reference herein. Furthermore, as described in U.S. patent application Ser. No. 15/877,393, "Electronic Forward market exchange for time interval object seats and capacity in time interval object spaces and vehicles," filed Jan. 23, 2018, the entirety of which is incorporated by reference herein. In some embodiments, a user 110 may select my subjects 4718 to toggle to subjects that are important to their user profile or needs in the network member database 222. In some embodiments, trips 4719 may be selected to toggle to the trip delivery view. In some embodiments, orders 4720 may be selected to toggle to cancel or adjust orders in the system that are unfilled. In some embodiments, users may toggle to the account 4721 page or time interval object community linked communities object page 4400 or the subject sequences page 4723. In some embodiments, users 110 may add additional subject hubs 4724 or may toggle to the gaming interface 3700. In some embodiments, time interval object community linked time interval object units may need to be scanned on the time interval object scanning module 4726. In some embodiments, users may select the reward program module 4727 or the dashboard module 4728. In some embodiments, the user may select the music 4729 or shopping module 4730. In some embodiments, the user may select help 4731 or settings 4732 to update account information or privacy settings. In some embodiments, users 110 may invite friends 4733 for rewards or bonuses or cash or credits 4733. In some embodiments, users may also logout 4734.

Figure 48:
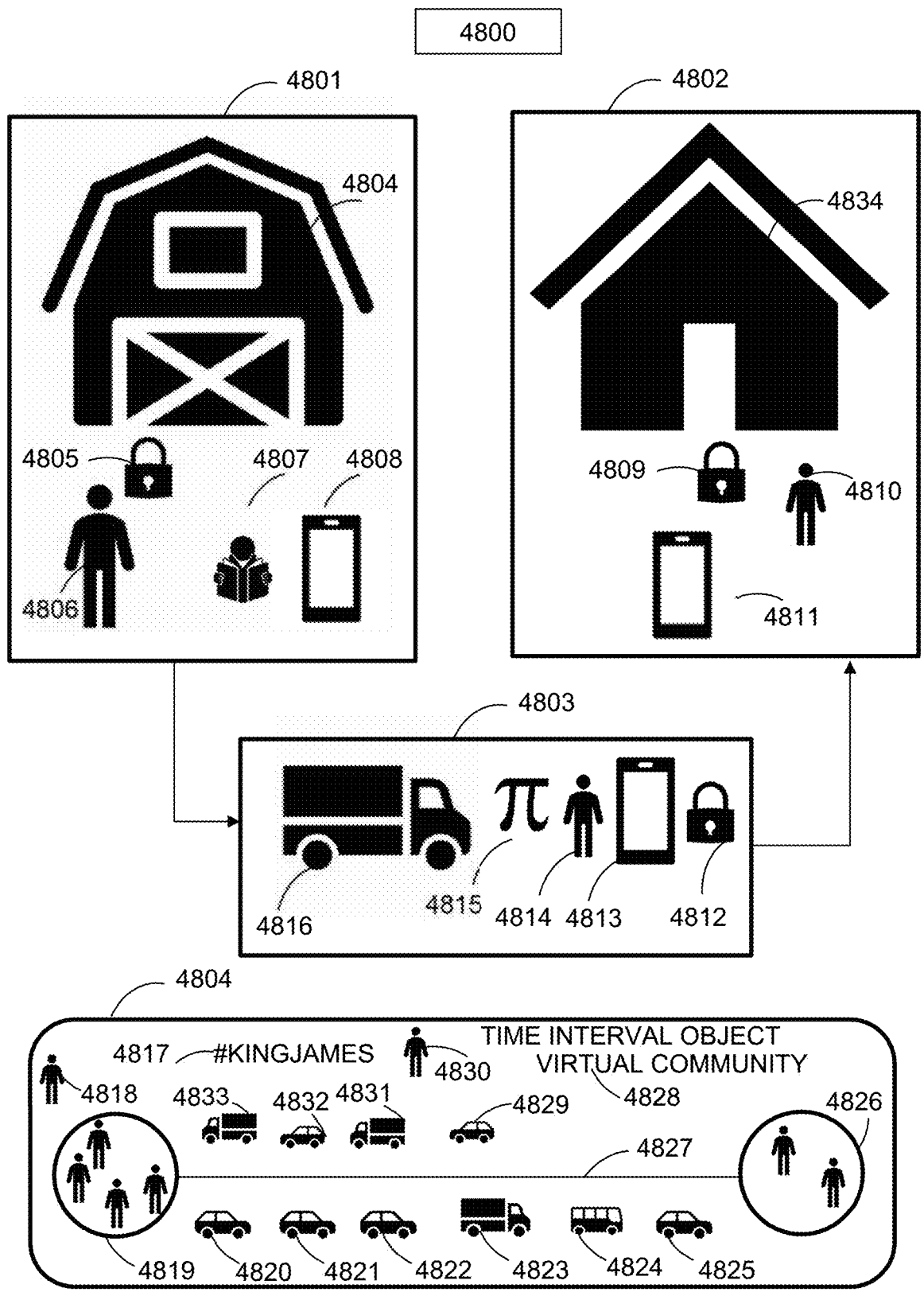
FIGS. 48-50 illustrate a system in accordance with implementations of various techniques described herein.

FIG. 48 illustrates another exemplary network configuration 4800 module of the disclosed method and system which records the network architecture of a typical time interval object community linked object with a price-time priority queue and resulting delivery sequence and integration with the time interval object linked virtual community object. In some embodiments, the multi layered network node topology of participating, transacting and/or trading transformed time interval object community linked time interval object capacity units or securities for time interval object community linked objects 4800 includes the following elements, or a subset or superset thereof:

exemplary time interval object community object waypoint origin 4801;

exemplary time interval object community object waypoint destination 4802;

exemplary time interval object community object during transit 4803;

exemplary time interval object community object 4804 to which a user may subscribe, join, friend, follow, etc . . . ;

exemplary home or barn or time interval object community unit storage unit at a time interval object community waypoint origin for an instructor 4804;

exemplary storage security device which electronically locks or unlocks the time interval object community object for transport 4805 at waypoint origin;

exemplary time interval object community object instructor user at subject waypoint origin 4806;

exemplary time interval object community object unit in the form of an exemplary language art subject at the time interval object community waypoint origin 4807;

exemplary time interval object community object unit in the form of an exemplary mobile or stationary computer device at the time interval object community waypoint origin 4808;

exemplary storage security device which electronically locks or unlocks the time interval object community object for transport 4809 at destination waypoint;

exemplary time interval object community object student user at subject waypoint destination 4810;

exemplary time interval object community delivery lock box at waypoint destination 4811 for time interval object community unit;

exemplary time interval object community unit transport vehicle in transit between origin and destination waypoint 4816;

exemplary time interval object community unit in transit between origin and destination waypoint 4815;

exemplary time interval object community unit transport instructor or driver in transit between origin and destination waypoint 4814 with may be physical or virtual;

exemplary time interval object community unit transport mobile computer device method and system interface in transit between origin and destination waypoint 4813;

exemplary time interval object community unit transport mobile computer device method and system security interface in transit between origin and destination waypoint 4812;

exemplary time interval object community object tag between origin and destination waypoint(s) for a specified time interval object community object such as the math subject of trinomials 4817;

exemplary time interval object community linked transport unit user at origin waypoint 4818;

exemplary time interval object community linked virtual transport subject object 4828;

exemplary time interval object community linked transport unit user 4830;

exemplary time interval object community linked object origin waypoint 4819 with users and time interval object units;

exemplary time interval object community linked object destination waypoint 4826 with users and time interval object units;

exemplary time interval object community virtual subject user 4830;

exemplary time interval object community linked object unit transport vehicles on an exemplary waypoint combination 4833, 4832, 4831, 4829, 4820, 4821, 4822, 4823, 4824, 4825.

In some embodiments, users 4806, 4810, 4814, 4818, 4830, 4819, 4826 may follow or subscribe or friend a time interval object community linked virtual subject 4828 for a particular time interval object unit 4817 such as trinomials by example, but not limited by example. In some embodiments, the time interval object community linked transport unit 4817 may be comprised of such as calculus, differential equation, English, French, Hindi, Chinese, Danish, culture, biology, chemistry, physics, computer science, or other time interval object varieties, people and subjects. In some embodiments, the time interval object community linked transport unit trinomials 4817 may be comprised of calculus, differential equation, English, French, Hindi, Chinese, Danish, culture, biology, chemistry, physics, computer science, or other time interval object varieties and subjects. In some embodiments, the time interval object community linked transport unit user may be a community member 4806 who has subject expertise inventory 4807 or subject expertise inventory on a computer device 4808 at a waypoint origin 4819 and desires to participate or transact in the price-time priority queue 300 for a certain time interval object subject unit 4807 on a waypoint sequence 4819, 4826 or 4801, 4802. In some embodiments, the time interval object community linked transport unit user may be an end consumer, restaurant, hotel, carpenter or other end user 4810 who desires to participate in the price-time priority queue 300 for certain time interval object units 4807, 4808. In some embodiments, the end user 4810 or origin owner 4806 of the time interval object community linked object with waypoints 4804 may use a mobile or fixed or visual or audio interface computer unit 4813 to enter price-time priority queue 300 based transactions for time interval object units 4807, 4808, 4819, 4826, 4815 along an time interval object community linked waypoint combination path 4827 that may be physical or virtual. In some embodiments, time interval object virtual subject communities may serve as virtual rental markets 4804 with associated price time priority queues 300 and GPS tracking of the time interval object units 4807, 4808, 4819, 4826, 4815 through the scanning of time interval object units 2600 at time interval object unit waypoint origin 4801, waypoint destination 4802, or along the waypoint sequence path 4803. In some embodiments, the user 4806 may transfer time interval object units 4807, 4808 by using the scan feature 2600 of the mobile or fixed or visual or audio interface computer unit 4813 to a time interval object community linked transport user 4814 in the time interval object community linked vehicle 4816 as a security authorized transaction participant 4812 of the price-time priority queue 300 of the time interval object community linked transport unit 4815. In some embodiments, the time interval object community linked transport unit 4815 may be delivered to an end user 4810 at an end user destination waypoint 4834 by using the mobile or fixed or visual or audio interface computer unit 4813 unlock sequence 4809 interface to deliver the time interval object community linked transport unit 4815 to a secure 4809 delivery storage unit or storage device 4811. In some embodiments, scanning procedures 2600 of the mobile or fixed or visual or audio interface computer unit 4813 may comprise secure transfer and records or the time interval object community linked transport unit 4815 for both pickup transfer at the time interval object community unit object origin 4801, waypoint combination transfer transport 4803 and waypoint destination delivery 4802.

Figure 49:
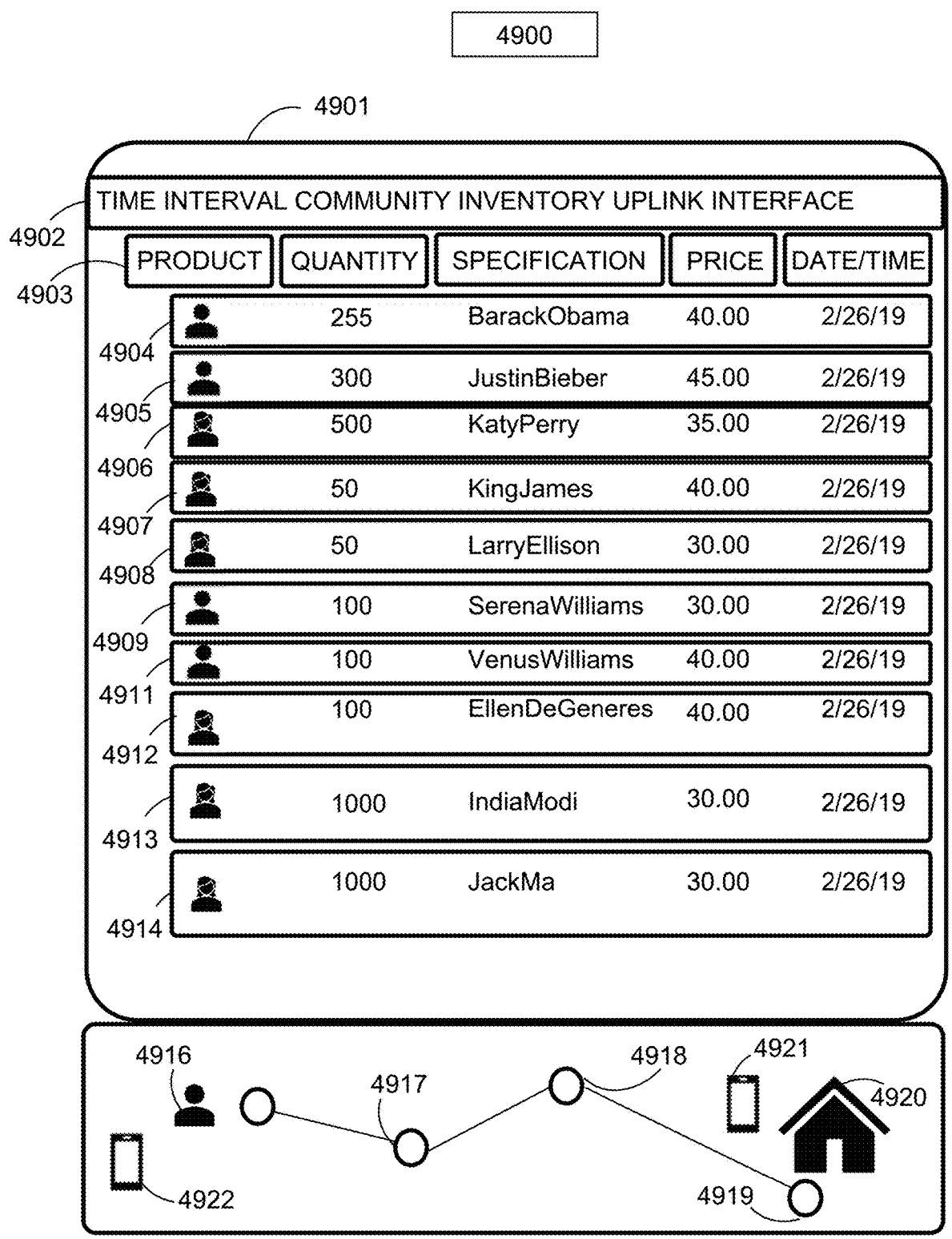

FIG. 49 illustrates an exemplary time interval object community inventory uplink interface 4900 of the disclosed method and system which may be user to upload time interval object community linked transport unit subject inventory to the time interval object linked virtual community object. In some embodiments, the uplink element of the multi layered network node topology of participating, transacting and/or trading transformed time interval object community linked time interval object capacity units or securities for time interval object community linked objects 4900 includes the following elements, or a subset or superset thereof:

exemplary time interval object community object unit uplink interface 4901 for time interval object unit inventory automation;

exemplary time interval object community object unit product type, quantity, specification, price, date and time 4903;

exemplary time interval object community unit object of BarakObama 4904 with a plurality of specifications;

exemplary time interval object community unit object of JustinBieber 4905 with a plurality of specifications;

exemplary time interval object community unit object of Katy Perry 4906 with a plurality of specifications;

exemplary time interval object community unit object of King James 4907 with a plurality of specifications;

exemplary time interval object community unit object of Larry Ellison 4908 with a plurality of specifications;

exemplary time interval object community unit object of Serena Williams 4909 with a plurality of specifications;

exemplary time interval object community unit object of Venus Willisma 4911 with a plurality of specifications;

exemplary time interval object community unit object of Ellen DeGeneres 4912 with a plurality of specifications;

exemplary time interval object community unit object of India Prime Minister Modi 4913 with a plurality of specifications;

exemplary time interval object community unit object of Jack Ma 4914 with a plurality of specifications;

exemplary time interval object community unit math object at origin waypoint 4916;

exemplary time interval object community linked transport unit object transfer or bypass waypoint 4917;

exemplary time interval object community linked transport unit object transfer or bypass waypoint 4918;

exemplary time interval object community linked transport unit object destination waypoint 4919 and storage delivery unit 4920;

In some embodiments, the method and system of time interval object community linked transport units 4916 with time interval object community linked transport price-time priority queues 300 may utilize an uplink module interface 4901 to upload time interval object subject unit inventory 4901 to the time interval object community linked transport unit object which may also be a form of a virtual search market interface to users of the method and system. In some embodiments, the time interval object may include a subset or superset of the following time interval object unit examples but not limiting by example: Barack Obama 4904, Justin Bieber 4905, Katy Perry 4906, King James 4907, Larry Ellison 4908, Serena Williams 4909, Venus Williams 4911, Ellen DeGeneres 4912, India Prime Minister Modi 4913, Jack Ma 4914 or a plurality of other time interval object units common to the time interval object market. In some embodiments, the time interval object units may include specifications and specification profiles in the specifications to standardize the units in the data transformations of the time interval object units 4916.

Figure 50:
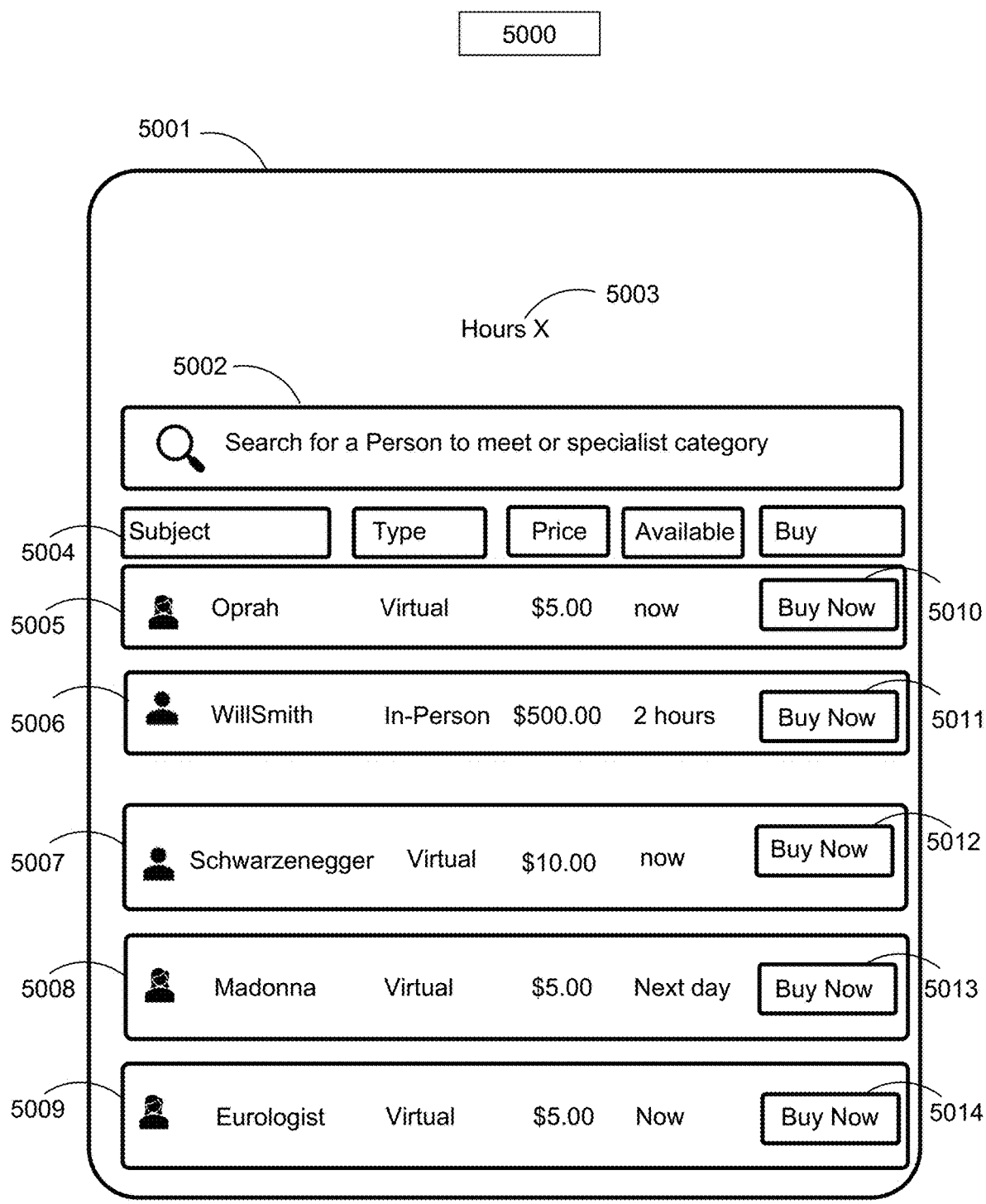

FIG. 50 illustrates an exemplary time interval object community search interface 5000 of the disclosed method and system which may be user to search for a time interval object community linked transport unit inventory to the time interval object linked virtual community object. In some embodiments, the search element of the multi layered network node topology of participating, transacting and/or trading transformed time interval object community linked time interval object capacity units or securities for time interval object community linked objects 4900 includes the following elements, or a subset or superset thereof:

exemplary time interval object community unit object search interface mobile or fixed or audio computer unit 5001;

exemplary time interval object community unit object search interface title 5003;

exemplary time interval object community unit object search interface for user time interval object search input 5002;

exemplary time interval object community unit object category title header such as subject, type, price of time interval object, availability of time interval object, rent or buy option for associated price-time priority queue of time interval object 5004;

exemplary time interval object community unit object of Oprah 5005 with a type of virtual at a price of $5.00 in the price-time priority queue with an immediate availability and an associated rent or buy now option button 5010;

exemplary time interval object community unit object of Will Smith 5006 with a type of in person at a price of $5.00 in the price-time priority queue with an availability in 2 hours and an associated rent or buy now option button 5011;

exemplary time interval object community unit object Schwarzenegger 5007 with a type of virtual at a price of $10.00 in the price-time priority queue with an immediate availability and an associated rent or buy now option button 5012;

exemplary time interval object community unit object of Madonna 5008 with a type of virtual at a price of $5.00 in the price-time priority queue with a next day availability and an associated rent or buy now option button 5013;

exemplary time interval object community unit object of Eurologist 5009 with a type of virtual at a price of $5.00 in the price-time priority queue with a next day availability and an associated rent or buy now option button 5014.

In some embodiments, the search function 5002 for the time interval object community object 4804 with a price-time priority queue auction indexes the search result with the following prioritization of first the time interval object community linked time interval object subject unit, then by price-time priority. In some embodiments, the search function may prioritize as a second priority price-time prioritization followed by instructor rating as a third index ranking. In some embodiments, the search function may prioritize as a second instructor rating followed by price-time priority as a third index ranking. In some embodiments, the search function 5002 may provide instructions for the graphical user interface 5001 to state if availability of the subject of the time interval object community linked time interval object unit is immediately available, available the next day or available a plurality of other time and date designations. In some embodiments, the time interval object community object 5005 may state only the lowest price $5.00 of the then current price-time priority queue 300 for the specific object requested in the search function 5002. In some embodiments, the subject may be Oprah 5005, Will Smith 5006, Schwarzenegger 5007, Madonna 5008, Eurologist 5009 or a plurality of other alternative subjects. In some embodiments, the specific subject may have a buy now or rent now 5010 button. In some embodiments, rare time interval object services community objects 4804 may require long transport distances over air 812 or sea 815 or virtual 811 or a plurality of other transport options for the waypoint sequence of the associated time interval object subject community object. In some embodiments, the rent now or buy now button 5010 instantiates the instructions for allow the application to consummate a transaction with geolocation and step by step delivery instructions 900, 2100, 2200, 2300 with the user interface as shown from the match of the user who may deliver a subject to the user who seeks to rent or buy the time interval object subject. In some embodiments, a user may be a human or artificial intelligence algorithm or series of algorithms or machine learning algorithms that may enter the price time priority queue at a specification and rating level for the time interval object community linked time interval object unit, which may even compete in rating and price-time priority against a human instructor for a given specification.

Figure 51:
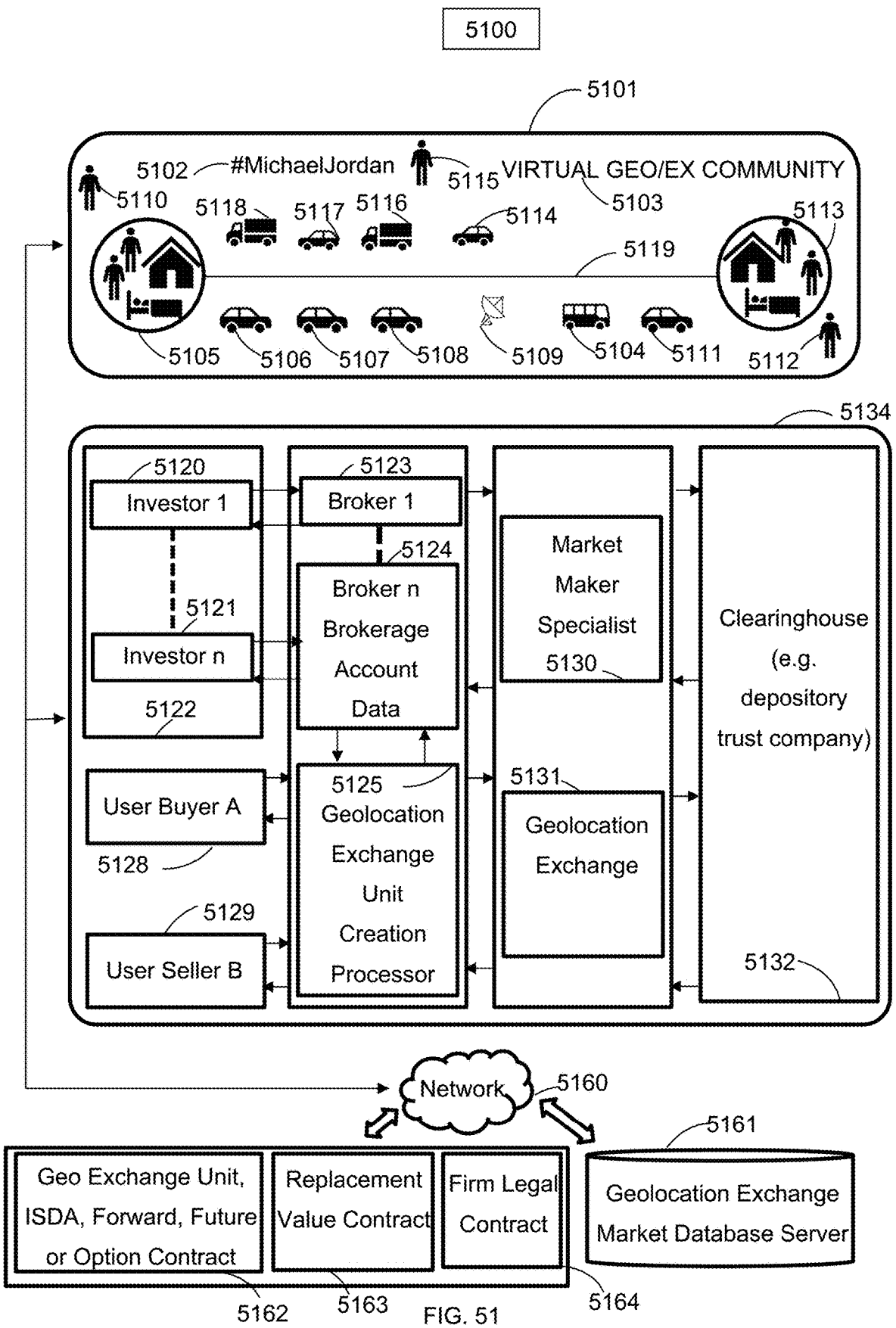
FIG. 51 illustrates an exemplary time interval object of Michael Jordan with the exemplary market transformations to make the geolocation exchange unit in accordance with some embodiments.

FIG. 51 illustrates an exemplary time interval object community and associated geolocation exchange unit creation method structure. In some embodiments, a time interval unit such as #MichaelJordan 5102 is constructed as a time interval unit community to which people or users may subscribe or follow with an associated price time and priority queue for the relevant Michael Jordan time interval unit community object 5101. A user 5110 may subscribe the to the Michael Jordan community 5102. In some embodiments, there may be a plurality of delivery methods for the virtual geolocation exchange unit or time interval unit 5103 community of Michael Jordan 5102. In some embodiments, the delivery methods may be physical such as a truck 5118, car 5117, truck 5116, small car 5114, virtual 5119 and 5109, mutli-vehicle 5111, 5106, 5107, 5108 or bus 5104 for the plurality of users 5110 and 5112 between two physical or virtual locations 5105, 5113. In some embodiments, the creation method process 5134 of a geolocation exchange unit may have a plurality of investors 5120, 5121 with invest in a broker account 5123 or 5124 to then alert the geolocation exchange unit creation processor 5125 the collateral has been posted. In some embodiments, a plurality of buyers 5128, 5129 may directly purchase the geolocation exchange units. In some embodiments, the market maker or specialist 5130 may help to facilitate transactions for the geolocation exchange 5131 and clearinghouse 5132. In some embodiments, the creation process for a geolocation exchange unit may interact with the system network 5160 to form a legal transformation for the geolocation exchange unit ISDA, Forward, Future or Option contract 5162 and replacement value contract 5163 and firm legal contract 5164 which may be the basis for the transactions on the geolocation exchange market database server 5161.

FIG. 52 illustrates an exemplary preamble formula structure 5200 for a Geolocation Exchange Unit or Transportation or Freight Capacity Units which may represent a geolocation exchange units or transportation and freight and parking and tolling and curb management and transportation management association unit securities or derivative unit securities or unitization structure. In some embodiments, to avoid doubt in the legal transformations a "Geolocation Exchange Unit" is synonymous with a "Transportation Capacity Unit" or "Freight Capacity Unit", or in other words, the Geolocation Exchange Unit refers more broadly to an exchange traded structure or instrument that may be in the form of stock, fixed income, debt, foreign exchange, futures, forwards, swaps, options, derivatives, exchange traded fund, block chain traded asset, private placement structure or public market structure. In some embodiments, the disclosed method and system relates to the sale and purchase or resale or repurchase or transfer and assignment of those certain geolocation exchange units or transportation and freight capacity units. In some embodiments, HoursX or SeatsX may relate to the purchase or sale or repurchase and resale of geolocation exchange units or time interval units or transportation capacity units. In some embodiments HoursX or ShipsX may relate to the purchase or sale or repurchase and resale of time interval units or freight capacity units. In some embodiments, a SeatsX or ShipsX Trade Hub is synonymous with a Virtual Hub. In yet other embodiments, a HoursX, PortalsX or WondersX or FarmsX or RoutesX or SidesX or CurbsX or TollsX Trade Hub is synonymous with a Virtual Hub. In some embodiments, PortalsX Geolocation Exchange Units may be capacity of advertising impressions though a plurality of operating system applications and web browsers associated with a data vault of a user 110 specification of geolocation attributes and geolocation exchange unit attributes. U.S. Provisional Patent Application 62/969,301, "Web browser and operating system portal and search portal with price time priority queues", filed Feb. 3, 2020, the contents which are hereby incorporated by reference in their entirety. In some embodiments, FarmsX Geolocation Exchange Units may be capacity of agricultural units with a plurality of agriculture exchange units as a specification of geolocation attributes and geolocation exchange unit attributes. U.S. patent application Ser. No. 16/290,278, "Agriculture community objects with price-time priority queues for transformed agricultural units", filed Mar. 1, 2019, the contents which are hereby incorporated by reference in their entirety. In some embodiments, Rent It X Geolocation Exchange Units may be capacity of rental tool or farm equipment or heavy machinery or general appliance units with a plurality of rental exchange units as a specification of geolocation attributes and geolocation exchange unit attributes. U.S. patent application Ser. No. 16/293,712, "Tool appliance community objects with price-time priority queues for transformed tool units", filed Mar. 6, 2019, the contents which are hereby incorporated by reference in their entirety. In some embodiments, Renewable Energy X Geolocation Exchange Units may be capacity of renewable energy units with a plurality of energy exchange units as a specification of geolocation attributes and geolocation exchange unit attributes. U.S. patent application Ser. No. 16/357,241, "Social community objects with price time priority queues for transformed renewable energy units", filed Mar. 18, 2019, the contents which are hereby incorporated by reference in their entirety. In some embodiments, Tutors X Geolocation Exchange Units may be capacity of educational or tutoring units with a plurality of educational exchange units as a specification of geolocation attributes and geolocation exchange unit attributes. U.S. patent application Ser. No. 16/397,685, "Social community objects with price-time priority queues for transformed educational units", filed Apr. 29, 2019, the contents which are hereby incorporated by reference in their entirety. In some embodiments, Parked X Geolocation Exchange Units may be capacity of parking units with a plurality of parking exchange units as a specification of geolocation attributes and geolocation exchange unit attributes. U.S. patent application Ser. No. 16/359,841, "Social community objects with price-time priority queues for transformed parking units", filed Mar. 20, 2019, the contents which are hereby incorporated by reference in their entirety. In some embodiments, CurbsX Geolocation Exchange Units may be capacity of curb space for parking or storage though a plurality of parking spots or curb storage specifications of geolocation attributes and geolocation exchange unit attributes. U.S. Provisional Patent Application 62/927,025, "Social community objects with price-time priority queues for transformed curb capacity units", filed Oct. 28, 2019, the contents which are hereby incorporated by reference in their entirety. In some embodiments, TollsX Geolocation Exchange Units may be capacity of tolling space or congestion management space for road or city congestion though a plurality of tolling or congestion management specifications of geolocation attributes and geolocation exchange unit attributes. U.S. Provisional Patent Application 62/927,081, "Social community objects with price-time priority queues for transformed congestion capacity units", filed Oct. 28, 2019, the contents which are hereby incorporated by reference in their entirety. In some embodiments, the Geolocation Exchange Unit is used interchangeably with any trading unit utilizing geolocation attributes in geolocation exchanged based methods.

FIG. 53 illustrates an exemplary preamble formula extension structure 5300 for a transformed Geolocation Exchange Unit or Transportation or Freight Capacity Unit which may represent a transportation and freight and parking and tolling and curb management and transportation management association unit securities or derivative unit securities or unitization structure. In some embodiments, the disclosed method and system relates to the sale and purchase or resale or repurchase or transfer and assignment of those certain transportation and freight capacity units. In some embodiments, HoursX may relate to the purchase or sale or repurchase or resale of time interval units, SeatsX may relate to the purchase or sale or repurchase and resale of transportation capacity units. In some embodiments ShipsX may relate to the purchase or sale or repurchase and resale of freight capacity units. In some embodiments, a SeatsX or ShipsX Trade Hub is synonymous with a Virtual Hub.

FIG. 54 illustrates an exemplary definition formula structure 5400 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Affiliate, Agreement, Applicable Interest Rate, Assigning Party, Bankrupt entity and other terms in accordance with some embodiments. In some embodiments, the formula for the transformed transportation or freight capacity unit may be present within the definitions stated in FIG. 54.

FIG. 55 illustrates an exemplary definition formula structure 5500 for a transformed Geolocation Exchange Unit or time interval unit or Transportation or Freight Capacity Unit which may represent a time interval and transportation and freight and parking and tolling and curb management and transportation management association unit securities or derivative unit securities or unitization structure. In some embodiments, a plurality of definitions are set from a superset or subset or combination of the following structure to include Business Day, Buyer, Claiming Party, Claims, Confirmation, Contract Price, Contract Value, Contractual Currency and other terms in accordance with some embodiments. In some embodiments, the formula for the transformed transportation or freight capacity unit may be present within the definitions stated in FIG. 55.

FIG. 56 illustrates an exemplary definition formula structure 5600 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Cost, Defaulting Party, Default Rate, Delivery, Early Termination Date, Effective Date, Event of Default, Force Majeure and other terms in accordance with some embodiments. In some embodiments, the formula for the transformed transportation or freight capacity unit may be present within the definitions stated in FIG. 56.

FIG. 57 illustrates an exemplary definition formula structure 5700 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include GTCs, Independent Amount, Letters of Credit, Margin Party, Non-Defaulting Party, Option, Option Buyer, Option Seller, Party or Parties, Party B, Payment Date, Performance Assurance and other terms in accordance with some embodiments. In some embodiments, the formula for the transformed transportation or freight capacity unit may be present within the definitions stated in FIG. 57.

FIG. 58 illustrates an exemplary definition formula structure 5800 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Person, Premium, Present Value Discount Rate, Ask Yield, Product, Recording, Replacement Value, Seller, Settlement Amount, and other terms in accordance with some embodiments. In some embodiments, the formula for the transformed transportation or freight capacity unit may be present within the definitions stated in FIG. 58.

FIG. 59 illustrates an exemplary definition formula structure 5900 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Taxes, Term, Terminated Transaction, Termination Payment, Termination Replacement Price, Termination Replacement Transaction and other terms in accordance with some embodiments. In some embodiments, the formula for the transformed transportation or freight capacity unit may be present within the definitions stated in FIG. 59.

FIG. 60 illustrates an exemplary definition formula structure 6000 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Trade Date, Transaction, Transportation Capacity Unit and Freight Capacity Unit may be used interchangeably and other terms in accordance with some embodiments. In some embodiments, the formula for the transformed transportation or freight capacity unit may be present within the definitions stated in FIG. 60.

FIG. 61 illustrates an exemplary definition formula structure 6100 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Confirmation and other terms in accordance with some embodiments. In some embodiments, a plurality of definitions are set from a superset or subset or combination of the following structure to include Recording of Transactions and other terms in accordance with some embodiments. In some embodiments, the formula for the transformed transportation or freight capacity unit may be present within the definitions stated in FIG. 61.

FIG. 62 illustrates an exemplary definition formula structure 6200 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Inconsistency with these established formulas for a plurality of transformed transportation unit formulas. In some embodiments, the formula for the transformed transportation or freight capacity unit may be present within the definitions stated in FIG. 62.

FIG. 63 illustrates an exemplary definition formula structure 6300 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Force Majeure with these established formulas for a plurality of transformed transportation unit formulas. In some embodiments, Force Majeure may occur and be written in one or more business days from the Force Majeure event. In some embodiments, Remedies for Product Delivery Failures may be caused by failure of failure of the Buyer or Seller to delivery the Geolocation Exchange Unit time interval unit or TCU and the non-failing party shall be entitled to the formula of the then current price of such TCI as liquidated damages. In some embodiments, the formula for the transformed transportation or freight capacity unit may be present within the definitions stated in FIG. 63.

FIG. 64 illustrates an exemplary definition formula structure 6400 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include events of default and remedies with these established formulas for a plurality of transformed transportation and freight unit formulas. In some embodiments, the formula for the transformed transportation or freight capacity unit may be present within the definitions stated in FIG. 60. In some embodiments, events of default may include failure to make payment when required, making false representations, failure to perform to deliver the TCU, post-merger or reorganization failing to support the obligations of TCU or GXU or time interval unit transactions. In some embodiments, events of default may include credit default or failure to delivery performance assurance or margin.

FIG. 65 illustrates an exemplary definition formula structure 6500 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include effect of default for a plurality of transformed transportation unit formulas. In some embodiments, effect of default may occur and be written in one or more business days from the Effect of an event of Default. In some embodiments, the calculation of a termination payment may be "Settlement Amount" for such Terminated Transaction shall be the difference between the Replacement Value and the Contract Value of such Terminated Transaction, as calculated by the Non-Defaulting Party as follows:

i. If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

ii. If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party. In some embodiments, the formula for the transformed transportation or freight capacity unit may be present within the definitions stated in FIG. 65.

FIG. 66 illustrates an exemplary definition formula structure 6600 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include effect of default for a plurality of transformed transportation unit formulas. In some embodiments, effect of default may occur and be written in one or more business days from the Effect of an event of Default. In some embodiments, the calculation of a termination payment may be "Settlement Amount" for such Terminated Transaction shall be the difference between the Replacement Value and the Contract Value of such Terminated Transaction, as calculated by the Non-Defaulting Party as follows:

iii. If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and iv. If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

v. If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section 5.4. In some embodiments, the formula for the transformed transportation or freight capacity unit may be present within the definitions stated in FIG. 66.

FIG. 67 illustrates an exemplary definition formula structure 6700 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Notice of Payment of Termination Payment of transformed transportation unit formulas. In some embodiments, Notice of Payment of Termination Payment may occur and be written in one or more business days from the Notice of Payment of Termination Payment. In some embodiments, As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and HoursX or PortalsX or SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid;

provided, however, that to the extent that the Termination Payment is calculated in respect of a termination pursuant to Article 3 5900, no such interest shall be payable. If the Termination Payment is due from the Non-Defaulting Party, the Non-Defaulting Party shall pay such Termination Payment, without interest, within twenty (20) Business Days after delivery of such notice.

FIG. 68 illustrates an exemplary definition formula structure 6800 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Notice of Payment of Termination Payment of transformed transportation unit formulas. In some embodiments, Notice of Payment of Termination Payment may occur and be written in one or more business days from the Notice of Payment of Termination Payment. In some embodiments, As soon as practicable after the calculation of the Termination Payment, the Non-Defaulting Party shall notify the Defaulting Party in writing of the amount of the Termination Payment and whether the Termination Payment is due to or due from the Non-Defaulting Party. The notice shall include a written statement explaining in reasonable detail the calculation of such Termination Payment to the Defaulting Party and HoursX or PortalsX or SeatsX. If the Termination Payment is due to the Non-Defaulting Party, the Defaulting Party shall pay such Termination Payment within five (5) Business Days after receipt of such notice, together with interest thereon (before as well as after judgment) at the Default Rate, to the extent permitted under applicable law, compounded daily, from (and including) the Early Termination Date to (but excluding) the day such amount is paid; provided, however, that to the extent that the Termination Payment is calculated in respect of a termination pursuant to Article 3 5900, no such interest shall be payable. If the Termination Payment is due from the Non-Defaulting Party, the Non-Defaulting Party shall pay such Termination Payment, without interest, within twenty (20) Business Days after delivery of such notice.

FIG. 69 illustrates an exemplary definition formula structure 6900 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Closeout Setoff features 6900. After calculation of a Termination Payment in accordance with Section 5.3 (unless such Termination Payment was calculated as a result of a termination pursuant to Article 3), if the Defaulting Party would be owed the Termination Payment, the Non-Defaulting Party shall be entitled, at its option and in its discretion, to set off against such Termination Payment any amounts due and owing by the Defaulting Party to the Non-Defaulting Party under any other agreements, instruments or undertakings between the Defaulting Party and the Non-Defaulting Party which are not related to the PortalsX or HoursX or SeatsX Trade Hub. The remedy provided for in this Section shall be without prejudice and in addition to any right of setoff, combination of accounts, lien or other right to which any Party is at any time otherwise entitled (whether by operation of law, contract or otherwise). Notwithstanding the foregoing, the Non-Defaulting Party shall not be required to pay to the Defaulting Party any amount owing by the Non-Defaulting Party under this Agreement until the Non-Defaulting Party receives confirmation satisfactory to it in its reasonable discretion that all obligations of the Defaulting Party to make any payments of any kind whatsoever to the Non-Defaulting Party or any of its Affiliates or otherwise which are due and payable as of the Early Termination Date have been fully and finally paid in cash in some embodiments.

FIG. 70 illustrates an exemplary definition formula structure 7000 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of definitions are set from a superset or subset or combination of the following structure to include Disputes of Invoices and Payments of transformed transportation unit formulas. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6400 and 6500 and 6600.

FIG. 71 illustrates an exemplary definition formula structure 7100 for a transformed Geolocation Exchange Unit or Transportation or time interval unit or Freight Capacity Unit. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6400 and 6500 and 6600.

FIG. 72 illustrates an exemplary definition formula structure 7200 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of limitation of remedies, liability and damages are set from a superset or subset or combination of the following structure to include limitation of remedies, liability and damages of transformed transportation unit formulas. In some embodiments, remedies are limited to the formulas of Replacement Value and Contract Value structured in 6400 and 6500 and 6600. In some embodiments, financial information may be requested to satisfy performance assurance 5700 formulas for credit support 7300 of Transportation and time interval unit or Freight Capacity Units.

FIG. 73 illustrates an exemplary definition formula structure 7300 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of credit support formulas are set from a superset or subset or combination of the following structure to include credit protection in the form of performance assurance and grants of security interest and remedies of transformed transportation unit formulas. In some embodiments, credit support may follow the formulas in the definition of performance assurance 5700. In some embodiments, credit support and performance assurance calculations may include value at risk calculations that consider duration of the contract, price volatility formulas, price correlation formulas, closeout setoff formulas, cross-default formulas and other formulas that may consider the value and credit fluctuations of the credit worthiness of a counterparty and the market value and Replacement Value of such contracts of transformed transportation and freight capacity units.

FIG. 74 illustrates an exemplary definition formula structure 7400 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, general formulas may follow the formulas in the definition of performance assurance 5700, representation and warranties formulas to determine the variance of financial results of a counterparty to quantify a truthfulness score. In some embodiments, a credit score or truthfulness score may use earnings manipulation formulas that seek variance thresholds on cash flow, inventories, receivables, payables, goodwill, and other accounting standards that may be placed in a model to determine the general variability of the credit worthiness of the counterparty.

FIG. 75 illustrates an exemplary definition formula structure 7500 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include cross checks on criminal background, driver license scores, indemnification scores, or scores to determine the likelihood of litigious actions.

FIG. 76 illustrates an exemplary definition formula structure 7600 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include credit support for successors and assignments to provide scores of the likelihood a counterparty assuming the transportation or freight capacity unit may handle the credit obligations without triggering an event of default.

FIG. 77 illustrates an exemplary definition formula structure 7700 for a transformed Geolocation Exchange Unit or time interval unit or Transportation or Freight Capacity Unit which may represent a time interval unit or transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts.

FIG. 78 illustrates an exemplary definition formula structure 7800 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts and arbitration awards.

FIG. 79 illustrates an exemplary definition formula structure 7900 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts and arbitration awards.

FIG. 80 illustrates an exemplary definition formula structure 8000 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include dispute resolution formulas and threshold formulas to methodically evaluate and settle dispute amounts and arbitration awards.

FIG. 81 illustrates an exemplary definition formula structure 8100 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include notice formulas and threshold formulas to methodically evaluate and settle dispute amounts and arbitration awards and counterparty information updates.

FIG. 82 illustrates an exemplary definition formula structure 8200 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include notice formulas and threshold formulas to methodically evaluate and settle severability and intent and regulation and exchange rule.

FIG. 83 illustrates an exemplary definition formula structure 8300 for a transformed Geolocation Exchange Unit or time interval unit or Transportation or Freight Capacity Unit which may represent a transportation and freight and parking and tolling and curb management and transportation management association unit securities or derivative unit securities or unitization structure. In some embodiments, a plurality of general formulas are set from a superset or subset or combination of the following structure to include additional formulas of transformed transportation unit formulas. In some embodiments, these formulas may include termination, liquidation, net out, offset, and plurality of counterpart formulas and threshold formulas to methodically evaluate and settle termination, liquidation, net out, offset, and plurality of counterpart formulas.

FIG. 84 illustrates an exemplary notice of correspondence 8400 for a transformed time interval unit or Transportation or Freight Capacity Unit which may represent a transportation and freight and parking and time interval unit or tolling and curb management and transportation management association unit securities or derivative unit securities or unitization structure. In some embodiments, a plurality of general formulas are set from a superset or subset or combination of the following structure to include additional notice of correspondence.

FIG. 85 illustrates an exemplary notice step flowchart and application of one or more which may represent a Geolocation Exchange Unit time interval unit or or transportation and freight and parking and tolling and curb management and transportation management association unit securities or derivative unit securities or unitization structure capacity unit transformations 8500. In some embodiments, at a computing device with a touchscreen interface, audio interface, augmented reality interface, mixed reality interface, brain wave interface, visual interface, detect a transportation or freight capacity unit 8502, the method and system may apply one or more transportation or freight capacity unit transformations to create a new transportation or freight capacity unit 8503. In some embodiments, the transformation may include the following transformations of the transportation and freight capacity unit or a superset or subset thereof:

apply an interest rate to discount forward transportation and freight and parking and tolling and curb management and transportation management association unit securities or derivative unit securities or unitization structure capacity units 8504;

apply a contract price to the forward transportation and freight and parking and tolling and curb management and transportation management association unit securities or derivative unit securities or unitization structure capacity units 8505;

apply a default interest rate to the forward transportation and freight and parking and tolling and curb management and transportation management association unit securities or derivative unit securities or unitization structure capacity units 8506;

apply an early termination date to the forward transportation and freight and parking and tolling and curb management and transportation management association unit securities or derivative unit securities or unitization structure capacity units 8507;

apply a force majeure event for forward transportation and freight and parking and tolling and curb management and transportation management association unit securities or derivative unit securities or unitization structure capacity units 8508;

apply a letter of credit or performance assurance for forward transportation and freight and parking and tolling and curb management and transportation management association unit securities or derivative unit securities or unitization structure capacity units 8509;

apply a termination replacement price meaning with respect to a Termination Replacement Transaction, the price which the Non-Defaulting Party acting in a commercially reasonable manner, pays or receives or could pay or receive in connection with the Termination Replacement Transaction (plus Costs reasonably incurred by the Non-Defaulting Party in entering into the Termination Replacement Transaction) for forward transportation or freight capacity units 8510.

In some embodiments, the aforementioned steps and transformations may be processed to transform the transportation or freight capacity unit 8511.

FIG. 86 illustrates an exemplary notice step flowchart and application of one or more Geolocation Exchange Units or time interval unit or transportation and freight and parking and tolling and curb management and transportation management association unit securities or derivative unit securities or unitization structure capacity unit transformations 8600. In some embodiments, at a computing device with a touchscreen interface, audio interface, augmented reality interface, mixed reality interface, brain wave interface, visual interface, detect a transportation or freight capacity unit 8602, the method and system may apply one or more transportation and freight and parking and tolling and curb management and transportation management association unit securities or derivative unit securities or unitization structure capacity unit transformations to create a new transportation or freight capacity unit 8603. In some embodiments, the transformation may include the following transformations of the transportation and freight capacity unit or a superset or subset thereof:

apply a Termination Replacement Transaction 8604 meaning a transaction for the purchase or sale, as applicable, of a Product(s) for any remaining period or part thereof to be purchased or sold in connection with the Terminated Transaction, provided that, the transaction replacing any Terminated Transaction or portion thereof shall be deemed to have a term:
  commencing on the Early Termination Date; and
  ending on the last day of the term
for forward transportation or freight capacity units;

apply a trade confirmation for forward transportation or freight capacity units 8605;

apply a recorded confirmation for forward transportation or freight capacity units 8206;

apply remedies for product delivery failures for forward transportation or freight capacity units as liquidated damages 8607;

apply events of default for forward transportation or freight capacity units as liquidated damages 8608;

In some embodiments, the aforementioned steps and transformations may be processed to transform the transportation or freight capacity unit 8609.

FIG. 87 illustrates an exemplary notice step flowchart and application of one or more Geolocation Exchange Unit or transportation and freight and parking and tolling and curb management and transportation management association unit securities or derivative unit securities or unitization structure capacity unit transformations 8700. In some embodiments, at a computing device with a touchscreen interface, audio interface, augmented reality interface, mixed reality interface, brain wave interface, visual interface, detect a transportation or freight capacity unit 8702, the method and system may apply one or more transportation or freight capacity unit transformations to create a new transportation or freight capacity unit 8703. In some embodiments, the transformation may include the following transformations of the transportation and freight capacity unit or a superset or subset thereof:

Apply a Calculation of a Termination Payment 8704.

a. If an Early Termination Date is designated with respect to any Transaction, the "Settlement Amount" for such Terminated Transaction shall be the difference between the Replacement Value and the Contract Value of such Terminated Transaction, as calculated by the Non-Defaulting Party as follows:

If the Non-Defaulting Party in respect of a Terminated Transaction is Seller and the Replacement Value is greater than the Contract Value, then the Settlement Amount shall be the amount of such excess plus the pro rata portion of the Contract Value attributable to any Contract Price actually paid by Buyer and shall be payable by the Non-Defaulting Party to the Defaulting Party;

If the Non-Defaulting Party in respect of a Terminated Transaction is Seller and the Replacement Value is less than the Contract Value, then the Settlement Amount shall be the amount of such difference less the pro rata portion of the Contract Value attributable to any Contract Price actually paid by Buyer and shall be payable by the Defaulting Party to the Non-Defaulting Party;

for forward transportation or freight capacity units.

In some embodiments, the aforementioned steps and transformations may be processed to transform the transportation or freight capacity unit 8705.

FIG. 88 illustrates an exemplary notice step flowchart and application of one or more Geolocation Exchange Unit or time interval unit or transportation and freight and parking and tolling and curb management and transportation management association unit securities or derivative unit securities or unitization structure capacity unit transformations 8400. In some embodiments, at a computing device with a touchscreen interface, audio interface, augmented reality interface, mixed reality interface, brain wave interface, visual interface, detect a transportation or freight capacity unit 8402, the method and system may apply one or more transportation or freight capacity unit transformations to create a new transportation or freight capacity unit 8803. In some embodiments, the transformation may include the following transformations of the transportation and freight capacity unit or a superset or subset thereof:

apply a Calculation of a Termination Payment 8804;

If the Non-Defaulting Party in respect of a Terminated Transaction is Buyer and the Replacement Value is greater than the Contract Value, then the Settlement Amount shall be the amount of such excess plus the pro rata portion of the Contract Value attributable to any Contract Price actually paid by Buyer and shall be payable by the Defaulting Party to the Non-Defaulting Party; and If the Non-Defaulting Party in respect of a Terminated Transaction is Buyer and the Replacement Value is less than the Contract Value, then the Settlement Amount shall be the amount of such difference less the pro rata portion of the Contract Value attributable to any Contract Price actually paid by Buyer and shall be payable by the Non-Defaulting Party to the Defaulting Party.

If the sum of the Settlement Amounts payable by the Defaulting Party is greater than the sum of Settlement Amounts payable by the Non-Defaulting Party, then a single payment in the amount of such excess will be payable to the Non-Defaulting Party by the Defaulting Party on the date specified in Section 5.4 6800. If the sum of the Settlement Amounts payable by the Non-Defaulting Party is greater than the sum of the Settlement Amounts payable by the Defaulting Party, then a single payment in the amount of such excess Settlement Amounts will be payable by the Non-Defaulting Party to the Defaulting Party on the date specified in Section for forward transportation or freight capacity units.

Figure 89:
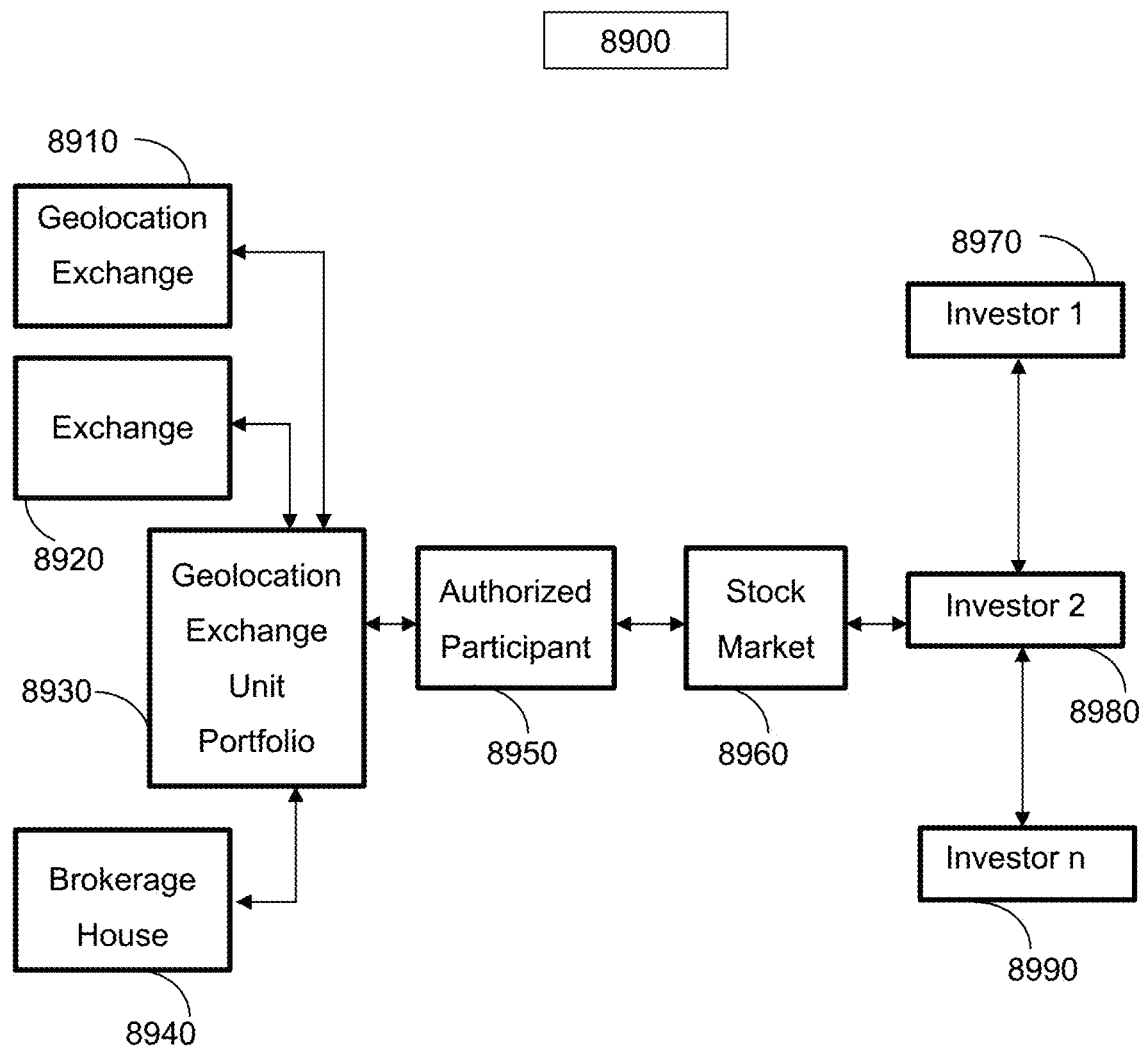
FIG. 89 illustrates an exemplary transformation of the creation of a time interval object Geolocation Exchange Unit or Geolocation Exchange Unit portfolio on the exchange.

FIG. 89 illustrates the general schema for the creation of a geolocation exchange unit security. In some embodiments, a plurality of investors 8970, 8980 and 8990 invest in the geolocation exchange unit securities that have been created through the geolocation exchange 8910, exchange 8920 to construct a geolocation exchange unit portfolio 8930 which may have a brokerage house 8940 to coordinate authorized participants 8950 to place the portfolios 8930 on the stock market 8960 as an exchange traded product in one of many forms of the time interval unit or time unit interval portfolios.

Figure 90A:
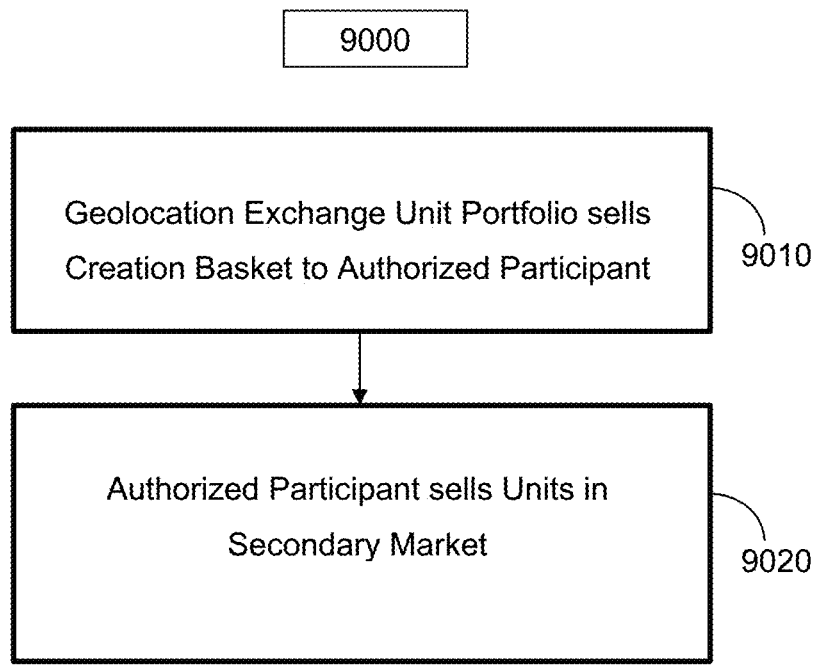
FIG. 90A and FIG. 90B illustrates an exemplary transformation of the creation of a time interval object Geolocation Exchange Unit or Geolocation Exchange Unit portfolio on the exchange.
Figure 90B:
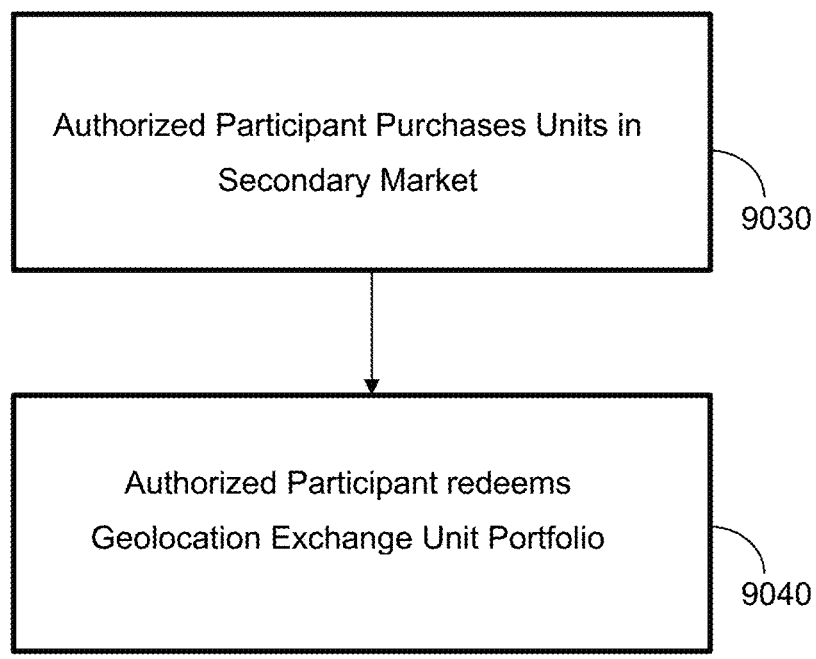

FIG. 90 illustrates exemplary steps, in some embodiments to create exchange traded products from the geolocation exchange units or time interval units. The first step is that the Geolocation Exchange Unit Portfolio sells Creation Basket to Authorized Participant 9010 followed by Authorized Participant sells Units in the Secondary Market 9020 in FIG. 90A. In some embodiments, Authorized Participant Purchases Units in Secondary Market 9030 followed by Authorized Participant redeems Geolocation Exchange Unit Portfolio 9040 in FIG. 90B. In some embodiments, the process outlined in diagrams 8900 and 9000 and 9100 may be used to make Initial Public Offerings or ("IPOs") of the geolocation exchange unit or time interval unit that was created. By way of example, but not limiting by example, the system and method may IPO Jimmy Page as a listed geolocation exchange unit for hours of guitar lessons as defined in the specification for the time interval unit of a virtual or in person time interval unit delivery with Jimmy Page the former lead guitarist of Led Zeppelin. In some embodiments, investors 8970, 8980, 8990 may pre-bid on the exchange to gauge value and interest in the IPO for a given geolocation exchange unit or time interval unit prior to the IPO where the geolocation exchange basket 9010 is then released for secondary trading in a secondary market 9020 such as a stock exchange, commodity exchange or general trading exchange. In some embodiments, once a time interval unit or geolocation exchange unit for a certain specification has been created as an IPO for secondary market trading, then a plurality of investors may freely buy or sell the legally transformed geolocation exchange units for a specification of Jimmy Page or a plurality of other celebrities, athletes, musicians, chefs, business people, categories of professions, categories of activities, or any time interval unit that may be defined under a given specification.

Figure 91:
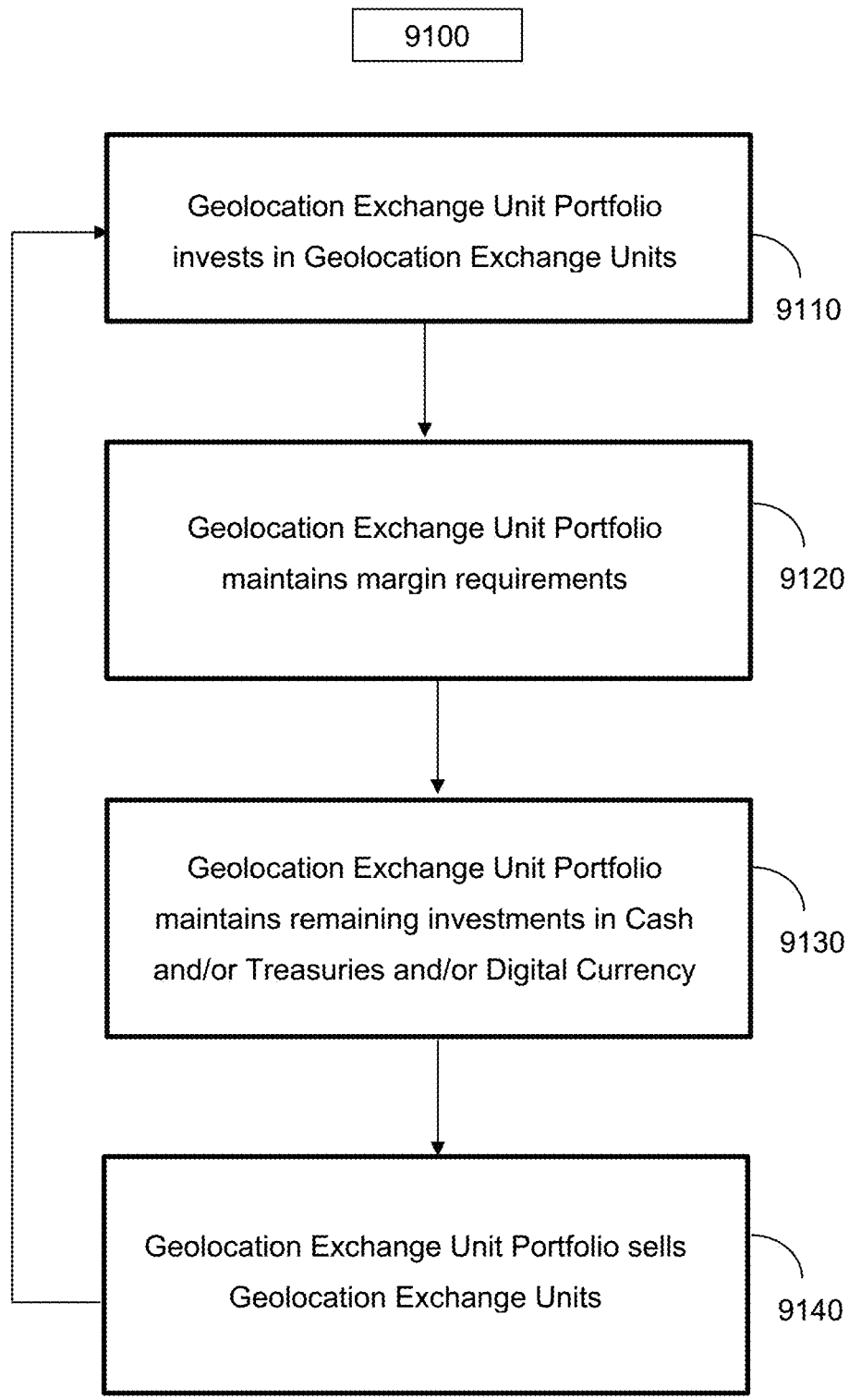
FIG. 91 illustrates an exemplary transformation of the creation of a time interval object Geolocation Exchange Unit or Geolocation Exchange Unit portfolio on the exchange.

FIG. 91 illustrates exemplary steps, in some embodiments to create baskets of geolocation exchange units which may also have secondary listings on a plurality of exchanges 9100. In some embodiments, Geolocation Exchange Unit Portfolio invests in Geolocation Exchange Units 9110 followed by Geolocation Exchange Unit Portfolio maintains margin requirements 9120 followed by Geolocation Exchange Unit Portfolio maintains remaining investments in Cash and/or Treasuries and/or Digital Currency 9130 followed by Geolocation Exchange Unit Portfolio sells Geolocation Exchange Units 9140 which may be repeated to cycle through the steps as new baskets are created, bought and sold.

Figure 92:
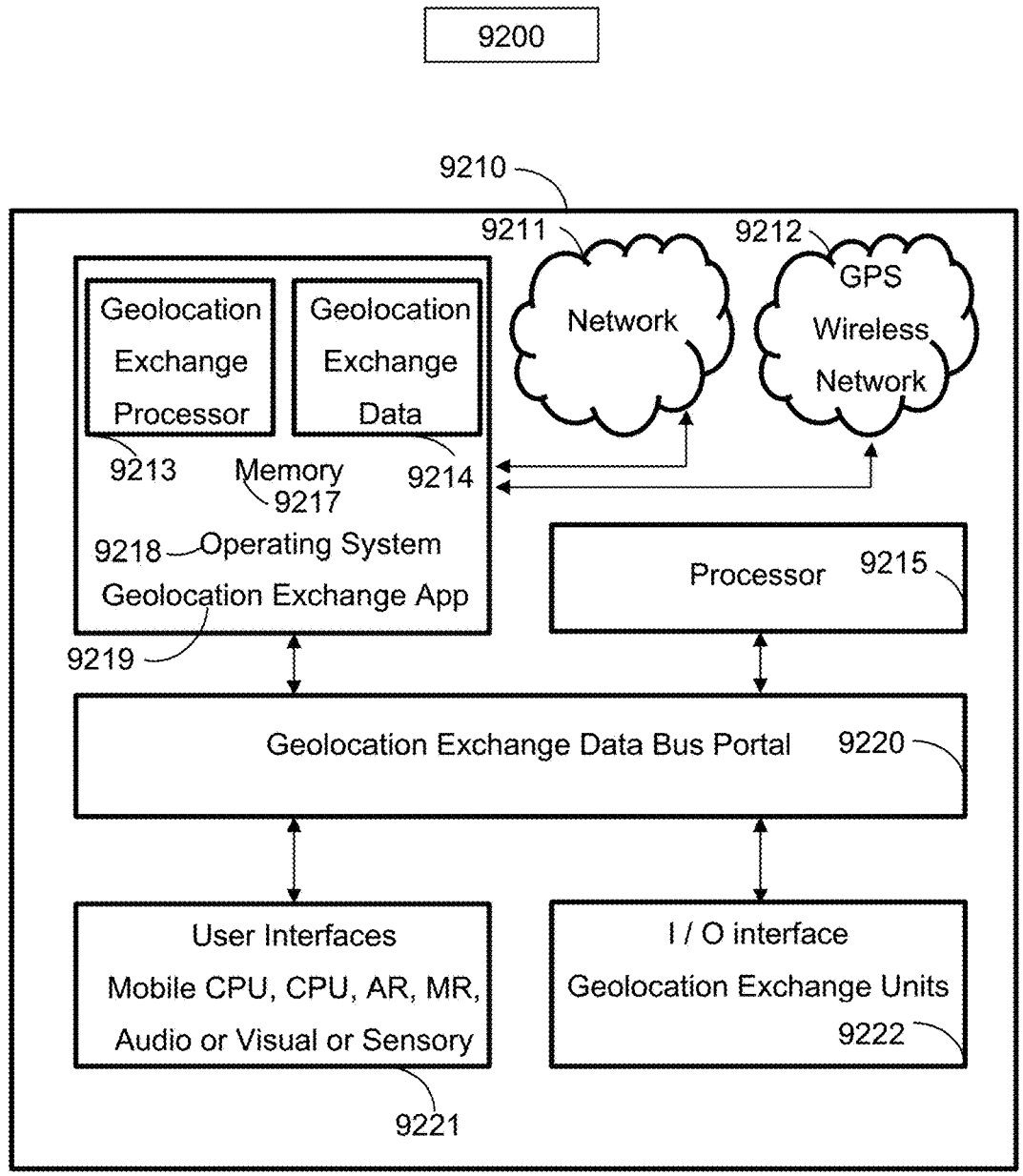
FIG. 92 illustrates an exemplary transformation of the creation of a time interval object Geolocation Exchange Unit or Geolocation Exchange Unit portfolio on the exchange system.

FIG. 92 illustrates exemplary schema, in some embodiments for the creation of geolocation exchange units 9210. In some embodiments, a geolocation exchange processor 9213 creates a geolocation exchange unit incorporating a plurality of geolocation exchange data 9214 from a geolocation exchange database 9214 which may use system memory 9217, an operating system 9217 as well as a plurality of instructions from a geolocation exchange application 9219. In some embodiments, the geolocation exchange application 9219 may use a network 9211 with geolocation exchange unit attributes of longitude, latitude, altitude or other dimension coordinates over a GPS wireless location network 9212 which may gather and process the geolocation exchange data 9214 for further processing 9215 while interacting with the geolocation exchange data bus portal 9220 as a gateway to interface with a plurality of user interfaces such as a mobile central processing unit or ("CPU"), stationary CPU, augmented reality device, mixed reality device, audio computing device, visual computing device, sensory computing device or a plurality of other computing devices 9221 with then have an input and output interface with the geolocation exchange units 9222 for trading or initial public offerings to create the baskets of time interval units or singular time interval units or secondary market trading.

Figure 93:
FIG. 93 illustrates an exemplary transformation creation and social network object of a time interval object Geolocation Exchange Unit for a Dermatology 5 star rated US English and Spanish Board Certified specification or Geolocation Exchange Unit portfolio on the exchange system.

FIG. 93 illustrates exemplary geolocation exchange unit or time interval unit community social object of Dermatologist 5 star 9322. In some embodiments, the computing interface 9310 displays a menu option 9351 for the geolocation exchange unit social network structure 9315 with a short name of #Dermatology5Star 9320 as well as a longer name which illustrates about the community object such as Dermatologist 5 star rated with US board medical certifications and the ability to communicate in English and Spanish 9322. In some embodiments, the geolocation exchange unit community social network object 9320 may have a feature for users to follow the object 9360, share the object 9355 on other platforms, make the object a public object 9350 or a private object 9345 which may be invite only or require certain identity verification to follow or become a member of the community, as well as a feature to buy or sell the geolocation exchange unit social network object time interval unit 9340. In some embodiments, the virtual hub pick up may be done physically with an in person time interval unit meeting or on a virtual platform such as skype, zoom, factetime, webex, in person, teams, or more such video or augmented reality or virtual reality or mixed reality communication platforms 9335. In some embodiments, the virtual hub drop off may be done physically with an in person time interval unit meeting or on a virtual platform such as skype, zoom, factetime, webex, in person, teams, or more such video or augmented reality or virtual reality or mixed reality communication platforms 9335. In some embodiments, the activity statistics for the geolocation exchange unit such as the amount of buyers, amount of sellers, intervals which have transacted, trades which have been completed, frequency of trades, volume of trades, the daily high price of the trades, the daily low price of the trades, the yearly high price of the trades, the yearly low price of the trades, additional news, weather or research on the geolocation exchange unit community objects, the trending feeds for other related or non-related geolocation exchange unit community objects 9325.

Figure 94:
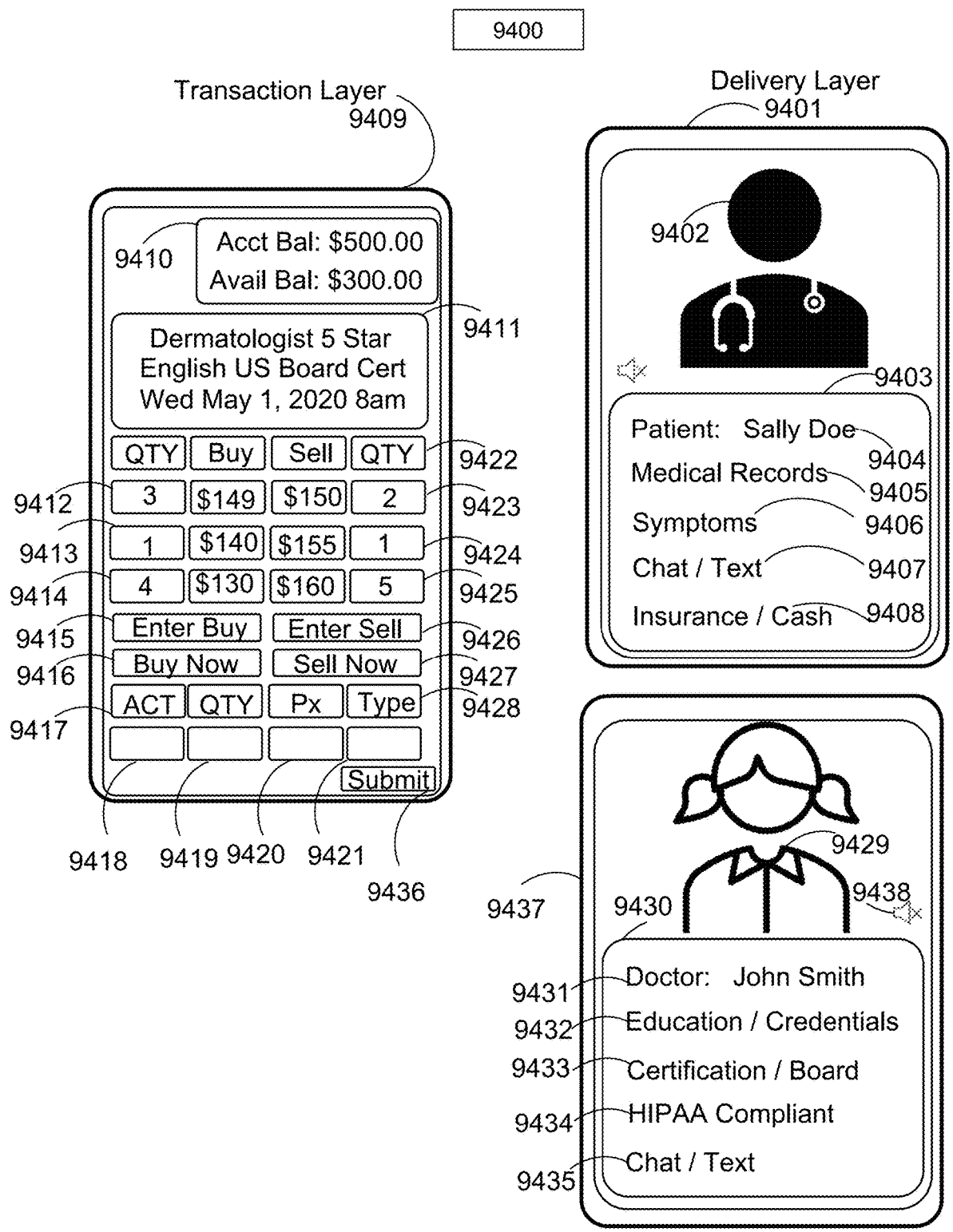
FIG. 94 illustrates an exemplary transformation creation and social network object of a time interval object Geolocation Exchange Unit for a Dermatology 5 star rated US English Board Certified specification or Geolocation Exchange Unit portfolio on the exchange system with exemplary transaction layer and delivery layer.

FIG. 94 illustrates an exemplary transaction layer 9409 for a geolocation exchange unit or time interval unit for the exemplary case of a Dermatologist 5 star rated who speaks English with US medical board certifications with a delivery time of Wednesday, May 1, 2020 at 8 am for virtual or in person delivery specification 9411. In some embodiments, the transaction layer 9409 may list the user account balance 9410 and available balance given outstanding transactions and trades 9410. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9412, the second price time priority queue quantity buy limit order book position 9413, the third price time priority queue quantity buy limit order book position 9414. In some embodiments, the first price time priority limit order buy queue position quantity of three with figure reference of 9412 also contains a price of $149. In some embodiments, the second price time priority limit order buy queue position quantity of one with figure reference of 9413 also contains a price of $140. In some embodiments, the third price time priority limit order buy queue position quantity of four with figure reference of 9414 also contains a price of $130. In some embodiments, an exemplary limit order sell queue for the geolocation exchange unit or time interval units may display the limit order book such as the first price time priority queue position quantity sell limit order book position 9423, the second price time priority queue quantity sell limit order book position 9424, the third price time priority queue quantity sell limit order book position 9425. In some embodiments, the first price time priority limit order sell queue position quantity of two with figure reference of 9423 also contains a price of $150. In some embodiments, the second price time priority limit order sell queue position quantity of one with figure reference of 9424 also contains a price of $155. In some embodiments, the third price time priority limit order sell queue position quantity of five with figure reference of 9425 also contains a price of $160. In some embodiments, the system and method transaction layer 9409 may contain both limit buy order features 9415 and market order features for buy now 9416 functionality. In some embodiments, the system and method transaction layer 9409 may contain limit order sell features 9426 and market order features for sell now 9427 functionality. In some embodiments, limit buy orders 9415 or limit sell orders 9426 allow the user to enter prices manually into the action block 9417 with input field 9418 for buy or sell as well as quantity selection order input field 9419 where the user may select their order quantity as well as a price input field 9420 where the user may select their limit order or other type of order price as well as a type input label 9428 and type label input field 9421 as well as a button to submit 9436 a relevant order. In some embodiments, upon order price match of the limit order book buy queue with the limit order book sell queue, delivery 9401 may occur virtually or in person for the contract specification date and time and quality and time interval unit specification 9411. In some embodiments, the virtual or in person delivery layer 9401 may show the video and or picture of the physician 9402 to the patent Sally Doe 9404. In some embodiments, the delivery layer 9401 may include the blockchain of the medical record history 9405, the blockchain symptoms 9406, chat and text between the buyer (patient) 9404 and seller (doctor) 9431 as well as insurance and cash and payment details 9408. In some embodiments, the patient 9429 or doctor 9402 may have a mute button 9438 during the video call as well as the name of the doctor 9431, the education and credentials of the doctor 9432, the certifications and boards of the doctor 9433, the HIPAA compliance of the doctor 9434 and chat and text records between the buyer (patient) and seller (doctor) 9435. In some embodiments, the geolocation exchange unit or time interval unit 9411 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 9401 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 95:
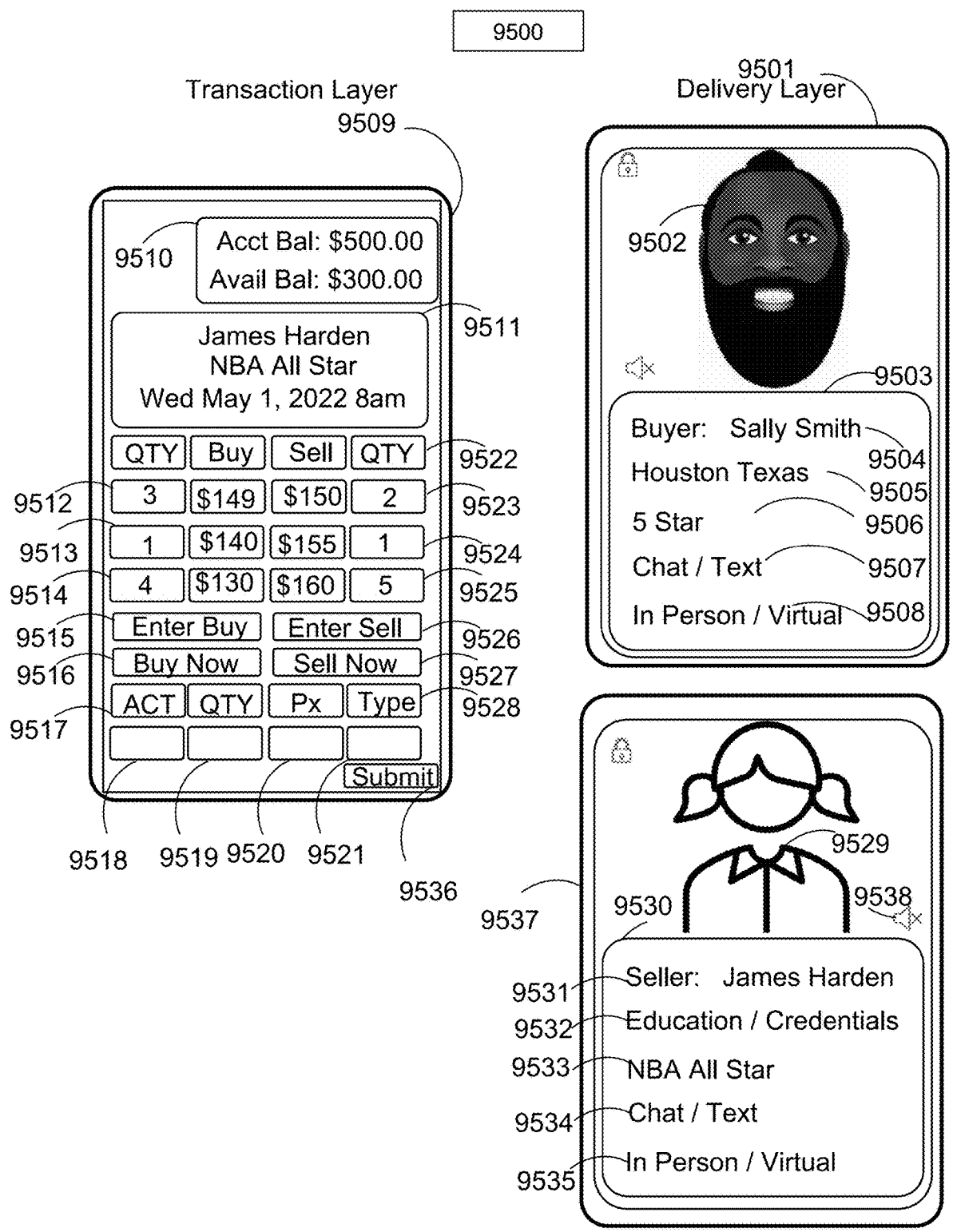
FIG. 95 illustrates an exemplary transformation creation and social network object of a time interval object Geolocation Exchange Unit for James Harden NBA All Star specification or Geolocation Exchange Unit portfolio on the exchange system with exemplary transaction layer and delivery layer.

FIG. 95 illustrates an exemplary transaction layer 9509 for a geolocation exchange unit or time interval unit for the exemplary case of James Harden the NBA All star with a delivery time of Wednesday, May 1, 2022 at 8 am for virtual or in person delivery specification 9511. In some embodiments, the transaction layer 9509 may list the user account balance 9510 and available balance given outstanding transactions and trades 9510. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9512, the second price time priority queue quantity buy limit order book position 9513, the third price time priority queue quantity buy limit order book position 9514. In some embodiments, the first price time priority limit order buy queue position quantity of three with figure reference of 9512 also contains a price of $149. In some embodiments, the second price time priority limit order buy queue position quantity of one with figure reference of 9513 also contains a price of $140. In some embodiments, the third price time priority limit order buy queue position quantity of four with figure reference of 9514 also contains a price of $130. In some embodiments, an exemplary limit order sell queue for the geolocation exchange unit or time interval units may display the limit order book such as the first price time priority queue position quantity sell limit order book position 9523, the second price time priority queue quantity sell limit order book position 9524, the third price time priority queue quantity sell limit order book position 9525. In some embodiments, the first price time priority limit order sell queue position quantity of two with figure reference of 9523 also contains a price of $150. In some embodiments, the second price time priority limit order sell queue position quantity of one with figure reference of 9524 also contains a price of $155. In some embodiments, the third price time priority limit order sell queue position quantity of five with figure reference of 9525 also contains a price of $160. In some embodiments, the system and method transaction layer 9509 may contain both limit buy order features 9515 and market order features for buy now 9516 functionality. In some embodiments, the system and method transaction layer 9509 may contain limit order sell features 9526 and market order features for sell now 9527 functionality. In some embodiments, limit buy orders 9515 or limit sell orders 9526 allow the user to enter prices manually into the action block 9517 with input field 9518 for buy or sell as well as quantity selection order input field 9519 where the user may select their order quantity as well as a price input field 9520 where the user may select their limit order or other type of order price as well as a type input label 9528 and type label input field 9521 as well as a button to submit 9536 a relevant order. In some embodiments, upon order price match of the limit order book buy queue with the limit order book sell queue, delivery 9501 may occur virtually or in person for the contract specification date and time and quality and time interval unit specification 9511. In some embodiments, the virtual or in person delivery layer 9501 may show the video and or picture or emoji of the athlete 9502 to the buyer Sally Smith 9504. In some embodiments, the delivery layer 9501 may include the blockchain of the location history 9505, the blockchain rating 9506, chat and text between the buyer (fan) 9504 and seller (athlete) 9531 as well as in person or virtual meeting details 9508. In some embodiments, the fan 9529 or athlete 9502 may have a mute button 9538 during the video call as well as the name of the athlete 9531, the education and credentials of the doctor 9532, the rating and qualification of the athlete 9533, the chat or text of the athlete 9534 and meeting type such as virtual or in person between the buyer (fan) and seller (athlete) 9535. In some embodiments, the geolocation exchange unit or time interval unit 9511 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 9501 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

In some embodiments, the aforementioned steps and transformations may be processed to transform the transportation and freight and parking and tolling and curb management and transportation management association unit securities or derivative unit securities or unitization structure capacity unit 8405.

Figure 96:
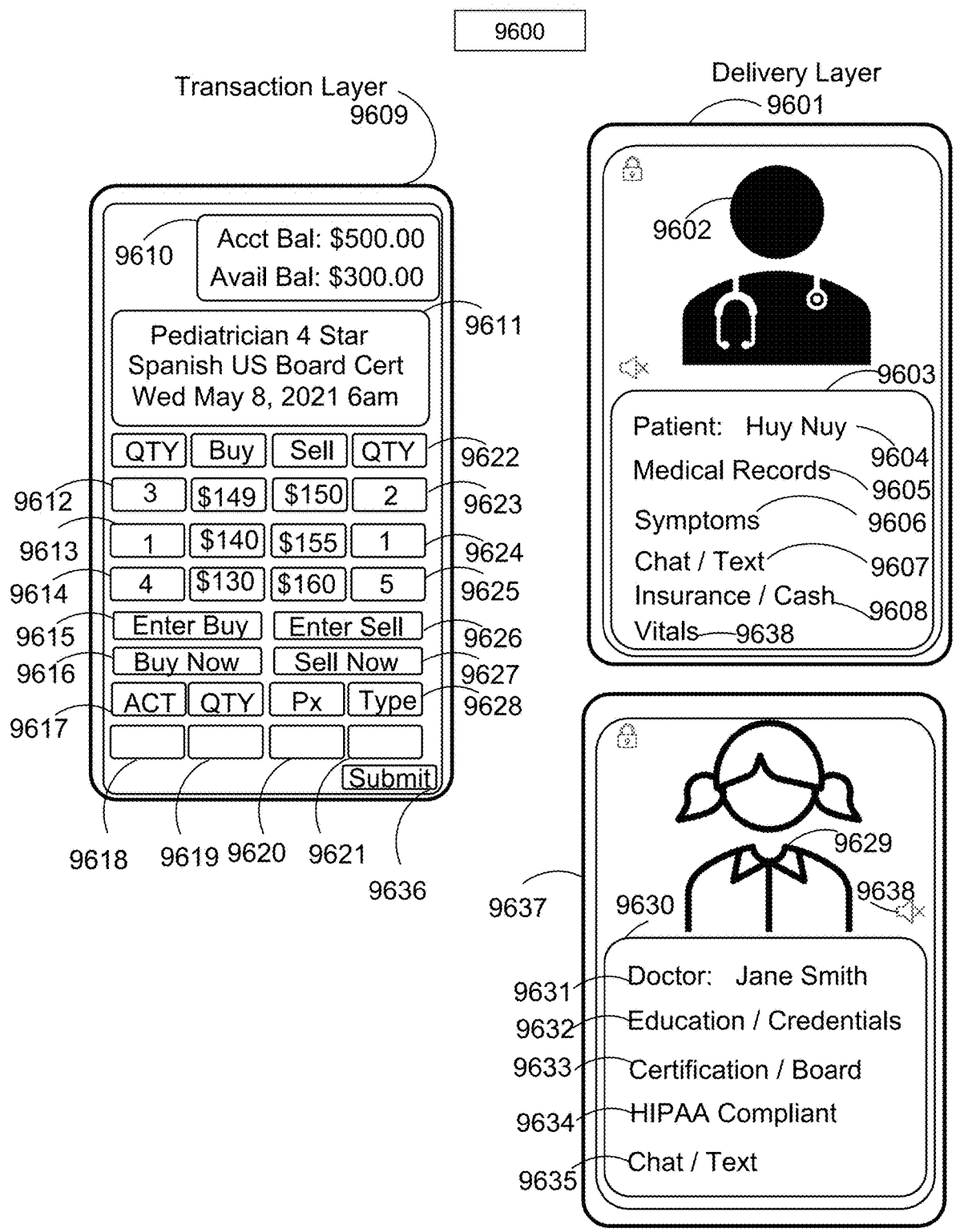
FIG. 96 illustrates an exemplary transformation creation and social network object of a time interval object Geolocation Exchange Unit for Pediatrician 4 star Spanish US board certification specification or Geolocation Exchange Unit portfolio on the exchange system with exemplary transaction layer and delivery layer.

FIG. 96 illustrates an exemplary transaction layer 9609 for a geolocation exchange unit or time interval unit for the exemplary case of a Pediatrician 4 star rated who speaks Spanish with US medical board certifications with a delivery time of Wednesday, May 8, 2021 at 6 am for virtual or in person delivery specification 9611. In some embodiments, the transaction layer 9609 may list the user account balance 9610 and available balance given outstanding transactions and trades 9610. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9612, the second price time priority queue quantity buy limit order book position 9613, the third price time priority queue quantity buy limit order book position 9614. In some embodiments, the first price time priority limit order buy queue position quantity of three with figure reference of 9612 also contains a price of $149. In some embodiments, the second price time priority limit order buy queue position quantity of one with figure reference of 9613 also contains a price of $140. In some embodiments, the third price time priority limit order buy queue position quantity of four with figure reference of 9614 also contains a price of $130. In some embodiments, an exemplary limit order sell queue for the geolocation exchange unit or time interval units may display the limit order book such as the first price time priority queue position quantity sell limit order book position 9623, the second price time priority queue quantity sell limit order book position 9624, the third price time priority queue quantity sell limit order book position 9625. In some embodiments, the first price time priority limit order sell queue position quantity of two with figure reference of 9623 also contains a price of $150. In some embodiments, the second price time priority limit order sell queue position quantity of one with figure reference of 9624 also contains a price of $155. In some embodiments, the third price time priority limit order sell queue position quantity of five with figure reference of 9625 also contains a price of $160. In some embodiments, the system and method transaction layer 9609 may contain both limit buy order features 9615 and market order features for buy now 9616 functionality. In some embodiments, the system and method transaction layer 9609 may contain limit order sell features 9626 and market order features for sell now 9627 functionality. In some embodiments, limit buy orders 9615 or limit sell orders 9626 allow the user to enter prices manually into the action block 9617 with input field 9618 for buy or sell as well as quantity selection order input field 9619 where the user may select their order quantity as well as a price input field 9620 where the user may select their limit order or other type of order price as well as a type input label 9628 and type label input field 9621 as well as a button to submit 9636 a relevant order. In some embodiments, upon order price match of the limit order book buy queue with the limit order book sell queue, delivery 9601 may occur virtually or in person for the contract specification date and time and quality and time interval unit specification 9611. In some embodiments, the virtual or in person delivery layer 9601 may show the video and or picture of the physician 9602 to the patient Huy Nuy 9604. In some embodiments, the delivery layer 9601 may include the blockchain of the medical record history 9605, the blockchain symptoms 9606, chat and text between the buyer (patient) 9604 and seller (doctor) 9631 as well as insurance and cash and payment details 9608 and vitals 9638. In some embodiments, the patient 9629 or doctor 9602 may have a mute button 9638 during the video call as well as the name of the doctor 9631, the education and credentials of the doctor 9632, the certifications and boards of the doctor 9633, the HIPAA compliance of the doctor 9634 and chat and text records between the buyer (patient) and seller (doctor) 9635. In some embodiments, the geolocation exchange unit or time interval unit 9611 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 9601 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 97:
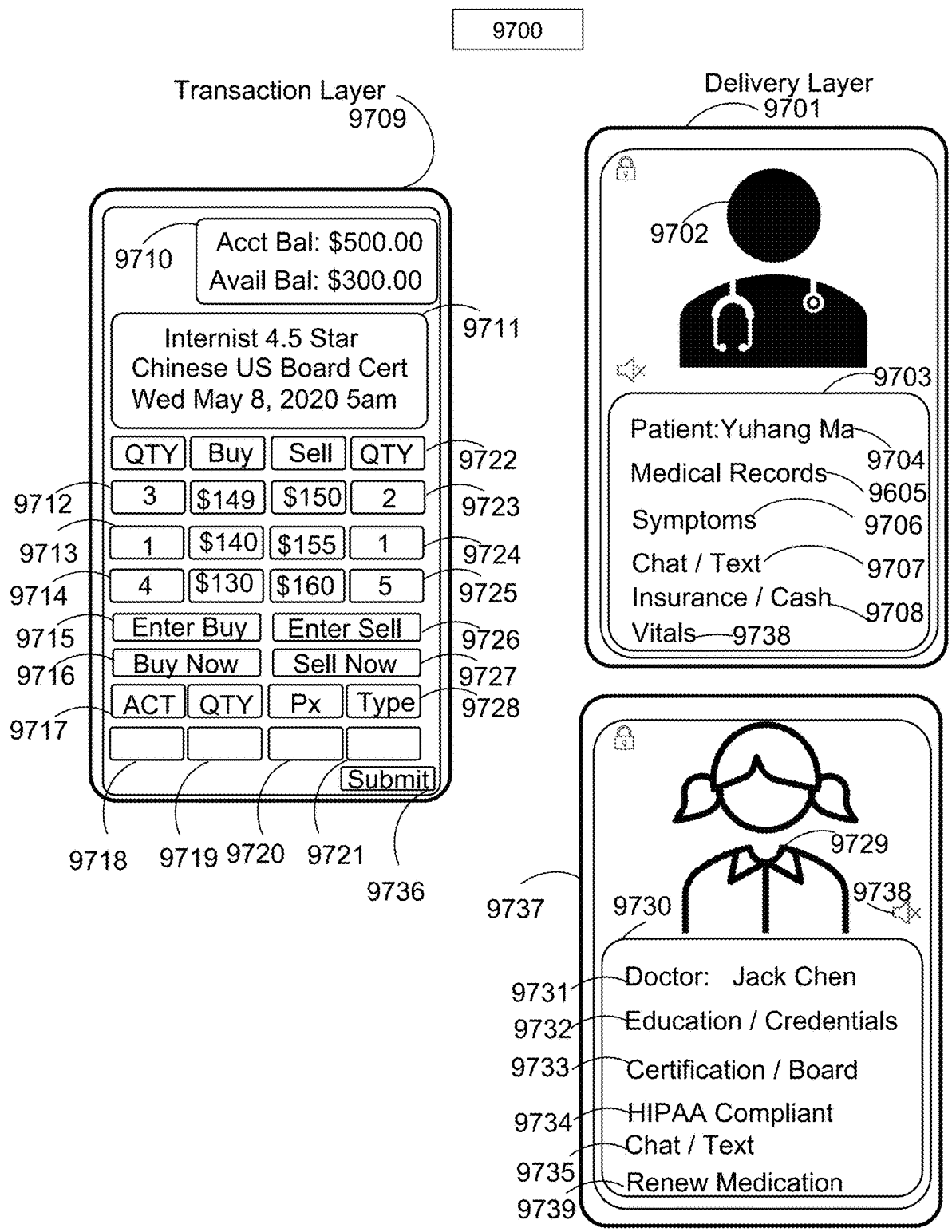
FIG. 97 illustrates an exemplary transformation creation and social network object of a time interval object Geolocation Exchange Unit for Internist 4.5 Star Chinese US board certification specification or Geolocation Exchange Unit portfolio on the exchange system with exemplary transaction layer and delivery layer.

FIG. 97 illustrates an exemplary transaction layer 9709 for a geolocation exchange unit or time interval unit for the exemplary case of an Internist 4.5 star rated who speaks Chinese with US medical board certifications with a delivery time of Wednesday, May 8, 2020 at 5 am for virtual or in person delivery specification 9711. In some embodiments, the transaction layer 9709 may list the user account balance 9710 and available balance given outstanding transactions and trades 9710. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9712, the second price time priority queue quantity buy limit order book position 9713, the third price time priority queue quantity buy limit order book position 9714. In some embodiments, the first price time priority limit order buy queue position quantity of three with figure reference of 9712 also contains a price of $149. In some embodiments, the second price time priority limit order buy queue position quantity of one with figure reference of 9713 also contains a price of $140. In some embodiments, the third price time priority limit order buy queue position quantity of four with figure reference of 9714 also contains a price of $130. In some embodiments, an exemplary limit order sell queue for the geolocation exchange unit or time interval units may display the limit order book such as the first price time priority queue position quantity sell limit order book position 9723, the second price time priority queue quantity sell limit order book position 9724, the third price time priority queue quantity sell limit order book position 9725. In some embodiments, the first price time priority limit order sell queue position quantity of two with figure reference of 9723 also contains a price of $150. In some embodiments, the second price time priority limit order sell queue position quantity of one with figure reference of 9724 also contains a price of $155. In some embodiments, the third price time priority limit order sell queue position quantity of five with figure reference of 9725 also contains a price of $160. In some embodiments, the system and method transaction layer 9709 may contain both limit buy order features 9715 and market order features for buy now 9716 functionality. In some embodiments, the system and method transaction layer 9709 may contain limit order sell features 9726 and market order features for sell now 9727 functionality. In some embodiments, limit buy orders 9715 or limit sell orders 9726 allow the user to enter prices manually into the action block 9717 with input field 9718 for buy or sell as well as quantity selection order input field 9719 where the user may select their order quantity as well as a price input field 9720 where the user may select their limit order or other type of order price as well as a type input label 9728 and type label input field 9721 as well as a button to submit 9736 a relevant order. In some embodiments, upon order price match of the limit order book buy queue with the limit order book sell queue, delivery 9701 may occur virtually or in person for the contract specification date and time and quality and time interval unit specification 9711. In some embodiments, the virtual or in person delivery layer 9701 may show the video and or picture of the physician 9702 to the patient Huy Nuy 9704. In some embodiments, the delivery layer 9701 may include the blockchain of the medical record history 9705, the blockchain symptoms 9706, chat and text between the buyer (patient) 9704 and seller (doctor) 9731 as well as insurance and cash and payment details 9708 and vitals 9738. In some embodiments, the patient 9729 or doctor 9702 may have a mute button 9738 during the video call as well as the name of the doctor 9731, the education and credentials of the doctor 9732, the certifications and boards of the doctor 9733, the HIPAA compliance of the doctor 9734 and chat and text records between the buyer (patient) and seller (doctor) 9735. In some embodiments, the geolocation exchange unit or time interval unit 9711 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 9701 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 98:
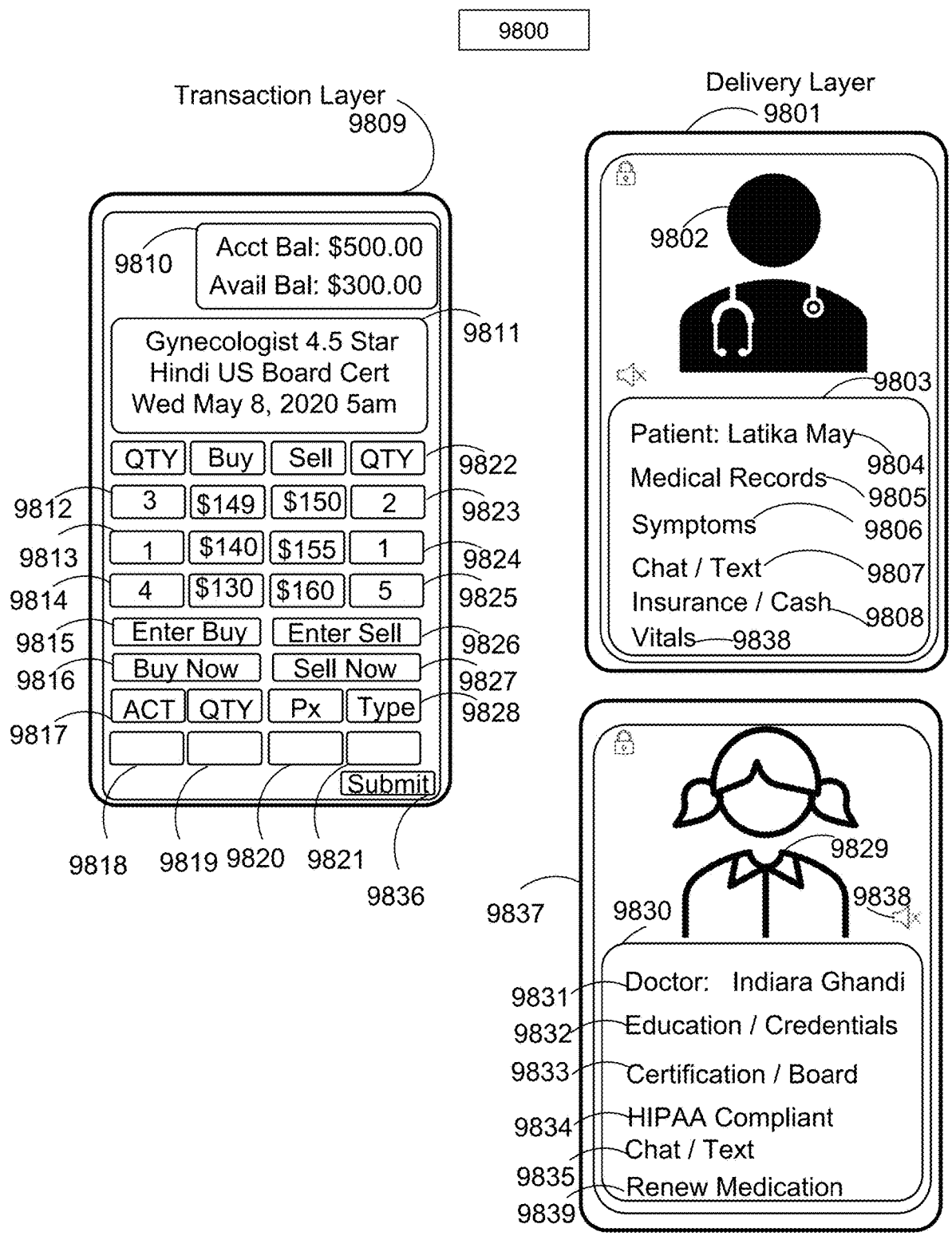
FIG. 98 illustrates an exemplary transformation creation and social network object of a time interval object Geolocation Exchange Unit for Gynecologist 4.5 Star Hindi US board certification specification or Geolocation Exchange Unit portfolio on the exchange system with exemplary transaction layer and delivery layer.

FIG. 98 illustrates an exemplary transaction layer 9809 for a geolocation exchange unit or time interval unit for the exemplary case of a Gynecologist 4.5 star rated who speaks Hindi with US medical board certifications with a delivery time of Wednesday, May 8, 2020 at 5 am for virtual or in person delivery specification 9811. In some embodiments, the transaction layer 9809 may list the user account balance 9810 and available balance given outstanding transactions and trades 9810. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9812, the second price time priority queue quantity buy limit order book position 9813, the third price time priority queue quantity buy limit order book position 9814. In some embodiments, the first price time priority limit order buy queue position quantity of three with figure reference of 9812 also contains a price of $149. In some embodiments, the second price time priority limit order buy queue position quantity of one with figure reference of 9813 also contains a price of $140. In some embodiments, the third price time priority limit order buy queue position quantity of four with figure reference of 9814 also contains a price of $130. In some embodiments, an exemplary limit order sell queue for the geolocation exchange unit or time interval units may display the limit order book such as the first price time priority queue position quantity sell limit order book position 9823, the second price time priority queue quantity sell limit order book position 9824, the third price time priority queue quantity sell limit order book position 9825. In some embodiments, the first price time priority limit order sell queue position quantity of two with figure reference of 9823 also contains a price of $150. In some embodiments, the second price time priority limit order sell queue position quantity of one with figure reference of 9824 also contains a price of $155. In some embodiments, the third price time priority limit order sell queue position quantity of five with figure reference of 9825 also contains a price of $160. In some embodiments, the system and method transaction layer 9809 may contain both limit buy order features 9815 and market order features for buy now 9816 functionality. In some embodiments, the system and method transaction layer 9709 may contain limit order sell features 9826 and market order features for sell now 9827 functionality. In some embodiments, limit buy orders 9815 or limit sell orders 9826 allow the user to enter prices manually into the action block 9817 with input field 9818 for buy or sell as well as quantity selection order input field 9819 where the user may select their order quantity as well as a price input field 9820 where the user may select their limit order or other type of order price as well as a type input label 9828 and type label input field 9821 as well as a button to submit 9836 a relevant order. In some embodiments, upon order price match of the limit order book buy queue with the limit order book sell queue, delivery 9801 may occur virtually or in person for the contract specification date and time and quality and time interval unit specification 9811. In some embodiments, the virtual or in person delivery layer 9801 may show the video and or picture of the physician 9802 to the patient Latika May 9804. In some embodiments, the delivery layer 9801 may include the blockchain of the medical record history 9805, the blockchain symptoms 9806, chat and text between the buyer (patient) 9704 and seller (doctor) 9831 as well as insurance and cash and payment details 9808 and vitals 9838. In some embodiments, the patient 9829 or doctor 9802 may have a mute button 9838 during the video call as well as the name of the doctor 9831, the education and credentials of the doctor 9832, the certifications and boards of the doctor 9833, the HIPAA compliance of the doctor 9834 and chat and text records between the buyer (patient) and seller (doctor) 9835. In some embodiments, the geolocation exchange unit or time interval unit 9811 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 9801 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 99:
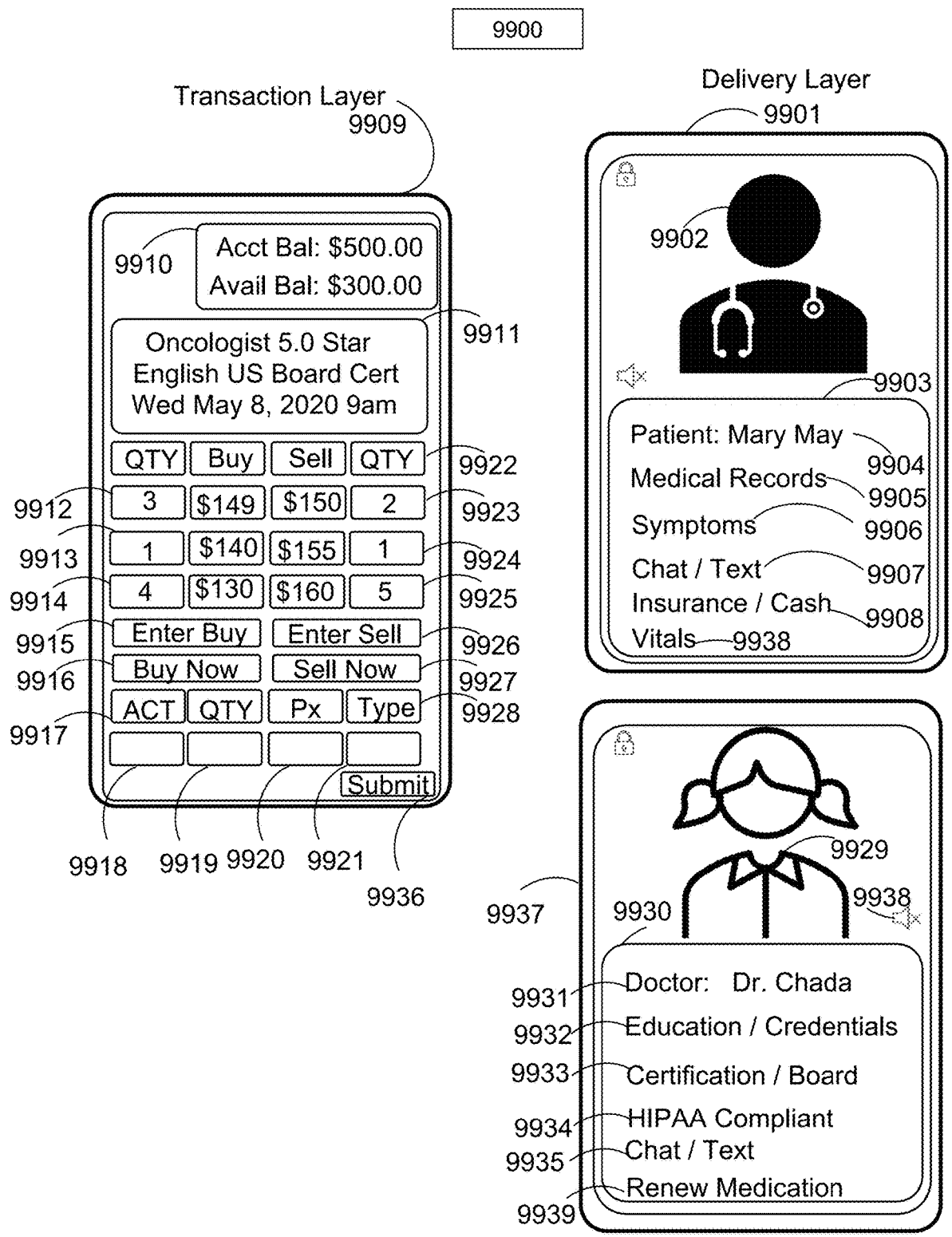
FIG. 99 illustrates an exemplary transformation creation and social network object of a time interval object Geolocation Exchange Unit for Oncologist 5.0 Star US board certification specification or Geolocation Exchange Unit portfolio on the exchange system with exemplary transaction layer and delivery layer.

FIG. 99 illustrates an exemplary transaction layer 9909 for a geolocation exchange unit or time interval unit for the exemplary case of an Oncologist 5.0 star rated who speaks English with US medical board certifications with a delivery time of Wednesday, May 8, 2020 at 9 am for virtual or in person delivery specification 9911. In some embodiments, the transaction layer 9909 may list the user account balance 9910 and available balance given outstanding transactions and trades 9910. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 9912, the second price time priority queue quantity buy limit order book position 9913, the third price time priority queue quantity buy limit order book position 9914. In some embodiments, the first price time priority limit order buy queue position quantity of three with figure reference of 9912 also contains a price of $149. In some embodiments, the second price time priority limit order buy queue position quantity of one with figure reference of 9913 also contains a price of $140. In some embodiments, the third price time priority limit order buy queue position quantity of four with figure reference of 9914 also contains a price of $130. In some embodiments, an exemplary limit order sell queue for the geolocation exchange unit or time interval units may display the limit order book such as the first price time priority queue position quantity sell limit order book position 9923, the second price time priority queue quantity sell limit order book position 9924, the third price time priority queue quantity sell limit order book position 9925. In some embodiments, the first price time priority limit order sell queue position quantity of two with figure reference of 9923 also contains a price of $150. In some embodiments, the second price time priority limit order sell queue position quantity of one with figure reference of 9924 also contains a price of $155. In some embodiments, the third price time priority limit order sell queue position quantity of five with figure reference of 9925 also contains a price of $160. In some embodiments, the system and method transaction layer 9909 may contain both limit buy order features 9915 and market order features for buy now 9916 functionality. In some embodiments, the system and method transaction layer 9909 may contain limit order sell features 9926 and market order features for sell now 9927 functionality. In some embodiments, limit buy orders 9915 or limit sell orders 9926 allow the user to enter prices manually into the action block 9917 with input field 9918 for buy or sell as well as quantity selection order input field 9919 where the user may select their order quantity as well as a price input field 9920 where the user may select their limit order or other type of order price as well as a type input label 9928 and type label input field 9921 as well as a button to submit 9936 a relevant order. In some embodiments, upon order price match of the limit order book buy queue with the limit order book sell queue, delivery 9901 may occur virtually or in person for the contract specification date and time and quality and time interval unit specification 9911. In some embodiments, the virtual or in person delivery layer 9901 may show the video and or picture of the physician 9902 to the patient Mary May 9904. In some embodiments, the delivery layer 9901 may include the blockchain of the medical record history 9905, the blockchain symptoms 9906, chat and text between the buyer (patient) 9904 and seller (doctor) 9931 as well as insurance and cash and payment details 9908 and vitals 9938. In some embodiments, the patient 9929 or doctor 9902 may have a mute button 9938 during the video call as well as the name of the doctor 9931, the education and credentials of the doctor 9932, the certifications and boards of the doctor 9933, the HIPAA compliance of the doctor 9934 and chat and text records between the buyer (patient) and seller (doctor) 9935. In some embodiments, the geolocation exchange unit or time interval unit 9911 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 9901 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 100:
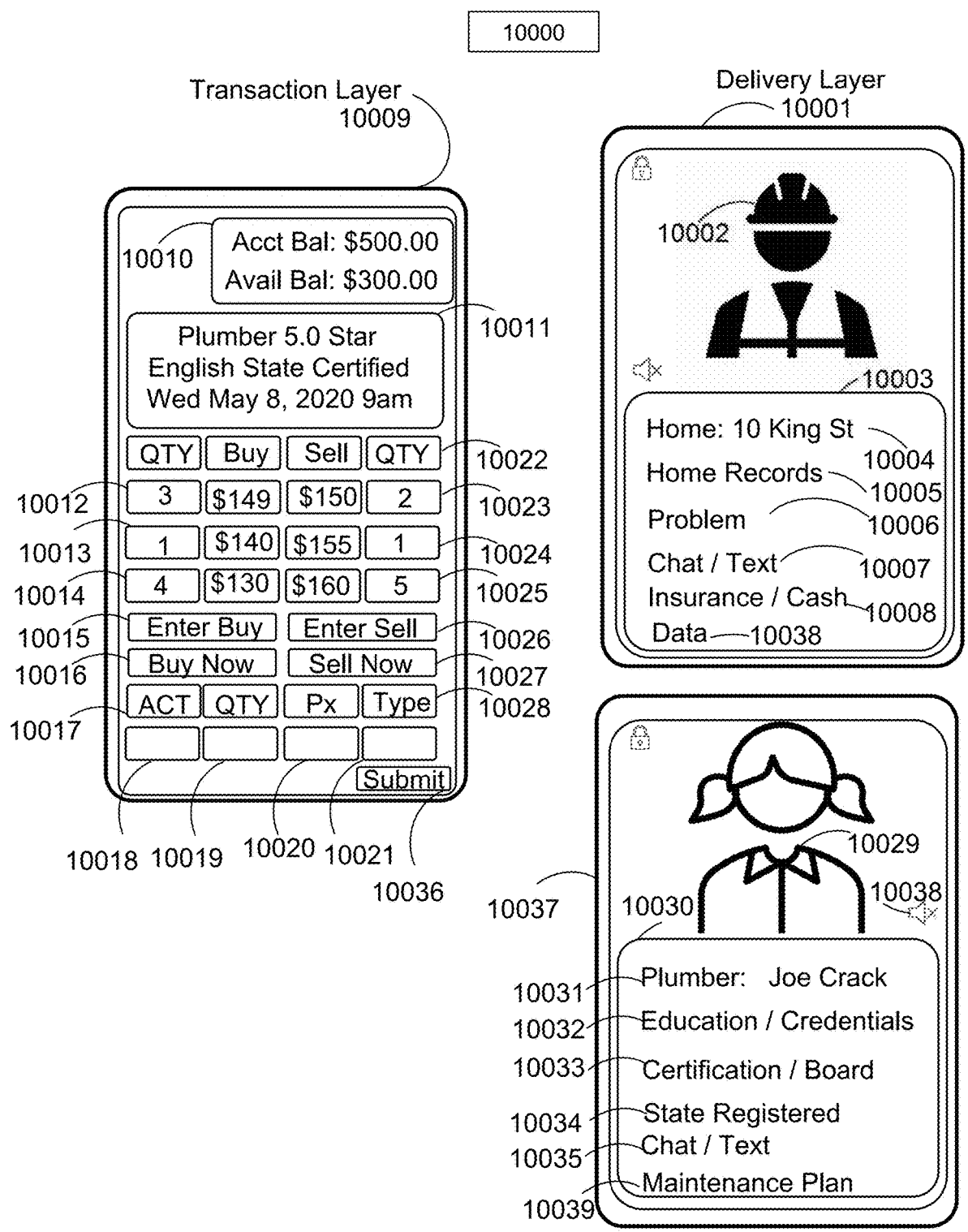
FIG. 100 illustrates an exemplary transformation creation and social network object of a time interval object Geolocation Exchange Unit for Plumber 5.0 Star English state certified specification or Geolocation Exchange Unit portfolio on the exchange system with exemplary transaction layer and delivery layer.

FIG. 100 illustrates an exemplary transaction layer 10009 for a geolocation exchange unit or time interval unit for the exemplary case of a plumber 5.0 star rated who speaks English with state certifications with a delivery time of Wednesday, May 8, 2020 at 9 am for virtual or in person delivery specification 10011. In some embodiments, the transaction layer 10009 may list the user account balance 10010 and available balance given outstanding transactions and trades 10010. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10012, the second price time priority queue quantity buy limit order book position 10013, the third price time priority queue quantity buy limit order book position 10014. In some embodiments, the first price time priority limit order buy queue position quantity of three with figure reference of 10012 also contains a price of $149. In some embodiments, the second price time priority limit order buy queue position quantity of one with figure reference of 10013 also contains a price of $140. In some embodiments, the third price time priority limit order buy queue position quantity of four with figure reference of 10014 also contains a price of $130. In some embodiments, an exemplary limit order sell queue for the geolocation exchange unit or time interval units may display the limit order book such as the first price time priority queue position quantity sell limit order book position 10023, the second price time priority queue quantity sell limit order book position 10024, the third price time priority queue quantity sell limit order book position 10025. In some embodiments, the first price time priority limit order sell queue position quantity of two with figure reference of 10023 also contains a price of $150. In some embodiments, the second price time priority limit order sell queue position quantity of one with figure reference of 10024 also contains a price of $155. In some embodiments, the third price time priority limit order sell queue position quantity of five with figure reference of 10025 also contains a price of $160. In some embodiments, the system and method transaction layer 10009 may contain both limit buy order features 10015 and market order features for buy now 10016 functionality. In some embodiments, the system and method transaction layer 10009 may contain limit order sell features 10026 and market order features for sell now 10027 functionality. In some embodiments, limit buy orders 10015 or limit sell orders 10026 allow the user to enter prices manually into the action block 10017 with input field 10018 for buy or sell as well as quantity selection order input field 10019 where the user may select their order quantity as well as a price input field 10020 where the user may select their limit order or other type of order price as well as a type input label 10028 and type label input field 10021 as well as a button to submit 10036 a relevant order. In some embodiments, upon order price match of the limit order book buy queue with the limit order book sell queue, delivery 10001 may occur virtually or in person for the contract specification date and time and quality and time interval unit specification 10011. In some embodiments, the virtual or in person delivery layer 10001 may show the video and or picture of the plumber 10002 to the customer address 10004. In some embodiments, the delivery layer 10001 may include the blockchain of the home record history 10005, the blockchain problem 10006, chat and text between the buyer (customer) 10004 and seller (plumber) 10031 as well as insurance and cash and payment details 10008 and data 10038. In some embodiments, the customer 10029 or plumber 10002 may have a mute button 10038 during the video call as well as the name of the plumber 10031, the education and credentials of the plumber 10032, the certifications and boards of the plumber 10033, the state registration 10034 and chat and text records between the buyer (customer) and seller (plumber) 10035. In some embodiments, the geolocation exchange unit or time interval unit 10011 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 10001 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 101:
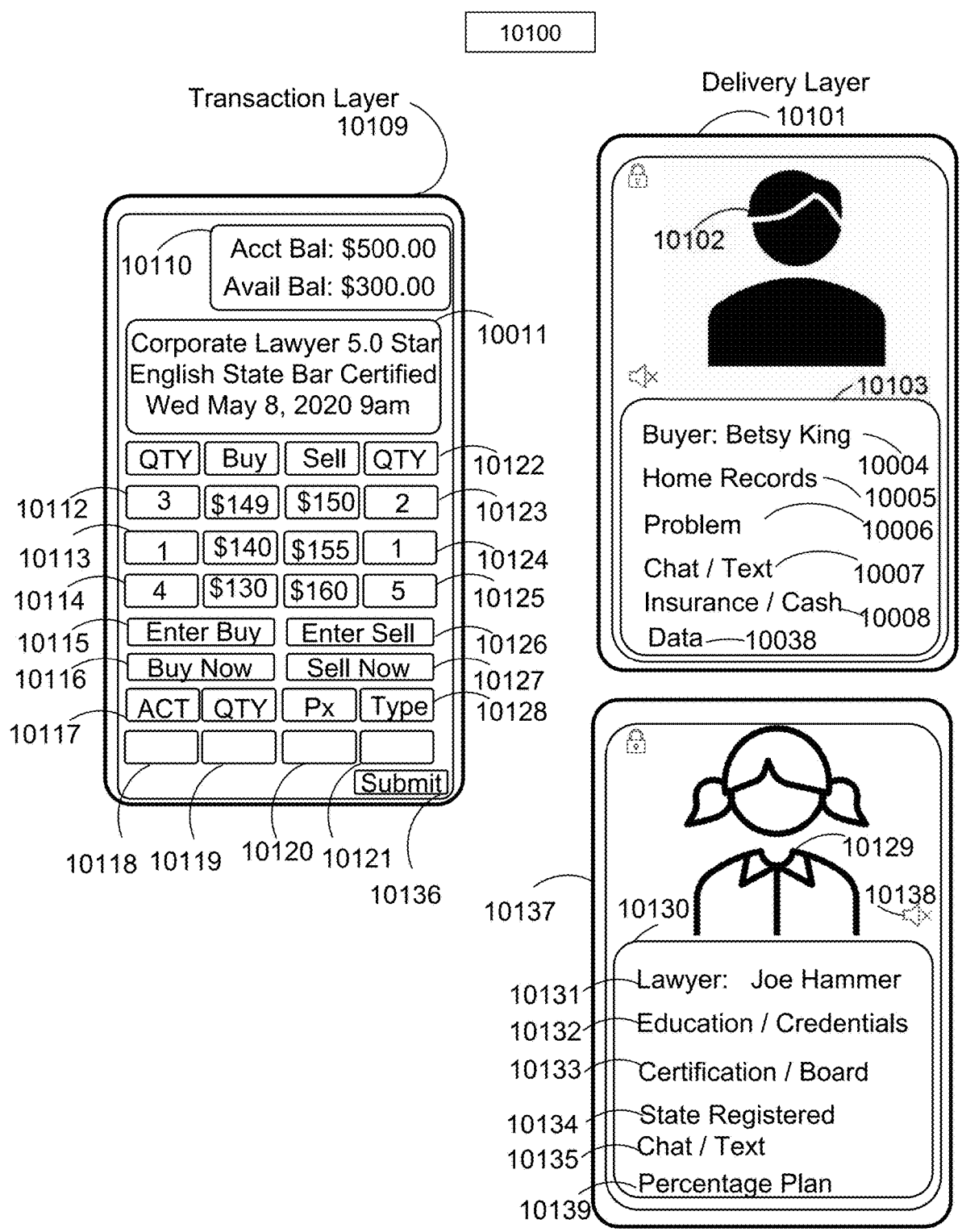
FIG. 101 illustrates an exemplary transformation creation and social network object of a time interval object Geolocation Exchange Unit for Corporate Lawyer 5.0 Star English state bar certified specification or Geolocation Exchange Unit portfolio on the exchange system with exemplary transaction layer and delivery layer.

FIG. 101 illustrates an exemplary transaction layer 10109 for a geolocation exchange unit or time interval unit for the exemplary case of a corporate lawyer 5.0 star rated who speaks English with state certifications with a delivery time of Wednesday, May 8, 2020 at 9 am for virtual or in person delivery specification 10111. In some embodiments, the transaction layer 10109 may list the user account balance 10110 and available balance given outstanding transactions and trades 10110. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10112, the second price time priority queue quantity buy limit order book position 10113, the third price time priority queue quantity buy limit order book position 10114. In some embodiments, the first price time priority limit order buy queue position quantity of three with figure reference of 10112 also contains a price of $149. In some embodiments, the second price time priority limit order buy queue position quantity of one with figure reference of 10113 also contains a price of $140. In some embodiments, the third price time priority limit order buy queue position quantity of four with figure reference of 10114 also contains a price of $130. In some embodiments, an exemplary limit order sell queue for the geolocation exchange unit or time interval units may display the limit order book such as the first price time priority queue position quantity sell limit order book position 10123, the second price time priority queue quantity sell limit order book position 10124, the third price time priority queue quantity sell limit order book position 10125. In some embodiments, the first price time priority limit order sell queue position quantity of two with figure reference of 10123 also contains a price of $150. In some embodiments, the second price time priority limit order sell queue position quantity of one with figure reference of 10124 also contains a price of $155. In some embodiments, the third price time priority limit order sell queue position quantity of five with figure reference of 10125 also contains a price of $160. In some embodiments, the system and method transaction layer 10109 may contain both limit buy order features 10115 and market order features for buy now 10116 functionality. In some embodiments, the system and method transaction layer 10109 may contain limit order sell features 10126 and market order features for sell now 10127 functionality. In some embodiments, limit buy orders 10115 or limit sell orders 10126 allow the user to enter prices manually into the action block 10017 with input field 10118 for buy or sell as well as quantity selection order input field 10119 where the user may select their order quantity as well as a price input field 10120 where the user may select their limit order or other type of order price as well as a type input label 10128 and type label input field 10121 as well as a button to submit 10136 a relevant order. In some embodiments, upon order price match of the limit order book buy queue with the limit order book sell queue, delivery 10101 may occur virtually or in person for the contract specification date and time and quality and time interval unit specification 10111. In some embodiments, the virtual or in person delivery layer 10101 may show the video and or picture of the lawyer 10102 to the customer address 10104. In some embodiments, the delivery layer 10101 may include the blockchain of the home record history 10105, the blockchain problem 10106, chat and text between the buyer (customer) 10104 and seller (lawyer) 10131 as well as insurance and cash and payment details 10108 and data 10138. In some embodiments, the customer 10129 or lawyer 10102 may have a mute button 10138 during the video call as well as the name of the lawyer 10131, the education and credentials of the lawyer 10132, the certifications and boards of the lawyer 10133, the state registration 10134 and chat and text records between the buyer (customer) and seller (lawyer) 10135. In some embodiments, the geolocation exchange unit or time interval unit 10111 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 10101 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 102:
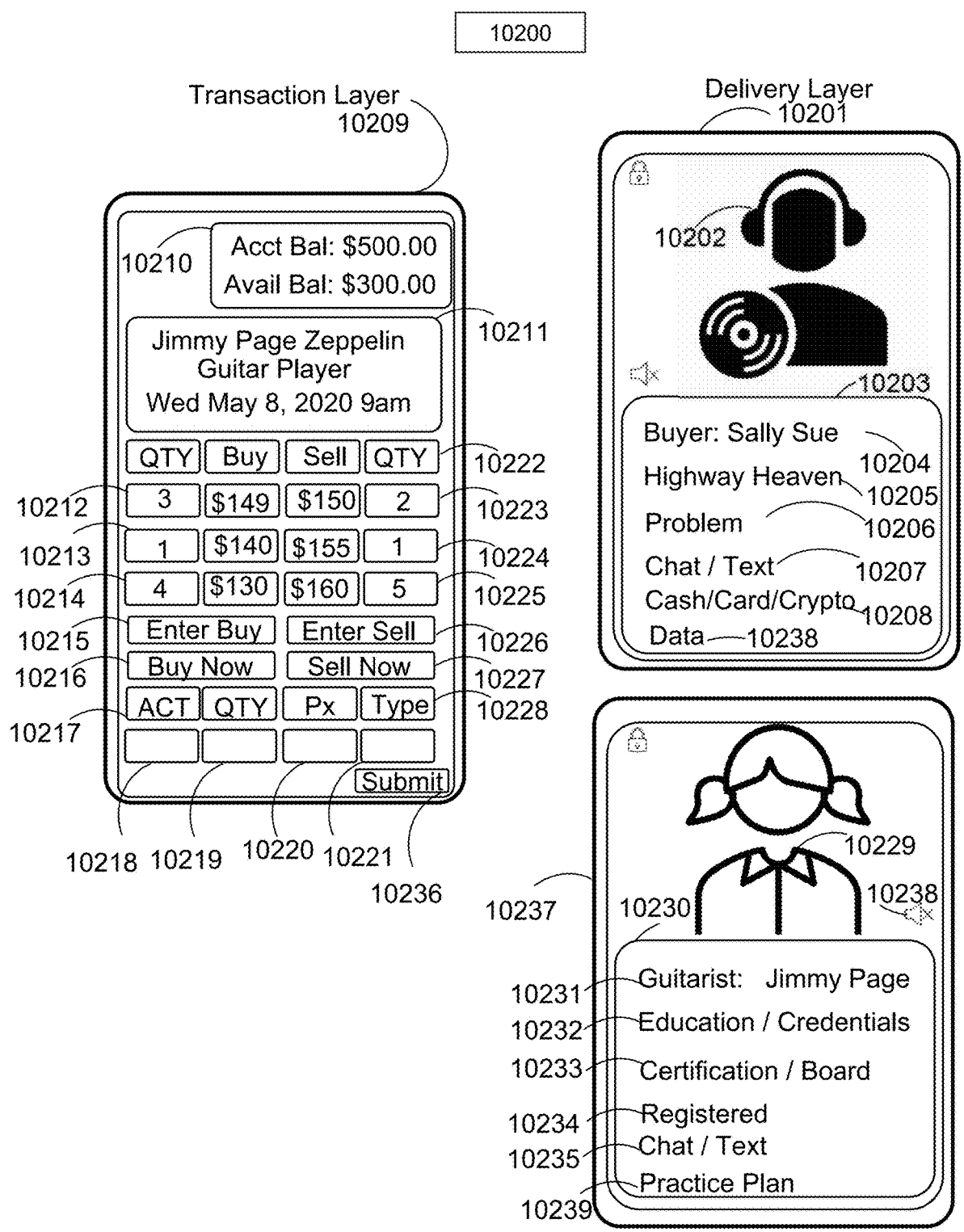
FIG. 102 illustrates an exemplary transformation creation and social network object of a time interval object Geolocation Exchange Unit for Jimmy Page Led Zeppelin Guitar Player specification or Geolocation Exchange Unit portfolio on the exchange system with exemplary transaction layer and delivery layer.

FIG. 102 illustrates an exemplary transaction layer 10209 for a geolocation exchange unit or time interval unit for the exemplary case of a Jimmy Page the lead guitarist of Led Zeppelin 5.0 star rated who speaks English with state certifications with a delivery time of Wednesday, May 8, 2020 at 9 am for virtual or in person delivery specification 10211. In some embodiments, the transaction layer 10209 may list the user account balance 10210 and available balance given outstanding transactions and trades 10210. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10212, the second price time priority queue quantity buy limit order book position 10213, the third price time priority queue quantity buy limit order book position 10214. In some embodiments, the first price time priority limit order buy queue position quantity of three with figure reference of 10212 also contains a price of $149. In some embodiments, the second price time priority limit order buy queue position quantity of one with figure reference of 10213 also contains a price of $140. In some embodiments, the third price time priority limit order buy queue position quantity of four with figure reference of 10214 also contains a price of $130. In some embodiments, an exemplary limit order sell queue for the geolocation exchange unit or time interval units may display the limit order book such as the first price time priority queue position quantity sell limit order book position 10223, the second price time priority queue quantity sell limit order book position 10224, the third price time priority queue quantity sell limit order book position 10225. In some embodiments, the first price time priority limit order sell queue position quantity of two with figure reference of 10223 also contains a price of $150. In some embodiments, the second price time priority limit order sell queue position quantity of one with figure reference of 10224 also contains a price of $155. In some embodiments, the third price time priority limit order sell queue position quantity of five with figure reference of 10225 also contains a price of $160. In some embodiments, the system and method transaction layer 10209 may contain both limit buy order features 10215 and market order features for buy now 10216 functionality. In some embodiments, the system and method transaction layer 10209 may contain limit order sell features 10226 and market order features for sell now 10227 functionality. In some embodiments, limit buy orders 10215 or limit sell orders 10226 allow the user to enter prices manually into the action block 10217 with input field 10218 for buy or sell as well as quantity selection order input field 10219 where the user may select their order quantity as well as a price input field 10220 where the user may select their limit order or other type of order price as well as a type input label 10228 and type label input field 10221 as well as a button to submit 10236 a relevant order. In some embodiments, upon order price match of the limit order book buy queue with the limit order book sell queue, delivery 10201 may occur virtually or in person for the contract specification date and time and quality and time interval unit specification 10211. In some embodiments, the virtual or in person delivery layer 10201 may show the video and or picture of the musician Jimmy Page 10202 to the customer address 10204. In some embodiments, the delivery layer 10201 may include the blockchain of the home record history 10205, the blockchain problem 10206, chat and text between the buyer (customer) 10204 and seller (musician Jimmy Page) 10231 as well as insurance and cash and payment details 10208 and data 10238. In some embodiments, the customer 10229 or musician Jimmy Page 10202 may have a mute button 10238 during the video call as well as the name of the musician Jimmy Page 10231, the education and credentials of the musician Jimmy Page 10232, the certifications and boards of the musician Jimmy Page 10233, the state registration 10234 and chat and text records between the buyer (customer) and seller (musician Jimmy Page) 10235 and practice plan 10239. In some embodiments, the geolocation exchange unit or time interval unit 10211 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 10201 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 103:
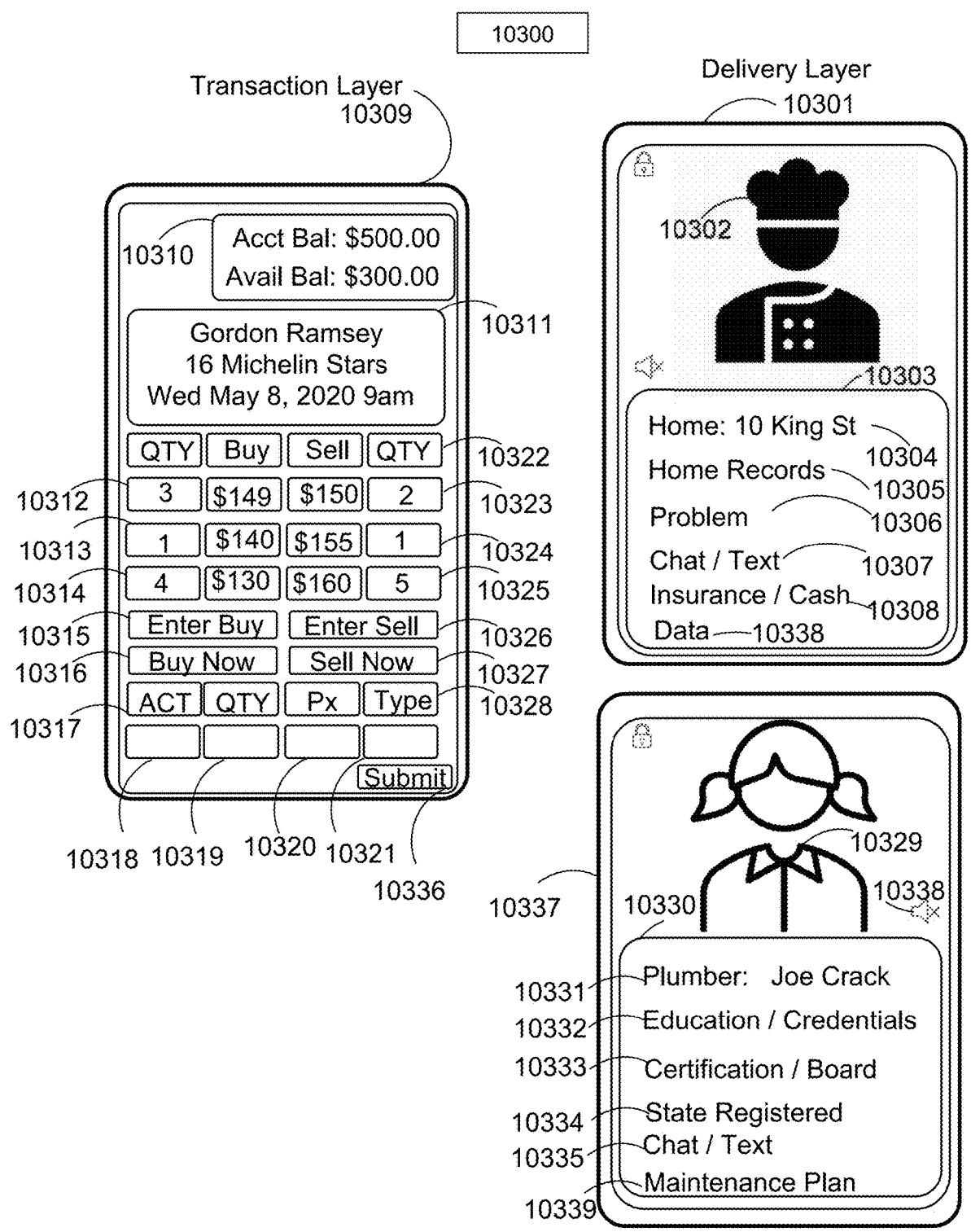
FIG. 103 illustrates an exemplary transformation creation and social network object of a time interval object Geolocation Exchange Unit for Gordon Ramsey 16 Michelin Stars Chef specification or Geolocation Exchange Unit portfolio on the exchange system with exemplary transaction layer and delivery layer.

FIG. 103 illustrates an exemplary transaction layer 10309 for a geolocation exchange unit or time interval unit for the exemplary case of the chef Gordon Ramsey 16 Michelin star rated who speaks English with state certifications with a delivery time of Wednesday, May 8, 2020 at 9 am for virtual or in person delivery specification 10311. In some embodiments, the transaction layer 10309 may list the user account balance 10310 and available balance given outstanding transactions and trades 10310. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10312, the second price time priority queue quantity buy limit order book position 10313, the third price time priority queue quantity buy limit order book position 10314. In some embodiments, the first price time priority limit order buy queue position quantity of three with figure reference of 10312 also contains a price of $149. In some embodiments, the second price time priority limit order buy queue position quantity of one with figure reference of 10313 also contains a price of $140. In some embodiments, the third price time priority limit order buy queue position quantity of four with figure reference of 10314 also contains a price of $130. In some embodiments, an exemplary limit order sell queue for the geolocation exchange unit or time interval units may display the limit order book such as the first price time priority queue position quantity sell limit order book position 10323, the second price time priority queue quantity sell limit order book position 10324, the third price time priority queue quantity sell limit order book position 10325. In some embodiments, the first price time priority limit order sell queue position quantity of two with figure reference of 10323 also contains a price of $150. In some embodiments, the second price time priority limit order sell queue position quantity of one with figure reference of 10324 also contains a price of $155. In some embodiments, the third price time priority limit order sell queue position quantity of five with figure reference of 10325 also contains a price of $160. In some embodiments, the system and method transaction layer 10309 may contain both limit buy order features 10315 and market order features for buy now 10216 functionality. In some embodiments, the system and method transaction layer 10309 may contain limit order sell features 10326 and market order features for sell now 10327 functionality. In some embodiments, limit buy orders 10315 or limit sell orders 10326 allow the user to enter prices manually into the action block 10317 with input field 10318 for buy or sell as well as quantity selection order input field 10319 where the user may select their order quantity as well as a price input field 10320 where the user may select their limit order or other type of order price as well as a type input label 10328 and type label input field 10321 as well as a button to submit 10236 a relevant order. In some embodiments, upon order price match of the limit order book buy queue with the limit order book sell queue, delivery 10301 may occur virtually or in person for the contract specification date and time and quality and time interval unit specification 10311. In some embodiments, the virtual or in person delivery layer 10301 may show the video and or picture of the chef Gordon Ramsey 10302 to the customer address 10304. In some embodiments, the delivery layer 10301 may include the blockchain of the home record history 10305, the blockchain problem 10306, chat and text between the buyer (customer) 10304 and seller (chef Gordon Ramsey) 10331 as well as insurance and cash and payment details 10208 and data 10338. In some embodiments, the customer 10329 or chef Gordon Ramsey 10302 may have a mute button 10338 during the video call as well as the name of the chef Gordon Ramsey 10331, the education and credentials of the chef Gordon Ramsey 10332, the certifications and boards of the chef Gordon Ramsey 10333, the state registration 10334 and chat and text records between the buyer (customer) and seller (chef Gordon Ramsey) 10335 and practice or maintenance plan 10339. In some embodiments, the geolocation exchange unit or time interval unit 10311 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the delivery layer 10301 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces.

Figure 104:
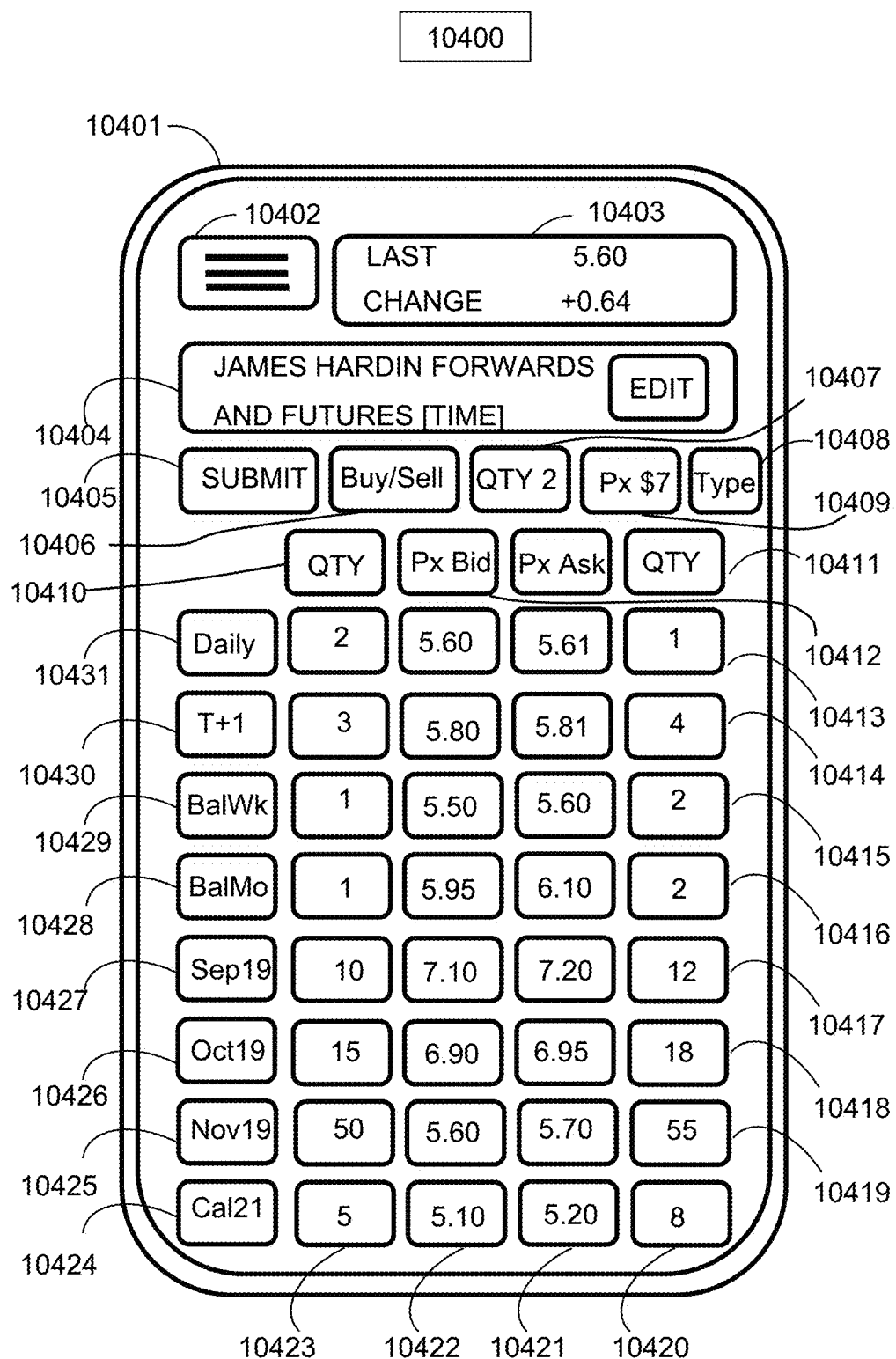
FIG. 104 illustrates an exemplary transformation of a forward and futures market for the exemplary time interval object Geolocation Exchange Unit object of James Harden NBA all star with exemplary plurality of time interval unit trading increments.

FIG. 104 illustrates an exemplary transaction layer and computing interface 10401 for a geolocation exchange unit or time interval unit for the exemplary case of the James Hardin with forwards, futures, financial swaps and financial indexes around the physical underlying value of the time interval unit or geolocation unit for a certain specification. In some embodiments, the computing interface 10401 with a menu 10402, and a index monitor to measure the current index value and delta change for the index over an given time increment 10404 of the time interval unit or geolocation exchange unit for time with James Harden the NBA all star 10404. In some embodiments, the order entry system may include a submit button for orders 10405, a buy or sell action button toggle 10406 a quantity input field 10407 a price entry field 10409 and a type field 10408. In some embodiments, the system and interface may include a quantity buy label for the price time priority queue for a given selection of forwards, futures, options, swaps, derivatives, financial indexes or other trading instruments both physical and financial and derivative values 10410. In some embodiments, the system and interface may include a price buy label for the price time priority queue for a given selection of forwards, futures, options, swaps, derivatives, financial indexes or other trading instruments both physical and financial and derivative values 10412. In some embodiments, the system and interface may include a quantity sell and quantity price label for the price time priority queue for a given selection of forwards, futures, options, swaps, derivatives, financial indexes or other trading instruments both physical and financial and derivative values 10411. In some embodiments, the system and interface may include a given tenure of instrument for the trading instrument such as daily for same day delivery 10431 or next day delivery 10430 or balance of the week 10429 or balance of the month 10428, or next month such as September 2019 10426 or two months forward such as October 2019 10426 or three months forward such as November 2019 10425 or the following year or two years forward for date calendar 2021 with reference of 10424 for the price time priority queue for a given selection of forwards, futures, options, swaps, derivatives, financial indexes or other trading instruments both physical and financial and derivative values 10411. In some embodiments, the quantity buy in the price time priority queue is quantity of five for that column 10423 or the price buy in the price time priority queue is price of $5.10 10422 and price sell of $5.20 in the price time priority sell queue 10421 and quantity sell of eight in the price time priority sell queue 10420. In some embodiments, each tenor may have an associated sell quantity for a given tenure such as quantity of one for the daily tenure 10413, quantity of 4 for the next day sell queue tenure 10414, quantity of 2 for the balance of week tenure sell queue 10415, quantity of 2 for the balance of month sell queue tenure 10416, quantity of 12 for the September 19 month sell queue tenure 10417, quantity of 18 for the October 19 month sell queue tenure 10418, quantity of 55 for the November 19 month sell queue tenure 10419.

Figure 105:
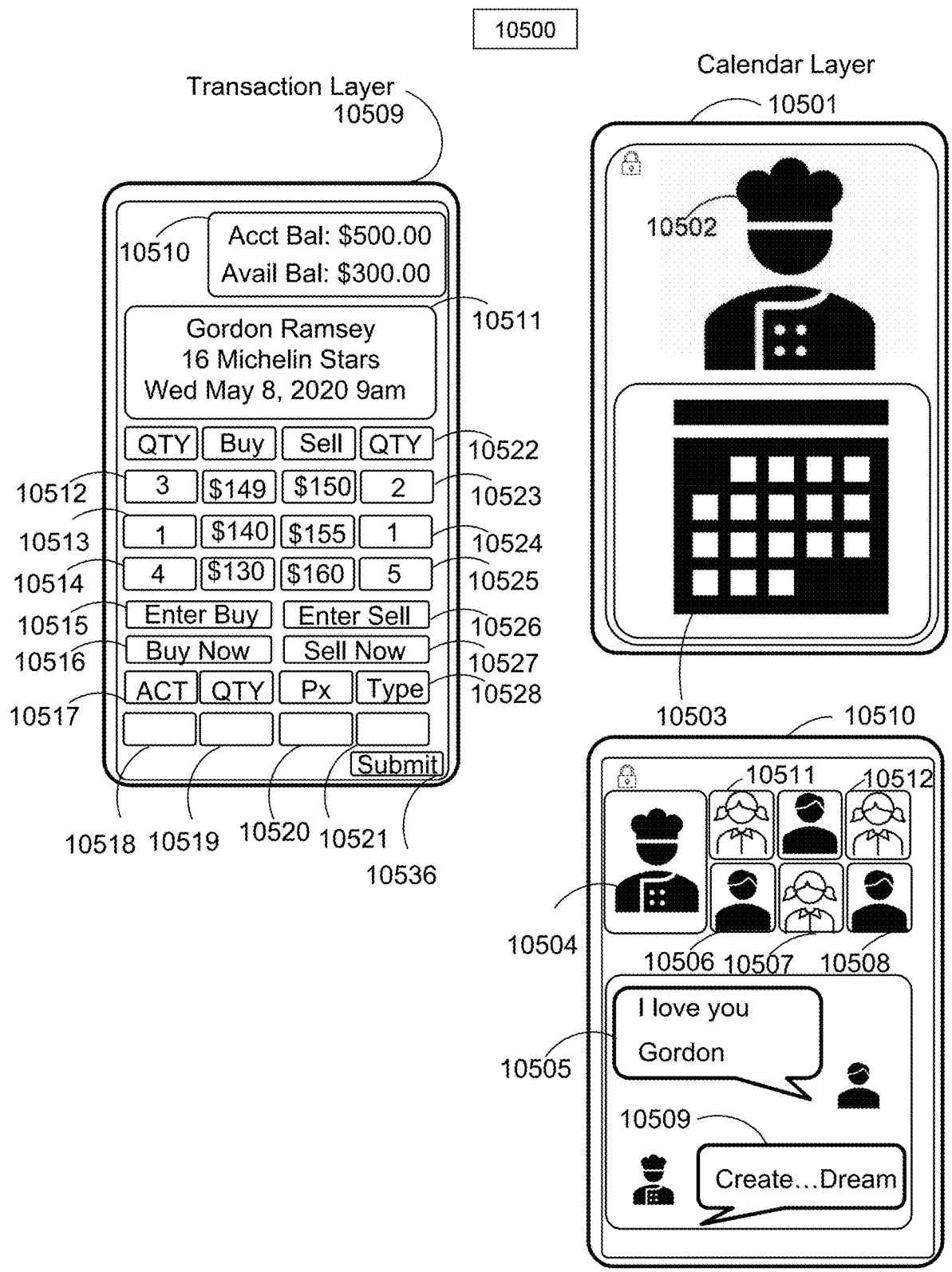
FIG. 105 illustrates an exemplary transformation creation and social network object of a time interval object Geolocation Exchange Unit for Gordon Ramsey 16 Michelin Stars Chef specification or Geolocation Exchange Unit portfolio with exemplary auto calendar interface once a transaction is complete and exemplary virtual delivery layer and communication interface.

FIG. 105 illustrates an exemplary transaction layer 10509 for a geolocation exchange unit or time interval unit for the exemplary case of the chef Gordon Ramsey 16 Michelin star rated who speaks English with state certifications with a delivery time of Wednesday, May 8, 2020 at 9 am for virtual or in person delivery specification 10511. In some embodiments, the transaction layer 10509 may list the user account balance 10510 and available balance given outstanding transactions and trades 10510. In some embodiments, a limited view of the price time priority transaction queue limit order book is displayed for the geolocation exchange unit or time unit interval for the given specification and the exemplary components of the price time priority queue such as the first price time priority queue position quantity buy limit order book position 10512, the second price time priority queue quantity buy limit order book position 10513, the third price time priority queue quantity buy limit order book position 10514. In some embodiments, the first price time priority limit order buy queue position quantity of three with figure reference of 10512 also contains a price of $149. In some embodiments, the second price time priority limit order buy queue position quantity of one with figure reference of 10513 also contains a price of $140. In some embodiments, the third price time priority limit order buy queue position quantity of four with figure reference of 10514 also contains a price of $130. In some embodiments, an exemplary limit order sell queue for the geolocation exchange unit or time interval units may display the limit order book such as the first price time priority queue position quantity sell limit order book position 10523, the second price time priority queue quantity sell limit order book position 10524, the third price time priority queue quantity sell limit order book position 10525. In some embodiments, the first price time priority limit order sell queue position quantity of two with figure reference of 10523 also contains a price of $150. In some embodiments, the second price time priority limit order sell queue position quantity of one with figure reference of 10524 also contains a price of $155. In some embodiments, the third price time priority limit order sell queue position quantity of five with figure reference of 10525 also contains a price of $160. In some embodiments, the system and method transaction layer 10509 may contain both limit buy order features 10515 and market order features for buy now 10516 functionality. In some embodiments, the system and method transaction layer 10509 may contain limit order sell features 10526 and market order features for sell now 10527 functionality. In some embodiments, limit buy orders 10515 or limit sell orders 10526 allow the user to enter prices manually into the action block 10517 with input field 10518 for buy or sell as well as quantity selection order input field 10519 where the user may select their order quantity as well as a price input field 10520 where the user may select their limit order or other type of order price as well as a type input label 10528 and type label input field 10521 as well as a button to submit 10536 a relevant order. In some embodiments, upon order price match of the limit order book buy queue with the limit order book sell queue, calendar layer 10301 may occur virtually or in person for the contract specification date and time and quality and time interval unit specification 10511 with integration into the user calendar once a trade is matched and complete to help the user keep track of the time interval unit obligations. In some embodiments, the virtual or in person delivery layer 10501 may show the video and or picture of the chef Gordon Ramsey 10502 to the calendar 10503. In some embodiments, the calendar layer 10501 may include the integration features with outlook calendar, google calendar, or a plurality of other calendar programs. In some embodiments, the geolocation exchange unit or time interval unit 10511 may have many types for telemedicine, legal, musicians, chefs, cooks, business persons, tutors, athletes, celebrities, professionals, teachers, engineers or more generally anyone or any topic selling or buying their time interval unit for a given specification. In some embodiments, the geolocation exchange unit or time interval unit may IPO or initial public offering once they commence selling to create the geolocation exchange unit specification which then may trade many times in the secondary market under the price time priority queue transformation structure and associated legal transformations to the time interval unit or geolocation exchange unit. In some embodiments, the calendar layer 10501 may provide supplemental data as the meeting is in person or it may provide supplemental data and virtual meeting structure through mobile CPU devices, stationary CPU devices, augmented reality CPU devices, virtual reality CPU devices, mixed reality CPU devices or a plurality of other CPU types or audio interfaces or sensory interfaces. In some embodiments, the virtual delivery layer 10510 may be one on one or one to many with video virtual delivery of the time unit interval unit. In some embodiments, the seller 10504 may present to many users 10511, 10512, 10506, 10507, 10508 with video communications or text or voice communications 10505, 10509.

Figure 106:
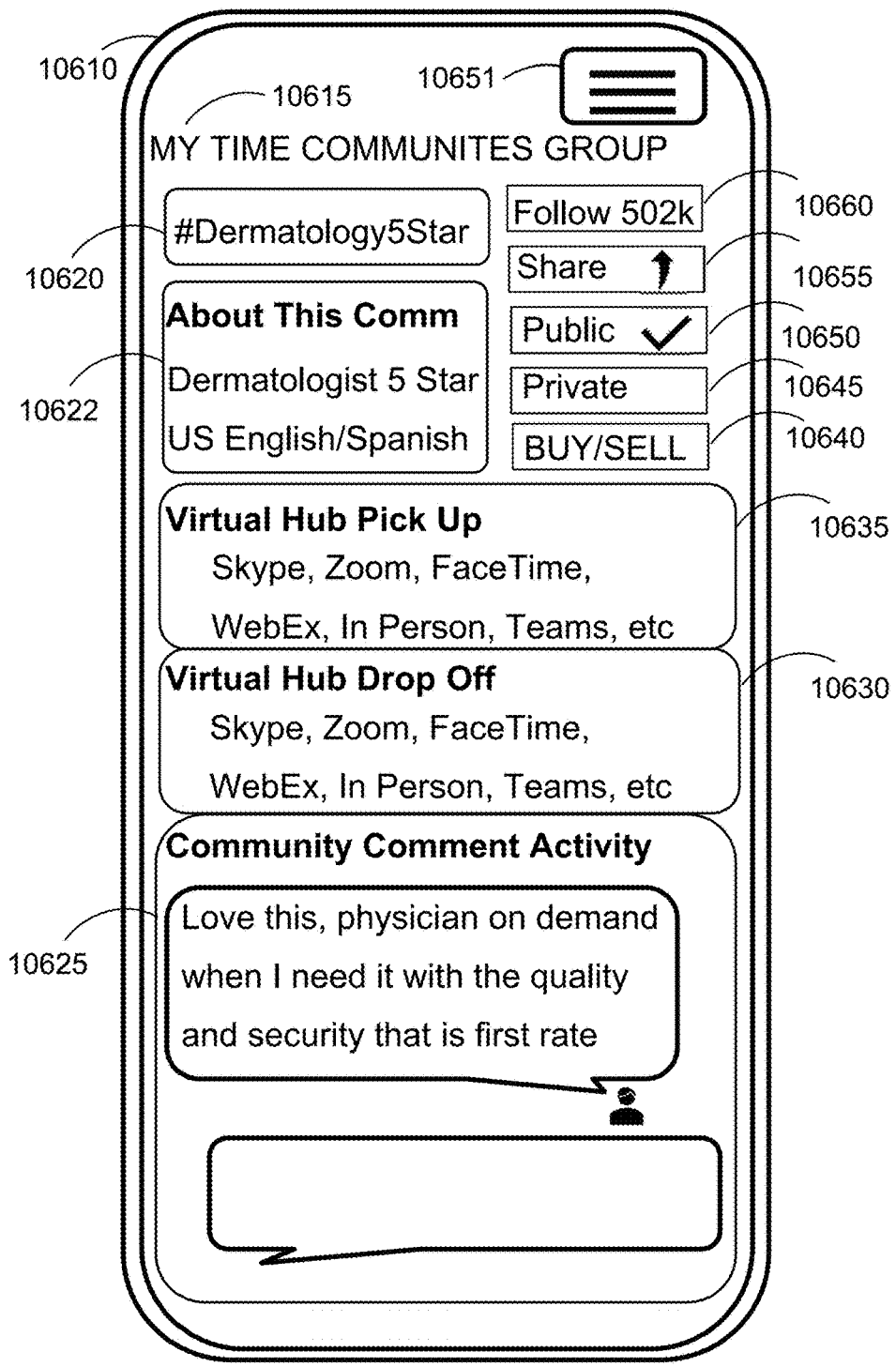
FIG. 106 illustrates an exemplary transformation creation and social network object of a time interval object Geolocation Exchange Unit for a Dermatology 5 star rated US English and Spanish Board Certified specification or Geolocation Exchange Unit portfolio on the exchange system with exemplary community comment activity of the time interval object.

FIG. 106 illustrates exemplary geolocation exchange unit object 10620 for the Dermatologist 5 star with the US board certification and ability to speak Spanish and English 10622 over a plurality of delivery methods that may be in person physically or virtually through augmented reality, mobile video computing, stationary video computing, mixed reality, virtual reality, audio computing devices, sensory computing devices or other computing devices with the ability to text 10625 in the community social network object which has been transformed into a security or tradable asset or commodity. In some embodiments, the community social network object transformation for the time unit interval or geolocation exchange unit may allow users to follow 10660, share 10655, keep private 10645, allow public access 10650 or move to a buy and sell price time priority queue 10640 for the given specification 10622.

The aforementioned description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising receiving user attribute data from a plurality of users over one or more wireless or wired communication networks, wherein the user attribute data comprises data corresponding to one or more user attributes for the plurality of users;

determining one or more virtual hub communities based on the user attribute data, wherein a respective virtual hub community corresponds to at least a portion of the user attribute data;

storing the one or more virtual hub communities on a first database server; and providing a time interval exchange for one or more time interval units based on the one or more virtual hub communities, wherein:

the one or more time interval units correspond to one or more time intervals for accessing one or more individuals, one or more businesses, one or more locations, or combinations thereof; and the time interval exchange corresponds to market depth data, the market depth data comprising data indicating one or more bid prices and one or more offer prices from the plurality of users for the one or more time interval units, wherein the time interval exchange is configured to allow for one or more trades of the one or more time interval units by the plurality of users, wherein the one or more trades comprise one or more purchases of the one or more time interval units by the plurality of users, one or more sales of the one or more time interval units by the plurality of users, or combinations thereof; and storing the time interval exchange on a second database server.

2. The method of claim 1, wherein the user attribute data comprises user location data, user search data, user profile data, or combinations thereof.

3. The method of claim 2, wherein:

the user location data comprises data determined using one or more satellite navigation systems, and wherein the user location data corresponds to one or more user locations for the plurality of users;

the user search data for a respective user comprises data corresponding to one or more subject searches performed by the respective user;

the user profile data for the respective user comprises data corresponding to one or more profile characteristics of the respective user; or combinations thereof.

4. The method of claim 1, wherein a respective time interval unit corresponds to a respective time interval having a specified date, a specified time, a specified duration, or combinations thereof.

5. The method of claim 1, wherein the one or more time intervals comprise one or more time intervals for accessing one or more services provided by the one or more individuals, one or more businesses, one or more locations, or combinations thereof.

6. The method of claim 5, wherein the one or more services comprise one or more medical services, one or more legal services, one or more food services, one or more professional services, one or more business services, one or more educational services, one or more physical training services, or combinations thereof.

7. The method of claim 1, wherein the market depth data further comprises activity data corresponding to the one or more time interval units, wherein the activity data comprises data associated with an amount of buyers, an amount of sellers, one or more transacted intervals, one or more completed trades, trading frequency, trading volume, one or more high trading prices, one or more low trading prices, or combinations thereof.

8. The method of claim 1, wherein the market depth data further comprises data corresponding to:

a bid queue for the one or more bid prices, wherein the one or more bid prices are ranked in the bid queue from highest price to lowest price, and wherein respective bid prices of the same value are ranked by time in the bid queue; and an offer queue for the one or more offer prices, wherein the one or more offer prices are ranked in the offer queue from lowest price to highest price, and wherein respective offer prices of the same value are ranked by time in the offer queue.

9. A method, comprising receiving user attribute data from a plurality of users over one or more wireless or wired communication networks, wherein the user attribute data comprises data corresponding to one or more user attributes for the plurality of users;

determining one or more virtual hub communities based on the user attribute data, wherein a respective virtual hub community corresponds to at least a portion of the user attribute data;

storing the one or more virtual hub communities on a first database server;

providing a time interval exchange for one or more time interval units based on the one or more virtual hub communities, wherein:

the one or more time interval units correspond to one or more time intervals for accessing one or more individuals, one or more businesses, one or more locations, or combinations thereof; and the time interval exchange corresponds to market depth data, the market depth data comprising data indicating one or more bid prices and one or more offer prices from the plurality of users for the one or more time interval units, wherein the one or more individuals comprise one or more physicians, one or more attorneys, one or more musicians, one or more tutors, one or more teachers, one or more chefs, one or more professionals, one or more engineers, one or more celebrities, or combinations thereof; and storing the time interval exchange on a second database server.

10. A method, comprising receiving user attribute data from a plurality of users, wherein the user attribute data comprises data corresponding to one or more user attributes for the plurality of users;

determining one or more virtual hub communities based on the user attribute data, wherein a respective virtual hub community corresponds to at least a portion of the user attribute data;

providing a time interval exchange for one or more time interval units based on the one or more virtual hub communities, wherein:

the one or more time interval units correspond to one or more time intervals for accessing one or more individuals, one or more businesses, one or more locations, or combinations thereof; and the time interval exchange corresponds to market depth data, the market depth data comprising data indicating one or more bid prices and one or more offer prices from the plurality of users for the one or more time interval units; and transmitting the market depth data to the plurality of users, wherein transmitting the market depth data comprises:

receiving constraint data from a respective user, wherein the constraint data indicates a selection by the respective user of one or more conditions for a respective time interval unit, and wherein the one or more conditions comprise cheapest route, single mode of transportation, multiple modes of transportation, fastest route, most scenic route, highest rated route, most available route, highest volume of participants for route, most frequent route, service level for route, emissions reduction, highest safety and security level for route, or combinations thereof; and transmitting the market depth data to the respective user based on at least the received constraint data.

11. The method of claim 10, wherein transmitting the market depth data comprises:
receiving updated market depth data for the time interval exchange in real time, wherein the updated market depth data comprises data corresponding to one or more updated bid prices and one or more updated offer prices for the one or more time interval units; and
transmitting at least a portion of the updated market depth data to the plurality of users.

12. A method, comprising
receiving user attribute data from a plurality of users, wherein the user attribute data comprises data corresponding to one or more user attributes for the plurality of users;
determining one or more virtual hub communities based on the user attribute data, wherein a respective virtual hub community corresponds to at least a portion of the user attribute data;
providing a time interval exchange for one or more time interval units based on the one or more virtual hub communities, wherein:
the one or more time interval units correspond to one or more time intervals for accessing one or more individuals, one or more businesses, one or more locations, or combinations thereof; and
the time interval exchange corresponds to market depth data, the market depth data comprising data indicating one or more bid prices and one or more offer prices from the plurality of users for the one or more time interval units, wherein the data indicating the one or more bid prices and the one or more offer prices comprises data indicating a first bid price or a first offer price from a first user of the plurality of users for a respective time interval unit;
receiving transaction input data from a second user of the plurality of users, wherein the transaction input data comprises data indicating an acceptance by the second user of the first bid price or the first offer price for the respective time interval unit;
generating a forward commodity contract between the first user and the second user based on the received transaction input data; and
arranging for delivery of the respective time interval unit based on the forward commodity contract, wherein arranging for the delivery comprises:
arranging for a physical delivery of one or more services provided by the one or more individuals, one or more businesses, one or more locations, or combinations thereof;
arranging for a virtual delivery of the one or more services provided by the one or more individuals, one or more businesses, one or more locations, or combinations thereof; or
combinations thereof.

13. The method of claim 12, wherein arranging for the virtual delivery comprises arranging for the virtual delivery using wired communication, wireless communication, audio communication, visual communication, augmented reality communication, mixed reality communication, virtual reality communication, or combinations thereof.

14. A computing system, comprising:
one or more processors; and
at least one memory comprising program instructions executable by the one or more processors to:
receive user attribute data from a plurality of users, wherein the user attribute data comprises data corresponding to one or more user attributes for the plurality of users;
determine one or more virtual hub communities based on the user attribute data, wherein a respective virtual hub community corresponds to at least a portion of the user attribute data; and
provide a time interval exchange for one or more time interval units based on the one or more virtual hub communities, wherein:
the one or more time interval units correspond to one or more time intervals for accessing one or more individuals, one or more businesses, one or more locations, or combinations thereof; and
the time interval exchange corresponds to market depth data, the market depth data comprising data indicating one or more bid prices and one or more offer prices from the plurality of users for the one or more time interval units, wherein the market depth data further comprises data corresponding to:
a bid queue for the one or more bid prices, wherein the one or more bid prices are ranked in the bid queue from highest price to lowest price, and wherein respective bid prices of the same value are ranked by time in the bid queue; and
an offer queue for the one or more offer prices, wherein the one or more offer prices are ranked in the offer queue from lowest price to highest price, and wherein respective offer prices of the same value are ranked by time in the offer queue.

15. The computing system of claim 14, wherein a respective time interval unit corresponds to a respective time interval having a specified date, a specified time, a specified duration, or combinations thereof.

16. A non-transitory computer-readable medium having stored thereon a plurality of computer-executable instructions which, when executed by a computer, cause the computer to:
receive user attribute data from a plurality of users, wherein the user attribute data comprises data corresponding to one or more user attributes for the plurality of users;
determine one or more virtual hub communities based on the user attribute data, wherein a respective virtual hub community corresponds to at least a portion of the user attribute data; and
provide a time interval exchange for one or more time interval units based on the one or more virtual hub communities, wherein:
the one or more time interval units correspond to one or more time intervals for accessing one or more individuals, one or more businesses, one or more locations, or combinations thereof;
the time interval exchange corresponds to market depth data, the market depth data comprising data indicating one or more bid prices and one or more offer prices from the plurality of users for the one or more time interval units; and
the user attribute data comprises user location data, user search data, user profile data, or combinations thereof; and wherein:
the user location data comprises data determined using one or more satellite navigation systems, and wherein the user location data corresponds to one or more user locations for the plurality of users;

the user search data for a respective user comprises data corresponding to one or more subject searches performed by the respective user;

the user profile data for the respective user comprises data corresponding to one or more profile characteristics of the respective user; or combinations thereof.

17. The non-transitory computer-readable medium of claim 16, wherein:

the one or more time intervals comprise one or more time intervals for accessing one or more services provided by the one or more individuals, one or more businesses, one or more locations, or combinations thereof; and the one or more services comprise one or more medical services, one or more legal services, one or more food services, one or more professional services, one or more business services, one or more educational services, one or more physical training services, or combinations thereof.

* * * * *